(12) United States Patent
Wang

(10) Patent No.: US 11,625,550 B2
(45) Date of Patent: Apr. 11, 2023

(54) APPARATUS HAVING HYBRID MONOCHROME AND COLOR IMAGE SENSOR ARRAY

(71) Applicant: HAND HELD PRODUCTS, INC., Charlotte, NC (US)

(72) Inventor: Ynjiun P. Wang, Cupertino, CA (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/523,231

(22) Filed: Nov. 10, 2021

(65) Prior Publication Data

US 2022/0284202 A1 Sep. 8, 2022

Related U.S. Application Data

(60) Continuation of application No. 17/167,464, filed on Feb. 4, 2021, now Pat. No. 11,238,251, which is a continuation of application No. 16/874,217, filed on May 14, 2020, now Pat. No. 10,949,634, which is a continuation of application No. 15/980,213, filed on
(Continued)

(51) Int. Cl.
| | | |
|---|---|---|
| *G06K 7/10* | (2006.01) | |
| *G06K 7/14* | (2006.01) | |
| *H04N 23/10* | (2023.01) | |
| *H04N 23/84* | (2023.01) | |

(Continued)

(52) U.S. Cl.
CPC ........... *G06K 7/10752* (2013.01); *G06K 7/10* (2013.01); *G06K 7/10722* (2013.01); *G06K 7/10732* (2013.01); *G06K 7/10811* (2013.01); *G06K 7/12* (2013.01); *G06K 7/14* (2013.01); *G06K 7/1417* (2013.01); *G06K 7/1443* (2013.01); *H04N 23/10* (2023.01); *H04N 23/843* (2023.01); *H04N 25/134* (2023.01)

(58) Field of Classification Search
CPC .. G06K 7/10752; G06K 7/10; G06K 7/10722; G06K 7/10811; G06K 7/10732; G06K 7/12; G06K 7/14; G06K 7/1417; G06K 7/1443; H04N 9/045
See application file for complete search history.

(56) References Cited

U.S. PATENT DOCUMENTS

| | | |
|---|---|---|
| 3,378,633 A | 4/1968 | Mbert |
| 3,684,868 A | 8/1972 | Christie et al. |

(Continued)

FOREIGN PATENT DOCUMENTS

| | | |
|---|---|---|
| AU | 2004227423 A1 | 10/2004 |
| CN | 1504824 A | 6/2004 |

(Continued)

OTHER PUBLICATIONS

US 8,038,065 B2, 09/2011, Wang et al. (withdrawn)

(Continued)

*Primary Examiner* — Laura A Gudorf
(74) *Attorney, Agent, or Firm* — Alston & Bird LLP

(57) ABSTRACT

There is provided in one embodiment an apparatus having an image sensor array. In one embodiment, the image sensor array can include monochrome pixels and color sensitive pixels. The monochrome pixels can be pixels without wavelength selective color filter elements. The color sensitive pixels can include wavelength selective color filter elements.

19 Claims, 36 Drawing Sheets

Related U.S. Application Data

May 15, 2018, now Pat. No. 10,691,907, which is a continuation of application No. 15/244,683, filed on Aug. 23, 2016, now Pat. No. 10,002,272, which is a continuation of application No. 14/684,609, filed on Apr. 13, 2015, now Pat. No. 9,454,686, which is a continuation of application No. 14/221,874, filed on Mar. 21, 2014, now Pat. No. 9,058,527, which is a continuation of application No. 13/493,348, filed on Jun. 11, 2012, now Pat. No. 8,720,785, which is a division of application No. 12/853,090, filed on Aug. 9, 2010, now Pat. No. 8,196,839, which is a division of application No. 11/445,930, filed on Jun. 2, 2006, now Pat. No. 7,770,799.

(60) Provisional application No. 60/694,371, filed on Jun. 27, 2005, provisional application No. 60/692,890, filed on Jun. 22, 2005, provisional application No. 60/690,268, filed on Jun. 14, 2005, provisional application No. 60/687,606, filed on Jun. 3, 2005.

(51) Int. Cl.
*H04N 25/13* (2023.01)
*G06K 7/12* (2006.01)

(56) References Cited

U.S. PATENT DOCUMENTS

| | | |
|---|---|---|
| 3,716,669 A | 2/1973 | Watanabe |
| 3,716,699 A | 2/1973 | Eckert et al. |
| 3,949,363 A | 4/1976 | Holm |
| 3,971,065 A | 7/1976 | Bayer |
| 4,047,203 A | 9/1977 | Dillon |
| 4,121,244 A | 10/1978 | Nakabe et al. |
| 4,253,447 A | 3/1981 | Moore et al. |
| 4,261,344 A | 4/1981 | Moore et al. |
| 4,350,418 A | 9/1982 | Taguchi et al. |
| 4,353,641 A | 10/1982 | Merlo |
| RE31,289 E | 6/1983 | Moore et al. |
| RE31,290 E | 6/1983 | Moore et al. |
| 4,390,895 A | 6/1983 | Sato et al. |
| 4,402,088 A | 8/1983 | McWaters et al. |
| 4,437,112 A | 3/1984 | Tanaka et al. |
| 4,491,865 A | 1/1985 | Danna et al. |
| 4,516,017 A | 5/1985 | Hara et al. |
| 4,523,224 A | 6/1985 | Longacre, Jr. |
| 4,546,379 A | 10/1985 | Sarofeen et al. |
| 4,570,057 A | 2/1986 | Chadima et al. |
| 4,605,956 A | 8/1986 | Cok |
| 4,613,895 A | 9/1986 | Burkey |
| 4,630,307 A | 12/1986 | Cok |
| 4,724,394 A | 2/1988 | Langer et al. |
| 4,724,521 A | 2/1988 | Carron et al. |
| 4,760,411 A | 7/1988 | Ohmura et al. |
| 4,774,565 A | 9/1988 | Freeman |
| 4,793,689 A | 12/1988 | Aoyagi et al. |
| 4,794,239 A | 12/1988 | Allais |
| 4,806,776 A | 2/1989 | Kley |
| 4,807,981 A | 2/1989 | Takizawa et al. |
| 4,823,186 A | 4/1989 | Muramatsu |
| 4,853,774 A | 8/1989 | Danna et al. |
| 4,854,302 A | 8/1989 | Allred, III |
| 4,858,020 A | 8/1989 | Homma |
| 4,862,253 A | 8/1989 | English et al. |
| 4,874,936 A | 10/1989 | Chandler et al. |
| 4,877,948 A | 10/1989 | Krueger |
| 4,877,949 A | 10/1989 | Danielson et al. |
| 4,915,483 A | 4/1990 | Robb |
| 4,941,456 A | 7/1990 | Wood et al. |
| 4,957,346 A | 9/1990 | Wood et al. |
| 4,958,064 A | 9/1990 | Kirkpatrick |
| 4,962,419 A | 10/1990 | Hibbard et al. |
| 4,963,756 A | 10/1990 | Quan et al. |
| 5,018,006 A | 5/1991 | Hashimoto |
| 5,019,699 A | 5/1991 | Koenck |
| 5,040,064 A | 8/1991 | Cok |
| 5,059,146 A | 10/1991 | Thomas et al. |
| 5,059,779 A | 10/1991 | Krichever et al. |
| 5,073,954 A | 12/1991 | Van et al. |
| 5,089,885 A | 2/1992 | Clark |
| 5,113,251 A | 5/1992 | Ichiyanagi et al. |
| 5,124,539 A | 6/1992 | Krichever et al. |
| 5,135,160 A | 8/1992 | Tasaki |
| 5,144,190 A | 9/1992 | Thomas et al. |
| 5,155,343 A | 10/1992 | Chandler et al. |
| 5,177,621 A | 1/1993 | Ohtaki et al. |
| 5,192,856 A | 3/1993 | Schaham |
| 5,196,684 A | 3/1993 | Lum et al. |
| 5,200,599 A | 4/1993 | Krichever et al. |
| 5,222,477 A | 6/1993 | Lia |
| 5,227,614 A | 7/1993 | Danielson et al. |
| 5,262,623 A | 11/1993 | Batterman et al. |
| 5,278,642 A | 1/1994 | Danna et al. |
| 5,288,985 A | 2/1994 | Chadima et al. |
| 5,291,008 A | 3/1994 | Havens et al. |
| 5,296,690 A | 3/1994 | Chandler et al. |
| 5,304,786 A | 4/1994 | Pavlidis et al. |
| 5,305,122 A | 4/1994 | Hayashi et al. |
| 5,308,962 A | 5/1994 | Havens et al. |
| 5,311,001 A | 5/1994 | Joseph et al. |
| 5,323,233 A | 6/1994 | Yamagami et al. |
| 5,323,327 A | 6/1994 | Carmichael et al. |
| 5,325,217 A | 6/1994 | Nagler et al. |
| 5,337,361 A | 8/1994 | Wang et al. |
| 5,340,786 A | 8/1994 | Tsutsui et al. |
| 5,343,028 A | 8/1994 | Figarella et al. |
| 5,347,374 A | 9/1994 | Fuss et al. |
| 5,354,977 A | 10/1994 | Roustaei |
| 5,369,778 A | 11/1994 | San et al. |
| 5,374,956 A | 12/1994 | D Luna |
| 5,378,883 A | 1/1995 | Batterman et al. |
| 5,382,782 A | 1/1995 | Hasegawa et al. |
| 5,393,965 A | 2/1995 | Bravman et al. |
| 5,399,846 A | 3/1995 | Pavlidis et al. |
| 5,401,944 A | 3/1995 | Bravman et al. |
| 5,406,032 A | 4/1995 | Clayton et al. |
| 5,406,062 A | 4/1995 | Hasegawa et al. |
| 5,410,141 A | 4/1995 | Koenck et al. |
| 5,410,649 A | 4/1995 | Gove |
| 5,414,538 A | 5/1995 | Eschbach |
| 5,452,379 A | 9/1995 | Poor |
| 5,463,214 A | 10/1995 | Longacre et al. |
| 5,468,951 A | 11/1995 | Knowles et al. |
| 5,471,533 A | 11/1995 | Wang et al. |
| 5,475,207 A | 12/1995 | Bobba et al. |
| 5,504,322 A | 4/1996 | Pavlidis et al. |
| 5,506,619 A | 4/1996 | Adams et al. |
| 5,513,264 A | 4/1996 | Wang et al. |
| 5,521,366 A | 5/1996 | Wang et al. |
| 5,527,262 A | 6/1996 | Monroe et al. |
| 5,532,467 A | 7/1996 | Roustaei |
| 5,541,777 A | 7/1996 | Sakamoto et al. |
| 5,572,006 A | 11/1996 | Wang et al. |
| 5,576,529 A | 11/1996 | Koenck et al. |
| 5,581,071 A | 12/1996 | Chen et al. |
| 5,591,952 A | 1/1997 | Krichever et al. |
| 5,591,955 A | 1/1997 | Laser |
| 5,602,377 A | 2/1997 | Beller et al. |
| 5,602,379 A | 2/1997 | Uchimura et al. |
| 5,608,204 A | 3/1997 | Hoefflinger et al. |
| 5,629,734 A | 5/1997 | Hamilton et al. |
| 5,637,849 A | 6/1997 | Wang et al. |
| 5,640,002 A | 6/1997 | Ruppert et al. |
| 5,646,390 A | 7/1997 | Wang et al. |
| 5,652,621 A | 7/1997 | Adams et al. |
| 5,654,533 A | 8/1997 | Suzuki et al. |
| 5,659,167 A | 8/1997 | Wang et al. |
| 5,662,586 A | 9/1997 | Monroe et al. |
| 5,672,858 A | 9/1997 | Li et al. |
| 5,680,542 A | 10/1997 | Mulchandani et al. |
| 5,691,773 A | 11/1997 | Wang et al. |
| 5,702,058 A | 12/1997 | Dobbs et al. |

(56) References Cited

U.S. PATENT DOCUMENTS

| | | |
|---|---|---|
| 5,702,059 A | 12/1997 | Chu et al. |
| 5,703,348 A | 12/1997 | Suzuki et al. |
| 5,703,349 A | 12/1997 | Meyerson et al. |
| 5,714,745 A | 2/1998 | Ju et al. |
| 5,717,195 A | 2/1998 | Feng et al. |
| 5,719,540 A | 2/1998 | Takaoka et al. |
| 5,723,853 A | 3/1998 | Longacre et al. |
| 5,723,868 A | 3/1998 | Hammond et al. |
| 5,739,518 A | 4/1998 | Wang |
| 5,751,844 A | 5/1998 | Bolin et al. |
| 5,754,670 A | 5/1998 | Shin et al. |
| 5,756,981 A | 5/1998 | Roustaei et al. |
| 5,763,864 A | 6/1998 | O'Hagan et al. |
| 5,763,866 A | 6/1998 | Seo et al. |
| 5,770,847 A | 6/1998 | Olmstead |
| 5,773,810 A | 6/1998 | Hussey et al. |
| 5,773,814 A | 6/1998 | Phillips et al. |
| 5,777,314 A | 7/1998 | Roustaei |
| 5,781,708 A | 7/1998 | Austin et al. |
| 5,783,811 A | 7/1998 | Feng et al. |
| 5,784,102 A | 7/1998 | Hussey et al. |
| 5,786,582 A | 7/1998 | Roustaei et al. |
| 5,786,586 A | 7/1998 | Pidhirny et al. |
| 5,793,033 A | 8/1998 | Feng et al. |
| 5,796,089 A | 8/1998 | Marom |
| 5,804,805 A | 9/1998 | Koenck et al. |
| 5,805,779 A | 9/1998 | Christopher et al. |
| 5,808,286 A | 9/1998 | Nukui et al. |
| 5,809,161 A | 9/1998 | Auty et al. |
| 5,811,774 A | 9/1998 | Ju et al. |
| 5,811,784 A | 9/1998 | Tausch et al. |
| 5,811,828 A | 9/1998 | Laser |
| 5,814,801 A | 9/1998 | Wang et al. |
| 5,814,803 A | 9/1998 | Olmstead |
| 5,815,200 A | 9/1998 | Ju et al. |
| 5,818,023 A | 10/1998 | Meyerson et al. |
| 5,818,028 A | 10/1998 | Meyerson et al. |
| 5,818,528 A | 10/1998 | Roth et al. |
| 5,818,975 A | 10/1998 | Goodwin et al. |
| 5,821,518 A | 10/1998 | Sussmeier et al. |
| 5,821,523 A | 10/1998 | Bunte et al. |
| 5,825,006 A | 10/1998 | Longacre et al. |
| 5,831,254 A | 11/1998 | Karpen et al. |
| 5,832,289 A | 11/1998 | Shaw et al. |
| 5,834,754 A | 11/1998 | Feng et al. |
| 5,837,987 A | 11/1998 | Danielson et al. |
| 5,841,121 A | 11/1998 | Koenck |
| 5,861,960 A | 1/1999 | Suzuki et al. |
| 5,867,594 A | 2/1999 | Cymbalski |
| 5,877,487 A | 3/1999 | Tani et al. |
| 5,880,451 A | 3/1999 | Smith et al. |
| 5,883,375 A | 3/1999 | Knowles et al. |
| 5,892,971 A | 4/1999 | Danielson et al. |
| 5,896,297 A | 4/1999 | Valerino |
| 5,896,403 A | 4/1999 | Nagasaki et al. |
| 5,900,613 A | 5/1999 | Koziol et al. |
| 5,901,243 A | 5/1999 | Beretta |
| 5,909,559 A | 6/1999 | So |
| 5,914,476 A | 6/1999 | Gerst et al. |
| 5,914,773 A | 6/1999 | Kurosawa et al. |
| 5,917,913 A | 6/1999 | Wang |
| 5,920,061 A | 7/1999 | Feng |
| 5,929,418 A | 7/1999 | Ehrhart et al. |
| 5,932,741 A | 8/1999 | Heckmann et al. |
| 5,932,862 A | 8/1999 | Hussey et al. |
| 5,932,872 A | 8/1999 | Price |
| 5,936,218 A | 8/1999 | Ohkawa et al. |
| 5,936,224 A | 8/1999 | Shimizu et al. |
| 5,940,163 A | 8/1999 | Byrum |
| 5,942,741 A | 8/1999 | Longacre et al. |
| 5,949,052 A | 9/1999 | Longacre et al. |
| 5,949,056 A | 9/1999 | White |
| 5,949,057 A | 9/1999 | Feng |
| 5,965,875 A | 10/1999 | Merrill |
| 5,969,326 A | 10/1999 | Ogami |
| 5,978,610 A | 11/1999 | Aoki |
| 5,979,753 A | 11/1999 | Roslak |
| 5,979,757 A | 11/1999 | Tracy et al. |
| 5,979,763 A | 11/1999 | Wang et al. |
| 5,986,297 A | 11/1999 | Guidash et al. |
| 5,988,506 A | 11/1999 | Schaham et al. |
| 5,992,744 A | 11/1999 | Smith et al. |
| 5,992,751 A | 11/1999 | Laser |
| 5,992,753 A | 11/1999 | Jianhu |
| 6,003,008 A | 12/1999 | Postrel et al. |
| 6,006,990 A | 12/1999 | Ye et al. |
| 6,010,070 A | 1/2000 | Mizuochi et al. |
| 6,010,073 A | 1/2000 | Bianchi |
| 6,015,088 A | 1/2000 | Parker et al. |
| 6,016,135 A | 1/2000 | Biss et al. |
| 6,019,286 A | 2/2000 | Li et al. |
| 6,042,012 A | 3/2000 | Olmstead et al. |
| 6,045,047 A | 4/2000 | Pidhirny et al. |
| 6,045,238 A | 4/2000 | Wheeler et al. |
| 6,049,813 A | 4/2000 | Danielson et al. |
| 6,053,407 A | 4/2000 | Wang et al. |
| 6,053,408 A | 4/2000 | Stoner |
| 6,057,554 A | 5/2000 | Plesko |
| 6,058,498 A | 5/2000 | Nagasaki et al. |
| 6,060,722 A | 5/2000 | Havens et al. |
| 6,062,455 A | 5/2000 | Giannuzzi et al. |
| 6,062,475 A | 5/2000 | Feng |
| 6,062,477 A | 5/2000 | Wike et al. |
| 6,069,696 A | 5/2000 | Mcqueen et al. |
| 6,073,851 A | 6/2000 | Olmstead et al. |
| 6,075,240 A | 6/2000 | Watanabe et al. |
| 6,082,619 A | 7/2000 | Ma et al. |
| 6,084,528 A | 7/2000 | Beach et al. |
| 6,088,058 A | 7/2000 | Mead et al. |
| 6,094,221 A | 7/2000 | Anderson |
| 6,095,422 A | 8/2000 | Yuji |
| 6,097,835 A | 8/2000 | Lindgren |
| 6,097,839 A | 8/2000 | Liu |
| 6,097,856 A | 8/2000 | Hammond, Jr. |
| 6,098,887 A | 8/2000 | Figarella et al. |
| 6,102,293 A | 8/2000 | Barkan et al. |
| 6,102,295 A | 8/2000 | Yuji |
| 6,105,869 A | 8/2000 | Scharf et al. |
| 6,109,526 A | 8/2000 | Ohanian et al. |
| 6,118,552 A | 9/2000 | Suzuki et al. |
| 6,119,941 A | 9/2000 | Katsandres et al. |
| 6,123,261 A | 9/2000 | Roustaei |
| 6,123,263 A | 9/2000 | Feng |
| 6,128,414 A | 10/2000 | Liu |
| 6,128,420 A | 10/2000 | Shin et al. |
| 6,141,046 A | 10/2000 | Roth et al. |
| 6,142,934 A | 11/2000 | Lagerway et al. |
| 6,152,368 A | 11/2000 | Olmstead et al. |
| 6,155,488 A | 12/2000 | Olmstead et al. |
| 6,155,491 A | 12/2000 | Dueker et al. |
| 6,157,027 A | 12/2000 | Watanabe et al. |
| 6,164,544 A | 12/2000 | Schwartz et al. |
| 6,166,768 A | 12/2000 | Fossum et al. |
| 6,176,429 B1 | 1/2001 | Reddersen et al. |
| 6,179,208 B1 | 1/2001 | Feng |
| 6,184,534 B1 | 2/2001 | Stephany et al. |
| 6,186,404 B1 | 2/2001 | Ehrhart et al. |
| 6,191,406 B1 | 2/2001 | Nelson et al. |
| 6,209,789 B1 | 4/2001 | Amundsen et al. |
| 6,216,953 B1 | 4/2001 | Kumagai et al. |
| 6,223,986 B1 | 5/2001 | Bobba |
| 6,223,988 B1 | 5/2001 | Batterman et al. |
| 6,225,670 B1 | 5/2001 | Dierickx |
| 6,230,975 B1 | 5/2001 | Colley et al. |
| 6,234,394 B1 | 5/2001 | Kahn et al. |
| 6,247,645 B1 | 6/2001 | Harris et al. |
| 6,250,551 B1 | 6/2001 | He et al. |
| 6,254,003 B1 | 7/2001 | Iinelli et al. |
| 6,262,804 B1 | 7/2001 | Friend et al. |
| 6,264,105 B1 | 7/2001 | Longacre et al. |
| 6,276,605 B1 | 8/2001 | Olmstead et al. |
| 6,283,374 B1 | 9/2001 | Fantone et al. |
| 6,289,176 B1 | 9/2001 | Martter et al. |
| 6,298,175 B1 | 10/2001 | Longacre et al. |

(56) References Cited

U.S. PATENT DOCUMENTS

| | | |
|---|---|---|
| 6,298,176 B2 | 10/2001 | Longacre et al. |
| 6,304,660 B1 | 10/2001 | Ehrhart et al. |
| 6,311,895 B1 | 11/2001 | Olmstead et al. |
| 6,311,896 B1 | 11/2001 | Mulla et al. |
| 6,313,917 B1 | 11/2001 | Tang et al. |
| 6,315,203 B1 | 11/2001 | Ikeda et al. |
| 6,315,204 B1 | 11/2001 | Knighton et al. |
| 6,318,635 B1 | 11/2001 | Stoner |
| 6,318,637 B1 | 11/2001 | Stoner |
| 6,321,266 B1 | 11/2001 | Yokomizo et al. |
| 6,330,975 B1 | 12/2001 | Bunte et al. |
| 6,336,587 B1 | 1/2002 | He et al. |
| 6,340,114 B1 | 1/2002 | Correa et al. |
| 6,347,163 B2 | 2/2002 | Roustaei |
| 6,357,659 B1 | 3/2002 | Kelly et al. |
| 6,362,868 B1 | 3/2002 | Silverbrook |
| 6,371,374 B1 | 4/2002 | Schwartz et al. |
| 6,375,075 B1 | 4/2002 | Ackley et al. |
| 6,385,352 B1 | 5/2002 | Roustaei |
| 6,386,452 B1 | 5/2002 | Kawamura |
| 6,398,112 B1 | 6/2002 | Li et al. |
| 6,405,925 B2 | 6/2002 | He et al. |
| 6,405,929 B1 | 6/2002 | Ehrhart et al. |
| 6,411,397 B1 | 6/2002 | Petteruti et al. |
| 6,419,157 B1 | 7/2002 | Ehrhart et al. |
| 6,431,452 B2 | 8/2002 | Feng |
| 6,435,411 B1 | 8/2002 | Massieu et al. |
| 6,452,153 B1 | 9/2002 | Lauxtermann et al. |
| 6,456,798 B1 | 9/2002 | Keech et al. |
| 6,459,509 B1 | 10/2002 | Maciey et al. |
| 6,460,766 B1 | 10/2002 | Olschafskie et al. |
| 6,463,173 B1 | 10/2002 | Tretter |
| 6,469,289 B1 | 10/2002 | Scott-Thomas et al. |
| 6,473,126 B1 | 10/2002 | Higashihara et al. |
| 6,474,865 B2 | 11/2002 | Nakajo |
| 6,476,865 B1 | 11/2002 | Gindele et al. |
| 6,486,503 B1 | 11/2002 | Fossum |
| 6,489,798 B1 | 12/2002 | Scott-Thomas et al. |
| 6,491,223 B1 | 12/2002 | Longacre et al. |
| 6,493,114 B1 | 12/2002 | Liu |
| 6,499,664 B2 | 12/2002 | Knowles et al. |
| 6,505,778 B1 | 1/2003 | Reddersen et al. |
| 6,522,323 B1 | 2/2003 | Sasaki et al. |
| 6,522,441 B1 | 2/2003 | Rudeen |
| 6,527,182 B1 | 3/2003 | Chiba et al. |
| 6,533,168 B1 | 3/2003 | Ching |
| 6,550,679 B2 | 4/2003 | Hennick et al. |
| 6,552,323 B2 | 4/2003 | Guidash et al. |
| 6,561,428 B2 | 5/2003 | Meier et al. |
| 6,565,003 B1 | 5/2003 | Ma |
| 6,575,367 B1 | 6/2003 | Longacre, Jr. |
| 6,575,368 B1 | 6/2003 | Tamburrini et al. |
| 6,575,369 B1 | 6/2003 | Knowles et al. |
| 6,576,883 B1 | 6/2003 | McCoy |
| 6,578,766 B1 | 6/2003 | Parker et al. |
| 6,598,797 B2 | 7/2003 | Lee |
| 6,603,508 B1 | 8/2003 | Hata |
| 6,611,289 B1 | 8/2003 | Yu et al. |
| 6,621,598 B1 | 9/2003 | Oda |
| 6,622,276 B2 | 9/2003 | Nagasaki et al. |
| 6,637,658 B2 | 10/2003 | Barber et al. |
| 6,646,246 B1 | 11/2003 | Gindele et al. |
| 6,654,062 B1 | 11/2003 | Numata et al. |
| 6,655,595 B1 | 12/2003 | Longacre et al. |
| 6,655,597 B1 | 12/2003 | Swartz et al. |
| 6,661,521 B1 | 12/2003 | Stern |
| 6,665,012 B1 | 12/2003 | Yang et al. |
| 6,665,384 B2 | 12/2003 | Daum et al. |
| 6,669,093 B1 | 12/2003 | Meyerson et al. |
| 6,671,394 B1 | 12/2003 | Sako |
| 6,676,016 B1 | 1/2004 | Coskrey, IV |
| 6,681,994 B1 | 1/2004 | Koenck |
| 6,688,525 B1 | 2/2004 | Nelson et al. |
| 6,694,064 B1 | 2/2004 | Benkelman |
| 6,695,209 B1 | 2/2004 | La |
| 6,698,656 B2 | 3/2004 | Parker et al. |
| 6,713,747 B2 | 3/2004 | Tanimoto |
| 6,714,239 B2 | 3/2004 | Guidash |
| 6,714,969 B1 | 3/2004 | Klein et al. |
| 6,722,569 B2 | 4/2004 | Ehrhart et al. |
| 6,729,546 B2 | 5/2004 | Roustaei |
| 6,736,320 B1 | 5/2004 | Crowther et al. |
| 6,749,120 B2 | 6/2004 | Hung et al. |
| 6,750,906 B1 | 6/2004 | Itani et al. |
| 6,752,319 B2 | 6/2004 | Ehrhart et al. |
| 6,774,893 B2 | 8/2004 | Debiez et al. |
| 6,778,210 B1 | 8/2004 | Sugahara et al. |
| 6,789,737 B2 | 9/2004 | Tien |
| 6,807,294 B2 | 10/2004 | Yamazaki |
| 6,809,766 B1 | 10/2004 | Krymski et al. |
| 6,811,088 B2 | 11/2004 | Lanzaro et al. |
| 6,813,046 B1 | 11/2004 | Gindele et al. |
| 6,814,290 B2 | 11/2004 | Longacre |
| 6,821,810 B1 | 11/2004 | Hsiao et al. |
| 6,824,059 B2 | 11/2004 | Jam et al. |
| 6,832,725 B2 | 12/2004 | Gardiner et al. |
| 6,832,729 B1 | 12/2004 | Perry et al. |
| 6,834,807 B2 | 12/2004 | Ehrhart et al. |
| 6,836,288 B1 | 12/2004 | Flewis |
| 6,836,289 B2 | 12/2004 | Koshiba et al. |
| 6,853,293 B2 | 2/2005 | Swartz et al. |
| 6,860,428 B1 | 3/2005 | Dowling et al. |
| 6,863,217 B2 | 3/2005 | Hudrick et al. |
| 6,877,664 B1 | 4/2005 | Oliva |
| 6,879,340 B1 | 4/2005 | Chevallier |
| 6,880,759 B2 | 4/2005 | Wilde et al. |
| 6,889,904 B2 | 5/2005 | Bianculli et al. |
| 6,892,067 B1 | 5/2005 | Sharma et al. |
| 6,910,633 B2 | 6/2005 | Swartz et al. |
| 6,917,381 B2 | 7/2005 | Acharya et al. |
| 6,921,200 B1 | 7/2005 | Booysen et al. |
| 6,937,774 B1 | 8/2005 | Specht et al. |
| 6,950,139 B2 | 9/2005 | Nobuhiro |
| 6,956,544 B2 | 10/2005 | Valliath et al. |
| 6,956,704 B2 | 10/2005 | Oomura et al. |
| 6,959,865 B2 | 11/2005 | Walczyk et al. |
| 6,969,003 B2 | 11/2005 | Havens et al. |
| 6,969,352 B2 | 11/2005 | Chiang et al. |
| 6,976,626 B2 | 12/2005 | Schmidt et al. |
| 6,976,631 B2 | 12/2005 | Kashi et al. |
| 6,993,184 B2 | 1/2006 | Matsugu |
| 7,009,638 B2 | 3/2006 | Gruber et al. |
| 7,014,114 B2 | 3/2006 | Maiman |
| 7,021,542 B2 | 4/2006 | Patel et al. |
| 7,025,272 B2 | 4/2006 | Yavid et al. |
| 7,036,735 B2 | 5/2006 | Hepworth et al. |
| 7,044,377 B2 | 5/2006 | Patel et al. |
| 7,044,378 B2 | 5/2006 | Patel et al. |
| 7,055,747 B2 | 6/2006 | Havens et al. |
| 7,057,654 B2 | 6/2006 | Roddy et al. |
| 7,059,525 B2 | 6/2006 | Longacre et al. |
| 7,073,715 B2 | 7/2006 | Patel et al. |
| 7,077,317 B2 | 7/2006 | Longacre et al. |
| 7,077,319 B2 | 7/2006 | Schnee et al. |
| 7,077,321 B2 | 7/2006 | Longacre et al. |
| 7,079,230 B1 | 7/2006 | McInerney et al. |
| 7,080,786 B2 | 7/2006 | Longacre et al. |
| 7,083,098 B2 | 8/2006 | Joseph et al. |
| 7,086,595 B2 | 8/2006 | Zhu et al. |
| 7,086,596 B2 | 8/2006 | Meier et al. |
| 7,087,883 B2 | 8/2006 | He et al. |
| 7,090,132 B2 | 8/2006 | Havens et al. |
| 7,090,133 B2 | 8/2006 | Zhu |
| 7,110,028 B1 | 9/2006 | Merrill |
| 7,111,787 B2 | 9/2006 | Ehrhart |
| 7,113,213 B2 | 9/2006 | Matsunaga et al. |
| 7,121,470 B2 | 10/2006 | McCall et al. |
| 7,123,755 B2 | 10/2006 | Shigeta |
| 7,128,266 B2 | 10/2006 | Zhu et al. |
| 7,129,979 B1 | 10/2006 | Lee |
| 7,130,047 B2 | 10/2006 | Chinnock et al. |
| 7,131,591 B1 * | 11/2006 | Herrod ............... G06K 7/10346 235/472.02 |
| 7,137,555 B2 | 11/2006 | Bremer et al. |

(56) References Cited

U.S. PATENT DOCUMENTS

| | | |
|---|---|---|
| 7,147,163 B2 | 12/2006 | Salvato et al. |
| 7,148,923 B2 | 12/2006 | Harper et al. |
| 7,159,783 B2 | 1/2007 | Walczyk et al. |
| 7,173,663 B2 | 2/2007 | Skow et al. |
| 7,187,442 B2 | 3/2007 | Chinnock et al. |
| 7,195,164 B2 | 3/2007 | Patel |
| 7,204,418 B2 | 4/2007 | Joseph et al. |
| 7,219,841 B2 | 5/2007 | Biss et al. |
| 7,219,843 B2 | 5/2007 | Havens et al. |
| 7,221,394 B2 | 5/2007 | Enomoto |
| 7,222,789 B2 | 5/2007 | Longacre et al. |
| 7,224,389 B2 | 5/2007 | Dierickx |
| 7,234,641 B2 | 6/2007 | Olmstead |
| 7,237,722 B2 | 7/2007 | Zhu et al. |
| 7,237,772 B2 | 7/2007 | Kamamura |
| 7,245,271 B2 | 7/2007 | Nixon et al. |
| 7,268,924 B2 | 9/2007 | Hussey et al. |
| 7,270,273 B2 | 9/2007 | Barber et al. |
| 7,270,274 B2 | 9/2007 | Hennick et al. |
| 7,273,298 B2 | 9/2007 | Laschke et al. |
| 7,276,025 B2 | 10/2007 | Roberts et al. |
| 7,277,562 B2 | 10/2007 | Zyzdryn |
| 7,281,661 B2 | 10/2007 | Zhu et al. |
| 7,287,696 B2 | 10/2007 | Attia et al. |
| 7,293,712 B2 | 11/2007 | Wang |
| 7,296,744 B2 | 11/2007 | He et al. |
| 7,296,749 B2 | 11/2007 | Massieu |
| 7,303,126 B2 | 12/2007 | Patel et al. |
| 7,303,131 B2 | 12/2007 | Carlson et al. |
| 7,327,478 B2 | 2/2008 | Matsuda |
| 7,327,504 B2 | 2/2008 | Gallagher |
| 7,331,523 B2 | 2/2008 | Meier et al. |
| 7,333,145 B2 | 2/2008 | Poplin |
| 7,343,865 B2 | 3/2008 | Shuert |
| 7,347,371 B2 | 3/2008 | Joseph et al. |
| 7,357,325 B2 | 4/2008 | Zhu et al. |
| 7,369,161 B2 | 5/2008 | Easwar et al. |
| 7,382,911 B1 | 6/2008 | Meier et al. |
| 7,394,484 B2 | 7/2008 | Soya et al. |
| 7,416,125 B2 | 8/2008 | Wang et al. |
| 7,423,678 B2 | 9/2008 | Shimizu |
| 7,428,093 B2 | 9/2008 | Tegreene et al. |
| 7,428,997 B2 | 9/2008 | Wiklof et al. |
| 7,428,998 B2 | 9/2008 | Zhu et al. |
| 7,446,753 B2 | 11/2008 | Fitch et al. |
| 7,460,130 B2 | 12/2008 | Salganicoff |
| 7,471,315 B2 | 12/2008 | Silsby et al. |
| 7,490,774 B2 | 2/2009 | Zhu et al. |
| 7,500,614 B2 | 3/2009 | Barber et al. |
| 7,501,634 B1 | 3/2009 | Reich et al. |
| 7,502,505 B2 | 3/2009 | Malvar et al. |
| 7,518,645 B2 | 4/2009 | Farrier |
| 7,520,433 B2 | 4/2009 | Knowles et al. |
| 7,523,866 B2 | 4/2009 | Longacre et al. |
| 7,523,867 B2 | 4/2009 | Martin et al. |
| 7,527,203 B2 | 5/2009 | Bremer et al. |
| 7,527,206 B2 | 5/2009 | Zhu et al. |
| 7,527,207 B2 | 5/2009 | Acosta et al. |
| 7,540,424 B2 | 6/2009 | Knowles et al. |
| 7,554,067 B2 | 6/2009 | Zarnowski et al. |
| 7,557,920 B2 | 7/2009 | Lebens |
| 7,559,473 B2 | 7/2009 | He |
| 7,567,691 B2 | 7/2009 | Shigeta |
| 7,568,628 B2 | 8/2009 | Wang et al. |
| 7,605,940 B2 | 10/2009 | Silverbrook et al. |
| 7,611,060 B2 | 11/2009 | Wang et al. |
| 7,636,486 B2 | 12/2009 | Steinberg et al. |
| 7,637,430 B2 | 12/2009 | Hawley et al. |
| 7,639,888 B2 | 12/2009 | Steinberg et al. |
| 7,639,889 B2 | 12/2009 | Steinberg et al. |
| 7,660,478 B2 | 2/2010 | Steinberg et al. |
| 7,681,799 B2 | 3/2010 | Zhu et al. |
| 7,690,572 B2 | 4/2010 | Meier et al. |
| 7,717,342 B2 | 5/2010 | Wang |
| 7,731,092 B2 | 6/2010 | Itou |
| 7,740,176 B2 | 6/2010 | Wang et al. |
| 7,768,552 B1 | 8/2010 | Doron |
| 7,770,799 B2 | 8/2010 | Wang |
| 7,773,118 B2 | 8/2010 | Florea et al. |
| 7,780,089 B2 | 8/2010 | Wang |
| 7,784,696 B2 | 8/2010 | Wang |
| 7,823,787 B2 | 11/2010 | He et al. |
| 7,840,647 B2 | 11/2010 | Kloba et al. |
| 7,841,532 B2 | 11/2010 | Longacre et al. |
| 7,845,563 B2 | 12/2010 | Kotlarsky et al. |
| 7,847,843 B2 | 12/2010 | Suda |
| 7,874,483 B2 | 1/2011 | Wang et al. |
| 7,874,485 B2 | 1/2011 | Meier et al. |
| 7,876,955 B2 | 1/2011 | Komiya et al. |
| 7,909,257 B2 | 3/2011 | Wang et al. |
| 7,984,855 B2 | 7/2011 | Wang |
| 8,002,188 B2 | 8/2011 | Wang |
| 8,016,196 B2 | 9/2011 | Meier et al. |
| 8,025,232 B2 | 9/2011 | Wang |
| 8,028,919 B2 | 10/2011 | He |
| 8,045,037 B2 | 10/2011 | Ichimasa |
| 8,087,588 B2 | 1/2012 | Kotlarsky et al. |
| 8,089,524 B2 | 1/2012 | Urisaka |
| 8,115,828 B2 | 2/2012 | Mikami |
| 8,132,729 B2 | 3/2012 | Silverbrook et al. |
| 8,146,820 B2 | 4/2012 | Wang et al. |
| 8,150,163 B2 | 4/2012 | Kruppa |
| 8,169,486 B2 | 5/2012 | Corcoran et al. |
| 8,196,834 B2 | 6/2012 | Vinogradov et al. |
| 8,196,839 B2 | 6/2012 | Wang |
| 8,218,027 B2 | 7/2012 | Wang |
| 8,282,006 B2 | 10/2012 | Longacre et al. |
| 8,302,868 B2 | 11/2012 | Samek et al. |
| 8,387,881 B2 | 3/2013 | Van et al. |
| 8,439,265 B2 | 5/2013 | Ferren et al. |
| 8,469,261 B2 | 6/2013 | Bonner et al. |
| 8,534,556 B2 | 9/2013 | Drzymala et al. |
| 8,544,737 B2 | 10/2013 | Gomez et al. |
| 8,569,671 B2 | 10/2013 | Meynants et al. |
| 8,596,542 B2 | 12/2013 | Havens et al. |
| 8,654,201 B2 | 2/2014 | Lim et al. |
| 8,682,077 B1 | 3/2014 | Longacre, Jr. |
| 8,720,784 B2 | 5/2014 | Wang |
| 8,720,785 B2 | 5/2014 | Wang |
| 8,733,660 B2 | 5/2014 | Wang et al. |
| 8,783,573 B2 | 7/2014 | Havens et al. |
| 8,969,326 B2 | 3/2015 | Feghali-Bostwick et al. |
| 8,978,985 B2 | 3/2015 | Wang et al. |
| 9,058,527 B2 | 6/2015 | Wang |
| 9,092,654 B2 | 7/2015 | Wang |
| 9,286,497 B2 | 3/2016 | Fukuba et al. |
| 9,305,199 B2 | 4/2016 | Wang et al. |
| 9,454,686 B2 | 9/2016 | Wang |
| 9,465,970 B2 | 10/2016 | Wang et al. |
| 9,578,269 B2 | 2/2017 | Wang et al. |
| 9,654,712 B2 | 5/2017 | Hong |
| 9,659,199 B2 | 5/2017 | Van et al. |
| 9,843,757 B2 | 12/2017 | Raynor |
| 10,171,767 B2 | 1/2019 | Wang et al. |
| 10,691,907 B2 | 6/2020 | Wang |
| 10,721,429 B2 | 7/2020 | Wang et al. |
| 10,735,684 B2 | 8/2020 | Wang et al. |
| 10,949,634 B2 | 3/2021 | Wang |
| 10,958,863 B2 | 3/2021 | Wang et al. |
| 11,238,251 B2 | 2/2022 | Wang |
| 11,238,252 B2 | 2/2022 | Wang |
| 11,317,050 B2 | 4/2022 | Wang et al. |
| 2001/0003071 A1 | 6/2001 | Mansutti et al. |
| 2001/0013549 A1 | 8/2001 | Harris et al. |
| 2002/0044689 A1 | 4/2002 | Roustaei et al. |
| 2002/0050518 A1 | 5/2002 | Roustaei |
| 2002/0051573 A1 | 5/2002 | Sakai et al. |
| 2002/0079370 A1 | 6/2002 | Wood et al. |
| 2002/0096566 A1 | 7/2002 | Schwartz et al. |
| 2002/0101528 A1 | 8/2002 | Lee et al. |
| 2002/0130957 A1 | 9/2002 | Gallagher et al. |
| 2002/0135683 A1 | 9/2002 | Tamama et al. |
| 2002/0150309 A1 | 10/2002 | Hepworth et al. |
| 2002/0153422 A1 | 10/2002 | Tsikos et al. |

(56) References Cited

U.S. PATENT DOCUMENTS

| | | |
|---|---|---|
| 2002/0158127 A1 | 10/2002 | Hori et al. |
| 2002/0170970 A1 | 11/2002 | Ehrhart |
| 2002/0171747 A1 | 11/2002 | Niikawa et al. |
| 2002/0179713 A1 | 12/2002 | Pettinelli et al. |
| 2002/0191830 A1 | 12/2002 | Pidhirny et al. |
| 2003/0004827 A1 | 1/2003 | Wang |
| 2003/0018897 A1 | 1/2003 | Bellis et al. |
| 2003/0019934 A1 | 1/2003 | Hunter et al. |
| 2003/0022144 A1 | 1/2003 | Cliff |
| 2003/0022147 A1 | 1/2003 | Segall et al. |
| 2003/0029917 A1 | 2/2003 | Hennick et al. |
| 2003/0034394 A1 | 2/2003 | Gannon et al. |
| 2003/0034399 A1 | 2/2003 | Wilz et al. |
| 2003/0040275 A1 | 2/2003 | Bridgelall |
| 2003/0062419 A1* | 4/2003 | Ehrhart .............. G06V 30/40 235/469 |
| 2003/0086008 A1 | 5/2003 | Nagano |
| 2003/0089775 A1 | 5/2003 | Yeakley et al. |
| 2003/0095299 A1 | 5/2003 | Oda et al. |
| 2003/0102376 A1 | 6/2003 | Meier et al. |
| 2003/0114206 A1 | 6/2003 | Timothy et al. |
| 2003/0117491 A1 | 6/2003 | Avni et al. |
| 2003/0132292 A1 | 7/2003 | Gomez et al. |
| 2003/0168512 A1 | 9/2003 | Longacre et al. |
| 2003/0169435 A1 | 9/2003 | Kobayashi et al. |
| 2003/0178492 A1 | 9/2003 | Tamburrini et al. |
| 2003/0206150 A1 | 11/2003 | Hussey et al. |
| 2003/0209603 A1 | 11/2003 | Schwartz et al. |
| 2003/0210332 A1 | 11/2003 | Frame |
| 2003/0213847 A1 | 11/2003 | McCall et al. |
| 2003/0218069 A1 | 11/2003 | Meier et al. |
| 2003/0222144 A1 | 12/2003 | Meier et al. |
| 2003/0222147 A1 | 12/2003 | Havens et al. |
| 2004/0000592 A1 | 1/2004 | Schwartz et al. |
| 2004/0004128 A1 | 1/2004 | Pettinelli et al. |
| 2004/0017482 A1 | 1/2004 | Weitman |
| 2004/0021783 A1 | 2/2004 | Mihara |
| 2004/0026510 A1 | 2/2004 | Cheung et al. |
| 2004/0046027 A1 | 3/2004 | Leone et al. |
| 2004/0046881 A1 | 3/2004 | Utagawa |
| 2004/0051801 A1 | 3/2004 | Iizuka et al. |
| 2004/0094627 A1 | 5/2004 | Parker et al. |
| 2004/0109081 A1 | 6/2004 | Sumi |
| 2004/0118921 A1 | 6/2004 | Breytman et al. |
| 2004/0155110 A1 | 8/2004 | Ehrhart et al. |
| 2004/0164165 A1 | 8/2004 | Havens et al. |
| 2004/0174576 A1 | 9/2004 | Kamisuwa et al. |
| 2004/0190092 A1 | 9/2004 | Silverbrook et al. |
| 2004/0195328 A1 | 10/2004 | Barber et al. |
| 2004/0206821 A1 | 10/2004 | Longacre et al. |
| 2004/0206825 A1 | 10/2004 | Schmidt et al. |
| 2004/0212723 A1 | 10/2004 | Lin |
| 2004/0228508 A1 | 11/2004 | Shigeta |
| 2004/0230333 A1 | 11/2004 | Oka |
| 2004/0251394 A1 | 12/2004 | Rhodes et al. |
| 2004/0262394 A1 | 12/2004 | Longacre et al. |
| 2005/0023352 A1 | 2/2005 | Patel et al. |
| 2005/0041296 A1 | 2/2005 | Hsiao et al. |
| 2005/0052554 A1 | 3/2005 | Sakurai et al. |
| 2005/0072847 A1 | 4/2005 | Barkan et al. |
| 2005/0089322 A1 | 4/2005 | Uenaka |
| 2005/0103846 A1 | 5/2005 | Zhu et al. |
| 2005/0121519 A1 | 6/2005 | Shinohara |
| 2005/0134936 A1 | 6/2005 | Haug et al. |
| 2005/0145698 A1 | 7/2005 | Havens et al. |
| 2005/0161511 A1 | 7/2005 | Parker et al. |
| 2005/0167507 A1 | 8/2005 | Swartz et al. |
| 2005/0254106 A9 | 11/2005 | Silverbrook et al. |
| 2005/0276475 A1 | 12/2005 | Sawada |
| 2005/0279836 A1 | 12/2005 | Havens et al. |
| 2005/0281474 A1 | 12/2005 | Huang |
| 2006/0001761 A1 | 1/2006 | Haba et al. |
| 2006/0011724 A1 | 1/2006 | Joseph et al. |
| 2006/0011725 A1 | 1/2006 | Schnee |
| 2006/0016335 A1 | 1/2006 | Cox et al. |
| 2006/0043194 A1 | 3/2006 | Barkan et al. |
| 2006/0098954 A1 | 5/2006 | Takagi |
| 2006/0119738 A1 | 6/2006 | Kido |
| 2006/0163355 A1 | 7/2006 | Olmstead et al. |
| 2006/0187311 A1 | 8/2006 | Labaziewicz et al. |
| 2006/0249581 A1 | 11/2006 | Smith |
| 2006/0255147 A1 | 11/2006 | Havens et al. |
| 2007/0002153 A1 | 1/2007 | Dierickx |
| 2007/0063048 A1 | 3/2007 | Havens et al. |
| 2007/0108284 A1 | 5/2007 | Pankow et al. |
| 2007/0135866 A1 | 6/2007 | Baker et al. |
| 2007/0158428 A1 | 7/2007 | Havens et al. |
| 2007/0158535 A1 | 7/2007 | Watkins |
| 2007/0164111 A1 | 7/2007 | Wang et al. |
| 2007/0181692 A1 | 8/2007 | Barkan et al. |
| 2007/0205272 A1 | 9/2007 | Daddabbo et al. |
| 2007/0219417 A1 | 9/2007 | Roberts et al. |
| 2007/0241195 A1 | 10/2007 | Hussey et al. |
| 2007/0242297 A1 | 10/2007 | Eki |
| 2007/0267501 A1 | 11/2007 | Jovanovski et al. |
| 2008/0219581 A1 | 9/2008 | Albu et al. |
| 2008/0223933 A1 | 9/2008 | Smith |
| 2008/0239352 A1 | 10/2008 | Jun |
| 2008/0267495 A1 | 10/2008 | Shimura |
| 2008/0291499 A1 | 11/2008 | Chang |
| 2008/0296393 A1 | 12/2008 | Jovanovski et al. |
| 2008/0309769 A1 | 12/2008 | Albu et al. |
| 2008/0309770 A1 | 12/2008 | Florea et al. |
| 2009/0026267 A1 | 1/2009 | Wang et al. |
| 2009/0032597 A1 | 2/2009 | Barber et al. |
| 2009/0046185 A1 | 2/2009 | Ota |
| 2009/0072038 A1 | 3/2009 | Li et al. |
| 2009/0073516 A1 | 3/2009 | Tanaka |
| 2009/0086294 A1 | 4/2009 | Sakakibara |
| 2009/0179999 A1 | 7/2009 | Albu et al. |
| 2009/0180710 A1 | 7/2009 | Chang |
| 2009/0201400 A1 | 8/2009 | Zhang et al. |
| 2009/0212911 A1 | 8/2009 | Min et al. |
| 2009/0213811 A1 | 8/2009 | Wang et al. |
| 2010/0140356 A1 | 6/2010 | Hawley et al. |
| 2010/0141812 A1 | 6/2010 | Hirota |
| 2010/0219250 A1 | 9/2010 | Wang |
| 2010/0226345 A1 | 9/2010 | Qu et al. |
| 2010/0258633 A1 | 10/2010 | Wang |
| 2010/0302420 A1 | 12/2010 | Strat et al. |
| 2010/0309340 A1 | 12/2010 | Border et al. |
| 2010/0316291 A1 | 12/2010 | Deng et al. |
| 2011/0073654 A1 | 3/2011 | Wang et al. |
| 2011/0080500 A1 | 4/2011 | Wang et al. |
| 2011/0101102 A1 | 5/2011 | Hussey et al. |
| 2011/0102638 A1 | 5/2011 | Susanu et al. |
| 2011/0168779 A1 | 7/2011 | Wang et al. |
| 2012/0002066 A1 | 1/2012 | Wang |
| 2012/0067956 A1 | 3/2012 | Gao et al. |
| 2012/0187190 A1 | 7/2012 | Wang et al. |
| 2012/0293699 A1 | 11/2012 | Blanquart et al. |
| 2013/0008964 A1 | 1/2013 | Hawley et al. |
| 2013/0010138 A1 | 1/2013 | Bigioi et al. |
| 2013/0021507 A1 | 1/2013 | Wang et al. |
| 2013/0112753 A1 | 5/2013 | Wang |
| 2013/0113967 A1 | 5/2013 | Wang |
| 2017/0169265 A1 | 6/2017 | Wang |
| 2021/0195132 A1 | 6/2021 | Wang et al. |
| 2021/0203870 A1 | 7/2021 | Wang et al. |
| 2022/0067317 A1 | 3/2022 | Wang |

FOREIGN PATENT DOCUMENTS

| | | |
|---|---|---|
| CN | 1511412 A | 7/2004 |
| CN | 1564996 | 1/2005 |
| CN | 100334499 C | 8/2007 |
| CN | 101031930 A | 9/2007 |
| CN | 101069190 A | 11/2007 |
| CN | 101073088 A | 11/2007 |
| CN | 101147157 A | 3/2008 |
| CN | 101171587 A | 4/2008 |
| CN | 101171597 A | 4/2008 |
| CN | 201117008 Y | 9/2008 |
| DE | 19581524 | 6/1997 |

(56) References Cited

FOREIGN PATENT DOCUMENTS

| | | |
|---|---|---|
| EP | 0119862 A2 | 9/1984 |
| EP | 0472299 A1 | 2/1992 |
| EP | 0498366 A2 | 8/1992 |
| EP | 0690403 A2 | 1/1996 |
| EP | 0809303 A1 | 11/1997 |
| EP | 0858212 A1 | 8/1998 |
| EP | 0917087 A1 | 5/1999 |
| EP | 1128661 A1 | 8/2001 |
| EP | 1152471 A2 | 11/2001 |
| EP | 1152472 A2 | 11/2001 |
| EP | 1436768 A1 | 7/2004 |
| EP | 1784761 | 5/2007 |
| EP | 1828957 | 9/2007 |
| EP | 1856651 | 11/2007 |
| EP | 2364026 A2 | 9/2011 |
| EP | 2953350 A1 | 12/2015 |
| GB | 2105143 A | 3/1983 |
| GB | 2301691 A | 12/1996 |
| JP | 59-040630 A | 3/1984 |
| JP | 63-185285 A | 7/1988 |
| JP | 02-268382 A | 11/1990 |
| JP | 03-250764 A | 11/1991 |
| JP | 03-250983 A | 11/1991 |
| JP | 04-111132 A | 4/1992 |
| JP | 04-271331 A | 9/1992 |
| JP | 05-120173 A | 5/1993 |
| JP | 05-242279 A | 9/1993 |
| JP | 05-316410 A | 11/1993 |
| JP | 06-004191 A | 1/1994 |
| JP | 06-004229 A | 1/1994 |
| JP | 06-231466 A | 8/1994 |
| JP | 06-266879 A | 9/1994 |
| JP | 06-301523 A | 10/1994 |
| JP | 07-021300 A | 1/1995 |
| JP | 07-121376 A | 5/1995 |
| JP | 07-141208 A | 6/1995 |
| JP | 07-182261 A | 7/1995 |
| JP | 07-506932 | 7/1995 |
| JP | 07-219863 A | 8/1995 |
| JP | 08-106393 A | 4/1996 |
| JP | 08-106441 A | 4/1996 |
| JP | 08-147398 A | 6/1996 |
| JP | 08-235298 A | 9/1996 |
| JP | 09-006891 A | 1/1997 |
| JP | 09-083841 A | 3/1997 |
| JP | 09-134403 A | 5/1997 |
| JP | 09-512372 | 12/1997 |
| JP | 10-063515 A | 3/1998 |
| JP | 10-070261 A | 3/1998 |
| JP | 10-106919 A | 4/1998 |
| JP | 10-198754 A | 7/1998 |
| JP | 10-507560 A | 7/1998 |
| JP | H10-187870 A | 7/1998 |
| JP | 10-223875 A | 8/1998 |
| JP | 10-508133 | 8/1998 |
| JP | 10-283204 A | 10/1998 |
| JP | 10-283207 A | 10/1998 |
| JP | 11-027485 A | 1/1999 |
| JP | 11-041494 A | 2/1999 |
| JP | 11-065859 A | 3/1999 |
| JP | 2899113 B2 | 6/1999 |
| JP | 11-191002 A | 7/1999 |
| JP | 11-194929 A | 7/1999 |
| JP | 11-230777 A | 8/1999 |
| JP | 11-266002 A | 9/1999 |
| JP | 11-312211 A | 11/1999 |
| JP | 11-312212 A | 11/1999 |
| JP | H11-328303 A | 11/1999 |
| JP | 11-345278 A | 12/1999 |
| JP | 11-514461 A | 12/1999 |
| JP | 11-515124 A | 12/1999 |
| JP | 2000-006475 A | 1/2000 |
| JP | 2000-050028 A | 2/2000 |
| JP | 2000-056625 A | 2/2000 |
| JP | 2000-501209 A | 2/2000 |
| JP | 2000-504489 A | 4/2000 |
| JP | 2000-165754 A | 6/2000 |
| JP | 2000-165755 A | 6/2000 |
| JP | 2000-187703 A | 7/2000 |
| JP | 2000-207228 A | 7/2000 |
| JP | 2000-215268 A | 8/2000 |
| JP | 2000-236326 A | 8/2000 |
| JP | 2000-293622 A | 10/2000 |
| JP | 2001-067230 A | 3/2001 |
| JP | 2001-126016 A | 5/2001 |
| JP | 2001-175803 A | 6/2001 |
| JP | 2001-202253 A | 7/2001 |
| JP | 2001-307014 A | 11/2001 |
| JP | 2001-350685 A | 12/2001 |
| JP | 2001-357345 A | 12/2001 |
| JP | 2001-526430 A | 12/2001 |
| JP | 2002-016244 A | 1/2002 |
| JP | 2002-042052 A | 2/2002 |
| JP | 2002-108618 A | 4/2002 |
| JP | 2002-240913 A | 8/2002 |
| JP | 2002-525644 A | 8/2002 |
| JP | 2002-525729 A | 8/2002 |
| JP | 2002-268201 A | 9/2002 |
| JP | 2002-366887 A | 12/2002 |
| JP | 2002-368201 A | 12/2002 |
| JP | 2003-015628 A | 1/2003 |
| JP | 2003-017677 A | 1/2003 |
| JP | 2003-032434 A | 1/2003 |
| JP | 2003-505771 A | 2/2003 |
| JP | 2003-087148 A | 3/2003 |
| JP | 2003-116059 A | 4/2003 |
| JP | 3395770 B2 | 4/2003 |
| JP | 2003-132301 A | 5/2003 |
| JP | 2003-260822 A | 9/2003 |
| JP | 2004-111590 A | 4/2004 |
| JP | 2004-159155 A | 6/2004 |
| JP | 2004-173172 A | 6/2004 |
| JP | 2004-213689 A | 7/2004 |
| JP | 2004-274698 A | 9/2004 |
| JP | 2004-533031 | 10/2004 |
| JP | 2004-326546 A | 11/2004 |
| JP | 2004-328657 A | 11/2004 |
| JP | 2005-022802 A | 1/2005 |
| JP | 2005-050506 A | 2/2005 |
| JP | 2005-505061 A | 2/2005 |
| JP | 3792753 B2 | 7/2006 |
| JP | 2008-511917 A | 4/2008 |
| JP | 2008-181887 A | 8/2008 |
| JP | 2008-533590 A | 8/2008 |
| SE | 0103286 | 4/2003 |
| TW | I393060 A | 7/2006 |
| WO | 86/01678 A2 | 3/1986 |
| WO | 86/01965 A2 | 3/1986 |
| WO | 93/14470 A1 | 7/1993 |
| WO | 96/13798 A2 | 5/1996 |
| WO | 96/20454 A1 | 7/1996 |
| WO | 97/08647 A1 | 3/1997 |
| WO | 99/04368 A1 | 1/1999 |
| WO | 99/30269 A1 | 6/1999 |
| WO | 99/64980 A1 | 12/1999 |
| WO | 00/16241 A1 | 3/2000 |
| WO | 00/72265 A1 | 11/2000 |
| WO | 01/46899 A2 | 6/2001 |
| WO | 01/69651 A2 | 9/2001 |
| WO | 02/63543 A2 | 8/2002 |
| WO | 03/01435 | 1/2003 |
| WO | 03/30082 | 4/2003 |
| WO | 03/81520 | 10/2003 |
| WO | 03/81521 | 10/2003 |
| WO | 03/87713 | 10/2003 |
| WO | 2004/008383 A1 | 1/2004 |
| WO | 2004/064382 A1 | 7/2004 |
| WO | 2004/090796 A1 | 10/2004 |
| WO | 2005/050390 A2 | 6/2005 |
| WO | 2006/026141 A1 | 3/2006 |
| WO | 2006/057863 A2 | 6/2006 |
| WO | 2006/065450 A2 | 6/2006 |
| WO | 2006/081466 A2 | 8/2006 |

(56) References Cited

FOREIGN PATENT DOCUMENTS

| WO | 2006/098954 A2 | 9/2006 |
| WO | 2006/098955 A2 | 9/2006 |
| WO | 2008/131438 A2 | 10/2008 |

OTHER PUBLICATIONS

Declaration of Dr. Lambertus Hesselink in the Matter of Certain Bar Code Readers, Scan Engines, Products Containing the Same, and Components Thereof, USITC Inv. No. 337-TA-1165, , 93 Pages.
Defendent's Evidence No. 1, Pubilcation No. JPH10508133A, dated Aug. 4, 1998, for Japanese Application No. 1997JP-0510472, filed Aug. 23, 1996, 59 pages.
Defendent's Evidence No. 2, Pubilcation No. JP2002368201A, dated Dec. 20, 2002, for Japanese Application No. 2001JP-0171364, filed Jun. 6, 2001, 16 pages.
Defendent's Evidence No. 3, Publication No. JP2004077633A, datedMar. 11, 2004, for Japanese Application No. 2002JP-0235420, filed Aug. 13, 2002, 27 pages.
Design and Implementation of Driving Timing for High Frame Rate Video Camera; Northwest Institute of Nuclear Technology; dated 2004; pp. 2; abstract retrieved on Oct. 8, 2013 from <http://en.cnki.com.cn/Article.sub.-en/CJFDTOTAL-DSSS20040203 1 .htm>.
Dolphin 7200 Series Mobile Computer available from Hand Held Products, Inc.; retrieved on Oct. 8, 2013 from <http://www.barcoding.com/prodpages/HHP/7200rf.pdf>.
Dolphin 7300 Series Mobile Computer available from Hand Held Products, Inc.; retrieved on Oct. 8, 2013 from <http://www.legacyglobal.com/Uploads/ProductPDF/Honeywell%20-%20Dolphin%207300%20Series.pdf>.
Dolphin 7400 Series Mobile Computer available from Hand Held Products, Inc.; retrieved on Oct. 8, 2013 from <http://www.barcoding.com/prodpages/HHP/7400.pdf>.
Dolphin 7900 Series Mobile Computer available from Hand Held Products, Inc.; retrieved on Oct. 8, 2013 from <http://www.barcodesinc.com/pdf/Hand-Held/7900.pdf>.
Dolphin 9500 Series Mobile Computer available from Hand Held Products, Inc.; retrieved on Oct. 8, 2013 from <http://www.barcoding com/prodpages/HHP/9500-9550.pdf>.
DVT SmartImage Sensor Installation & User Guide, 2003, 157 pages.
Eastman Kodak Company, Kodak Digital Science KAC-0311 Image Sensor, Fully Integrated Timing, Analog Signal Processing & 10 bit ADC, Technical Data, Revision No. 1, Aug. 5, 2002, pp. 1-56.
Eastman Kodak Company, Kodak Digital Science KAC-0311 Image Sensor, Fully Integrated Timing, Analog Signal Processing & 10 bit ADC, Technical Data; Revision 1; dated Aug. 5, 2002, pp. 1-56.
Eastman Kodak Company, Ultra Sensitive Global Shutter 580 fps Monochrome CIS Device Performance Specification, Sep. 2004, pp. 1-22; retrieved on Oct. 9, 2013 from <http://www.datasheetarchive.com/dl/Datasheets-IS20/DSA00392870.pdf>- ;.
English Version, Nullity Suit in the matter of *Opticon Sensors Europe B.V.* v. *Hand Held Products, Inc.*, on the nullity of the German part of EP2953350, German Federal Patent Court, filed Jun. 29, 2020, 45 pages.
European Patent Office, Communication Partial Search Report, European Patent Application No. 10012906.3, dated May 3, 2011 (5 pages).
European Patent Office, European Patent Application No. 10012906.3, Communication Extended Search Report, dated Oct. 10, 2011 (12 pages).
Ex Parte Reexamination Certificate in 90/009,996 (Reissue U.S. Pat. No. 7,586,628 C1); dated Nov. 29, 2012.
Ex Parte Reexamination Interview Summary in 90/009,996 (Reissue U.S. Pat. No. 7,586,628 C1; dated Mar. 26, 2013.
Ex Parte Reexamination Interview Summary in 90/009,996 (Reissue U.S. Pat. No. 7,586,628 CI); dated Mar. 26, 2013.
Ex Parte Reexamination Office Action in U.S. Appl. No. 90/009,996; dated Aug. 3, 2012.
Ex parte Request for Reexamination of U.S. Pat. No. 7,568,628 dated Apr. 23, 2012 (including Transmittal and PTO/SB/08, with Exhibits cited as References 1,2, 3, and 5 herein).
Exhibit 169—B: U.S.C. § 103 Invalidity Chart for U.S. Pat. No. 9,576,169, 55 pages.
Exhibit 169—Acosta: 35 U.S.C. §102 Invalidity Chart for U.S. Pat. No. 9,576,169 Based on U.S. Pat. No. 7,527,207, 18 pages.
Exhibit 169—Hori: 35 U.S.C. §102 Invalidity Chart for U.S. Pat. No. 9,576,169 Based on U.S. Publication No. 2002/0158127, 29 pages.
Exhibit 169—Hung 2000: 35 U.S.C. §102 Invalidity Chart for U.S. Pat. No. 9,576,169 Based on U.S. Pat. No. 6,749,120, 17 pages.
Exhibit 169—Joseph 2004: 35 U.S.C. §102 Invalidity Chart for U.S. Pat. No. 9,576,169 Based on U.S. Pat. No. 7,204,418 , 20 pages.
Exhibit 169—Longacre-006: 35 U.S.C. §102 Invalidity Chart for U.S. Pat. No. 9,576,169 Based on U.S. Pat. No. 5,825,006, 96 pages.
Exhibit 169—Meier 2003: 35 U.S.C. §102 Invalidity Chart for U.S. Pat. No. 9,576,169 Based on U.S. Publication No. 2003/0218069 , 30 pages.
Exhibit 169—Olmstead 2005: 35 U.S.C. §102 Invalidity Chart for U.S. Pat. No. 9,576,169 Based on U.S. Pat. No. 7,234,641 , 33 pages.
Exhibit 169—Poplin: 35 U.S.C. §102 Invalidity Chart for U.S. Pat. No. 9,576,169 Based on U.S. Pat. No. 7,333,145 , 31 pages.
Exhibit 169—Reddersen 2001: 35 U.S.C. §102 Invalidity Chart for U.S. Pat. No. 9,576,169 Based on U.S. Pat. No. 6,176,429, 30 pages.
Exhibit 169—Roustaei: 35 U.S.C. §102 Invalidity Chart for U.S. Pat. No. 9,576,169 Based on International Publication No. 99/30269, 19 pages.
Exhibit 169—Silverbrook: 35 U.S.C. §102 Invalidity Chart for U.S. Pat. No. 9,576,169 Based on U.S. Pat. No. 8,132,729 , 32 pages.
Exhibit 169—Zhu 2004: 35 U.S.C. §102 Invalidity Chart for U.S. Pat. No. 9,576,169 Based on U.S. Pat. No. 7,490,774 , 61 pages.
Exhibit 429—B: U.S.C. § 103 Invalidity Chart for U.S. Pat. No. 10,721,429, 75 pages.
Exhibit 429—Acosta: 35 U.S.C. §102 Invalidity Chart for U.S. Pat. No. 10,721,429 Based on U.S. Pat. No. 7,527,207, 34 pages.
Exhibit 429—Hori: 35 U.S.C. §102 Invalidity Chart for U.S. Pat. No. 10,721,429 Based on U.S. Publication No. 2002/0158127, 35 pages.
Exhibit 429—Hung 2000: 35 U.S.C. §102 Invalidity Chart for U.S. Pat. No. 10,721,429 Based on U.S. Pat. No. 6,749,120, 27 pages.
Exhibit 429—Joseph 2004: 35 U.S.C. §102 Invalidity Chart for U.S. Pat. No. 10,721,429 Based on U.S. Pat. No. 7,204,418, 28 pages.
Exhibit 429—Longacre-006: 35 U.S.C. §102 Invalidity Chart for U.S. Pat. No. 10,721,429 Based on U.S. Pat. No. 5,825,006, 134 pages.
Exhibit 429—Meier 2003: 35 U.S.C. §102 Invalidity Chart for U.S Pat. No. 10,721,429 Based on U.S. Publication No. 2003/0218069, 34 pages.
Exhibit 429—Olmstead 2005: 35 U.S.C. §102 Invalidity Chart for U.S. Pat. No. 10,721,429 Based on U.S. Pat. No. 7,234,641, 37 pages.
Exhibit 429—Poplin: 35 U.S.C. §102 Invalidity Chart for U.S. Pat. No. 10,721,429 Based on U.S. Pat. No. 7,333,145, 66 pages.
Exhibit 429—Reddersen 2001: 35 U.S.C. §102 Invalidity Chart for U.S. Pat. No. 10,721,429 Based on U.S. Pat. No. 6,176,429, 38 pages.
Exhibit 429—Roustaei: 35 U.S.C. §102 Invalidity Chart for U.S. Pat. No. 10,721,429 Based on International Publication No. 99/30269, 32 pages.
Office Action for Chinese Application No. 201110220832.0 dated Sep. 29, 2015.
Office Action for Chinese Application No. 201110220832.0; dated Aug. 26, 2013.
Office Action for European Application No. 06737299.5; dated Jul. 10, 2013.
Office Action for European Application No. 10012906.3; dated Oct. 9, 2012.
Office Action for European Application No. EP17193038.1 dated May 8, 2018.
Office Action for Japanese Application No. 2008-500843; dated Jun. 22, 2012; translation.

(56) References Cited

OTHER PUBLICATIONS

Office Action for Japanese Application No. 2008-500843; dated May 14, 2013; translation.
Office Action for Japanese Application No. 2008-500844; dated Jan. 24, 2012; translation.
Office Action for Japanese Application No. 2008-500844; dated Sep. 14, 2012; translation.
Office Action for Japanese Application No. 2013-003616 dated May 19, 2014.
Office Action for Japanese Application No. 2013-003616; dated Oct. 8, 2013.
Office Action for Japanese Application No. 2014-046409 dated Jan. 5, 2015.
Office Action for Japanese Application No. 2014-046409 dated Jul. 17, 2015.
Office Action for Japanese Application No. 2015-227211 dated Jan. 15, 2018, 26 pages.
Office Action for Japanese Application No. 2015-227211 dated Oct. 24, 2016, 7 pages.
Office Action for Japanese Application No. 2015-227211 dated Oct. 24, 2016, with English translation, 7 pages.
Office Action for Japanese Application No. 2017-152142 dated Mar. 26, 2018.
Office Action for Japanese. Application No. 2015-227211 dated Sep. 14, 2018, 20 pages.
Office Action for U.S. Appl. No. 11/077,975; dated Dec. 10, 2008.
Office Action for U.S. Appl. No. 11/077,975; dated Feb. 25, 2008.
Office Action for U.S. Appl. No. 11/077,975; Notice of Allowance; dated Apr. 10, 2009.
Office Action for U.S. Appl. No. 11/077,975; Notice of Allowance; dated Jul. 10, 2009.
Office Action for U.S. Appl. No. 11/077,976; dated Apr. 2, 2008.
Office Action for U.S. Appl. No. 11/077,976; dated Aug. 6, 2008.
Office Action for U.S. Appl. No. 11/077,976; dated Dec. 10, 2008.
Office Action for U.S. Appl. No. 11/077,976; Notice of Allowance; dated May 29, 2009.
Office Action for U.S. Appl. No. 11/174,447; dated Jan. 16, 2009.
Office Action for U.S. Appl. No. 11/445,930 dated May 13, 2009.
Office Action for U.S. Appl. No. 12/190,145 dated Nov. 14, 2013.
Office Action for U.S. Appl. No. 12/190,145; Advisory Action; dated Feb. 2, 2010.
Office Action for U.S. Appl. No. 12/190,145; dated Aug. 12, 2008.
Office Action for U.S. Appl. No. 12/190,145; dated Jul. 18, 2012.
Office Action for U.S. Appl. No. 12/190,145; dated Mar. 31, 2009.
Office Action for U.S. Appl. No. 12/190,145; dated Oct. 22, 2009.
Office Action for U.S. Appl. No. 12/403,459 dated Mar. 7, 2012.
Office Action for U.S. Appl. No. 12/403,459 dated Oct. 2, 2012.
Office Action for U.S. Appl. No. 12/403,459; dated Feb. 5, 2013.
Office Action for U.S. Appl. No. 12/534,664; Notice of Allowance; dated Nov. 8, 2010.
Office Action for U.S. Appl. No. 12/610,892; Notice of Allowance; dated Jun. 15, 2011.
Office Action for U.S. Appl. No. 12/853,090 dated Mar. 3, 2011.
Office Action for U.S. Appl. No. 12/853,590; dated Mar. 3, 2011.
Office Action for U.S. Appl. No. 12/861,461 dated Oct. 19, 2010.
Office Action for U.S. Appl. No. 13/052,768; dated Jun. 15, 2011.
Office Action for U.S. Appl. No. 13/052,768; Notice of Allowance; dated Feb. 6, 2012.
Office Action for U.S. Appl. No. 13/052,768; Notice of Allowance; dated Jul. 13, 2012.
Office Action for U.S. Appl. No. 13/052,768; Notice of Allowance; dated Mar. 21, 2013.
Office Action for U.S. Appl. No. 13/052,768; Notice of Allowance; dated Sep. 18, 2013.
Office Action for U.S. Appl. No. 13/188,696 dated Apr. 24, 2013.
Exhibit 429—Silverbrook: 35 U.S.C. §102 Invalidity Chart for U.S. Pat. No. 10,721,429 Based on U.S. Pat. No. 8,132,729, 50 pages.
Exhibit 429—Zhu 2004: 35 U.S.C. §102 Invalidity Chart for U.S. Pat. No. 10,721,429 Based on U.S. Pat. No. 7,490,774, 45 pages.
Exhibit 628—B: U.S.C. § 103 Invalidity Chart for U.S. Pat. No. 7,568,628, 91 pages.
Exhibit 628—Acosta: 35 U.S.C. §102 Invalidity Chart for U.S. Pat. No. 7,568,628 Based on U.S. Pat. No. 7,527,207, 69 pages.
Exhibit 628—Hori: 35 U.S.C. §102 Invalidity Chart for U.S. Pat. No. 7,568,628 Based on U.S. Publication No. 2002/0158127, 48 pages.
Exhibit 628—Hung 2000: 35 U.S.C. §102 Invalidity Chart for U.S. Pat. No. 7,568,628 Based on U.S. Pat. No. 6,749,120, 68 pages.
Exhibit 628—Joseph 2004: 35 U.S.C. §102 Invalidity Chart for U.S. Pat. No. 7,568,628 Based on U.S. Pat. No. 7,204,418, 57 pages.
Exhibit 628—Longacre-006: 35 U.S.C. §102 Invalidity Chart for U.S. Pat. No. 7,568,628 Based on U.S. Pat. No. 5,825,006, 140 pages.
Exhibit 628—Meier 2003: 35 U.S.C. §102 Invalidity Chart for U.S. Pat. No. 7,568,628 Based on U.S. Publication No. 2003/0218069, 73 pages.
Exhibit 628—Olmstead 2005: 35 U.S.C. §102 Invalidity Chart for U.S. Pat. No. 7,568,628 Based on U.S. Pat. No. 7,234,641, 71 pages.
Exhibit 628—Poplin: 35 U.S.C. §102 Invalidity Chart for U.S. Pat. No. 7,568,628 Based on U.S. Pat. No. 7,333,145, 123 pages.
Exhibit 628—Reddersen 2001: 35 U.S.C. §102 Invalidity Chart for U.S. Pat. No. 7,568,628 Based on U.S. Pat. No. 6,176,429, 80 pages.
Exhibit 628—Roustaei: 35 U.S.C. §102 Invalidity Chart for U.S. Pat. No. 7,568,628 Based on International Publication No. 99/30269, 50 pages.
Exhibit 628—Silverbrook: 35 U.S.C. §102 Invalidity Chart for U.S. Pat. No. 7,568,628 Based on U.S. Pat. No. 8,132,729, 64 pages.
Exhibit 628—Zhu 2004: 35 U.S.C. §102 Invalidity Chart for U.S. Pat. No. 7,568,628 Based on U.S. Pat. No. 7,490,774, 104 pages.
Exhibit 799—B: U.S.C. § 103 Invalidity Chart for U.S. Pat. No. 7,770,799, Feb. 9, 2022, 231 pages.
Exhibit D Prior Art for U.S. Pat. No. 8,978,985, In the matter of Certain Barcode Scanners, Scan Engines, Products Containing the Same, and Components Thereof, USITC Inv. No. 337-TA-1165, 5 pages.
Exhibit D-0 Invalidity Chart for U.S. Pat. No. 8,978,985, In the matter of Certain Barcode Scanners, Scan Engines, Products Containing the Same, and Components Thereof, USITC Inv. No. 337-TA-1165, 25 pages.
Exhibit D-1 Invalidity Chart for U.S. Pat. No. 8,978,985 Based on U.S. Pat. No. 7,490,774, In the matter of Certain Barcode Scanners, Scan Engines, Products Containing the Same, and Components Thereof, USITC Inv. No. 337-TA-1165, 45 pages.
Exhibit D-2 Invalidity Chart for U.S. Pat. No. 8,978,985 Based on U.S. Pat. No. 7,237,722, In the matter of Certain Barcode Scanners, Scan Engines, Products Containing the Same, and Components Thereof, USITC Inv. No. 337-TA-1165, 36 pages.
Exhibit D-3. Invalidity Chart for U.S. Pat. No. 8,978,985 Based on U.S. Pat. No. 7,204,418, n the matter of Certain Barcode Scanners, Scan Engines, Products Containing the Same, and Components Thereof, USITC Inv. No. 337-TA-1165, 38 pages.
Exhibit D-4 Invalidity Chart for U.S. Pat. No. 8,978,985 Based on U.S. Pat. No. 6,176,429, In the matter of Certain Barcode Scanners, Scan Engines, Products Containing the Same, and Components Thereof, USITC Inv. No. 337-TA-1165, 45 pages.
Exhibit D01: US 2005/0103866A1 to Zhu et al. published May 19, 2005, Nullity Suit in the matter of *Opticon Sensors Europe B.V.* v. *Hand Held Products, Inc.*, on the nullity of the German part of EP2953350, 186 pages.
Exhibit D02: U.S. Pat. No. 6,176,429B1 to PSC Scanning, Inc. patented Jan. 23, 2011, Nullity Suit in the matter of *Opticon Sensors Europe B.V.* v. *Hand Held Products, Inc.*, on the nullity of the German part of EP2953350, 60 pages.
Exhibit D03: WO 2005/050390A2 to Metrologic Instruments, Inc. published Jun. 2, 2005, Nullity Suit in the matter of *Opticon Sensors Europe B.V.* v. *Hand Held Products, Inc.*, on the nullity of the German part of EP2953350, 53 pages.
Exhibit D04: US 2005/0001035A1 to Hawkey et al. published Jan. 6, 2005, Nullity Suit in the matter of *Opticon Sensors Europe B.V.* v. *Hand Held Products, Inc.*, on the nullity of the German part of EP2953350, 30 pages.

(56) References Cited

OTHER PUBLICATIONS

Exhibit D05: U.S. Pat. No. 5,825,006 to Welch Allyn, Inc. patented Oct. 20, 1998, Nullity Suit in the matter of *Opticon Sensors Europe B.V.* v. *Hand Held Products, Inc.,* on the nullity of the German part of EP2953350, 44 pages.
Exhibit E Prior Art for U.S. Pat. No. 9,465,970, In the matter of Certain Barcode Scanners, Scan Engines, Products Containing the Same, and Components Thereof, USITC Inv. No. 337-TA-1165, 5 pages.
Exhibit E-0 Invalidity Chart for U.S. Pat. No. 9,465,970 Based on U.S. Pat. No. 7,490,774, In the matter of Certain Barcode Scanners, Scan Engines, Products Containing the Same, and Components Thereof, USITC Inv. No. 337-TA-1165.
Exhibit E-1 Invalidity Chart for U.S. Pat. No. 9,465,970 Based on U.S. Pat. No. 7,490,774, In the matter of Certain Barcode Scanners, Scan Engines, Products Containing the Same, and Components Thereof, USITC Inv. No. 337-TA-1165, 64 pages.
Exhibit E-2 Invalidity Chart for U.S. Pat. No. 9,465,970 Based on U.S. Pat. No. 7,237,722, In the matter of Certain Barcode Scanners, Scan Engines, Products Containing the Same, and Components Thereof, USITC Inv. No. 337-TA-1165, 38 pages.
Exhibit E-3 Invalidity Chart for U.S. Pat. No. 9,465,970 Based on U.S. Pat. No. 7,240,418, In the matter of Certain Barcode Scanners, Scan Engines, Products Containing the Same, and Components Thereof, USITC Inv. No. 337-TA-1165, 47 pages.
Exhibit E-4 Invalidity Chart for U.S. Pat. No. 9,465,970 Based on U.S. Pat. No. 6,176,429, In the matter of Certain Barcode Scanners, Scan Engines, Products Containing the Same, and Components Thereof, USITC Inv. No. 337-TA-1165, 52 pages.
Exhibit E-5 Invalidity Chart for U.S. Pat. No. 9,465,970 Based on U.S. Pat. No. 7,527,207, In the matter of Certain Barcode Scanners, Scan Engines, Products Containing the Same, and Components Thereof, USITC Inv. No. 337-TA-1165, 34 pages.
Exhibit NK02: EP 2953350B1 to Hand Held Products, Inc., published Sep. 27, 2017, Nullity Suit in the matter of *Opticon Sensors Europe B.V.* v. *Hand Held Products, Inc.,* on the nullity of the German part of EP2953350, 60 pages.
Exhibit NK03: EP 2953350A1 to Hand Held Products, Inc., published Dec. 9, 2015, Nullity Suit in the matter of *Opticon Sensors Europe B.V.* v. *Hand Held Products, Inc.,* on the nullity of the German part of EP2953350, 68 pages.
Exhibit NK04: WO 2006/098955A2 to Hand Held Products, Inc. published Sep. 21, 2006, Nullity Suit in the matter of *Opticon Sensors Europe B.V.* v. *Hand Held Products, Inc.,* on the nullity of the German part of EP2953350, 98 pages.
Exhibit NK05: U.S. Appl. No. 11/077,975, filed Mar. 11, 2005, titled Bar Code Reading Device With Global Electronic Shutter Control, Inventor Ynjiun Wang et al. Nullity Suit in the matter of *Opticon Sensors Europe B.V.* v. *Hand Held Products, Inc.,* on the nullity of the German part of EP2953350, 102 pages.
Exhibit NK06: U.S. Appl. No. 11/077,976, filed Mar. 11, 2005, titled System and Method to Automatically Focus an Image Reader, Inventor Ynjiun Wang et al. Nullity Suit in the matter of *Opticon Sensors Europe B.V.* v. *Hand Held Products, Inc.,* on the nullity of the German part of EP2953350, 110 pages.
Exhibit NK07 Search Report for Patent Application No. 15167739.0 dated Oct. 30, 2015, Nullity Suit in the matter of *Opticon Sensors Europe B.V.* v. *Hand Held Products, Inc.,* on the nullity of the German part of EP2953350, 6 pages.
Exhibits HLNK 1 and 1a to the Reply to Nullity Complaint dated Jun. 29, 2020, In the Matter of *Opticon Sensors Europe B.V.* vs. *Hand Held Products, Inc.,* EP2953350B1 2 Ni 60/20 (EP), dated Jan. 26, 2021: "Honeywell Xenon Competitive Motion Tolerance Test Video", YouTube, dated Apr. 18, 2011, 1 page, full video available at https://www.youtube.com/watch?v=JYSd4yZ6B0I.
Extended European Search Report for European Patent Application No. 16183463.5 dated Apr. 19, 2017, 11 pages.
Extended European Search Report issued in European Application No. 21174730.8 dated Oct. 4, 2021, 8 pages.

Final Office Action for Japanese Patent Application No. 2014-046409 dated Aug. 24, 2016, with English translation, 16 pages.
Final Office Action for Japanese Patent Application No. 2015-227211 dated Apr. 7, 2017, with English translation, 5 pages.
Final Rejection dated Jul. 6, 2020 for U.S. Appl. No. 16/204,077.
Final Written Decision for U.S. Pat. No. 7,568,628, dated Feb. 18, 2015.
First Instance Judgment upholding the Decision for Invalidation made by the Patent Reexamination Board received from the Chinese IP Court, dated Dec. 28, 2017, 53 pages.
Fossum, E. R.; "CMOS Image Sensors: Electronic Camera-on-a-Chip;" IEEE Transaction on Electron Devices, vol. 44, No. 10; pp. 1689-1698; dated Oct. 1997.
Micron image sensor with TrueSNAP technology, pp. 1-3; dated Oct. 21, 2004; originally retrieved from <www.eetasia.comART.sub.--8800349851.sub.-765245.sub.-NP.sub.-d8379- d7c.htm>, presently retrieved from <http://www.eetasia.com/articleLogin.do?artId=8800349851&fromWhere=/ART.sub.-8800349851.sub.-765245.sub.-NP.su- b.-e5a216a1.HTM&catId=765245&newsType=NP&pageNo=null&encode=e5a216a1> on Oct. 8, 2013.
Micron Technology, Inc. MT9M111 SOC Megapixel Digital Image Sensor, Products and Specifications Preliminary Manual, pp. 1-61, 2004.
Micron Technology, Inc., MT9M413 1.3 Megapixel CMOS Active Pixel Digital Image Sensor, Specification manual, Version 3.0, pp. 1-30, Jan. 2004.
MotionPro HS Series User's Manual Ver. 1.12, 2005, 79 pages.
MT9V022 ⅓-Inch Wide VGA CMOS Digital Image Sensor Data Sheet, Semiconductor (Rev. 7, Oct. 2018), 39 pages.
MT9V022 Image Sensor IC Chip; Micron, Inc.; dated Oct. 2, 2004; . originally retrieved from <http://download.micron.com/pdf/flyers/mt9v022_(mi-0350)_flyer.pdf>- ; currently retrieved from <http://web.archive.org/web/20070404011812/http://download.micron.com/- pdf/flyers/mt9v022_(mi-0350)_flyer.pdf> on Oct. 8, 2013.
Muniz et al., A Robust Software Barcode Reader using the Hough Transform, 1999, 8 pages.
Non-Final Office Action received for U.S. Appl. No. 16/893,973, dated Nov. 8, 2021, 8 pages.
Non-Final Office Action received for U.S. Appl. No. 17/167,452, dated Nov. 16, 2021, 7 pages.
Non-Final Rejection dated Apr. 16, 2015 for U.S. Appl. No. 14/221,903.
Non-Final Rejection dated Aug. 6, 2020 for U.S. Appl. No. 16/874,217.
Non-Final Rejection dated Dec. 20, 2019 for U.S. Appl. No. 16/204,077.
Non-Final Rejection dated Jul. 9, 2021 for U.S. Appl. No. 17/302,324.
Non-Final Rejection dated Jul. 11, 2019 for U.S. Appl. No. 15/980,213.
Non-Final Rejection dated Jun. 24, 2021 for U.S. Appl. No. 17/167,464.
Non-Final Rejection dated Mar. 3, 2011 for U.S. Appl. No. 12/853,090.
Non-Final Rejection dated Nov. 8, 2021 for U.S. Appl. No. 16/893,973.
Non-Final Rejection dated Nov. 16, 2021 for U.S. Appl. No. 17/167,452.
Non-Final Rejection dated Nov. 16, 2021 for U.S. Appl. No. 17/198,587.
Non-Final Rejection dated Oct. 29, 2015 for U.S. Appl. No. 14/684,609.
Notice of Allowance and Fees Due (PTOL-85) dated Aug. 29, 2018 for U.S. Appl. No. 15/401,779.
Notice of Allowance and Fees Due (PTOL-85) dated Dec. 2, 2020 for U.S. Appl. No. 16/874,217.
Notice of Allowance and Fees Due (PTOL-85) dated Dec. 18, 2020 for U.S. Appl. No. 16/874,217.
Notice of Allowance and Fees Due (PTOL-85) dated Dec. 23, 2013 for U.S. Appl. No. 13/052,768.
Notice of Allowance and Fees Due (PTOL-85) dated Feb. 18, 2021 for U.S. Appl. No. 16/874,217.
Notice of Allowance and Fees Due (PTOL-85) dated Jan. 6, 2021 for U.S. Appl. No. 16/874,217.
Notice of Allowance and Fees Due (PTOL-85) dated Jun. 3, 2016 for U.S. Appl. No. 14/221,903.
Notice of Allowance and Fees Due (PTOL-85) dated Mar. 5, 2010 for U.S. Appl. No. 11/174,447.

(56) References Cited

OTHER PUBLICATIONS

Notice of Allowance and Fees Due (PTOL-85) dated Mar. 5, 2010 for U.S. Appl. No. 11/445,930.
Notice of Allowance and Fees Due (PTOL-85) dated Mar. 21, 2013 for U.S. Appl. No. 13/052,768.
Notice of Allowance and Fees Due (PTOL-85) dated May 8, 2020 for U.S. Appl. No. 15/980,213.
Notice of Allowance and Fees Due (PTOL-85) dated May 26, 2020 for U.S. Appl. No. 16/728,797.
Notice of Allowance and Fees Due (PTOL-85) dated May 27, 2020 for U.S. Appl. No. 16/728,810.
Notice of Allowance and Fees Due (PTOL-85) dated Nov. 5, 2020 for U.S. Appl. No. 16/204,077.
Notice of Allowance and Fees Due (PTOL-85) dated Nov. 16, 2021 for U.S. Appl. No. 17/302,324.
Notice of Allowance and Fees Due (PTOL-85) dated Nov. 27, 2019 for U.S. Appl. No. 15/980,213.
Notice of Allowance and Fees Due (PTOL-85) dated Oct. 7, 2016 for U.S. Appl. No. 15/016,927.
Notice of Allowance and Fees Due (PTOL-85) dated Sep. 16, 2020 for U.S. Appl. No. 16/204,077.
Notice of Allowance and Fees Due (PTOL-85) dated Sep. 23, 2016 for U.S. Appl. No. 14/925,447.
Notice of Allowance for U.S. Appl. No. 11/174,447 dated Aug. 20, 2009.
Notice of Allowance for U.S. Appl. No. 11/174,447 dated Mar. 5, 2010.
Notice of Allowance for U.S. Appl. No. 11/445,930 dated Mar. 5, 2010.
Notice of Allowance for U.S. Appl. No. 11/445,930 dated Nov. 17, 2009.
Notice of Allowance for U.S. Appl. No. 12/403,459 dated Aug. 5, 2013.
Notice of Allowance for U.S. Appl. No. 12/853,090 dated Jan. 27, 2012.
Notice of Allowance for U.S. Appl. No. 12/853,090 dated Sep. 6, 2011.
Notice of Allowance for U.S. Appl. No. 12/861,461 dated Apr. 4, 2011.
Notice of Allowance for U.S. Appl. No. 13/052,768 dated Jul. 13, 2012.
Notice of Allowance for U.S. Appl. No. 13/213,543 dated Feb. 19, 2013.
Notice of Allowance for U.S. Appl. No. 13/213,543 dated Jan. 3, 2014.
Notice of Allowance for U.S. Appl. No. 13/213,543 dated Jul. 10, 2013.
Notice of Allowance for U.S. Appl. No. 13/213,543 dated Oct. 30, 2013.
Notice of Allowance for U.S. Appl. No. 13/289,795 dated Dec. 16, 2013.
Notice of Allowance for U.S. Appl. No. 13/437,439 dated Dec. 26, 2013.
Notice of Allowance for U.S. Appl. No. 13/493,348 dated Apr. 26, 2013.
Notice of Allowance for U.S. Appl. No. 13/493,348 dated Dec. 23, 2013.
Notice of Allowance for U.S. Appl. No. 13/493,348 dated Nov. 5, 2013.
Notice of Allowance for U.S. Appl. No. 13/586,420 dated Oct. 24, 2013.
Notice of Allowance for U.S. Appl. No. 14/220,903 dated Jun. 3, 2016.
Notice of Allowance for U.S. Appl. No. 14/221,857 dated Jan. 22, 2015.
Notice of Allowance for U.S. Appl. No. 14/221,886 dated Aug. 18, 2015.
Notice of Allowance for U.S. Appl. No. 14/221,886 dated Nov. 27, 2015.
Notice of Allowance for U.S. Appl. No. 14/221,903 dated Nov. 30, 2015.
Notice of Allowance for U.S. Appl. No. 14/221,903 dated Oct. 5, 2015.
Notice of Allowance for U.S. Appl. No. 14/273,631 dated Oct. 29, 2014.
Notice of Allowance for U.S. Appl. No. 14/684,609 dated May 24, 2016.
Notice of Allowance for U.S. Appl. No. 14/690,653 dated Apr. 26, 2016.
Notice of Allowance for U.S. Appl. No. 15/244,683 dated Feb. 16, 2018.
Notice of Allowance from U.S. Appl. No. 14/221,874, dated Jan. 14, 2015.
Notice of Allowance received for U.S. Appl. No. 17/167,464, dated Aug. 11, 2021, 8 pages.
Notice of Allowance received for U.S. Appl. No. 17/167,464, dated Jan. 5, 2022, 5 pages.
Notice of Allowance received for U.S. Appl. No. 17/198,587, dated Feb. 9, 2022, 9 pages.
Notice of Reasons for Rejection for Japanese Application No. 2018-134033; dated Jul. 10, 2019.
Notice of Refusal issued in Japanese Application No. 2020-115147 dated Aug. 2, 2021, 8 pages.
Notification of Acceptance for Request for Invalidation for Chinese Application No. 200680016023.5; dated Jul. 3, 2012.
Notification of Acceptance of Request for Invalidation of CN App. No. 200680016023.5, dated Aug. 20, 2012. (In Chinese language).
Notification of Oral Proceedings on the Request for Invalidation issued in Chinese Patent Application No. 200680016023.5 issued on Oct. 23, 2012. 5 pages. Full translation.
Notification of Transfer of Documents issued in Chinese Patent Application No. 200680016023.5 dated Oct. 24, 2012. 281 pages. Partial translation.
Notification to Grant Patent for Chinese Application No. 201110220832.0 dated Sep. 5, 2016.
Notification to Grant Patent for Chinese Application No. 201110220834.X dated Sep. 5, 2016.
Notification to Grant Patent for Chinese Patent Application No. 201110220832.0 dated Sep. 5, 2016, with English Translation, 4 pages.
Nov. 29, 2012 Ex Parte Reexamination Interview Summary in U.S. Reexamination U.S. Appl. No. 90/009,996 (U.S. Pat. No. 7,568,628).
Observation Application No. 200680016023.5. Title of invention "Bar Code Reading Device with Global Electronic Shutter Control." State observation directed to the Notification of Acceptance of Request for Invalidation, which was issued by the Patent Reexamination Board on the date of Nov. 27, 2012. 15 pages. Dec. 4, 2012. Partial translation.
Observation Application No. 200680016023.5. Title of invention "Bar Code Reading Device with Global Electronic Shutter Control." State observation directed to the Notification of Transferring the document (issue No. 2012111300206340) which was issued by the Patent Reexamination Board on the date of Nov. 16, 2012. 134 pages. Dec. 4, 2012. Full translation.
Observation by Patentee in Response to the Notification of Acceptance of Request for Invalidation, Proceedings on the Request for Invalidation of Chinese Application No. 200680016023.5, Dec. 4, 2012 (Submitted with English Translation).
Observation by the Petitioner; Proceedings on the Invalidation of Chinese Application No. 200680016023.5; dated May 29, 2013.
Observations by Patentee, Proceedings on the Request for Invalidation of Chinese Application No. 200680016023.5, Nov. 2, 2012 (Submitted with English Translation).
Observations by Petitioner, Proceedings on the Request for Invalidation of Chinese Application No. 200680016023.5, Nov. 27, 2012 (Submitted with English translation of the transmittal form).
Office Action for Chinease Application No. 201110220834.X dated Sep. 18, 2015.
Office Action for Chinese Application No. 201110220834.X dated May 27, 2014.
Office Action for Chinese Application No. 2006800000502.3 dated Feb. 13, 2012.

(56) References Cited

OTHER PUBLICATIONS

Office Action for Chinese Application No. 200680016023.5; dated Oct. 24, 2013.
Office Action for Chinese Application No. 200680016023.5; dated Oct. 30, 2013.
Office Action for Chinese Application No. 2006800160235; dated Jan. 23, 2009 (translation).
Office Action for Chinese Application No. 201110220832.0 dated May 30, 2014.
China National Intellectual Property Administration, Notice of Acceptance of Patent Invalidation Petition received for Application No. 200680016023.5 granted Sep. 28, 2011 (CN 101171597 B), dated Jun. 13, 2022, 33 pages, People's Republic of China.
China National Intellectual Property Administration, Notice of Acceptance of Patent Invalidation Petition received for Application No. 201110220832.0 granted Dec. 14, 2016 (CN 102324013 B), dated Jun. 27, 2022, 33 pages, People's Republic of China.
China National Intellectual Property Administration, Notice of Acceptance of Patent Invalidation Petition received for Application No. 201110220834.X granted Dec. 14, 2016 (CN 102324014 B), dated Jun. 27, 2022, 40 pages, People's Republic of China.
Non-Final Rejection dated Aug. 18, 2022 for U.S. Appl. No. 17/825,742.
U.S. Appl. filed Jun. 14, 2005, U.S. Appl. No. 60/690,268.
U.S. Appl. filed Jun. 3, 2005, U.S. Appl. No. 60/687,606.
U.S. Patent Application for Apparatus Having Hybrid Monochrome and Color Image Sensor Array, unpublished (filed May 26, 2022), Jnjiun P. Wang (Inventor), Hand Held Products, Inc. (Assignee), U.S. Appl. No. 17/825,726.
U.S. Patent Application for Apparatus Having Hybrid Monochrome and Color Image Sensor Array, unpublished (filed May 26, 2022), Ynjiun P. Wang (Inventor), Hand Held Products, Inc. (Assignee), U.S. Appl. No. 17/825,742.
U.S. Patent Application for Image Reader Comprising CMOS Based Image Sensor Array, unpublished (filed Apr. 29, 2022), Ynjiun P. Wang (Inventor), Hand Held Products, Inc. (Assignee), U.S. Appl. No. 17/733,315.
U.S. Patent Application for Image Reader Comprising CMOS Based Image Sensor Array, unpublished (filed Apr. 29, 2022), Ynjiun P. Wang (Inventor), Hand Held Products, Inc. (Assignee), U.S. Appl. No. 17/733,328.
China National Intellectual Property Administration, Notice Terminating the Invalidation of Patent CN 101171597 (CN Appl. No. 200680016023.5), dated Aug. 29, 2022, 3 pages, PRC. (English summary).
China National Intellectual Property Administration, Notice Terminating the Invalidation of Patent ZL201110220832.0 (CN Appl. No. 201110220832.0, Publication No. CN102324013A), dated Aug. 29, 2022, 3 pages, PRC. (English summary).
China National Intellectual Property Administration, Notice Terminating the Invalidation of Patent ZL201110220834.X (CN Appl. No. 201110720834.X, Publication No. CN 102143216A), dated Aug. 29, 2022, 3 pages, PRC. (English summary).
Communication about intention to grant a European patent received for European Application No. 21174730.8, dated Sep. 2, 2022, 6 pages.
Notice of Allowance received for U.S. Appl. No. 17/825,726, dated Sep. 7, 2022, 10 pages.
Annex to the communication dated May 26, 2020 for EP Application No. 17193038.1, 2 pages.
Annex to the communication dated Oct. 10, 2019 for EP Application No. 17193038.1, 2 pages.
Annex to the communication dated Sep. 3, 2010 for EP Application No. 06737299.5, 2 pages.
Annex to the communication dated Sep. 7, 2020 for EP Application No. 16183463.5, 1 page.
Appeal Decision for Japanese Application No. 2013-003616 dated Sep. 29, 2015.
Applicant-Initiated Interview Summary dated Oct. 1, 2021 for U.S. Appl. No. 17/302,324.
Applicants' Summary of Interview in U.S. Appl. No. 90/009,996 (U.S. Pat. No. 7,568,628); dated Dec. 14, 2012.
Apr. 15, 2008 Office Action in U.S. Appl. No. 11/495,417.
Apr. 17, 2013 Office Action in U.S. Appl. No. 13/586,420, 32 pages.
Attachment B4 (U.S. Pat. No. 6,155,488) of the Rejoinder in the matter of *Hand Held Products* versus *Opticon Sensoren GmbH and Opticon Sensors Europe B.V.* for alleged patent infringement (EP 2 953 350 B1), dated Dec. 4, 2020, 21 pages.
Attachment B5 (U.S. Publication No. 2003/0062419) of the Rejoinder in the matter of *Hand Held Products* versus *Opticon Sensoren GmbH and Opticon Sensors Europe B.V.* for alleged patent infringement (EP 2 953 350 B1), dated Dec. 4, 2020, 30 pages.
Baltes, J. "Efficient Image Processing for Increased Resolution and Color Correctness of CMOS Image Sensors," 2001, 263-268. 10.1007/3-540-45603-1_28.
Berezin, V., et al., "Dynamic Range Enlargement in CMOS Imagers with Buried Photodiode;" Micron Imaging, Micron Technology; pp. 1-3; dated 2003; retrieved on Oct. 8, 2013 from <http://www.imagesensors.org/Past%20Workshops/2003%20Workshop/2003%20P-apers/47%20Berezin%20et%20al.pdf>.
Bundle of Exhibits NK08: Silicon Imaging SI-1024F MegaCamera, [online] 2002, [retrieved Sep. 24, 2020] retrieved from the Internet URL: http://alacron.com/clientuploads/directory/Cameras/SILICON%20IMAGING/SI_Silicon%20imaging_SI-1024F.pdf, Nullity Suit in the matter of *Opticon Sensors Europe B.V.* v. *Hand Held Products, Inc.*, on the nullity of the German part of EP2953350, 8 pages.
Bundle of Exhibits NK08: US 2002/0050518A1 to Alexander R. Roustaei. published May 2, 2002 Nullity Suit in the matter of *Opticon Sensors Europe B.V.* v. *Hand Held Products, Inc.*, on the nullity of the German part of EP2953350, 74 pages.
Bundle of Exhibits NK08: US 2004/0212723A1 to Malcolm Lin published Oct. 28, 2004, Nullity Suit in the matter of *Opticon Sensors Europe B.V.* v *Hand Held Products, Inc.*, on the nullity of the German part of EP2953350,18 pages.
Bundle of Exhibits NK08: WO 01/69651A2 to Symagery MicroSystems, Inc. published Sep. 20, 2001, Nullity Suil in the matter of *Opticon Sensors Europe B.V.* v. *Hand Held Products, Inc.*, on the nullity of the German part of EP2953350, 30 pages.
Case of Demand for Rescission of Appeal Decision, Defendent's First Brief, dated Nov. 12, 2019, 92 pages.
Case of Demand for Rescission of Appeal Decision, Reiwa 1 (2019) (Gyo-ke) No. 10099, Plaintiff's First Brief, dated Sep. 13, 2019, 28 pages.
Case of Demand for Rescission of Appeal Decision, Reiwa 1 (2019) (Gyo-ke) No. 10099, Plaintiff's Second Brief, dated Oct. 2, 2019, 3 pages.
Case of Demand for Rescission of Appeal Decision, Reiwa 1 (2019) (Gyo-ke) No. 10099, Plaintiff's Third Brief, dated Feb. 4, 2020, 30 pages.
Chappell Brown, "CMOS imager sports electronic shutter," EE Times, Sep. 8,1998 (available at https://web.archive.org/web/20040506082237/http://www.eetimes.com/news/98/1025news/cmos.html), 3 pages.
Chbuchi et al., Barcode Readers using the Camera Device in Mobile Phones, Proceedings of the 2004 International Conference on Cyberworlds, 6 pages, Dec. 2004.
Chen, T. "A study of spatial color interpolation algorithms for single-detector digital cameras," 1999 (22 pages).
Chinese Office Action from Chinese Patent Application No. 201110220832.0 dated Nov. 3, 2014.
Chinese Office Action from Chinese Patent Application No. 201110220834.X dated Nov. 3, 2014.
Chinese Patent Application No. 200680000050.3 Office Action dated Mar. 22, 2009 (including English translation thereof, and translated version of pending claims of Chinese Patent Application No. 2006800000 503 (26 pages)).
Claim set of U.S. Appl. No. 12/132,462, filed Jun. 3, 2008, 15 pages.
Claim set of U.S. Appl. No. 12/132,480, filed Jun. 3, 2008, 8 pages.
Claim set of U.S. Appl. No. 12/132,480, filed Jun. 3, 2008, 18 pages.
Comments of Statement of Reasons for Patentability and/or Confirmation in U.S. Appl. No. 90/009,996; dated Mar. 26, 2013.
Communication about intention to grant a European patent dated Jan. 15, 2021 for EP Application No. 17193038.1, 5 pages.

(56) References Cited

OTHER PUBLICATIONS

Communication about intention to grant a European patent dated Mar. 10, 2021 for EP Application No. 16183463.5, 5 pages.
Communication about intention to grant a European patent dated Mar. 31, 2016 for EP Application No. 06737299.
Communication about intention to grant a European patent dated May 17, 2017 for EP Application No. 15167739.
Communication Extended Search Report for European Application No. 10012906.3; dated Oct. 10, 2011.
Communication from the Examining Division dated Jan. 11, 2008 for EP Application No. 06737299.
Communication from the Examining Division dated Jul. 10, 2013 for EP Application No. 06737299.5, 2 pages.
Communication from the Examining Division dated May 26, 2020 for EP Application No. 17193038.
Communication from the Examining Division dated Oct. 10, 2019 for EP Application No. 17193038.
Communication from the Examining Division dated Sep. 3, 2010 for EP Application No. 06737299.
Communication from the Examining Division dated Sep. 7, 2020 for EP Application No. 16183463.5, 2 pages.
Communication Partial Search Report, European Patent Application No. 10012906.3; dated May 13, 2011 (5 pages).
Communication Pursuant to Article 94(3) EPC for European Application No. 06 737 299.5; dated Jan. 11, 2008.
Communication Pursuant to Article 94(3) EPC for European Application No. 06 737 299.5; dated Sep. 3, 2010.
Communication Pursuant to Article 94(3) EPC for European Application No. 06 737 300.1; dated Oct. 30, 2013.
Communication Pursuant to Article 94(3) EPC in European Application No. 06737300.1; dated Jan. 19, 2011.
"1.3-Megapixel CMOS Active-Pixel Digital Image Sensor;" pp. 30; dated 2004; retrieved on Oct. 8, 2013 from <http://www.digchip.com/datasheets/parts/datasheet/301/MT9M413-pdf.php- >.
"½-Inch 3-Megapixel CMOS Digital Image Sensor;" Micron, pp. 1-41; dated 2004; retrieved on Oct. 8, 2013 from <http://www.neodomains.ca/domains/content/customizedTemplate/kinko/pdf/mt9t001p12stc.pdf>.
"417 Bar Code;" dated Dec. 25, 1997.
"4600 Image Reader;" IMAGETEAM (Trademark) from Hand Held Products, Inc.; retrieved on Oct. 8, 2013 from <http://www.barcoding.com/prodpages/HHP/4600.pdf>.
"4800 Image Reader;" IMAGETEAM (Trademark) from Hand Held Products, Inc.; retrieved on Oct. 8, 2013 from <http://www.barcoding.com/prodpages/HHP/4800.pdf>.
"IT4000 Imaging Module & IT4300Laser Aiming Imaging Module;" Hand Held Products Inc.; Hand Held Products IMAGETEAM 4X00 Optical Subassembly; retrieved on Oct. 8, 2013 from <http://www.racoindustries.com/hhpit4x00opt.htm>.
"IT4200 Image Engine & IT4250 Image Engine with decoder board;"; IMAGETEAM 4200/4250 OEM 2D Image Engine; Hand Held Products, Inc.; dated 2001; retrieved on Oct. 8, 2013 from <ftp://www.scansourcela.us/HandHeld%20Products/Data%20Sheets/Scanners%20&%20Input%20Devices/English/4200-SS%20Rev%20B.pdf>.
"Observation," Application No. 200680016023.5; Title of invention "Bar Code Reading Device with Global Electronic Shutter Control," State observation directed to the Notification of Acceptance of Request for Invalidation, which was issued by the Patent Reexamination Board on Nov. 27, 2012; 15 pages; dated Dec. 4, 2012; partial translation.
"VV6600 1.3 Megapixel CMOS Image Sensor IC Chip;" STMicroelectronics.
"XSCALE PXA25X Processor IC Chip including Central Processing Unit (CPU)" Intel 2002.
"XSCALE PXA27X Processor IC Chip with 'Quick Capture Camera Interface';" Intel 2005.

(IPEA/409) International Preliminary Report on Patentability Chapter II or (IB/373) International Preliminary Report on Patentability Chapter I dated Sep. 12, 2007 for WO Application No. PCT/US06/008113.
(IPEA/409) International Preliminary Report on Patentability Chapter II or (IB/373) International Preliminary Report on Patentability Chapter 1 dated Sep. 12, 2007 for WO Application No. PCT/US06/008114.
"½-Inch VGA (With Freeze-Frame) CMOS Active-Pixel Digital Image Sensor: MT9V403," Micron, Rev. B, Jan. 2004, 33 pages.
"1M28, 1M75, and 1M150 User's Manual," DALSA, Rev. 4, Sep. 30, 2003, 74 pages.
"Cypress's LUPA-300 Image Sensor Earns 2005 Product of the Year Honors From analogZONE," Cypress, Feb. 23, 2006 (available at https://www.cypress.com/news/cypresss-lupa-300-image-sensor-earns-2005-product-year-honors-analogzone), 2 pages.
"DALSA 1M150-SA (Prelim.)," DALSA, Aug. 28, 2003, 2 pages.
"DALSA IA-G1-VGA CMOS Area Array Sensor," DALSA, undated (available at https://www.datasheetarchive.com/pdf/download.php?id=c7dccf64051389eeae5b9c6e6dbfb3d1f64d24&type=P&term=25V12V), 18 pages.
"FillFactory's High Fill Factor N-Well Pixel® (U.S. Pat. No. 6,225,670)," Technology: FillFactory Technology Exclusivities, Nov. 5, 2005, 6 pages.
"IBIS5-A-1300 Datasheet," Fillfactory Image Sensors, Rev. 1.3, Jan. 4, 2005, 67 pages.
"Kodak KAC-1310 Image Sensor," Eastman Kodak Company, Rev. 4, Nov. 7, 2002, 78 pages.
"Lumenera USB Camera User's Manual," Lumenera Corporation, Release 3.5, 2004, 31 pages.
"LUPA 1.3 Mpixel @ 450 fps CMOS APS," Fillfactory Image Sensors, Jul. 4, 2003, 27 pages.
"LUPA300 CMOS Image Sensor," ON Semiconductor, Rev. 11, Dec. 2016, 29 pages.
"MT9V022: ⅓-Inch Wide-VGA Digital Image Sensor Features," Aptina Imaging, Rev.H 6/10 EN, 2005.
½-Inch 3-Megapixel CMOS Digital Image Sensor; Micron, pp. 1-41; dated 2004; retrieved on Oct. 8, 2013 from <http://www.neodomains.ca/domains/content/customizedTemplate/kinko/pdf-/mt9t001p12stc.pdf>.
½-Inch VGA (With Freeze Frame) CMOS Active-Pixel Digital Image Sensor; pp. 33; dated 2004; retrieved on Oct. 8, 2013 from <http://www.datasheet4u.com/datasheet/M/T/9/MT9V403.sub.-Micron.pdf.h- tm1>.
⅓-Inch Wide-VGA CMOA Digital Image Sensor-MT9V022; Aptina Imaging; 56 pages,; dated 2005.
⅓-Inch Wide-VGA CMOS Digital Image Sensor, 64 pages.
2003 IEEE Workshop on CCDs and Advanced Image Sensors Program, Schloss Elmau; pp. 1-5; dated May 15-17, 2003; retrieved on Oct. 8, 2013 from <http://www.imagesensors.org/Past%20Workshops/2003%20Workshop/2003%20P- apers/20 03%20Program.htm>.
2004 IEEE International Symposium on Circuits and Systems (IEEE Cat. No. 04CH37512), Vancouver, BC, 2004, pp. IV-960,4 pages.
4000 OEM 2D Image Engine; IMAGETEAM (Trademark)from Hand Held Products, Inc.; dated 2005; retrieved on Nov. 26, 2013 from <http://data.manualslib.com/pdf2/28/2788/278784-hand.sub.-held.sub.---products/it4000.pdf?57edd87f01d2468a84c2e0f75ef84d2c&take=binary>.
4410 Image Reader; IMAGETEAM (Trademark) from Hand Held Products, Inc. retrieved on Oct. 8, 2013 from <http://www.barcoding.com/prodpages/HHP/4410hd.pdf>.
A First Invalidity Request filed by Fujian Newland Auto-ID Tech. Co., Ltd ("Newland") in China submitted Apr. 18, 2012. 670 pages.
A second invalidity request filed by Fujjan Newland Auto-ID Tech. Co., Ltd. ("Newland") in China, dated Mar. 4, 2013.
ABoushady, H.; "Single Stamp Amplifers;" University of Paris VI, slides 1-24; dated 2001; retrieved on Oct. 8, 2013 from <http://www-soc.lip6.fr/.about.hassan/lec3.sub.-single.sub.-stage.pd-f>.
Adams, J. E.; "Color Processing in Digital Cameras;" IEEE Magazine, Eastman Kodak Company; dated 1998.

(56) References Cited

OTHER PUBLICATIONS

Adams, J. E.; "Design of practical color filter array interpolation algorithms for digital cameras;" SPIE, vol. 3028; pp. 117-125; dated 1997.
Adams, J.E., et al.; "Color Processing in Digital Cameras;" IEEE Magazine, Eastman Kodak Company; dated 1998.
Administrative Ruling in Writing of Supreme People's Court of the People's Republic of China, Decision to Reject Retrial, No. ZGFXS 7309, 23 pages.
Affidavit of Christopher Butler dated Jun. 12, 2013.
Agilent Technologies, Pulsed Operating Ranges for AlInGaP LEDs vs. Projected Long Term Light Output Performance, Application Brief I-024, Nov. 1999, pp. 1-6.
Allais, D, The History of Automatic Identification, ID Systems—The Magazine of Keyless Data Entry (Rev. F). Retrieved from https://www.stonybrook.edu/commcms/ libspecial/collections/ manuscripts/aidc/aidchistory_allais.pdf (12 pages).
Annex to the communication dated Jan. 11, 2008 for EP Application No. 06737299.5, 2 pages.
Annex to the communication dated Jan. 14, 2021 for EP Application No. 16183463.5, 3 pages.
Annex to the communication dated Jan. 18, 2021 for EP Application No. 16183463.5, 1 page.
Annex to the communication dated Jul. 10, 2013 for EP Application No. 06737299.5, 2 pages.
Outgoing—ISA/210—International Search Report dated Jul. 14, 2006 for WO Application No. PCT/US06/008114.
Outgoing—ISA/210—International Search Report dated Oct. 26, 2006 for WO Application No. PCT/US06/008113.
OV9640FBG Color CMOS 1.3 MegaPixel (VarioPixelTM) Concept Camera Module, 2003, 24 pages.
Panasonic's Integrated Smart Card Reader model No. ZU-9A36CF4 available from Matsushita Electrical Industrial Company, Ltd.
Panasonic's Specification No. MIS-DG60C194 entitled, "Manual Insertion Type Integrated Smart Reader" dated Mar. 2004, revision 1.00.
Partial European Search Report for European Patent Application No. 16183463.5 dated Jan. 12, 2017, 8 pages.
Patent Owner's Appeal Brief Re: CN 200680016023.5, dated Jun. 29, 2016, 55 pages.
Patentee Response to Oberservations by Petitioner, Proceedings on the Invalidation of Chinese Application No. 200680016023.5; dated Nov. 9, 2012.
Patentee's Reply Brief in the matter of Hand Held Products versus Opticon Sensoren GmBH et al. regarding the response to the patent infringement of European Patent No. 2953350, filed Sep. 30, 2020 (137 pages).
PB-MV13 20mm CMOS Active-Pixel Digital Image Sensor; Photobit; p. 33; dated Aug. 2000; retrieved on Oct. 8, 2013 from <http://fast-vision.com/clientuploads/PDFs/Pb-MV13 Product Specification.pdf>.
PC Card Standard 8.0 Release—Apr. 2001; Personal Computer Memory Card International Association (PCMCIA) Version 2.0 <http://www.pcmcia.org>; retrieved on Oct. 8, 2013 from <affon.narod.ru/09gu80.pdf>.
Pending claims for Chinese Application No. 2006800000503; dated May 13, 2009.
Pending claims of Chinese Patent Application No. 2006800000503 dated May 13, 2009 (4 pages).
Rejoinder in the matter of Hand Held Products versus Opticon Sensoren GmBH and Opticon Sensors Europe B.V. for alleged patent infringement (EP 2 953 350 B1), dated Dec. 4, 2020, 98 pages.
Reply to Nullity Complaint dated Jun. 29, 2020, In the Matter of *Opticon Sensors Europe B.V.* vs. *Hand Held Products, Inc.,* EP2953350B1 2 Ni 60/20 (EP), dated Jan. 26, 2021, 65 pages.
Report by Applicants dated Sep. 15, 2011 (reporting divisional application filings in SIPO). (1 page).
Respondent's Initial Invalidity Contention in the Matter of Certain Barcode Scanners, Mobile Computers with Barcode Scanning Capabilities, Scan Engines, and Components Thereof (Inv. No. 337-TA-1285), dated Feb. 9, 2022, 96 pages.
Respondent's Statement of Defense in the matter of *Hand Held Products* versus *Opticon Sensoren GmBH et al.* regarding response to the complaint filed regarding the patent infringement of European Patent No. 2953350, filed Jun. 29, 2020 (53 pages).
Respondents Notice of Prior Art, In the matter of Certain Barcode Scanners, Scan Engines, Products Containing the Same, and Components Thereof, USITC Inv. No 337-TA-1165, 40 pages.
Respondents' Initial Markman Brief, In the Matter of Certain Barcode Scanners, Scan Engines, Products Containing the Same, and the Components Thereof, USITC Inv. No 337-TA-1165, 136 pages.
Respondents' Claim Construction Exhibit, RXM-14, In the Matter of Certain Bar Code Readers, Scan Engines, Products Containing the Same, and Components Thereof, USITC Inv. No. 337-TA-1165, Declaration of Dr. Chandrajit Bajaj, 54 Pages.
Respondents' Claim Construction Exhibits, RXM-13, In the Matter of Certain Bar Code Readers, Scan Engines, Products Containing the Same, and Components Thereof, USITC Inv. No. 337-TA-1165, Declaration of Dr. Benjamin F. Goldberg, 24 pages.
Respondents' Claim Construction Exhibits, RXM-14, In the Matter of Certain BarCode Readers, Scan Engines, Products Containing the Same, and Components Thereof, USITC Inv. No. 337-TA-1165, Declaration of Dr. Lambertus Hesselink, 94 Pages.
Respondents' Final Markman Exhibit RXM-21, Complainants' Opening Claim Construction Brief, In the Matter of Certain Bar Code Readers, Scan Engines, Products Containing the Same, and Components Thereof, USITC Inv. No. 337-TA-1061, 51 pages.
Respondents' Final Markman Exhibit RXM-22, Complainants' Reply Claim Construction Brief, In the Matter of Certain Bar Code Readers, Scan Engines, Products Containing the Same, and Components Thereof, USITC Inv. No. 337-TA-1061, 53 pages.
Respondents' Final Markman Exhibit RXM-28, U.S. Pat. No. 6,836,288, 41 pages.
Respondents' Final Markman Exhibit, Inv. No. 337-TA-1165, RXM-16, The American Heritage Desk Dictionary and Thesaurus, 4 pages.
Respondents' Final Markman Exhibit, Inv. No. 337-TA-1165, RXM-17, Webster's New World College Dictionary Fourth Edition, 4 pages.
Respondents' Final Markman Exhibit, Inv. No. 337-TA-1165, RXM-18, Webster's II, New College Dictionary, 4 pages.
Respondents' Final Markman Exhibit, Inv. No. 337-TA-1165, RXM-19, Collins English Dictionary, 5 pages.
Respondents' Final Markman Exhibit, Inv. No. 337-TA-1165, RXM-20, The New Oxford American Dictionary, 5 pages.
Response and European Communication Pursuant to Article 94(3) EPC in European Application No. 06737300.0; dated Jul. 29, 2011.
Response by Patent Owner with Exhibits as files in U.S. Appl. No. 90/009,996; dated Oct. 3, 2012.
Result of Consultation issued in EP Application No. 16183463.5 on Jan. 14, 2021, 3 pages.
Result of Consultation issued in EP Application No. 16183463.5 on Jan. 18, 2021, 5 pages.
S. Hamami, L. Fleshel and O. Yadid-Pecht, "CMOS APS imager employing 3.3 V 12 bit 6.3 MS/s pipelined ADC," 2004 IEEE International Symposium on Circuits and Systems (IEEE Cat. No. 04CH37512), Vancouver, BC, 2004, pp. IV-960, 4 pages.
Sakamoto, et al. "Software pixel interpolation for digital still cameras suitable for a 32-bit MCU," in IEEE Transactions on Consumer Electronics, vol. 44, No. 4, pp. 1342-1352, Nov. 1998, doi: 10.1109/30.735836.
Search Report for European Application No. 13153147.7 dated Oct. 29, 2015.
Search Report for European Application No. 15 16 7739 dated Oct. 30, 2015.
Search Report for European Application No. 15167739.0 dated Oct. 30, 2015.
Second Instance Judgment upholding the Decision for Invalidation made by the Patent Reexamination Board received from the Chinese IP Court, dated Nov. 7, 2018, 11 pages.

(56) References Cited

OTHER PUBLICATIONS

Sep. 14, 2012 Letter and Decision of Rejection in Japanese Patent Application No. 2008-500844, with machine generated English translation.
StMicroelectronics, STMicroelectronic Introduces Low-Cost High-Quality Mega Pixel CMOS Sensor for Digital Still Cameras and Camcorders, Introduction article on website http://www.st.com/stoneline/press/news/year2002/p1239p.htm, p. 1, Oct. 9, 2002.
Supplemental Observations by the Patentee; Proceedings on the Invalidation of Chinese Application No. 200680016023.5; dated Nov. 2, 2012.
Supplemental Observations by the Patentee; Proceedings on the Invalidation of Chinese Application No. 200680016023.5; dated Nov. 9, 2012.
Text of the Observation by Patentee to Request for Invalidity Action in Chinese Application No. 200680016023.5 dated Aug. 20, 2012.
The Text of Observation, Beijing ZBSD Patent & Trademark Agent LTD; dated Nov. 8, 2012; 29 pages; full translation.
The Text of the Observation, Beijing ZBSD Patent & Trademark Agent Ltd; dated Oct. 11, 2012; 233 pages; full translation.
Communication pursuant to Article 94(3) EPCfor European Application No. 17193038.1; dated Oct. 10, 2019.
Communication under Rule 71(3) EPC for European Patent Application No. 13153147.7 dated Jun. 29, 2017, 7 pages.
Communication under Rule 71(3) EPCfor European Patent Application No. 15167739.0 dated May 17, 2017, 7 pages.
Compact Flash Specification; Version 2.0; dated 2003; onginally retrieved from <http://www.compactflash.org> presently retrieved on Nov. 6, 2013 from <https://www.google.comlsearch?q=CompactFlash+Specification%3B%E2%80%9-D&rls=com.microsoft:en-us&ie=UTF-8&oe=UTF-8&startIndex=&startPage=1#q=Comp-actFlash+Specification&rls=com.microsoften-us>.
CompactFlash Specification; Version 2.0; dated 2003; originally retrieved from <http://www.compactflash.org> presently retrieved on Nov. 6, 2013 from <https://www.google.comlsearch?q=CompactFlash+Specification%3B%E2%80%9-D&rls=com.microsoft:en-us&ie=UTF-8&oe=UTF-8&startindex=&startPage=1#q=Comp-actFlash+Specification&rls=com.microsoften-us>.
Complainants' Opening Claim Construction Brief, Corrected Exhibit CXM-0078, U.S. Pat. No. 7,219,841, 48 pages.
Complainants' Opening Claim Construction Brief, Exhibit CXM-0006, Kodak Kac-9630 CMOS Image Sensor, Device Performance Specification, 23 pages.
Complainants' Opening Claim Construction Brief, Exhibit CXM-0023, U.S. Pat. No. 4,794,239, 18 pages.
Complainants' Opening Claim Construction Brief, Exhibit CXM-0024, U.S. Pat. No. 5,304,786, 52 pages.
Complainants' Opening Claim Construction Brief, Exhibit CXM-0054, Microsoft Press Computer Dictionary, The Comprehensive Standard for Business, School, Library, and Home, 5 pages.
Complainants' Opening Claim Construction Brief, Exhibit CXM-0056, AIM, Uniform Symbology Specification Code 93, 16 pages.
Complainants' Opening Claim Construction Brief, Exhibit CXM-0064, International Standard, Information Technology—Automatic Identification and Date Capture Techniques—Bar Code Symbology—QR Code, 123 pages.
Complainants' Opening Claim Construction Brief, Exhibit CXM-0072, Webster's II New College Dictionary, 4 pages.
Complainants' Opening Claim Construction Brief, Exhibit CXM-0074, Microsoft Press Computer Dictionary, The Comprehensive Standard for Business, School, Library, and Home, Optical Communications. 5 pages.
Complainants' Opening Claim Construction Brief, Exhibit CXM-0078, U.S. Pat. No. 7,446,753, 28 pages.
Complainants' Opening Claim Construction Brief, Exhibit CXM-0079, In the Matter of Certain Bar Code Readers, Scan Engines, Products Containing the Same, and Components Thereof, USITC Inv. No. 337-TA-1165, Declaration of R. Michael Guidash, 51 pages.
Complainants' Opening Claim Construction Brief, Exhibit CXM-0080, In the Matter of Certain Bar Code Readers, Scan Engines, Products Containing the Same, and Components Thereof, USITC Inv. No. 337-TA-1165, Declaration of Michael S. Kogan, 21 pages.
Complainants' Opening Claim Construction Brief, Exhibit CXM-0081, In the Matter of Certain Bar Code Readers, Scan Engines, Products Containing the Same, and Components Thereof, USITC Inv. No. 337-TA-1165, Declaration of Dr. Omid Kia, 30 pages.
Complainants' Opening Claim Construction Brief, Exhibit JXM-0001, U.S. Pat. No. 9,465,970 (Issued Oct. 11, 2016), 56 pages, Oct. 28, 2019.
Complainants' Opening Claim Construction Brief, Exhibit JXM-0001, U.S. Pat. No. 9,465,970, 66 pages.
Complainants' Opening Claim Construction Brief, Exhibit JXM-0002, U.S. Pat. No. 8,978,985, 62 pages.
Complainants' Opening Claim Construction Brief, Exhibit JXM-0003, U.S. Pat. No. 7,148,923, 15 pages.
Complainants' Opening Claim Construction Brief, Exhibit JXM-0004, U.S. Pat. No. 7,527,206, 186 pages.
Complainants' Opening Claim Construction Brief, Exhibit JXM-0005, U.S. Pat. No. 9,659,199, 21 pages.
Complainants' Opening Claim Construction Brief, Exhibit JXM-0006, U.S. Pat. No. 7,159,783, 22 pages.
Complainants' Opening Claim Construction Brief, Exhibit JXM-0010, Appendix C, Certified CoPy of Prosecution History of U.S. Pat. No. 7,148,923, 380 paGES.
Complainants' Opening Claim Construction Brief, In the Matter of Certain Barcode Scanners, Scan Engines, Products Containing the Same, and the Components Thereof, USITC Inv No. 337-TA-1165, 137 pages.
Complainants' Response to Opticon's Response to Order No. 18, In the Matter of Certain Barcode Scanners, Scan Engines, Products Containing the Same, and the Components Thereof, USITC Inv. No. 337-TA-1165, 14 pages.
Complainants' Response to Order 18, Exhibit CXM-0088, Bar Code 1: Plessey Code Specification Page, 6 pages.
Complainants' Response to Order 18, Exhibit CXM-0102, United States Postal Services DMM 708 Technical Specifications, 34 pages.
Complainants' Response to Order 18, Exhibit CXM-0103, Royal Mail, Four State Customer Code Symbology Specification and Application, PE 5969, 30 pages.
Complainants' Response to Order 18, Exhibit CXM-0104, Canada Post Corporation 4-State Bar Code Handbook, 31 pages.
Complainants' Response to Order 18, Exhibit CXM-0105, Koninklijke PTT Post BV KIX Specification, 9 pages.
Complainants' Response to Order 18, Exhibit CXM-0106, United States Postal Service DMM 503 Extra Services, 40 pages.
Complainants' Response to Order 18, Exhibit CXM-0109, Planet Depos, Transcript of Takashi Ushiki, Corporate Designee, 6 pages.
Complainants' Response to Order 18, Exhibit CXM-0110, U.S. Pat. No. 9,286,497, 36 pages.
Complainants' Response to Order 18, Exhibit CXM-0111, U.S. Pat. No. 6,729,546, 25 pages.
Complainants' Response to Order 18, Exhibit CXM-0112, U.S. Pat. No. 6,254,003, 24 pages.
Complainants' Response to Order 18, Exhibit CXM-0113, U.S. Pat. No. 7,303,126, 13 pages.
Complainants' Response to Order 18, Exhibit CXM-0114, U.S. Pat. No. 6,889,904, 13 pages.
Complainants' Response to Order 18, Exhibit CXM-0115,Opticon, 2D Scan Engine, MDI-3100-SR, Specifications Manual, 25 pages.
Complainants' Response to Order 18, Exhibit CXM-0116, MDI-3000 Opticon Technical Support Portal, Specifications Manual, 2 pages.
Complainants' Response to the ALJ's Questions Posed During the Markman Hearing, In the Matter of Certain Barcode Scanners, Scan Engines, Products Containing the Same, and the Components Thereof, USITC Inv. No. 337-TA-1165, 24 pages.
Dec. 19, 2007 Office Action in U.S. Appl. No. 11/495,417.
Decision of Rejection for Japanese Application No. 2018-134033, dated Mar. 18, 2020, 6 pages.

(56) References Cited

OTHER PUBLICATIONS

Decision on Appeal for U.S. Pat. No. 7,568,628; dated Feb. 28, 2014.
Decision to grant a European patent dated Aug. 31, 2017 for EP Application No. 15167739.
Decision to grant a European patent dated Jul. 14, 2016 for EP Application No. 06737299.
Decision to grant a European patent received for European Application No. 16183463.5, dated Jul. 22, 2021, 3 pages.
Decision to grant a European patent received for European Application No. 17193038.1, dated Jun. 4, 2021,2 pages.
Titus, H. "Imaging Sensors That Capture Your Attention," Sensors Magazine (Feb. 2001), 6 pages.
Toshiba CCD Linear Image Sensor (TCD1304AP), Oct. 15, 2001 (15 pages). Retrieved from https://spectrecology.com/wp-content/uploads/2021/03/ Toshiba-TCD1304AP-CCD-array.pdf.
Transaction Terminal Image Kiosk 8870 available from Hand Held Products, Inc.; retrieved on Oct. 8, 2013 from <http://www.legacyglobal.com/Uploads/ProductPDF/Honeywell%20-%20Transaction%20Team%20118870%20Series.pdf>.
Transaction Terminal Image Kiosk 8870 available from Hand Held Products, Inc.; retrieved on Oct. 8, 2013 from<http://www.legacyglobaLcom/Uploads/ProductPDF/Honeywell%20-%20Transaction%20Team%20TT8870%20Series.pdf>.
Trial and Appeal Decision issued in Japanese Application No. 2018-134033 on Oct. 7, 2021, 4 pages.
Triplic, In the matter of *Hand Held Products, Inc.* vs. *Opticon Sensoren GmbH et al.*, 7 O 4/20, dated Jan. 7, 2021, 14 pages.
U.S. App. filed Oct. 5, 2004, Wang., U.S. Appl. No. 10/958,779.
U.S. Appl. filed Jun. 27, 2005., U.S. Appl. No. 60/694,371.
U.S. Appl. filed Apr. 9, 2009., U.S. Appl. No. 12/421,457.
U.S. Appl. filed Apr. 9, 2009., U.S. Appl. No. 12/421,476.
U.S. Appl. filed Aug. 23, 2016; In re: Wang entitled Apparatus Having Hybrid Monochrom and Color Image Sensor Array., U.S. Appl. No. 15/244,683.
U.S. Appl. filed Dec. 1, 2004., U.S. Appl. No. 60/632,696.
U.S. Appl. filed Dec. 14, 2009., U.S. Appl. No. 12/637,528.
U.S. Appl. filed Dec. 2, 2008., U.S. Appl. No. 12/326,443.
U.S. Appl. filed Jul. 26, 2016; In re: Wang entitled Digital Picture Taking Optical Reader Having Hybrid Monochrome and Color Image Sensor Array., U.S. Appl. No. 15/219,827.
U.S. Appl. filed Jun. 11, 2012., U.S. Appl. No. 13/493,348.
U.S. Appl. filed Jun. 22, 2005., U.S. Appl. No. 60/692,890.
U.S. Appl. filed Jun. 30, 2010., U.S. Appl. No. 12/827,619.
U.S. Appl. filed Mar. 11, 2005., U.S. Appl. No. 11/077,976.
U.S. Appl. filed Oct. 5, 2009., U.S. Appl. No. 12/573,663.
U.S. Notice of Allowance issued in U.S. Appl. No. 12/610,892 dated Nov. 10, 2011.
US 8,038,065 B2, 09/2011, Wang et al. (withdrawn).
Validity Search Report from the Chinese Patent Office for Application No. 200680016023.5; dated Mar. 15, 2012.
Wandell, B. and Silverstein, L.D. (2003) Digital Color Reproduction. In S. Shevell (2nd Ed ), The Science of Color (pp. 288-289). Elsevier Ltd.
Written Opinion of the International Search Authority dated Jul. 14, 2006 for WO Application No. PCT/US06/008114.
Written Opinion of the International Search Authority dated Oct. 26, 2006 for WO Application No. PCT/US06/008113.
Written Response to Request for Invalidation of Chinese Application No. 200680016023.5; dated Apr. 19, 2013.
Www.fillfactory.com, Dual Shop Dynamic Dynamic Range Expansion, Website, Feb. 28, 2005, pp. 1-3.
www.micron.com, Introducing a CMOS Image Sensor Specifically Designed for Automotive Scene—Understanding Systems, Website, Oct. 2, 2004, pp. 1-2.
www.photofocus.com, Linog(Trademark) Technology the Key to Programmable Linear, Logarithmic, or Combined Linear And Logarithmic Response Without Image Lag or Distortion, Website, Feb. 28, 2005, pp. 1-6.

Xscale PXA25X Processor IC Chip including Central Processing Unit (CPU) Intel; retrieved on Oct. 8, 2013 from <http://www.datasheetarchive.com/d1main/Datasheets-14/DSA-276710.pdf&g-t;.
Xscale PXA27X Processor IC Chip with 'Quick Capture Camera Interface'; Intel; retrieved on Oct. 8, 2013 from <int.xscale-freak.com/XSDoc/PXA27X/28000304.pdf>.
Fossum, Eric R.. "Active pixel sensors: are CCDs dinosaurs?" Electronic Imaging (1993).
Fowler, B., et al.; "A CMOS Area Image Sensor with Pixel Level A/D Conversion;" Information Systems Laboratory, Electrical Engineering Department, Standford University; dated Nov. 20, 1995.
Gamal et al.,CMOS Image Sensors, 2005, 15 pages.
German Version, Nullity Suit in the matter of *Opticon Sensors Europe B.V.* v. *Hand Held Products, Inc.*, on the nullity of the German part of EP2953350, German Federal Patent Court, filed Jun. 29, 2020, 48 pages.
Gunturk, B. K., et al.; "Demosaicking: Color Filter Array Interpolation," IEEE Signal Processing Magazine; dated Jan. 2005.
Gunturk, Bhadir K., John Glotzbach, Yucel Altunbasak, Ronald W. Shafer, and Russel M. Mersereau. "Demosaicking Color Filter Array Interpolation" IEEE Signal Processing Magazine, Jan. 2005.
Hamad, Karez & Kaya, Mehmet. (2016). A Detailed Analysis of Optical Character Recognition Technology. International Journal of Applied Mathematics, Electronics and Computers. 4. 244 244. 10.18100/ijamec.270374.
Hamami, S., et al., "CMOS APS Imager Employing 3.3V 12 Bit 6.3 MS/S Pipelined ADC;" The VLSI Systems Center, Ben-Gurion University; ISCAS '04. Proceedings of the 2004 International Symposium on Circuits and Systems; dated May 2004.
Hassan Aboushady, Single Stage Amplifiers, University of Paris VI, Sliders pp. 1-24, 2001 (date as indicated by the USPTO in U.S. Appl. No. 90/009,996).
Heimann, T. K,et al; "Color Filter Array and Color Correction for High Dynamic Range CMOS IMage Sensors;" European Conference on Circuit Theory and Design; dated Aug. 2001.
Henderson, R. K., et al.; "Pixel-Pixel Fixed Pattern Noise in CMOS Image Sensors due to Readout Parasitic Capacitance." IEEE Workshop on Charge-Coupled Devices and Advanced Image Sensors, Jun. 2005, 4 pages.
HP iPAQ rx3700 series Mobile Media Companion, North America—Version 5—May 19, 2005 (12 pages). Retrieved from https://manualzz.com/download/25195141.
Imageteam 3800E linear image engine available from Hand Held Products, Inc.; retrieved on Oct. 8, 2013 from <http://www.barcoding.com/prodpages/HHP/3800vhdpdf>.
IMAGETEAM 4710 two-dimensional reader available for Hand Held Products, Inc.; retrieved on Oct. 8, 2013 from <http://www.barcoding.com/prodpages/HHP/4710hd.pdf>.
IMAGETEAM 4710 two-dimensional reader available from Hand Held Products, Inc.; retrieved on Oct. 8, 2013 from <http://www.barcoding.com/prodpages/HHP/471 Ohd.pdf>.
IMAGETEAM 4710 two-dimensional reader available from Hand Held Products, Inc.; retrieved on Oct. 8, 2013 from <http://www.barcoding.com/prodpages/HHP/4710hd.pdf>.
Intel.RTM. Strong ARM RISC Processor; INTEL; dated 2000; retrieved on Oct. 8, 2013 from <http://pdf.datasheetcatalog.com/datasheets/90/361041.sub.-DS.pdf>.
Intention to grant (signatures) dated Jan. 15, 2021 for EP Application No. 17193038.
Intention to grant (signatures) dated Mar. 9, 2021 for EP Application No. 16183463.5,1 page.
International Search Report and Written Opinion for Application No. PCMJS2006/008113; dated Oct. 26, 2006.
International Search Report and Written Opinion for Application No. PCT/US2006/008113; dated Oct. 26, 2006.
International Search Report and Written Opinion for Application No. PCT/US2006/008114; dated Jul. 14, 2006.
International Search Report for Application No. PCT/US2006/008113; dated Aug. 7, 2006.
International Standard ISO/IEC 15420, 2000, 11 pages.
International Standard ISO/IEC 18004, 2000, 122 pages.
Invalidation Decision for Chinese Application No. 200680016023.5 dated Mar. 29, 2016.

(56) References Cited

OTHER PUBLICATIONS

Jan. 24, 2012 Japanese Office Action in Corresponding Japanese Application No. 2008-500844, with machine generated translation.
Japanese Office Action for Application No. 2018-134033, dated Jul. 8, 2019.
Japanese Patent Application No. 63-185285 (cited with English Abstract and tanslation in corresponding U.S. Pat. No. 4,858,020).
Judgment of the Japanese IP High Court in the case of Japanese Patent Appeal of Appeal No. 2015-227211 dated Jul. 29, 2020, 107 pages.
Keren, et al. "Restoring Subsampled Color Images, Machine Vision and Application," Machine Vision and Applications (1999) 11:197-202.
Kodak Image Sensor Soluctins, Device Performance Specificaiton for Kodak KAI0340S and Kodak KAI-0340D Image Sensor, pp. 1-54 Revision 1.0, Aug. 6, 2004.
Kodak Image Sensor Solutions, Color Better through CMY Filters, www.kodak.com/go/ccd, pp. 1-2. Month and year unavailable but known to be published prior to earliest priority date of Jun. 3, 2005.
Kodak Image Sensor Solutions, Device Performance Specification for Kodak DAC9630 Cmos Image Sensor, pp. 1-22, Revision 1.1, Sep. 2004.
Kodak KAC-9630 CMOS Image Sensor, 2004, 22 pages.
Kodak KLI-4104 Image Sensor Device Performance Specification dated Oct. 27, 2003.
Lam, S. H., et al.; "Demosaic: Color Filter Array Interpolation for Digital Cameras;" PCM 2001, LNCS 2195; pp. 1084-1089; dated 2001.
Litwiller, David J.. "CCD vs. CMOS: Facts and Fiction." (2001), 4 pages.
LM9630 100 X 128 580 fps Ultra Sensitive Monochrome CMOS Image Sensor; National Semiconductor; dated May 2002; retrieved on Oct. 8, 2013 from <http://doc.chipfind.ru/pdf/nsc/1m9630.pdf>.
Longere, et al., Perceptual assessment of demosaicing algorithm performance. Proceedings of the IEEE, 2002, 90, pp. 123-132. 10.1109/5.982410.
Lumenera USB Camera User's Manual—Release 3.5; Lumenera Corporation; dated 2004.
Mar. 26, 2013 Ex Parte Reexamination Certificate in U.S. Appl. No. 90/009,996 (Reissue U.S. Pat. No. 7,568,628C1).
Mar. 4, 2013 Second Request for Invalidation of Chinese Application No. 200680016023.5.
Marino, et al. "Improving the performance of single chip image capture devices," J. Electronic Imaging, 2003, 12(2):209-218. 10.1117/1.1560643.
Micron image sensor with TrueSNAP technology, 2004, 3 pages.
Office Action for U.S. Appl. No. 13/188,696; dated Jan. 4, 2013.
Office Action for U.S. Appl. No. 13/213,543; dated Mar. 30, 2012.
Office Action for U.S. Appl. No. 13/213,543; dated Sep. 20, 2012.
Office Action for U.S. Appl. No. 13/289,795; dated Aug. 7, 2013.
Office Action for U.S. Appl. No. 13/437,439; dated May 15, 2013.
Office Action for U.S. Appl. No. 13/437,439; Notice of Allowance; dated Aug. 27, 2013.
Office Action for U.S. Appl. No. 13/447,393 dated Jul. 16, 2012.
Office Action for U.S. Appl. No. 13/447,393; Notice of Allowance; dated Dec. 28, 2012 .
Office Action for U.S. Appl. No. 13/493,348 dated Aug. 17, 2012.
Office Action for U.S. Appl. No. 13/586,420 dated Sep. 5, 2013.
Office Action for U.S. Appl. No. 14/220,903 dated Apr. 16, 2015.
Office Action for U.S. Appl. No. 14/221,857 dated May 9, 2014.
Office Action for U.S. Appl. No. 14/221,857 dated Sep. 3, 2014.
Office Action for U.S. Appl. No. 14/221,874 dated May 9, 2014.
Office Action for U.S. Appl. No. 14/221,874 dated Sep. 15, 2014.
Office Action for U.S. Appl. No. 14/684,609 dated Oct. 25, 2015.
Office Action for U.S. Appl. No. 14/690,653 dated Nov. 19, 2015.
Office Action for U.S. Appl. No. 14/925,447 dated May 20, 2016.
Office Action for U.S. Appl. No. 15/016,927 dated May 3, 2016.
Office Action for U.S. Appl. No. 11/495,417; dated Apr. 15, 2008.
Office Action for U.S. Appl. No. 12/190,145; dated May 9, 2013.
Office Action for U.S. Appl. No. 12/534,664; Notice of Allowance; dated Aug. 6, 2010.
Office Action for U.S. Appl. No. 12/610,892; Notice of Allowance; dated Nov. 10, 2011.
Office Action for U.S. Appl. No. 13/437,439; dated Aug. 31, 2012.
Office Action for U.S. Appl. No. 15/244,683 dated Sep. 12, 2017.
Office Action for U.S. Appl. No. 15/401,779 dated Sep. 26, 2017.
Office Action for U.S. Appl. No. 15/244,683 dated Mar. 24, 2017, 39 pages.
Office Action for U.S. Appl. No. 16/728,797, dated Feb. 5, 2020, 16 pages.
Office Action for U.S. Appl. No. 16/728,810, dated Feb. 5, 2020, 18 pages.
Office Action from U.S. Appl. No. 14/221,886, dated Feb. 25, 2015.
Office Action from U.S. Appl. No. 14/273,631, dated Jul. 7, 2014.
Office Action in Chinese Application No. 201110220834.X, dated Aug. 14, 2013, 11 pages.
Office Action issued in Japanese Application No. 2020-009300 dated Mar. 29, 2021, 9 pages.
Office Action issued in Japanese Application No. 2020-115143 dated Nov. 6, 2020, 2 pages.
Office Action issued in Japanese Application No. 2020-115146 dated Nov. 30, 2020, 2 pages.
Office Action issued in Japanese Office Action 2020-115145 on Nov. 30, 2020, 2 pages.
Office Communication (Notice of Transmission of Documents) for Chinese Application No. 200680016023.5 dated Jun. 4, 2015.
Ohbuchi et al., Barcode Readers using the Camera Device in Mobile Phones, 6 pages.
Order Granting/Denying Request for Ex Parte Reexamination in U.S. Appl. No. 90/009,996; dated Jun. 1, 2012.
Applicant Initiated Interview Summary (PTOL-413) dated Feb. 19, 2013 for U.S. Appl. No. 13/213,543, 2 pages.
Corrected Notice of Allowability dated Apr. 5, 2022 for U.S. Appl. No. 17/167,452, 2 pages.
Corrected Notice of Allowability dated Mar. 1, 2022 for U.S. Appl. No. 17/198,587, 2 pages.
Corrected Notice of Allowability dated Mar. 4, 2022 for U.S. Appl. No. 17/167,452, 2 pages.
Corrected Notice of Allowability dated Mar. 4, 2022 for U.S. Appl. No. 17/198,587, 2 pages.
Corrected Notice of Allowability dated Mar. 9, 2022 for U.S. Appl. No. 16/893,973, 2 pages.
Corrected Notice of Allowability dated Mar. 23, 2022 for U.S. Appl. No. 17/198,587, 3 pages.
Corrected Notice of Allowability dated Mar. 30, 2022 for U.S. Appl. No. 16/893,973, 2 pages.
Corrected Notice of Allowability, including Examiner's Amendment, dated Mar. 30, 2022 for U.S. Appl. No. 17/198,587, 7 pages.
English Translation of JP Office Action dated Apr. 5, 2022 for JP Application No. 2020115147, 9 pages.
English Translation of JP Office Action, including Search Report, dated Mar. 4, 2022 for JP Application No. 2021041127, 9 pages.
JP Office Action dated Apr. 5, 2022 for JP Application No. 2020115147, 9 pages.
JP Office Action, including Search Report, dated Mar. 4, 2022 for JP Application No. 2021041127, 9 pages.
Notice of Allowance and Fees Due (PTOL-85) dated Feb. 16, 2022 for U.S. Appl. No. 17/167,452, 9 pages.
Notice of Allowance and Fees Due (PTOL-85) dated Feb. 28, 2022 for U.S. Appl. No. 16/893,973, 8 pages.
Sugiyama, Y., et al., "A High-Speed, Region-of-Interest Readout CMOS Image Sensor with Profile, Data Acquiring Function", ITE Technical Report, May 13, 2004, vol. 28, No. 25, pp. 5 to 8, The Institute of Image Information and Television Engineers, Japan. (Abstract only).
U.S. Appl. No. 17/657,215, "Image Reader Comprising CMOS Based Image Sensor Array", Unpublished (filed Mar. 30, 2022), (Ynjiun P. Wang, lnventor)(Hand Held Products, Inc., Assignee).
Final Rejection dated Dec. 28, 2022 for U.S. Appl. No. 17/825,742.
English translation of JP Office Action, including Search Report, dated Nov. 7, 2022 for JP Application No. 2021179355.

(56) References Cited

OTHER PUBLICATIONS

JP Office Action, including Search Report, dated Nov. 7, 2022 for JP Application No. 2021179355.
Progress and the result of techno'98-technology, NEC Technical Report, May 25, 1998, p. 150, vol. 51, No. 5, p. 150. (Machine Translation Provided.).
English Translation of JP Office Action dated Dec. 27, 2022 for JP Application No. 2021041127.
English Translation of JP Office Action dated Jan. 5, 2023 for JP Application No. 2020115147.
JP Decision to Grant dated Jan. 5, 2023 for JP Application No. 2020115147.
JP Office Action dated Dec. 27, 2022 for JP Application No. 2021041127.
Examiner's Summary of Applicant-Initiated Interview received for U.S. Appl. No. 17/825,742, dated Nov. 16, 2022, 2 pages.
Non-Final Office Action dated Nov. 25, 2022 for U.S. Appl. No. 17/523,500.
U.S. Office Action Appendix dated Nov. 16, 2022 for U.S. Appl. No. 17/825,742.
Decision to grant a European patent dated Jan. 19, 2023 for EP Application No. 21174730.
Non-Final Rejection dated Mar. 2, 2023 for U.S. Appl. No. 18/050,712.
Non-Final Rejection dated Mar. 3, 2023 for U.S. Appl. No. 17/733,315.

\* cited by examiner

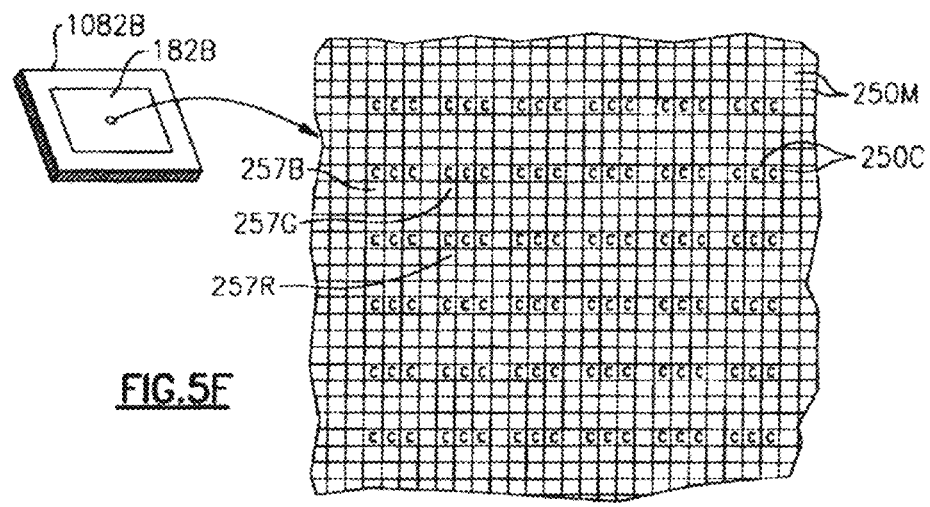
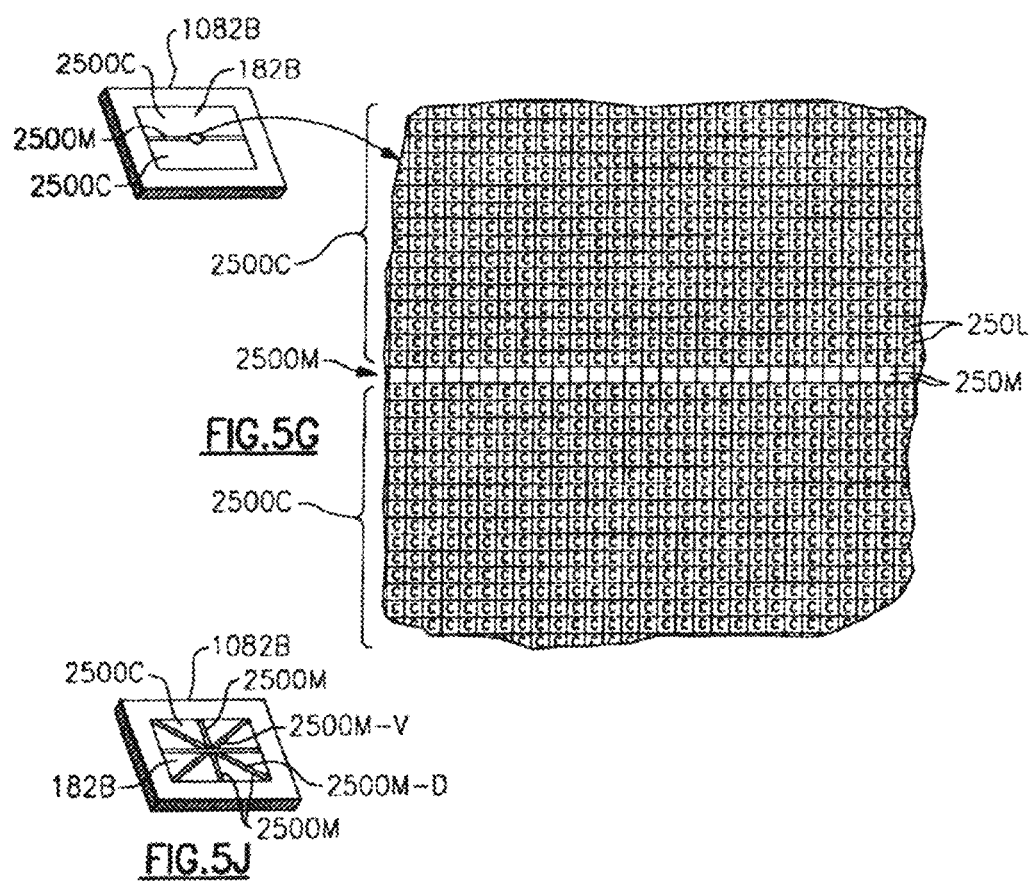

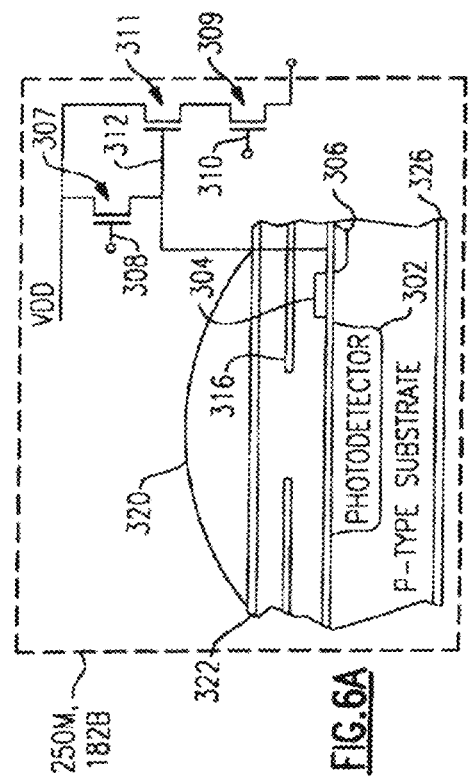
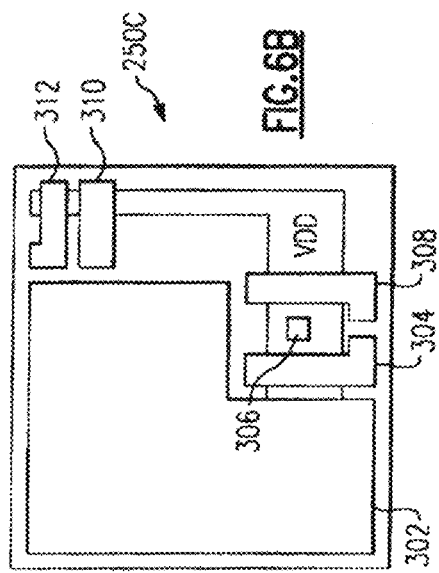
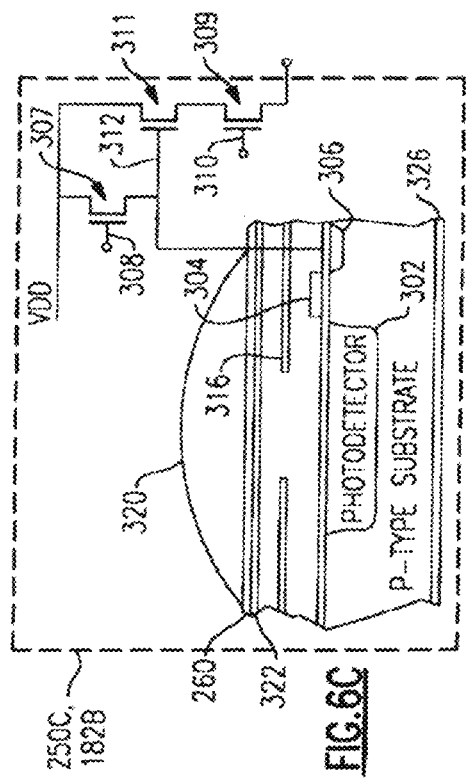
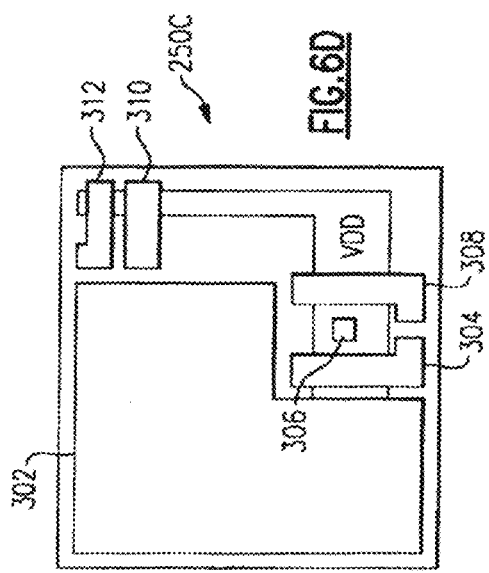

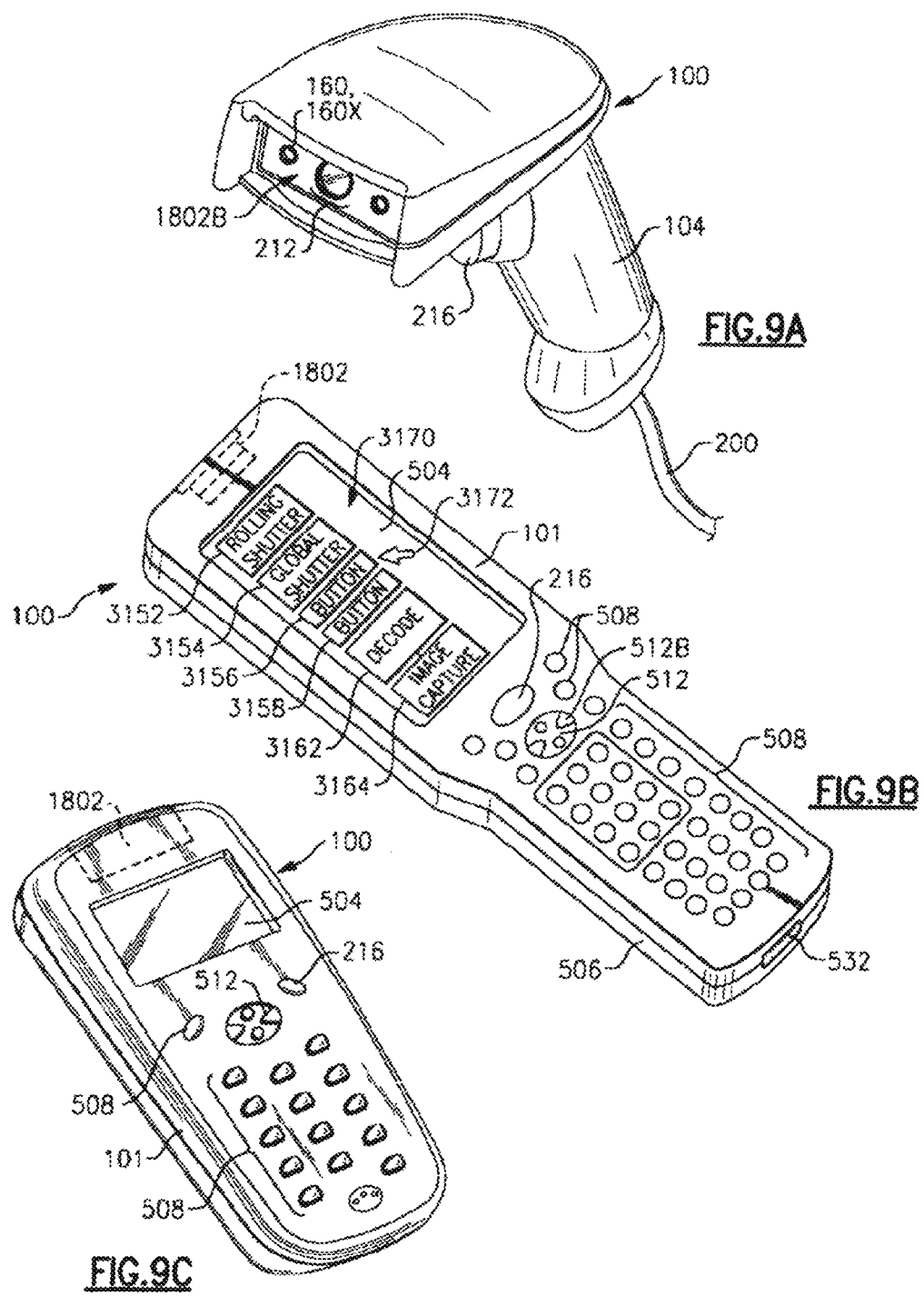

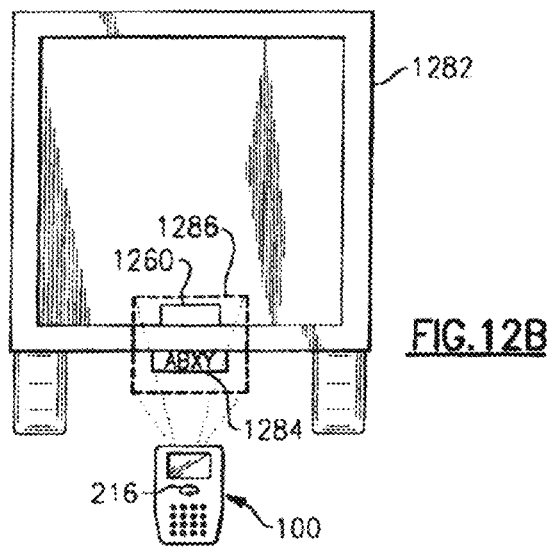
FIG.12B
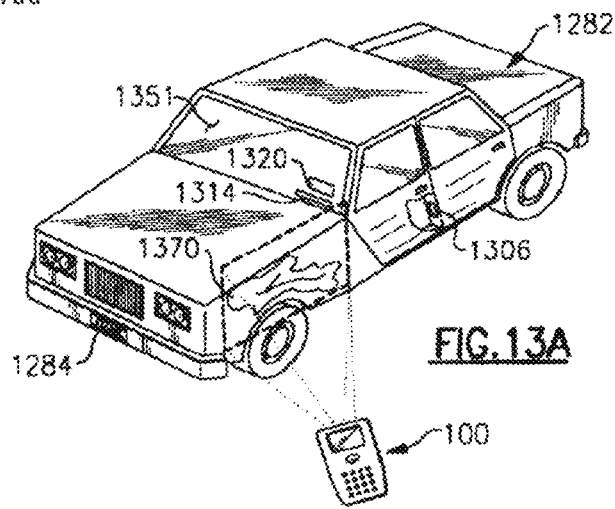
FIG.13A
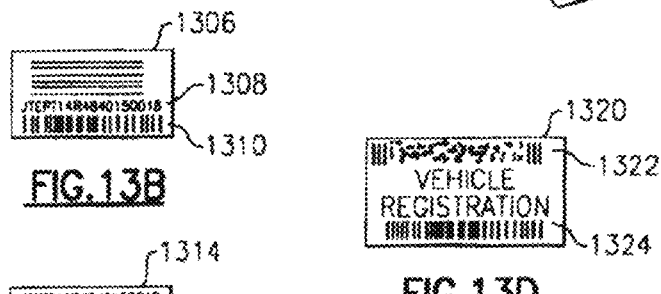
FIG.13B
FIG.13C
FIG.13D

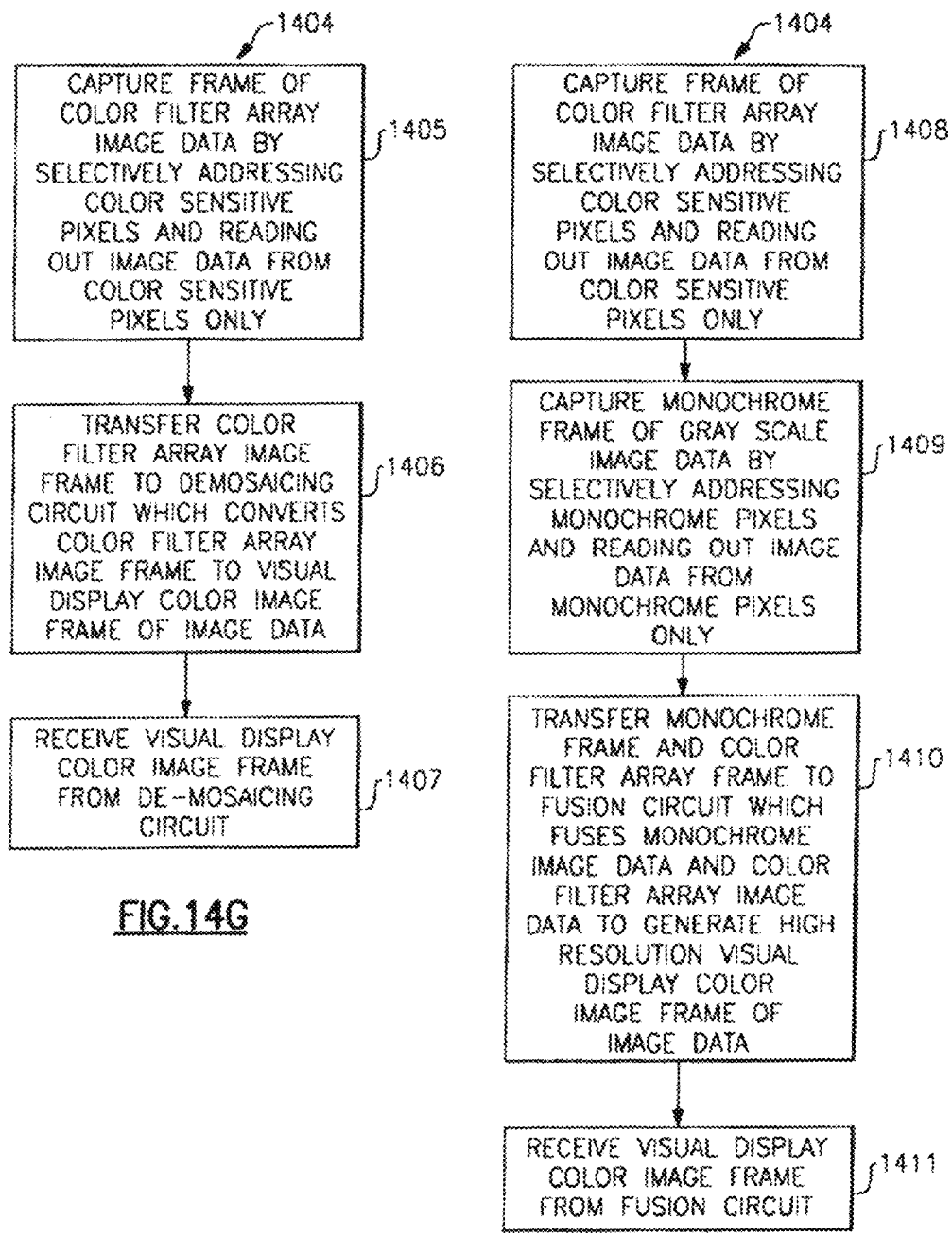

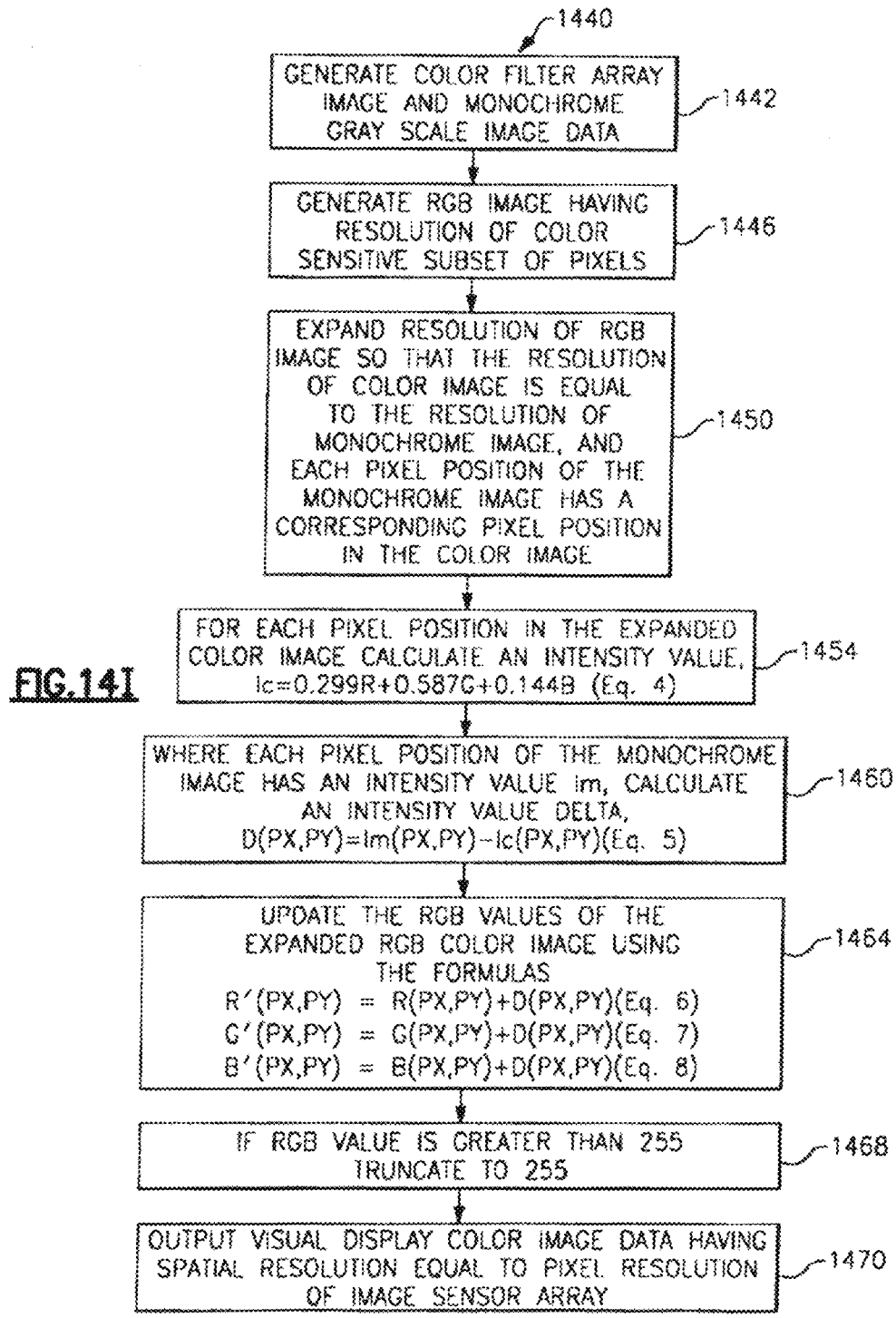

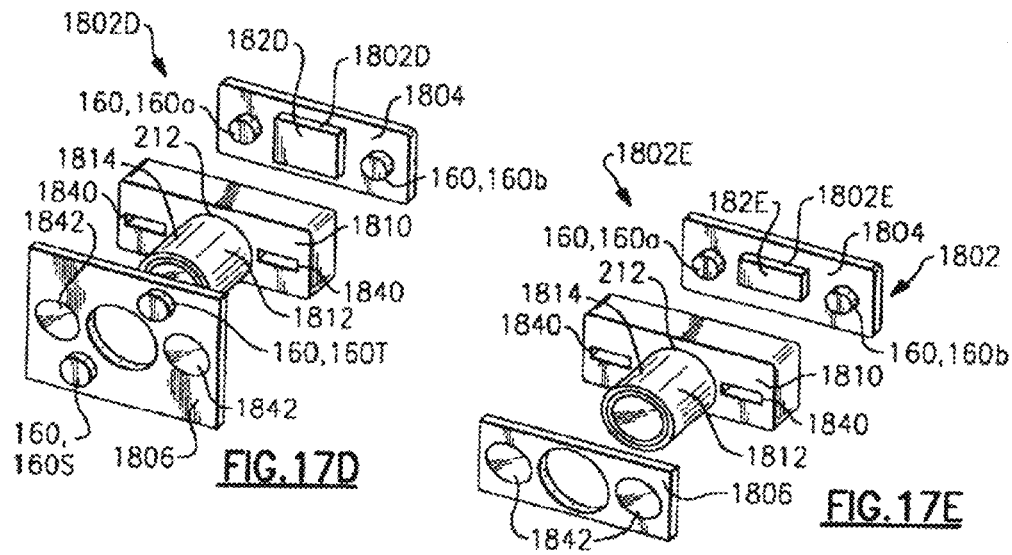
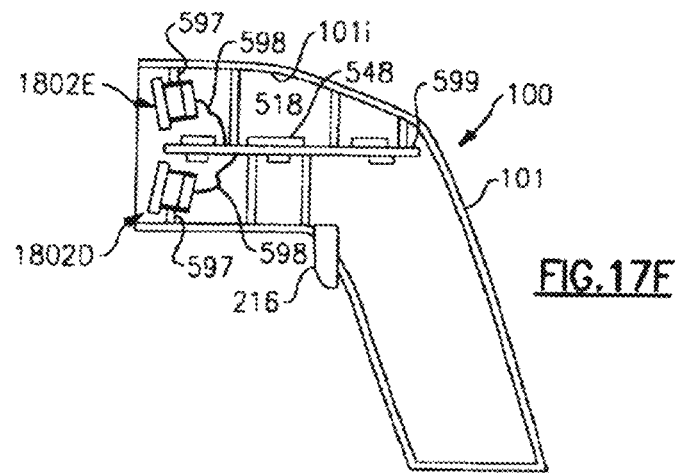
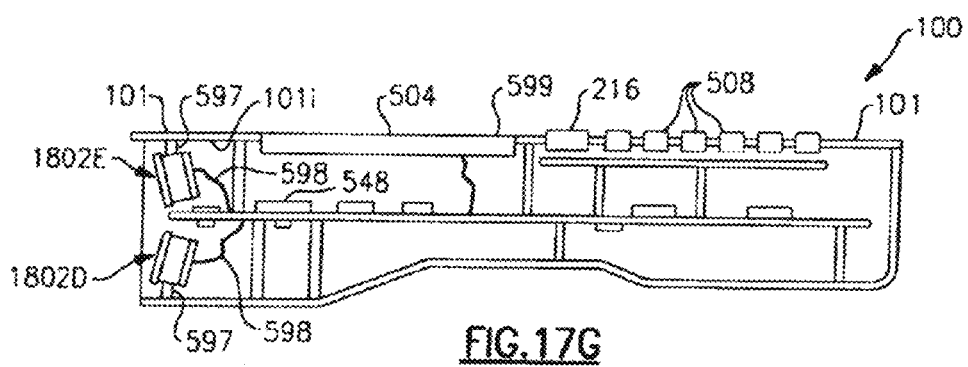

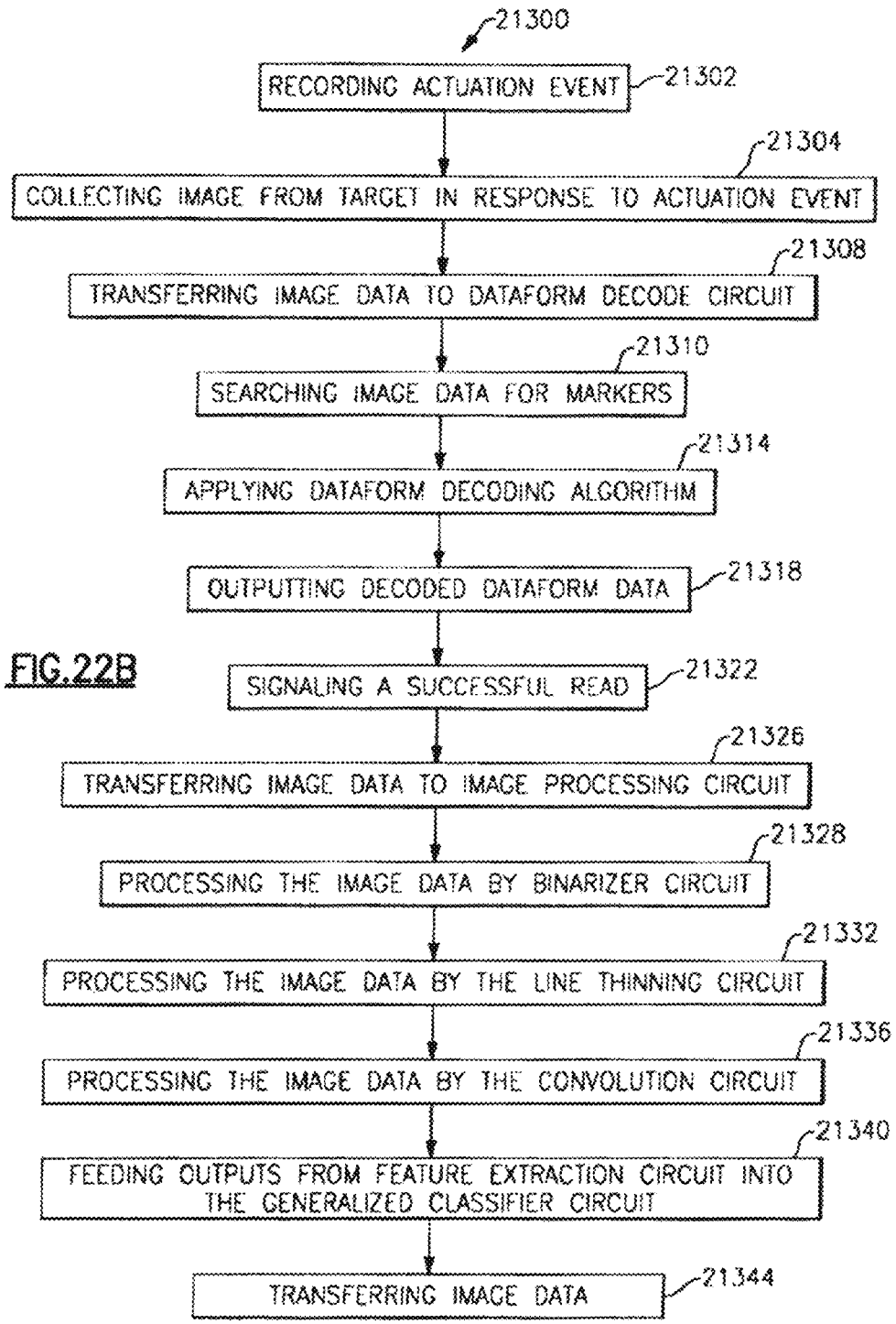

APPARATUS HAVING HYBRID MONOCHROME AND COLOR IMAGE SENSOR ARRAY

CROSS REFERENCE TO RELATED APPLICATIONS

This application is a continuation of U.S. application Ser. No. 17/167,464, filed Feb. 4, 2021, entitled "Apparatus Having Hybrid Monochrome and Color Image Sensor Array", which application is a continuation of U.S. application Ser. No. 16/874,217, filed May 14, 2020, entitled "Apparatus Having Hybrid Monochrome and Color Image Sensor Array" (now U.S. Pat. No. 10,949,634), which application is a continuation of U.S. application Ser. No. 15/980,213, filed May 15, 2018, entitled "Apparatus Having Hybrid Monochrome and Color Image Sensor Array" (now U.S. Pat. No. 10,691,907), which application is a continuation of U.S. patent application Ser. No. 15/244,683, filed Aug. 23, 2016, entitled, "Apparatus Having Hybrid Monochrome and Color Image Sensor Array" (now U.S. Pat. No. 10,002,272), which application is a continuation of U.S. patent application Ser. No. 14/684,609 filed Apr. 13, 2015, entitled, "Apparatus Having Hybrid Monochrome and Color Image Sensor Array" (now U.S. Pat. No. 9,454,686), which application is a continuation of U.S. patent application Ser. No. 14/221,874 filed Mar. 21, 2014 entitled, "Apparatus Having Hybrid Monochrome and Color Image Sensor Array" (now U.S. Pat. No. 9,058,527), which application is a continuation of U.S. patent application Ser. No. 13/493,348 filed Jun. 11, 2012, and entitled "Apparatus Having Hybrid Monochrome and Color Image Sensor Array" (now U.S. Pat. No. 8,720,785), which application is a divisional of U.S. patent application Ser. No. 12/853,090 filed Aug. 9, 2010 entitled, "Optical Reader Having Reduced Specular Reflection Read Failures" (now U.S. Pat. No. 8,196,839), which application is a divisional of U.S. patent application Ser. No. 11/445,930 filed Jun. 2, 2006 entitled, "Optical Reader Having Reduced Specular Reflection Read Failures" (now U.S. Pat. No. 7,770,799), which application claims priority under 35 U.S.C. § 119(e) to U.S. Provisional Patent Application No. 60/687,606, filed Jun. 3, 2005 and titled "Digital Picture Taking Optical Reader Having Hybrid Monochrome And Color Image Sensor Array," to U.S. Provisional Patent Application No. 60/690,268, filed Jun. 14, 2005 and titled "Digital Picture Taking Optical Reader Having Hybrid Monochrome And Color Image Sensor Array," and to U.S. Provisional Patent Application No. 60/692,890 filed Jun. 22, 2005, entitled "Digital Picture Taking Optical Reader Having Hybrid Monochrome And Color Image Sensor Array" and to U.S. Provisional Patent Application No. 60/694,371 filed Jun. 27, 2005 entitled "Digital Picture Taking Optical Reader Having Hybrid Monochrome And Color Image Sensor Array", all of which are incorporated by reference herein in their respective entireties. All of the aforementioned patent applications (e.g., Provisional Patent Application No. 60/694,371, Provisional Patent Application No. 60/692,890, Provisional Patent Application No. 60/690,268 and Provisional Patent Application No. 60/687,606 and their descendants) and publications thereof are herein incorporated by reference in their entirety. The aforementioned U.S. patent application Ser. No. 11/445,930 is also related to U.S. patent application Ser. No. 11/174,447 filed Jun. 30, 2005 entitled, "Digital Picture Taking Optical Reader Having Hybrid Monochrome And Color Image Sensor" (now U.S. Patent Publication No. 2006/0274171) which is also incorporated herein by reference in its entirety.

FIELD OF THE INVENTION

The present invention relates to optical readers in general and specifically, to an optical reader having an image sensor array.

BACKGROUND OF THE PRIOR ART

Designs have been proposed for bar code decoding devices having picture taking functionality.

In U.S. Pat. No. 6,298,176, a picture taking bar code reading device is described that is equipped to output bar code data and associated image data. In one example described in U.S. Pat. No. 6,298,176, output image data is image data representing a handwritten signature. The image data output by the bar code decoding device may be subject to size correction, image orientation adjustment and image distortion correction image processing for correcting distortion resulting from an image being captured at an angle.

In U.S. Publication No. US2002/0171745, a picture taking bar code reading device is described which is in communication with a remote computer. The bar code reading device sends image data and associated bar code data to the remote computer. In one combined bar code/image data transmission scheme described in U.S. Publication No. US2002/0171745, an image data file in .PDF, .TIFF, or .BMP filed format is created at a data collection device which includes an image representation of a decoded bar code message and an image representation of the package including the bar code encoding the decoded message.

In U.S. Pat. No. 6,722,569 a picture taking bar code reading device is described that includes a color image sensor and a classification circuit which classifies image data as being either bi-tonal image data or color image data.

In U.S. Publication No. US2005/0001035 a picture taking bar code reading device is described which executes either a picture taking exposure control algorithm or bar code decoding exposure control algorithm depending on which mode is selected.

While the above references describe significant improvements in the art, there remains a need for improvement in the art of a picture taking optical reader which is capable of picture taking functionality and excellent bar code decoding functionality.

Performance of an optical reader may be hindered where an optical reader is operated to read bar code symbols or other indicia of a substrate having a "shiny" surface. Such substrates can include, e.g., metal, glass, and laminated plastic. Light rays emanating from a reader that are projected on a highly reflective shiny surface of a substrate may be substantially entirely reflected directly onto a reader image sensor array. Artisans skilled in the art of optical readers regard a "specular reflection" read condition to have occurred where a substantial percentage of light rays are reflected from a substrate and directed onto a reader image sensor array. Light rays are said to be reflected at a "specular" angle when light rays are reflected from a substrate at about the angle of incidence. Specular reflection tends to saturate a reader image sensor array to cause decoding failures. There is a need for an optical reader configured so that specular reflection read errors are reduced.

BRIEF DESCRIPTION OF THE DRAWINGS

The objects and features of the invention can be better understood with reference to the drawings described below, and the claims.

FIG. 3b is a top view of the pixel shown in FIG. 3a;

FIG. 5f is a top perspective view of an image sensor integrated circuit chip incorporating an image sensor array according to the invention with an exploded view portion illustrating a pixel pattern of color sensitive "clusters" of pixels which pattern may be distributed throughout the array;

FIGS. 5g-5i are top perspective views of image sensor integrated circuit chips incorporating a linear bar code symbol optimized image sensor array according to the invention with respective exploded view portions illustrating pixel patterns including "zones" of monochrome pixels and "zones" of color sensitive pixels;

FIG. 5j is a top perspective view of an image sensor integrated circuit chip incorporating a linear symbol optimized image sensor array according to the invention;

FIG. 6a is a cutaway exploded side view of a monochrome pixel according to one embodiment of the invention;

FIG. 6b is a top view of the pixel shown in FIG. 6a;

FIG. 6c is a cutaway exploded side view of a color sensitive pixel in one embodiment of the invention;

FIG. 6d is a top view of the pixel shown in FIG. 6c;

FIGS. 8b and 8c are front and side views, respectively, of the imaging module shown in FIG. 8a;

FIG. 8f is a front view of a polarizer plate which may be included as part of an imaging module herein, e.g., the imaging middle shown in FIG. 8a;

FIGS. 9a and 9b are physical form views of various hand held optical readers according to the invention;

FIG. 9c is a perspective view of a hand held mobile telephone (a "cell phone") which may incorporate a hybrid monochrome and color image sensor array according to the invention and which may be configured according to the invention;

FIG. 12b is another application schematic view illustrating an optical reader being used to take a color picture of a delivery vehicle;

FIG. 13a is an application schematic diagram according to the invention illustrating an optical reader according to the invention being used to read bar codes of a vehicle and to take color pictures of a vehicle;

FIG. 13b is a view of a VIN sticker which may be disposed on the vehicle of FIG. 13a;

FIG. 13c is a view of a VIN plate which may be disposed on the vehicle of FIG. 13a;

FIG. 13d is a view of a vehicle registration sticker which may be disposed on the vehicle of FIG. 13a;

FIGS. 14g and 14h are additional flow diagrams illustrating examples of operation of an optical reader according to the invention in a picture taking mode of operation;

FIG. 14i is a flow diagram illustrating operation of a fusion circuit of an optical reader according to the invention which processes monochrome and color image data to produce a high resolution visual display color frame of image data;

FIGS. 16a-16c illustrate various pixelized frames of image data which may be captured by an optical reader according to the invention;

FIGS. 17b and 17c illustrate alternative hardware blocks that can be utilized with the electrical circuit of FIG. 17a;

FIGS. 17d and 17e illustrate imaging modules which may be utilized with the reader of FIG. 17a;

FIGS. 17f and 17g illustrate exemplary optical readers incorporating a pair of imaging modules;

FIG. 22b is a process for practicing principles of the invention including automatically discriminating between different dataform types;

DETAILED DESCRIPTION OF THE INVENTION

Figure 1A:
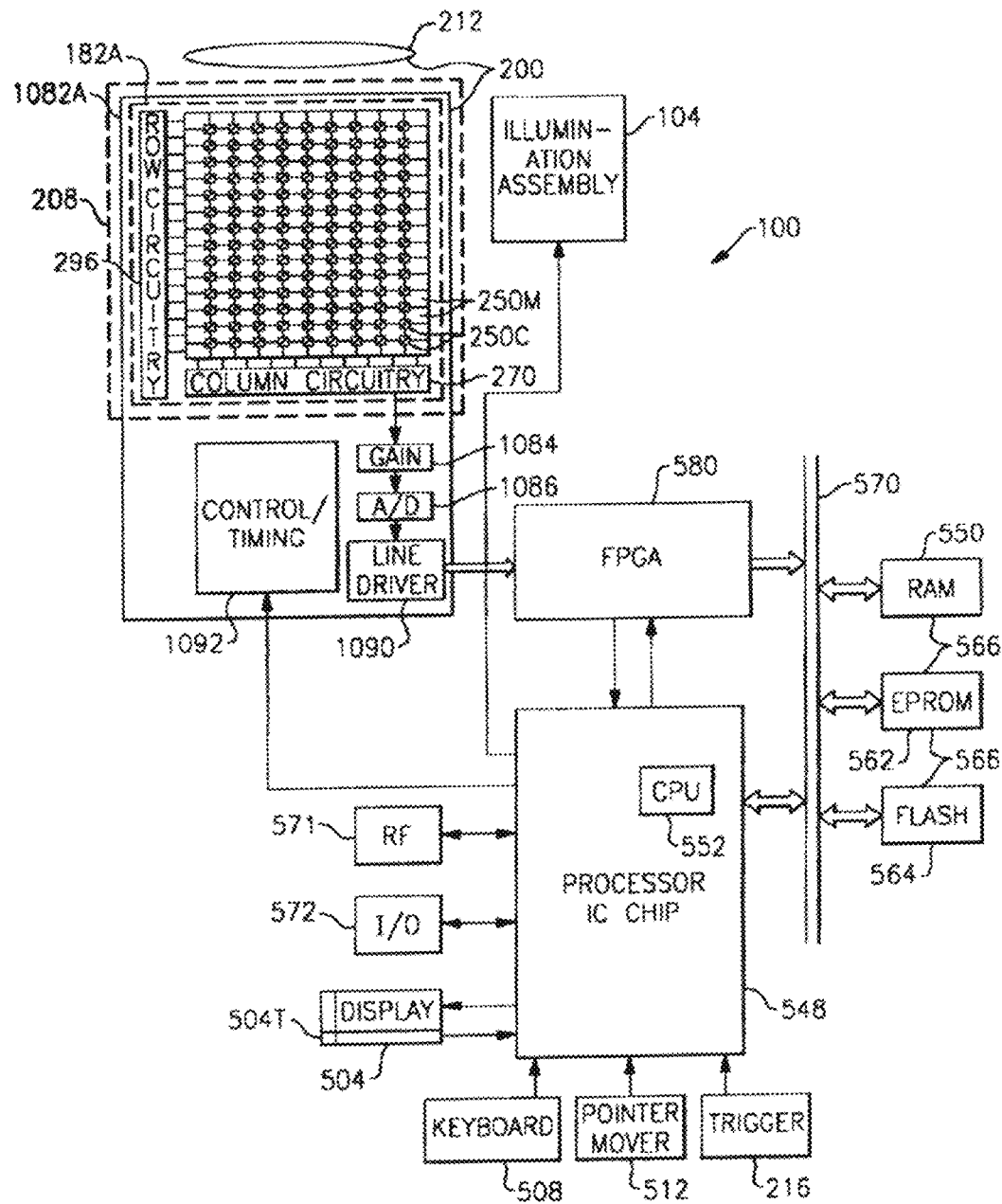
FIG. 1a is an electrical block diagram of a hand held optical reader of the invention including a hybrid monochrome and a color sensing solid state image sensor array.

There is provided in one embodiment an optical reader having an image sensor array. In one embodiment, the image sensor array can include a first subset of pixels and a second subset of pixels. The first subset of pixels can be devoid of light polarizing filter elements, and the second subset of pixels can be light polarizing pixels including light polarizing filter elements. An optical reader can be configured to selectively read out image data from an image sensor array's light polarizing pixels.

An optical reader image sensor array of the invention can include light polarizing pixels, each light polarizing pixel having a light polarizing filter element (light polarizing filter) that significantly attenuates polarized light rays generated from an appropriately polarized light source and reflected at a specular angle; thus, reducing the contribution of specularly reflected light rays to generated image signals from the polarizing pixels. In one embodiment, a first subset of pixels of an optical reader image sensor array are monochrome pixels and a second subset of pixels are light polarizing pixels. For decoding decodable indicia in specular reflection read conditions, image data corresponding to the light polarizing pixels can be selectively transferred to a decode circuit, either by way of selecting reading out image data from the light polarizing pixels, or by selectively extracting image data corresponding to light polarizing pixels from a frame of image data including image data in addition to image data corresponding to light polarizing pixels.

In another embodiment, there is provided a picture taking optical reader having a hybrid monochrome and color (monocolor) solid state image sensor array. The hybrid image sensor array comprises a plurality of pixels including a first subset of pixels and a second subset of pixels, wherein the first subset of pixels are monochrome pixels and the second subset of pixels are color sensitive pixels having wavelength selective color filter elements.

In one embodiment, the monochrome first subset of pixels is formed in a checkerboard pattern, and voids are formed at the corners of pixels of the first subset, such that combinations of voids of adjacent pixels define open areas. Pixels of the color sensitive second subset of pixels are formed at the open areas, and wavelength selective filter elements are formed on pixels of the second subset but not on pixels of the first subset.

In another embodiment, an optical reader solid state image sensor array includes a plurality of pixels formed in a plurality of rows on an IC chip in a checkerboard pattern wherein each pixel has approximately the same dimension. The majority of pixels of the image sensor array are monochrome pixels of the first subset. Color sensitive pixels of the second subset are at spaced apart positions and are uniformly or substantially uniformly distributed throughout the image sensor array. Color sensitive pixels may be distributed in the array in a specific pattern of uniform distribution such as a period of P=2, where every other pixel of every other row of the image sensor array is a color sensitive pixel, or a period of P=4 where, for every fourth row of pixels of the array, every fourth pixel is a color sensitive pixel.

A hybrid monochrome and color sensing solid state image sensor array of the invention may be incorporated in an imaging module which, in addition to having an image sensor array constructed in accordance with the invention includes such elements as an imaging lens, an illumination assembly including a field illumination assembly, an aiming illumination assembly and a support member for supporting the above elements. An imaging module, in turn, may be incorporated into a hand held housing which encapsulates and supports the imaging assembly.

Utilizing complementary metal-oxide-silicon (CMOS) integrated circuit fabrication technologies the image sensor array in one embodiment can be made to have selectively addressable pixels. Where the image sensor array is constructed to have selectively addressable pixels, pixels of the first subset of pixels can be selectively addressed independent of the second subset of pixels so that image data corresponding to the first subset of pixels is selectively read out independent of the second subset of pixels. Image sensor arrays having selective read out capability can be provided utilizing alternative fabrication technologies.

In a further aspect, an optical reader according to the invention includes separate and independently controllable reset control lines for resetting monochrome pixels and color sensitive pixels of the image sensor array. During exposure periods for exposing color sensitive pixels, monochrome pixels may be driven into reset. During exposure periods for exposing monochrome pixels, color sensitive pixels may be driven into reset. Driving pixels not being selectively addressed for image data read out into a reset state reduces cross-talk between pixels of the image sensor array.

By incorporating within a single low cost image sensor array a combination of monochrome pixels and color sensitive pixels, an optical reader according to the invention provides indicia decoding performance approximately equal to the performance of an optical reader having an all monochrome image sensor array, and picture taking performance (i.e., the ability to obtain visual display quality color frames of image data) approximately equal to or superior to that of a digital camera incorporating an all color pixel image sensor array, wherein each pixel of the array includes a wavelength selective filter element.

Figure 1B:
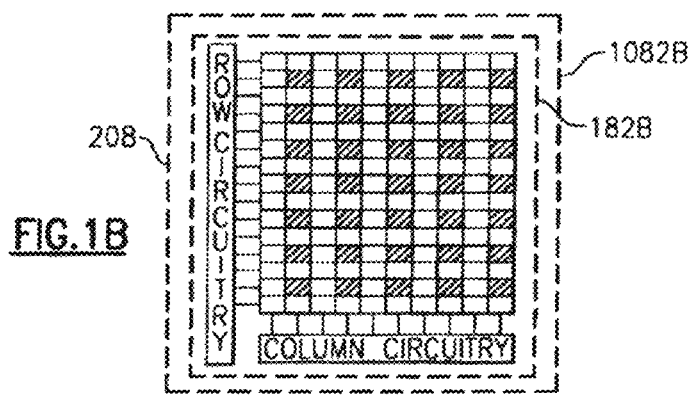
FIG. 1b is a block diagram of an alternative image sensor array which may be incorporated into an optical reader according to the invention.

An electrical block diagram of an optical reader 100 according to the invention is shown in FIG. 1a. Reader 100 includes a solid state image sensor array 182A, incorporated on an image sensor integrated circuit chip 1082A shown in FIG. 1a as a CMOS image sensor integrated circuit (IC) chip. In an important aspect, as will be described herein, image sensor array 182A includes a plurality of pixels and wavelength sensitive color filter elements associated with a color sensitive subset of the pixels, wherein the remaining pixels external to the color sensitive subset of pixels are devoid of associated wavelength selective filter elements. Because image sensor array 182A includes both monochrome pixels and color sensitive pixels, image sensor array 182A may be termed a hybrid monochrome and color image sensor array. Reader 100 further includes a processor IC chip 548 and a control circuit 552. Control circuit 552 in the embodiment of FIG. 1a is shown as being provided by a central processing unit (CPU) of processor IC chip 548. In other embodiments, control circuit 552 may be provided by e.g., a programmable logic function execution device such as a field programmable gate array (FPGA) or an application specific integrated circuit (ASIC). Imaging lens 212 focuses images onto an active surface of image sensor array 182A and together with image sensor array 182A forms an imaging assembly 200. Control circuit 552 executes picture taking and indicia decoding algorithms in accordance with instructions stored in program memory EPROM 562 which together with RAM 560 and Flash memory 564 forms a reader memory 566. Reader memory 566 is in communication with processor IC chip 548 via system bus 570. Main processor IC chip 548 may be a multifunctional IC chip such as an XSCALE PXA25x processor IC chip including central processing unit (CPU) 552. Reader 100 further includes a field programmable gate array (FPGA) 580. Operating under the control of control circuit 552, FPGA 580 receives digital image data from image sensor IC chip 1082A and transfers that image data into RAM 560 so that the image data can be further processed (e.g., by the decoding of a bar code symbol). Processor IC chip 548 can include an integrated frame grabber. For example, processor IC chip 548 can be an XSCALE PXA27X processor IC chip with "Quick Capture Camera Interface" available from INTEL. Where processor IC chip 548 includes an integrated frame grabber, the integrated frame grabber may provide the frame acquisition functionality of FPGA 580. Reader 100 further includes an illumination assembly 104 and a manual trigger 216. Image sensor IC chip 1082A in the embodiment of FIG. 1a includes an on-chip control/timing circuit 1092, an on-chip gain circuit 1084, an on-chip analog-to-digital converter 1086 and an on-chip line driver 1090. An image sensor array which is incorporated into optical reader 100 may take on a variety of forms. In FIG. 1a reader 100 includes first image sensor array 182A. However, as indicated by hardware block 208, the image sensor array 182A may be replaced. For example, in the embodiment of FIG. 1b, reader 100 incorporates image sensor array 182B. In other embodiments, optical reader 100 incorporates more than one image sensor array. Various embodiments of image sensor arrays which may be incorporated into reader 100 are described herein.

Figures 1C, 1D:
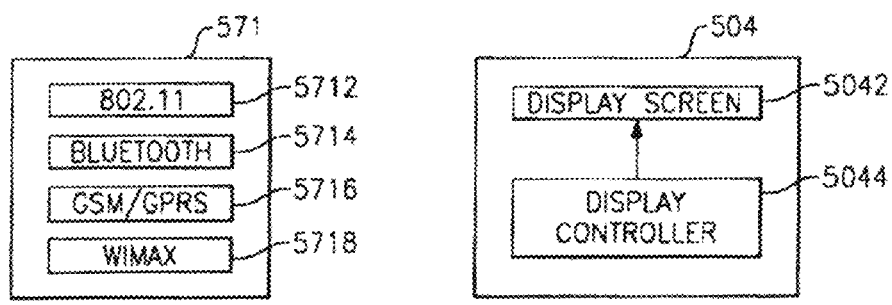
FIG. 1c is a schematic block diagram illustrating an RF communications circuit according to the invention.
FIG. 1d is a schematic block diagram illustrating a display according to the invention.

In a further aspect, reader 100 includes a radio frequency (RF) communication interface 571. Radio frequency communication interface 571 may include one or more radio transceivers. Referring to the schematic diagram of FIG. 1c, radio frequency communication interface 571 may include one or more of an 802.11 radio transceiver 5712, a Bluetooth radio transceiver 5714, a GSM/GPS radio transceiver 5716 or a WIMAX (802.16) radio transceiver 5718. Radio frequency communication interface 571 facilitates wireless communication of data between device 100 and a spaced apart device 150. I/O communication interface 572 includes one or more serial or parallel hard-wired communication interfaces facilitating communication with a spaced apart device 150 as will be described further in connection with FIG. 10. I/O communication interface 572 may include one or more of an Ethernet communication interface, a universal serial bus (USB) interface, or an RS-232 communication interface. Optical reader 100 may further include a keyboard 508 for entering data, a pointer mover 512 for moving a pointer of a graphical user interface (GUI) and a trigger 216 for initiating bar code reading and/or picture taking. Optical reader 100 may also include a display 504, such as a monochrome or color LED display and a touch screen 504T overlaid over display 504. As shown in the schematic block diagram of FIG. 1d, display 504 may include a display screen 5042 coupled to display controller 5044 for displaying color image data. Display controller 5044 receives a visual display color frame of image data from control circuit 552, and reformats that data for display depending on the particular requirements of display screen 5042, including the pixel resolution of display screen 5042. All of the components of FIG. 1a can be encapsulated and supported by a hand held housing 101, e.g., as shown in FIGS. 9a-9c. Additional features and functions of the components of reader 100 shown in FIG. 1a are described herein.

Figure 1E:
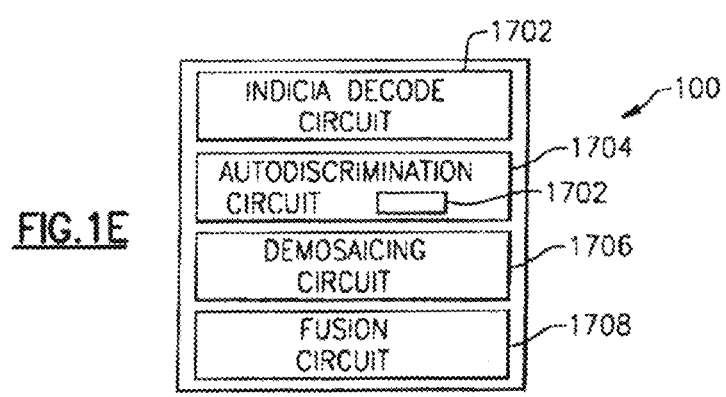
FIG. 1e is a schematic view illustrating incorporation of a decode circuit, a signature autodiscrimination circuit, a demosaicing circuit, and a fusion circuit into an optical reader according to the invention.

Referring to FIG. 1e, optical reader 100 may be regarded as having various processing circuits (modules). Indicia decode circuit 1702 receives image data and decodes decodable indicia therein such as bar code indicia and OCR character data. Optical reader 100 can be configured so that indicia decode module 1702 decodes such bar code symbols UPC/EAN, Code 11, Code 39, Code 128, Codabar, Interleaved 2 of 5, MSI, PDF417, MicroPDF417, Code 16K, Code 49, MaxiCode, Aztec, Aztec Mesa, Data Matrix, Qcode, QR Code, UCC Composite, Snowflake, Vericode, Dataglyphs, RSS, BC 412, Code 93, Codablock, Postnet (US), BPO4 State, Canadian 4 State, Japanese Post, KIX (Dutch Post), Planet Code and the like, and such OCR character forms as OCR A, OCR B, and the like. Autodiscrimination circuit 1704 processes received image data and distinguishes between handwritten character data and decodable indicia. Autodiscrimination circuit 1704 may include indicia decode circuit 1702. Autodiscrimination circuit 1704 and indicia decode circuit 1702 may be physically embodied by a combination of control circuit 552 and memory 566. Specifically, control circuit 552 operating under the control of a program stored in memory 562 may process image data stored in memory 560 to decode decodable indicia therein or to discriminate between handwritten character data and decodable indicia. Further aspects of indicia decode circuit 1702 and autodiscrimination circuit 1704 are described in copending U.S. patent application Ser. No. 10/958,779 entitled, System And Method To Automatically Discriminate Between A Signature And A Barcode, filed Oct. 5, 2004 and U.S. patent application Ser. No. 11/077,975, filed Mar. 11, 2005 entitled, Bar Code Reading Device With Global Electronic Shutter Control, both of which are incorporated herein by reference. As will be described further herein, optical reader 100 may further include a demosaicing circuit 1706, and a fusion circuit 1708. Demosaicing circuit 1706 receives as an input a color filter array image data frame (e.g., a Bayer pattern image) and produces as an output a visual display color frame of image data. Fusion circuit 1708 receives as inputs both monochrome and color image data and produces as an output a visual display color frame of image data having a spatial resolution at or on the order of the pixel resolution of the optical reader's hybrid monochrome and color image sensor array. Like circuit 1702, 1704, circuits 1706 and 1708 may be physically embodied by the combination of control circuit 552 and memory 566. Control circuit 552 as well as circuits 1702, 1704, 1706, and 1708 may be incorporated within hand held housing 101 (e.g., as shown in FIGS. 9a-9c) or else one or more of circuits 552, 1702, 1704, 1706, and 1708 can be incorporated in a housing of a spaced apart device 150 as described in connection with FIG. 10.

Figure 8A:
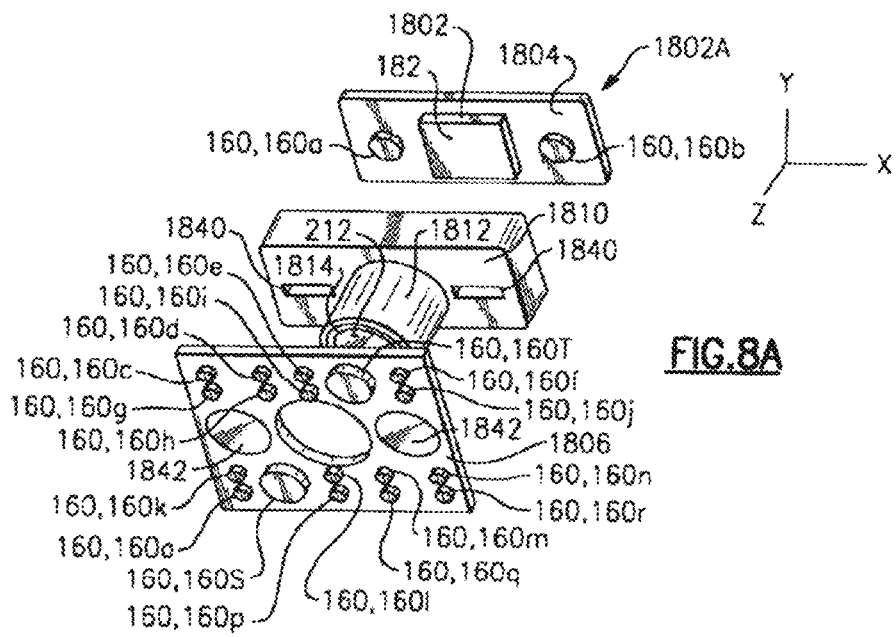
FIG. 8a is an exploded perspective view of an imaging module according to the invention.
Figure 8B:
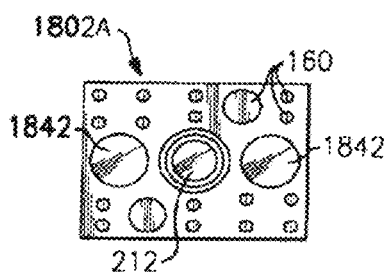
Figure 8C:
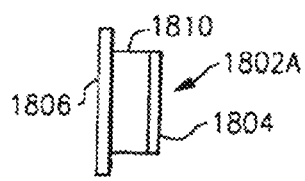
Figure 8E:
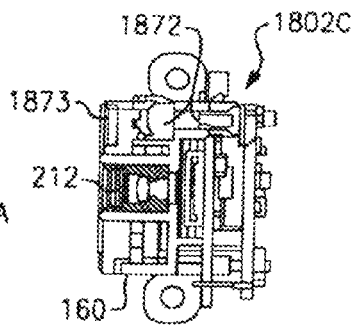
FIG. 8e is a top view of an alternative imaging module incorporating a laser based aiming pattern generating system.
Figure 8D:
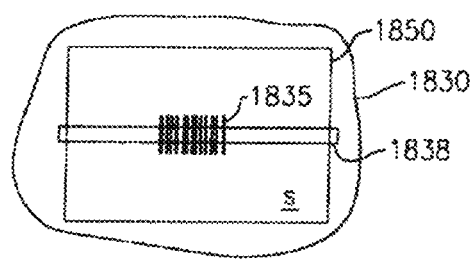
FIG. 8d shows an illumination and aiming pattern which may be projected by an optical reader according to the invention.

A visual display color frame of image data as referred to herein, in one embodiment is an image frame including a set of color indicating data at each of a plurality of pixel positions, wherein each set of color indicating data represents a color at a discrete position of a target 1850 (shown in FIG. 8d). Each set of color indicating data includes three color values, e.g., a color scale value representing red, a color scale value representing blue, and a color scale value representing green. Alternatively, the set of color indicating data for each pixel position may include a cyan value, a magenta value and a value representing yellow.

In one specific example, the set of color indicating data for each pixel position of a visual display color frame of image data output by demosaicing circuit 1706 or fusion circuit 1708 are RGB data sets including 24 bits of information, wherein the first 8 bits represent a red color scale value (red value) for the pixel position, the second 8 bits represent a green color scale value (green value) for the pixel position and the third 8 bits represent a blue color scale value (blue value) for the pixel position.

A major feature of the invention is the construction of the optical reader's image sensor array various embodiments of which are shown and described throughout several views including the views of FIGS. 2a-7d.

A first embodiment of a hybrid monochrome and color sensitive (monocolor) solid state image sensor array is shown and described in FIG. 1a and FIGS. 2a-4b.

Figure 2A:
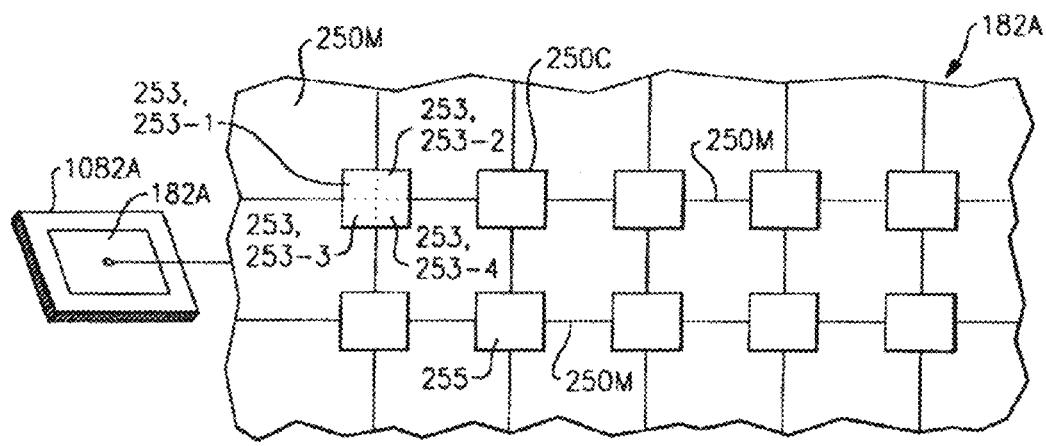
FIG. 2a-2d are various partial exploded top views of an embodiment of a solid state image sensor array according to the invention.

Referring to FIG. 1a and FIGS. 2a-4b, solid state image sensor array 182A includes a monochrome first subset of pixels 250M and a color sensitive second subset of pixels 250C. The first subset of monochrome pixels 250M is formed in a checkerboard pattern and voids 253 as shown in FIG. 2a are formed at the corners of pixels of the first subset, such that combinations of voids, e.g., voids 253-1, 253-2, 253-3, 253-4 of adjacent pixels define open areas, e.g., open area 255, each open area bounded by four pixels of the first subset. With further reference to image sensor array 182A, pixels 250C forming a second subset of pixels 250C are disposed in the open areas 255, and wavelength selective filter elements, e.g., filter element 260C, 260M, as shown in FIG. 2b are formed on pixels of the second subset but not on pixels of the first subset. Monochrome pixels 250M as described herein are devoid of color filter elements (color filters). Pixels of the first monochrome pixel subset are in the shape of twelve sided polygons. The pixels are cross-shaped as seen from the top view that is indicated by FIGS. 2a-2d (the monochrome pixels are square shaped as modified by the presence of voids 253). Pixels of the color sensitive second subset are square as seen from a top view.

Figure 2B:
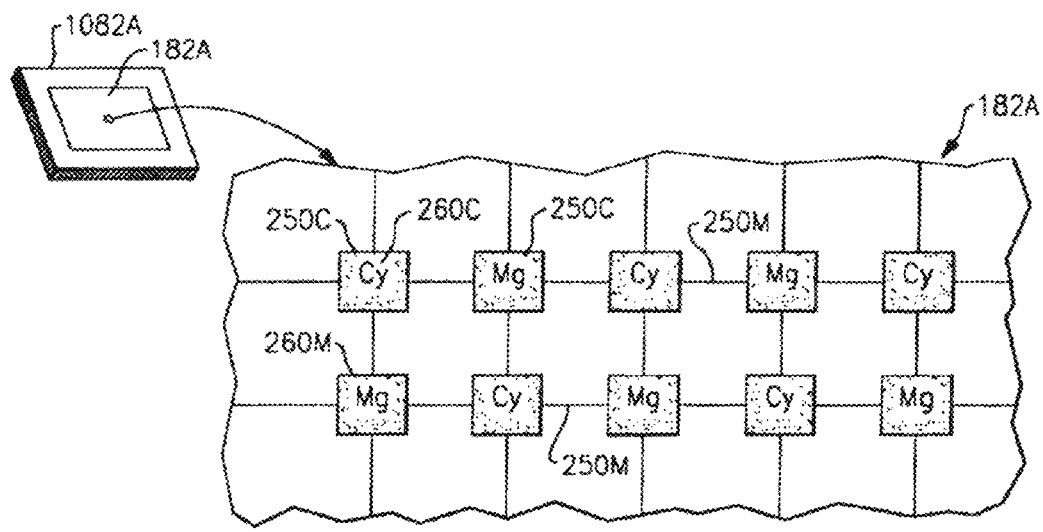
Figure 2C:
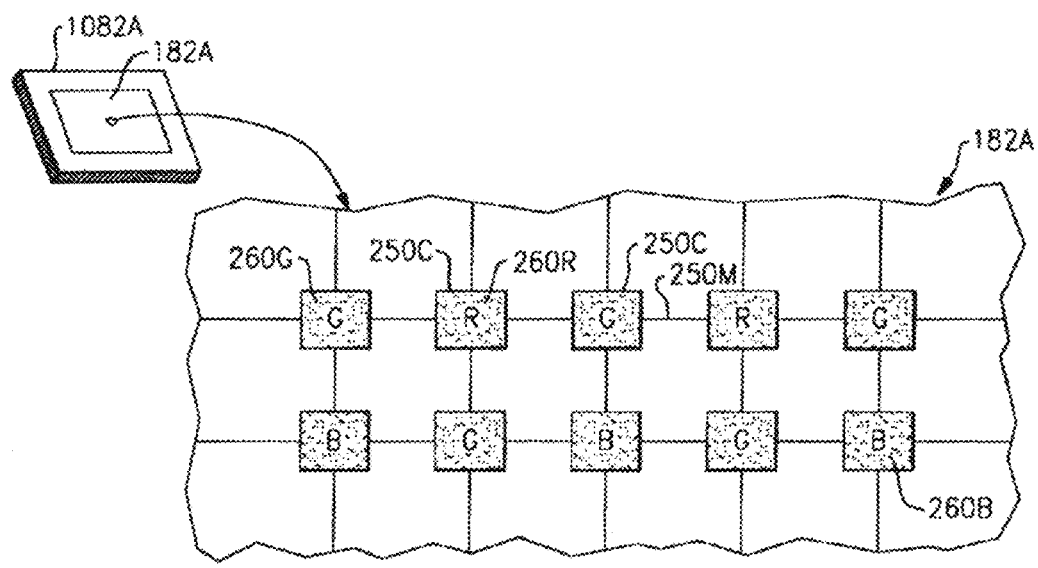
Figure 2D:
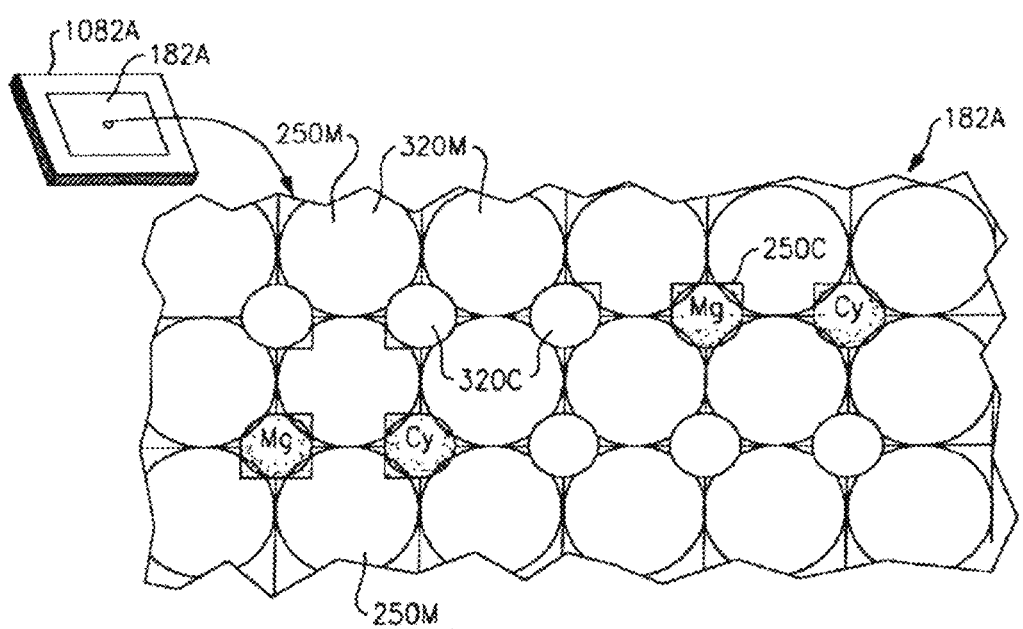

In the version of image sensor array 182A shown in FIG. 2b, color sensitive pixels 250C of image sensor array 182A include either a cyan (Cy) filter element 260C or magenta (Mg) filter element 260M. In the version of FIG. 2c, color sensitive pixels 250C of image sensor array 182A include either a red filter element 260R, a green filter element 260G or a blue color filter element 260B (RGB filters). The color sensitive pixels 250C can be distributed throughout image sensor array 182 according to a Bayer pattern wherein there are N blue pixels, N red pixels and 2N green pixels. Color filter elements of any image sensor array pixel as described herein can be deposited on the major body of color sensitive pixels 250C by way of a depository process. As will be explained herein, visual display color image data can be obtained utilizing either the version of image sensor array 182A shown in FIG. 2b or the version of image sensor array 182A shown in FIG. 2c, or another version of image sensor array 182A such as a version including cyan, magenta and yellow (CMY) color sensitive pixels. Because cyan and magenta filters require only one dye and not two dyes (as in red, green, and blue filters) a version of image sensor array 182A including cyan and magenta filter elements in place of red, green and blue filter elements allows more light to pass through to a photodetector of the pixels and exhibits a higher signal to noise ratio than a version including red, green and blue filters. Nevertheless, an image sensor array having a combination of red, green and blue (RGB) filter elements may be preferred for certain applications. Referring to FIG. 2d, image sensor array 182A may include microlenses 320 for directing of light rays incident on image sensor array 182A. Further aspects of microlenses 320, including monochrome pixels, microlenses 320M, and color sensitive pixel microlenses 320C are described herein.

Figure 3A:
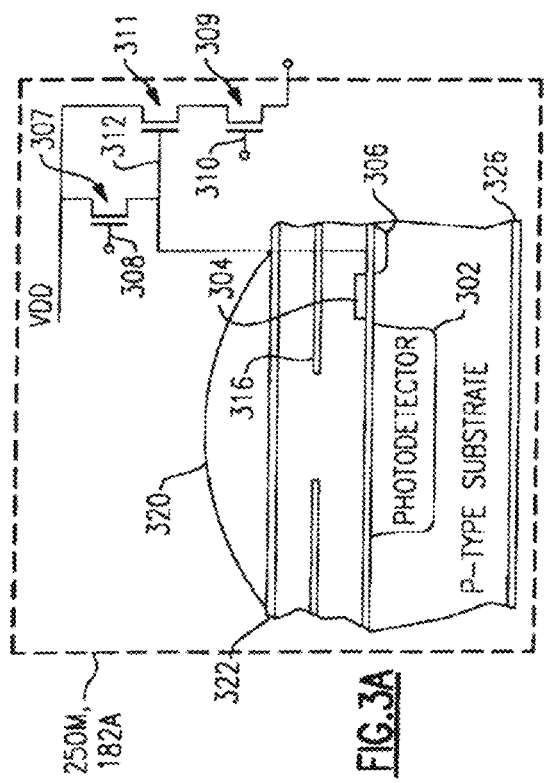
FIG. 3a is a cutaway exploded side view of a monochrome pixel according to one embodiment of the invention.
Figure 3B:
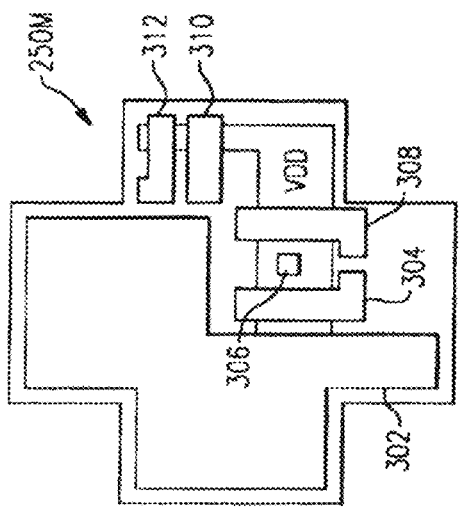

Exploded physical form views of an image sensor pixel array 182A, where array 182A is configured to operate in a global electronic shutter operating mode are shown and described in FIGS. 3a-3d. A monochrome pixel 250M of image sensor array 182A is shown in FIGS. 3a and 3b. Monochrome pixel 250M includes a photodetector 302 which may be of photodiode or photogate construction, a transfer gate 304, a floating diffusion 306, a reset transistor 307 including reset gate 308, a row select transistor 309 including row select gate 310 and a source follower amplifier transistor 311 including amplifier gate 312. An important feature of pixel 250M is opaque optical shield 316. Opaque optical shield 316, typically comprising metal, shields light rays from components of pixel 250M other than photodetector 302. Accordingly, pixels from each of several rows of image sensor array 182A can be simultaneously exposed to light in a global electronic shutter operating mode without the light rays modulating charges stored in floating diffusion 306 or another storage region. Further aspects of image sensor arrays capable of operating in a global electronic shutter operating mode are described in U.S. patent application Ser. No. 11/077,975 incorporated herein by reference. Referring to additional aspects of pixel 250M, pixel 250M includes microlens 320 which may be disposed on light transmissive protective layer 322. Microlens 320 collects light from a larger surface area than photodetector 302 and directs light toward photodetector 302.

A color sensitive pixel 250C of image sensor array 182A is described with reference to FIGS. 3c and 3d. Color sensitive pixel 250C is similar in construction to monochrome pixel 250M. Color sensitive pixel 250C includes a photodetector 302 which may be of photodiode or photogate construction, a transfer gate 304 for transferring charge from photodetector 250C, a floating diffusion 306, a reset transistor 307 including reset gate 308, a row select transistor 309 including row select gate 310 and a source follower transistor amplifier 311 including amplifier gate 312. Color sensitive pixel 250C also includes opaque shield 320 which shields light from light sensitive components of pixel 250C other than photodetector 302. Pixel 250C may also include microlens 320 for increasing the amount of light incident on photodetector 302. In addition to the above elements color sensitive pixel 250C includes a wavelength selective color filter element 260 formed thereon. Wavelength selective color filter element 260 may be disposed intermediate microlens 320 and protective layer 322. In the versions of FIGS. 2a-2d, it is seen that each color sensitive pixel 250C has four adjacent monochrome pixels 250M.

Figure 3C:
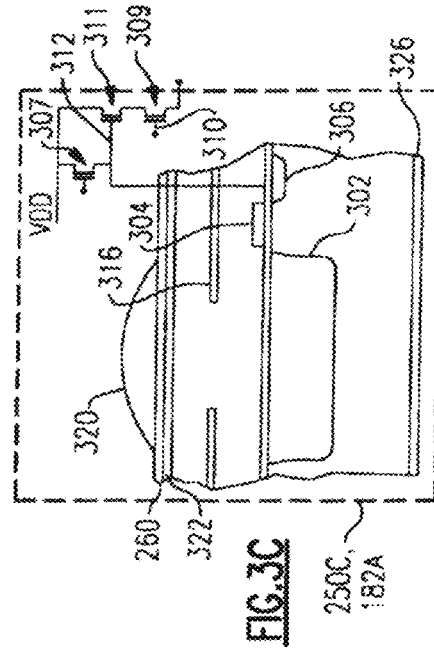
FIG. 3c is a cutaway exploded side view of a color sensitive pixel in one embodiment of the invention.

Microlenses 320 as shown in FIGS. 3a and 3c are also shown in the view of FIG. 2d. Monochrome pixel microlens 320, 320M and color sensitive microlenses 320, 320C may be formed on a microlens array included a plurality of microlenses. With the architecture described wherein color sensitive pixels 250C are disposed in open areas defined by voids of checkerboard pattern of a first monochrome subset of pixels 250M, microlenses 320C of color sensitive pixels 250, 250C have very little (e.g., less than 3.4%) of overlap relative to microlenses 320M.

Figure 3D:
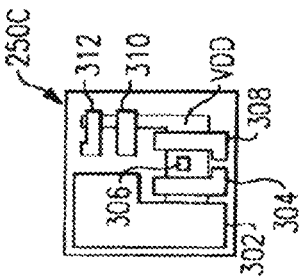
FIG. 3d is a top view of the pixel shown in FIG. 3c.

Color sensitive pixel 250C of image sensor array 182A as best seen by a comparison between FIGS. 3b and 3d and consumes a smaller surface area than pixel 250M. In one version, pixel 250M includes an area, as seen from a top view, of about 12 µm by 12 µm while pixel 250C includes an area, as seen from a top view, of about 6 µm by 6 µm. In another version, pixel 250M includes a top surface area of about 6 µm by 6 µm, while pixel 250C includes a top surface area of about 3 µm or 3 µm. Size reductions of pixel 250M or pixel 250, 250C may be made at low cost by reducing the number of transistors of pixel 250M and/or pixel 250C.

A transistor count of a pixel 250C of image sensor array 182A may readily be reduced by eliminating optically shielded floating diffusion 306 in which charges are stored on a temporary basis to facilitate global electronic shutter operation. Accordingly, in one embodiment, monochrome pixels 250M of image sensor array 182A have more transistors than color sensitive pixels 250C but are capable of being exposed on a global electronic shutter basis, whereas color sensitive pixels 250C have fewer transistors than monochrome pixels 250M but are not capable of being exposed on a global electronic shutter basis. In yet another embodiment with reference to image sensor array 182A having smaller dimensioned color sensitive pixels than monochrome pixels, the relatively larger monochrome pixels 250M have a transistor count sufficient to facilitate global shutter operation, but the relatively smaller color sensitive pixels 250C are passive pixels requiring off-pixel amplification, and comprise a single transistor each. Further aspects of global electronic shutter and rolling shutter operations relative to image sensor arrays which may be incorporated into reader 100 are described herein.

Figure 4A:
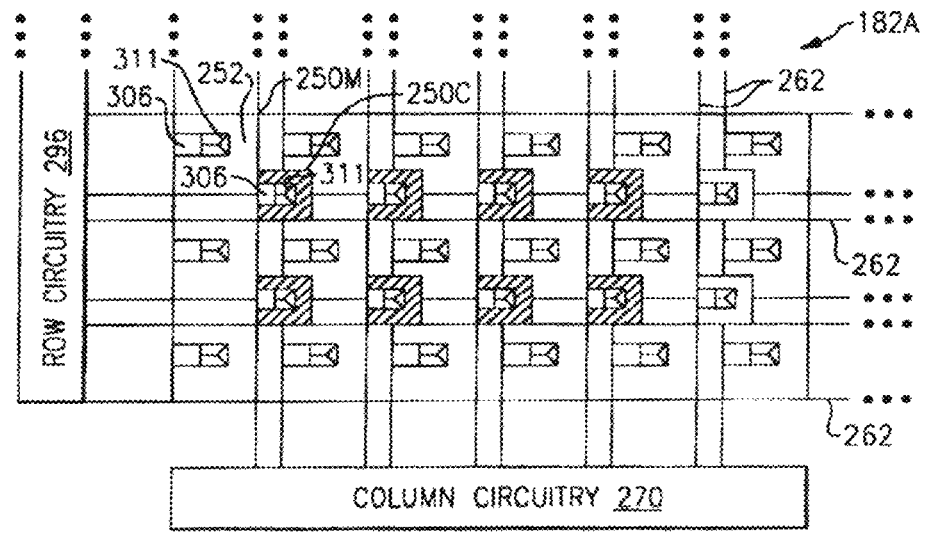
FIG. 4a is an electrical block diagram of an embodiment of an image sensor according to the invention.

Referring to FIG. 4a, a high level electrical block diagram of image sensor array 182A is shown. According to one version, image sensor array 182A is an active pixel image sensor array of complementary metal oxide semiconductor (CMOS) construction such that each pixel 250M, 250C, whether from the monochrome first subset of pixels or the color sensitive second subset of pixels is an active pixel including a pixel amplifier 311 for amplifying signals corresponding to light incident on photosensitive region 252. Each pixel 250M, 250C may also include an optically shielded storage element 306. Image sensor array 182A further includes two-dimensional grid of interconnects 262 which are in electrical communication with respective column circuitry 270 and row circuitry 296. Row circuitry 296 and column circuitry 270 enable such processing and operational tasks as selectively addressing pixels, decoding pixels, amplification of signals, analog-to-digital conversion, applying timing, read out and reset signals and the like.

Figure 4B:
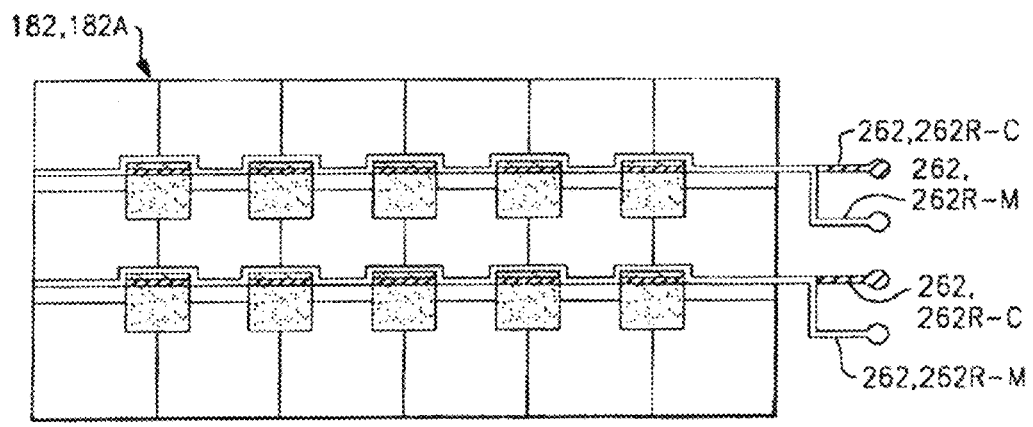
FIG. 4b is an electrical block diagram of an image sensor array of the invention showing incorporation of reset control lines in the image sensor array.

Among the control lines forming interconnect grid 262 of image sensor array 182A are pixel reset control lines. When pixels are reset by application of an appropriate control signal on a reset control line, residual charges which have accumulated on the pixels are connected temporarily to VDD so that built up charges on pixels of the image sensor array drain out of the pixels. In accordance with the invention, image sensor array 182A includes separate reset control lines for monochrome pixels 250M and color pixels 250C. Referring to FIG. 4b, image sensor array 182A may be constructed so that image sensor array 182A has a first set of reset control lines 262R-M for resetting monochrome pixels 250M and a second set of reset control lines 262R-C for resetting color pixels 250C.

In certain operating modes optical reader 100 selectively reads out a windowed frame of image data comprising image data from monochrome pixels 250M. In other operating modes, optical reader 100 selectively reads out a windowed frame of image data comprising image data from color pixels 250C. In accordance with the invention, a reset control timing pulse can be applied to image sensor array 182A during the time that a windowed frame of image data is being captured to reset pixels of image sensor array 182A that are not being selectively addressed for image data read out. As shown by the timing diagram of FIG. 4c, an exposure control timing pulse 354 can be coordinated with a reset control timing pulse 370.

Figure 4C:
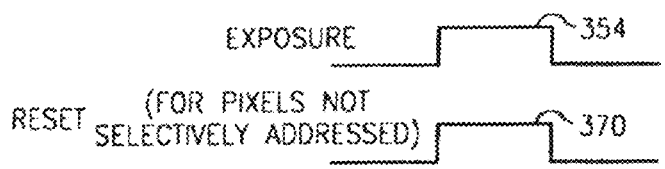
FIG. 4c is a timing diagram illustrating coordinated exposure control timing pulses and reset control timing pulses according to the invention.

With further reference to FIG. 4c, exposure control timing pulse 354 may control exposure of monochrome pixels 250M of image sensor array 182A (or alternatively, color pixels 250C) of image sensor array 182A, while reset control timing pulse 370 drives pixels not being selectively addressed into a reset state. When pixels are reset, charges built up on pixels tend to be drained out of the pixels. Further, it is believed that photons entering pixels driven into reset may be refracted so that fewer photons become incident on neighboring pixels being exposed for image data read out. Accordingly, coordinating the timing of an exposure control pulse 354 for exposing selectively addressed pixels and a reset control timing pulse 370 for resetting pixels not being selectively addressed reduces cross talk between pixels.

Referring again to the view of FIG. 4*b*, image sensor array 182A may be constructed so that the presence of multiple reset control lines 162R-C, 162R-M do not substantially decrease the fill factor of pixels of image sensor array 182A. FIG. 4*b* shows a schematic top view of multiple reset control lines 162R-M, 162R-C incorporated in image sensor array 182, 182A. According to the invention, control lines 162R-M, 162R-C can be incorporated in image sensor array 182A in a layered manner so that for a substantial portion of image sensor array 182A, control lines 164R-M have x, y positions that coincide with x, y positions of control line 164R-C (axes are defined in FIG. 8*a*). Control lines 164R-C in the embodiments of FIG. 4*b* are installed at a different height (a different Z axis position) within image sensor array 182A such that control lines 162R-M and 162R-C, for substantial length of the control lines, have common x, y positions. Installing the multiple control lines to be on top of one another so that the control lines have a common x, y axis position within image sensor array 182A reduces the amount of fill factor degradation which would otherwise result from installation of an additional set of reset control lines within image sensor array 182A.

Figure 5A:
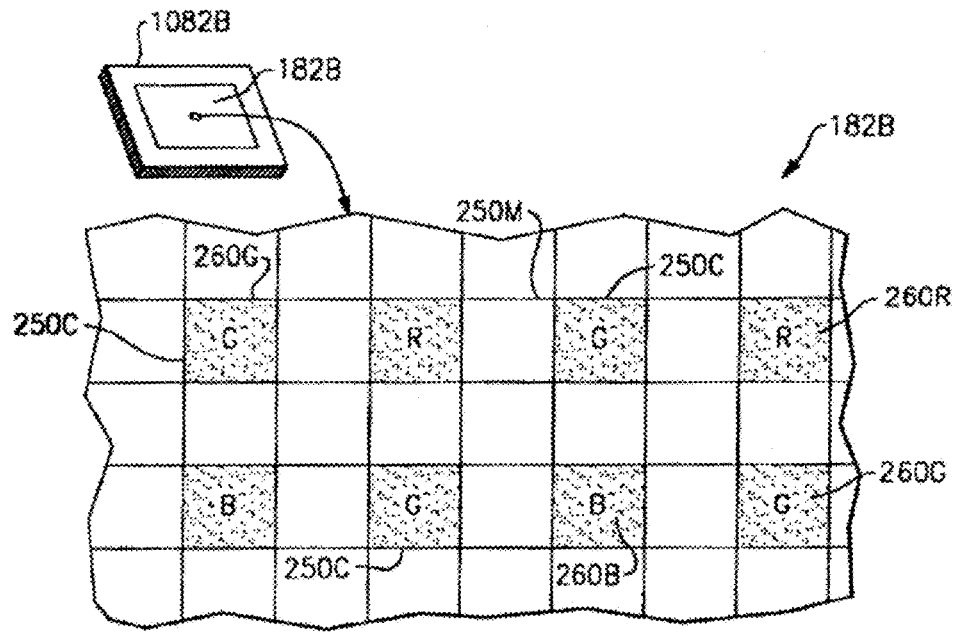
FIGS. 5a-5e are various partial exploded top views of an embodiment of a solid state image sensor array according to the invention.
Figure 5B:
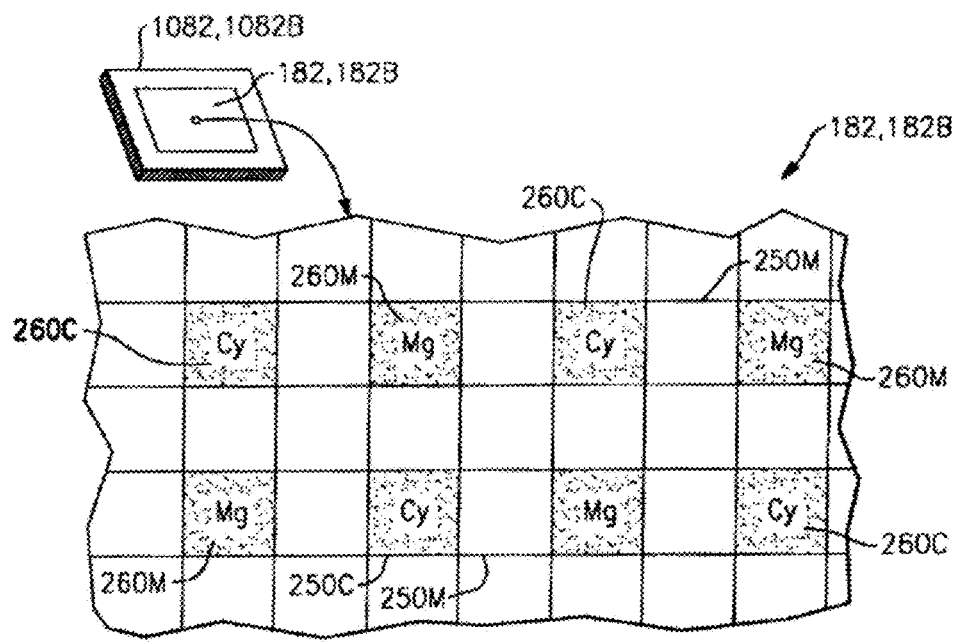
Figure 5C:
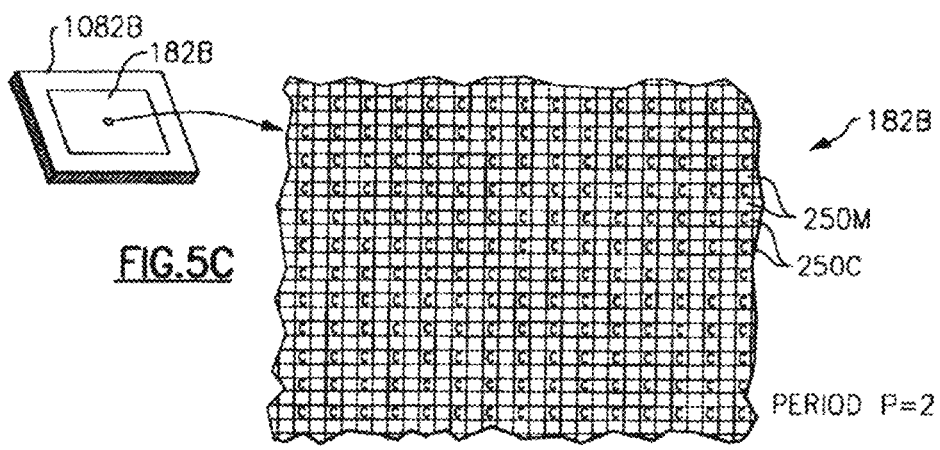

An alternative construction for an image sensor array according to the invention is described with reference to FIGS. 5*a*-7*b*. In the embodiment of FIGS. 5*a*-7*b* image sensor array 182B includes a plurality of square shaped pixels (as seen from a top view) in a checkerboard pattern, each of the pixels having substantially the same dimensions. Each pixel 250M, 250C of image sensor array 182B may be constructed to have approximately the same top surface dimensions as seen from the top views of FIGS. 5*a*-5*i* and approximately the same side view cross-sectional dimensions as seen from the cross-sectional views of FIGS. 6*a*-6*d*. Image sensor array 182B is similar to the construction of a standard off-the-shelf monochrome image sensor array except that select ones of the pixels of the image sensor array have an associated wavelength selective color filter element. Solid state image sensor array 182B includes a plurality of pixels formed in a plurality of rows. In the version of FIGS. 5*a*-5*e*, a monochrome first subset of pixels 250M comprise the majority of pixels of the array. Wavelength selective color filter elements 260 are included in the second subset of color sensitive pixels 250C. The color sensitive second subset of pixels 250C comprises pixels at spaced apart pixel positions uniformly distributed or substantially uniformly distributed throughout the plurality of pixels forming the image sensor array 182B. In the embodiment of FIGS. 5*a* and 5*b*, every other pixel in every other row of pixels (e.g., pixel row 2, 4, 6 . . . ) has an associated wavelength selective color filter element. In one example of the invention, image sensor array 182B can be provided by including an appropriately designed color filter array on an image sensor array of an MT9M111 Digital Clarity SOC 1.3 megapixel CMOS image sensor IC chip of the type available from Micron, Inc., an MT9V022 image sensor IC chip also available from Micron, Inc. or a VV6600 1.3 megapixel CMOS image sensor IC chip of the type available from STMicroelectronics. Other image sensor IC chips which can be utilized to provide image sensor array 182B include MT9M413 image sensor IC chip available from Micron, Inc., a KAC-0311 image sensor IC chip manufactured by Kodak, Inc. and a KAI-0340 image sensor IC chip also manufactured by Kodak, Inc. Operational aspects of the referenced KAI-0340 image sensor IC chip are described further herein. Various manufacturer product description materials respecting certain of the above image sensor IC chips are appended to Provisional Patent Application No. [not yet assigned] filed Jun. 22, 2005 (Express Mail Label No. EV554216715US) and Provisional Patent Application No. [not yet assigned] filed Jun. 27, 2005 (Express Mail Label No. EV554216661US) which are incorporated herein by reference. The above commercially sold image sensor IC chips can be utilized (with additions or replacements of filter elements as are necessary) to provide any one of image sensor arrays 182B, 182C, 182D, 182F, 182G, 182H described herein.

The above referenced MT9V022 and MT9M413 image sensor IC chips manufactured by Micron, Inc., and KAC-0311 image sensor IC chip by Kodak, Inc. are CMOS image sensor IC chips that may be operated in a global electronic shutter mode such that all rows of pixels subject to image data read out have common exposure periods; that is, all rows of pixels subject to image data read out for reading out a frame of image data (i.e., full frame or "windowed frame") have a common exposure start time and a common exposure stop time. For global electronic shutter operation, an exposure control timing pulse, as will be described herein is applied to the image sensor array. Exposure of each row of pixels subject to image data read out begins at the leading edge of the exposure control timing pulse and ends at the falling edge of the exposure control timing pulse. In its technical literature, Micron, Inc. uses the trademark TRUESNAP with reference to a global electronic shutter operating mode.

Referring to FIG. 5*b*, wavelength selective color filter elements (filters) formed on color sensitive pixels 250, 250C may be a combination of cyan filter elements 260C and magenta color filter elements 260M. As shown in FIG. 5*a*, wavelength sensitive filters of color sensitive pixels 250C may also be a combination of red filter elements 260R, green filter elements 260G and blue filter elements 260B. Because cyan and magenta filters require only one dye and not two dyes (as in red green and blue filters), the version of FIG. 5*b* allows more light to pass through to a photodetector (e.g., photodetector 302 as shown in FIG. 6*c*) and exhibits a higher signal to noise ratio than the embodiment of FIG. 5*b*. Nevertheless, the version of FIG. 5*a* may be preferred for certain applications.

In the embodiment of FIGS. 5*a*-7*d*, hybrid monochrome and color image sensor 182B can be made by including an appropriately designed color filter array on a commonly available, off-the-shelf image sensor array in a standardly known checkerboard pattern, each pixel of the array having substantially the same dimensions. A larger portion of image sensor array 182B is shown in FIG. 5*c*, where pixels designated by the letter "c" are color sensitive pixels 250C and pixels not designated by the letter "c" are monochrome pixels 250M. In the example of FIG. 5*c*, color sensitive pixels are formed on array 182B with a period of P=2, meaning the every other pixel of every other row of pixels is a color sensitive pixel 250C. In the version of FIG. 5*d*, color sensitive pixels are formed on array 182B with a period of P=3, meaning that every third pixel of every third row is a color sensitive pixel 250C. In the version of FIG. 5*e*, color sensitive pixels, c, are formed with a period of P=4, meaning that every fourth pixel from every fourth row of pixels is a color sensitive pixel 250C. In the versions of FIGS. 5*a*-5*e*, each color sensitive pixel 250C has eight adjacent monochrome pixels 250M (two side adjacent, one top adjacent, one bottom adjacent and four corner adjacent).

Additional views of image sensor array 182B including a subset of monochrome pixels 250M and a subset of color sensitive pixels 250C, wherein each pixel of the image sensor array has substantially equal dimensions are shown and described in connection with FIGS. 5f-5j.

Referring to the version of FIG. 5f, image sensor array 182B includes the first subset of monochrome pixels 250M and a second subset of color sensitive pixels 250C. The color sensitive pixels 250C of image sensor array 182B in the version of FIG. 5f are formed in clusters such as cluster 257R, cluster 257G and cluster 257B.

Each cluster 257 in the version of FIG. 5f includes a plurality of pixels in successive horizontally adjacent pixel positions, such that each pixel of the cluster is horizontally adjacent to at least one other color sensitive pixel. Color sensitive clusters of pixels are distributed uniformly or substantially uniformly throughout image sensor array 182B. Clusters may be formed in accordance with the standardized color filter pattern such as an RGB Bayer pattern or a cyan-magenta-yellow (CMY) pattern. Each cluster may have a plurality of pixels with each pixel of every individual cluster having a filter element of the same wavelength rating. In the specific version shown in FIG. 5f, clusters are distributed throughout image sensor array 182B in a pattern that is accordance with the pattern of Bayer color filter array.

Cluster 257G includes three horizontally adjacent green pixels. Cluster 257R includes three horizontally adjacent red pixels. Cluster 257B includes three horizontally adjacent blue pixels. As will be described further in connection with FIG. 7c, the version of image sensor array 182B including a distribution of color sensitive pixels in horizontally arranged clusters as shown in FIG. 5f is particularly useful where it is desired to include in image sensor array 182B separate and independently controllable reset control lines 262R-M and 262R-C for separately and independently resetting monochrome pixels of image sensor array 182B and color sensitive pixels of image sensory array 182B without increasing the thickness of image sensor array 182B.

Referring now to the versions of image sensor array 182B shown in FIG. 5g-5j, image sensor array 182B having a subset of monochrome pixels in a subset of color sensitive pixels may be configured to include "zones" of monochrome pixels and "zones" of color sensitive pixels. A "zone" of pixels herein is a collection of positionally related pixels at a specified area of an image sensor array each having a color filter element or alternatively, each being without a color element. Examples of zones described herein comprise all pixels of one row of pixels or all pixels of each of several consecutive rows of pixels. In the version of FIG. 5g, image sensor array 182B includes two color sensitive zones of pixels 2500C and a single monochrome zone of pixels 2500M. Each zone of pixels comprises a plurality of horizontally, vertically or diagonally adjacent pixels. The plurality of pixels of a monochrome zone of pixels, e.g., zone 2500M are all devoid of a color sensitive filter element. The plurality of adjacent pixels in a color sensitive zone of pixels, e.g., zone 2500C, all include a color sensitive filter element.

Referring to the version of FIG. 5g, monochrome zone of pixels 2500M is interposed between a pair of color sensitive zones of pixels 2500C. Monochrome zone of pixels 2500M in the version of FIG. 5g comprises a single row of pixels of image sensor array 182B at or approximately the center of image sensor array 182B. The first color sensitive zone of pixels of an image sensor array 182B includes all pixels from the row of pixels of zone 2500M up to the top row of image sensor array 182B. The second color sensitive zone of pixels 2500C in the version of FIG. 5g includes all pixels from all rows from the center row monochrome zone of pixels 2500M down to the bottom row of pixels of image sensor array 182B. The color filter elements of color sensitive pixels 250C of image sensor array 182B may be formed in a standard color filter pattern, e.g., an RGM Bayer color filter pattern or a CMY pattern.

Figure 5D:
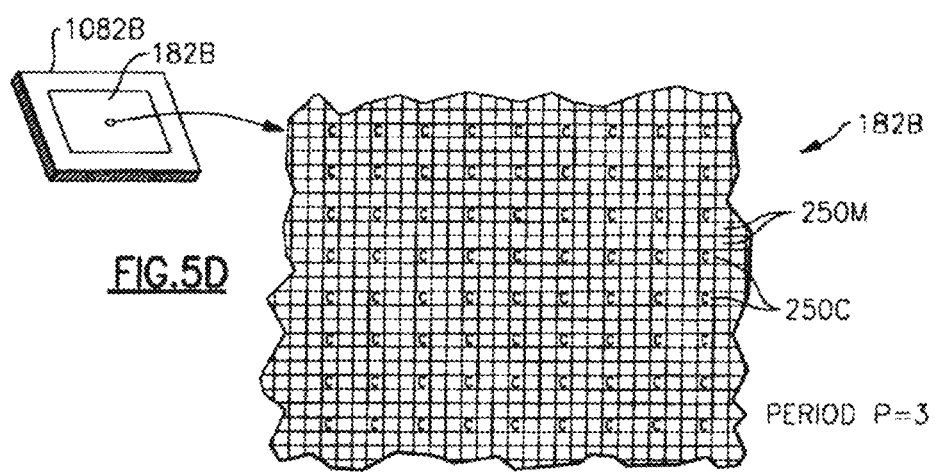
Figure 5E:
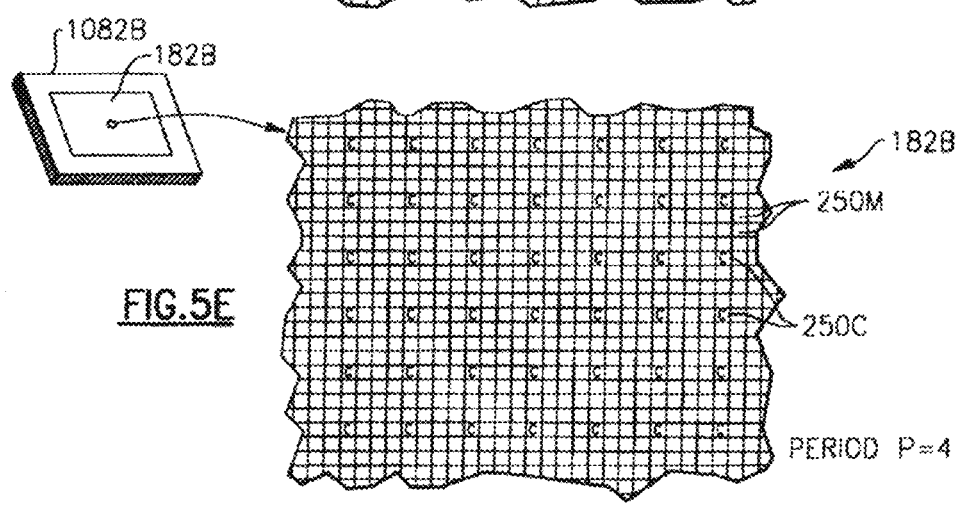
Figure 5H:
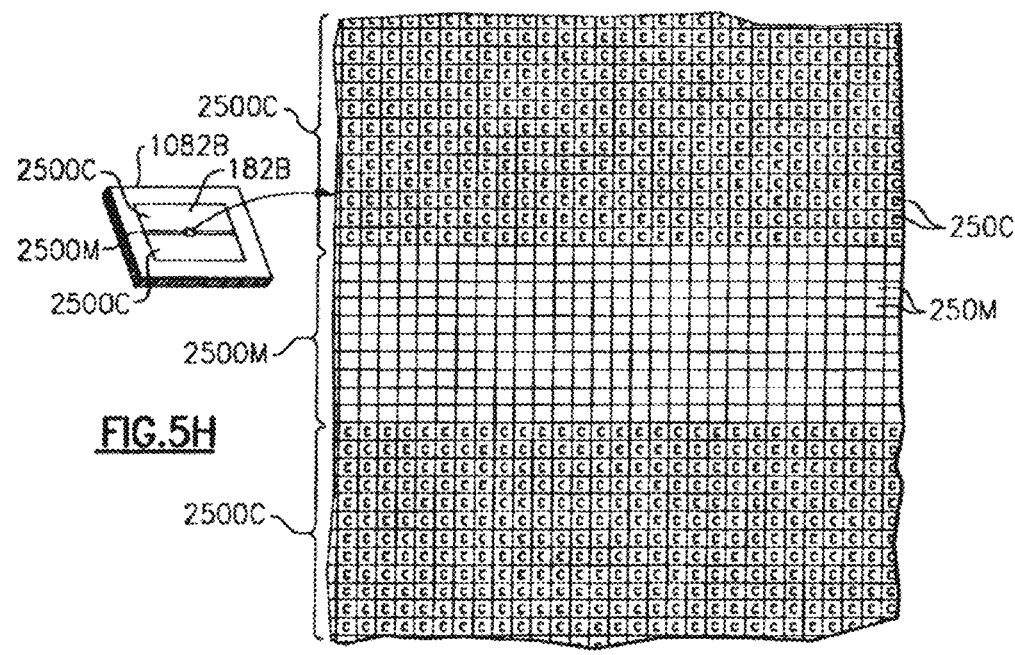

Referring to FIG. 5h, another version of image sensor array 182B is shown and described. The version of FIG. 5h is similar to the version of FIG. 5g except that the monochrome zone of pixels 2500M is expanded to include ten consecutive rows of pixels at the center or approximately the center of image sensor array 182B.

Figure 5I:
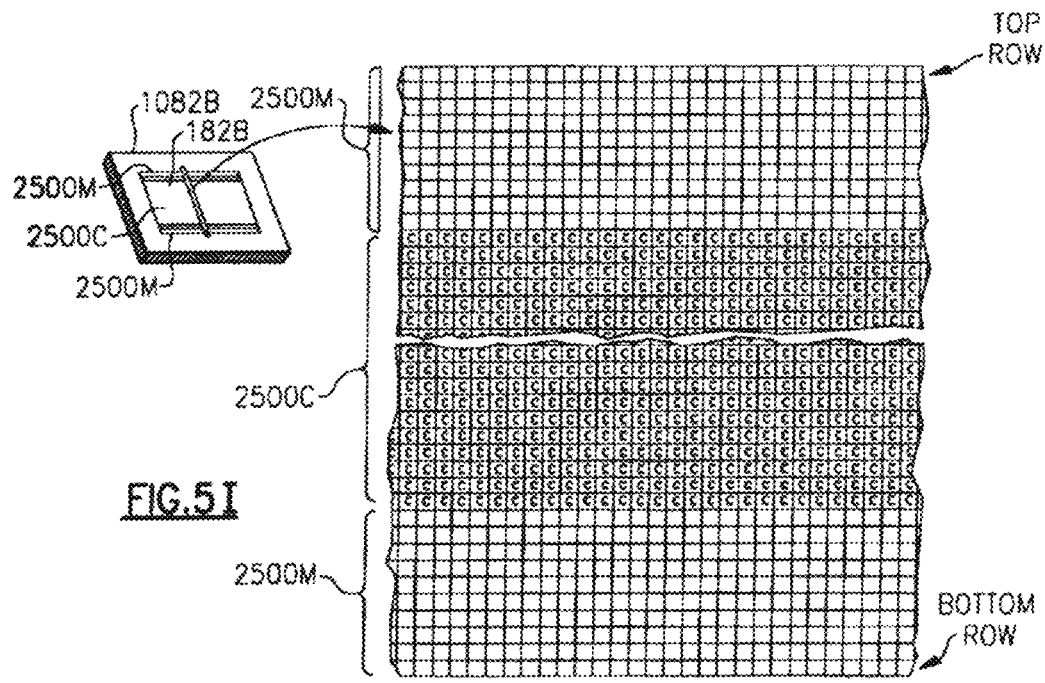

In the version of image sensor array 182B as shown in FIG. 5i, a single color sensitive zone of pixels 2500C is interposed between two relatively small width monochrome zones of pixels 2500M formed at the top and bottom of image sensor array 182B respectively. In the version of image sensor array 182B shown in FIG. 5a, the first monochrome zone of pixels 2500M comprises the first ten rows of pixels of image sensor array 182B and a second monochrome zone of pixels 2500M includes pixels of the bottom ten rows of image sensor array 182B. Color sensitive zone of pixels 2500C in the version of FIG. 5i includes all pixels of the array excluding the first ten and the last ten rows of pixels of image sensor array 182B. In the versions of FIG. 5h and FIG. 5i, the pixels of the color sensitive zones 2500C shown may include color filter elements in accordance with the pattern of a standardized color filter array, e.g., an RGB Bayer pattern or a CMY pattern.

The version of image sensor array 182B shown in FIG. 5j is similar in construction to the version of FIG. 5g except that the version of FIG. 5j includes additional monochrome zones of pixels 2500M. In the version of FIG. 5j image sensor array 182B includes a pair of diagonal zones of monochrome pixels 2500M-D extending through a center (actual or approximate) of image sensor array 182B and a vertically extending zone of monochrome pixels 2500M-V extending through a center of image sensor array 182B. The linear zones of monochrome pixels 2500M shown in the version of FIG. 5j may include a minor dimension equal to one pixel width or more than one pixel width. For example, the vertically extending monochrome zone of pixels 2500M of FIG. 5j may include pixel positions of one column of pixels or of a plurality of columns of pixels. Likewise, the diagonally extending linear monochrome zones of pixels 2500M of FIG. 5g may include pixel positions of a single diagonal row of pixels or alternatively, of a plurality of diagonal rows of pixels.

It will be seen that the versions of image sensor array 182B shown in FIGS. 5g-5j are particularly well suited for use in picture taking optical readers which in bar code decoding applications are expected to decode linear bar code symbols. The image sensor arrays of FIGS. 5g-5j may be referred to as linear symbol optimized image sensor arrays. As will be described in further detail herein, image data corresponding to monochrome zones of pixels 2500M in the versions of FIGS. 5g-5j can be selectively addressed and read out independently of image data from rows from color sensitive zones 2500C of pixels. In bar code decoding applications, control circuit 552 may selectively address pixels of monochrome zones 2500M and read out image data from monochrome zones of pixels 2500M as shown in FIGS. 5g-5i and transfer such image data to indicia decode circuit 1702 for decoding of a linear bar code symbol. For picture taking applications, control circuit 552 may selectively address pixels of a color sensitive zone or zones of pixels 2500C and selectively read out image data from color sensitive zone or zones 2500C and process such color image data into a visual display color frame of image data. The processing as will be explained further herein may include such steps as executing a demosaicing routine to convert color filter pattern image data into a visual display format and interpolation of color pixel values corresponding to the missing pixel positions at the pixel positions occupied by a monochrome zone or zones 2500M of pixels.

In FIGS. 6a-6d, exploded physical form view of pixels of image sensor array 182, 182B are shown. A monochrome pixel 250M of image sensor array 182B is shown in FIGS. 6a and 6b. Pixel 250M includes a photodetector 302 which may be of photodiode or photogate construction, a transfer gate 304, a floating diffusion 306, a reset transistor 307 including reset gate 308, a row select transistor 309 including row select gate 310 and a source follower amplifier transistor 311 including amplifier gate 312. An important feature of pixel 250M is opaque optical shield 316. Opaque optical shield 316, typically comprising metal, shields light rays from components of pixel 250M other than photodetector 302. Accordingly, pixels from each of several rows of image sensor array 182A can be simultaneously exposed to light in a global electronic shutter operating mode without the light rays modulating charges stored in floating diffusion 306 or another storage region. Further aspects of image sensor arrays capable of operating in a global electronic shutter operating mode are described in U.S. patent application Ser. No. 11/077,975 incorporated herein by reference. Referring to additional aspects of pixel 250M, pixel 250M includes microlens 320 which may be disposed on light transmissive protective layer 322. Microlens 320 collects light from a larger surface area than photodetector 302 and directs light toward photodetector 302.

A color sensitive pixel 250C of image sensor array 182B is described with reference to FIGS. 6c and 6d. Color sensitive pixel 250C is similar in construction to monochrome pixel 250M. Color sensitive pixel 250C includes a photodetector 302 which may be of photodiode or photogate construction, a transfer gate 304 for transferring charge from photodetector 250C, a floating diffusion 306, a reset transistor 307 including reset gate 308, a row select transistor 309 including row select gate 310 and a source follower transistor amplifier 311 including amplifier gate 312. Color sensitive pixel 250C also includes opaque shield 320 which shields light from light sensitive components of pixel 250C other than photodetector 302. Pixel 250C may also include microlens 320 for increasing the amount of light incident on photodetector 302. In addition to the above elements, color sensitive pixel 250C includes a wavelength selective color filter element 260 formed thereon. Wavelength selective color filter element 260 may be disposed intermediate microlens 320 and protective layer 322.

Figure 7A:
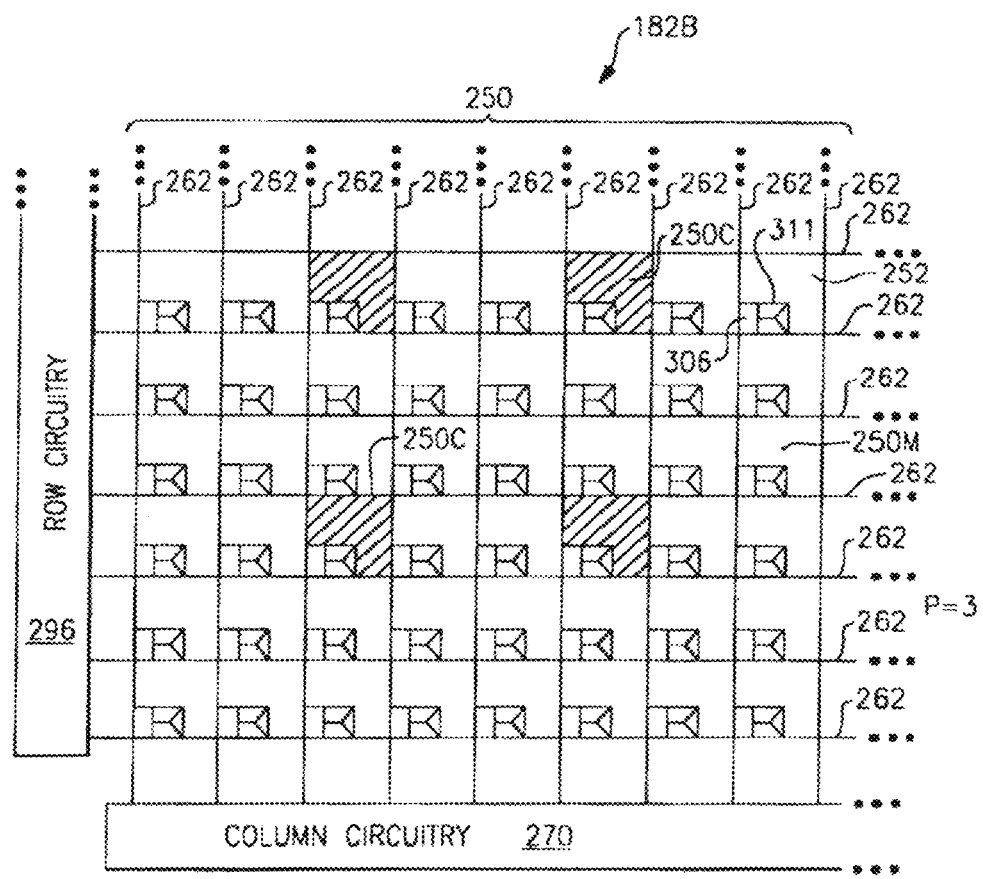
FIG. 7a is an electrical block diagram of an embodiment of an image sensor according to the invention.

A high level electrical block diagram of image sensor array 182B is shown in FIG. 7a. Image sensor array 182B may be of CMOS construction and may be an active pixel image sensor array such that each pixel 250 of image sensor array 182B includes a pixel amplifier 311. Each pixel 250 of image sensor array may further have a photosensitive region 252 and an optically shielded storage element 306. Image sensor array 182B further includes a two-dimensional grid of interconnects 262 which are in electrical communication with respective column circuitry 270 and row circuitry 296. Row circuitry 296 and column circuitry 270 enable such processing and operational tasks as selectively addressing pixels, decoding pixels, amplification of signals, analog-to-digital conversion, and applying timing, read out and reset signals.

Figure 7B:
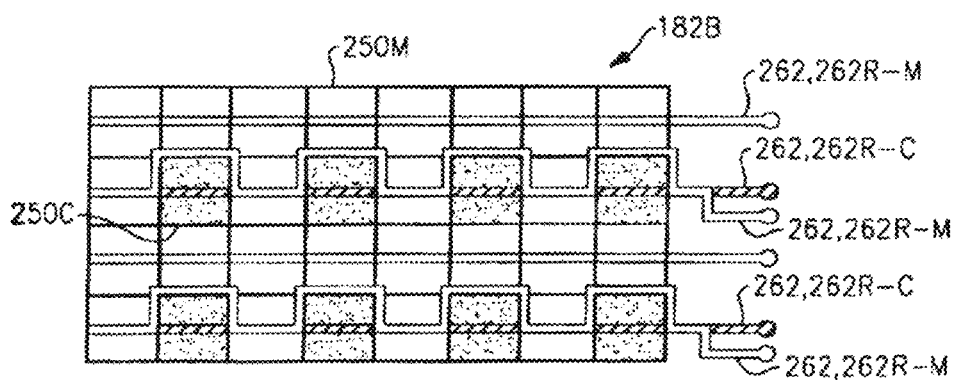
FIG. 7b is an electrical block diagram of an image sensor array of the invention showing incorporation of reset control lines in the image sensor array.

Reset control lines of interconnect grid 262 are shown in FIG. 7b. Image sensor array 182B may have multiple sets of reset control lines so that monochrome pixels 250M of image sensor array 182B can be reset independently of color sensitive pixels 250C of image sensor array 182B as described previously in connection with the description of image sensor array 182B. According to the invention, control lines 262R-M, 262R-C can be incorporated in image sensor array 182B in a layered manner so that for a substantial portion of image sensor array 182B, control lines 262R-M have x, y positions that coincide with x, y positions of control line 262R-C (axes are defined in FIG. 8a). Control lines 262R-C in the embodiment of FIGS. 7b are installed at a different height (a different Z axis position) within image sensor array 182B relative to control lines 262R-C such that control lines 262R-M and 262R-C, for substantial length of the control lines, have common x, y positions. Installing the multiple control lines to be on top of one another so that the control lines have a common x, y axis position within image sensor array 182B reduces the amount of fill factor degradation which would otherwise result from installation of an additional set of reset control lines within image sensor array 182B.

Figure 7C:
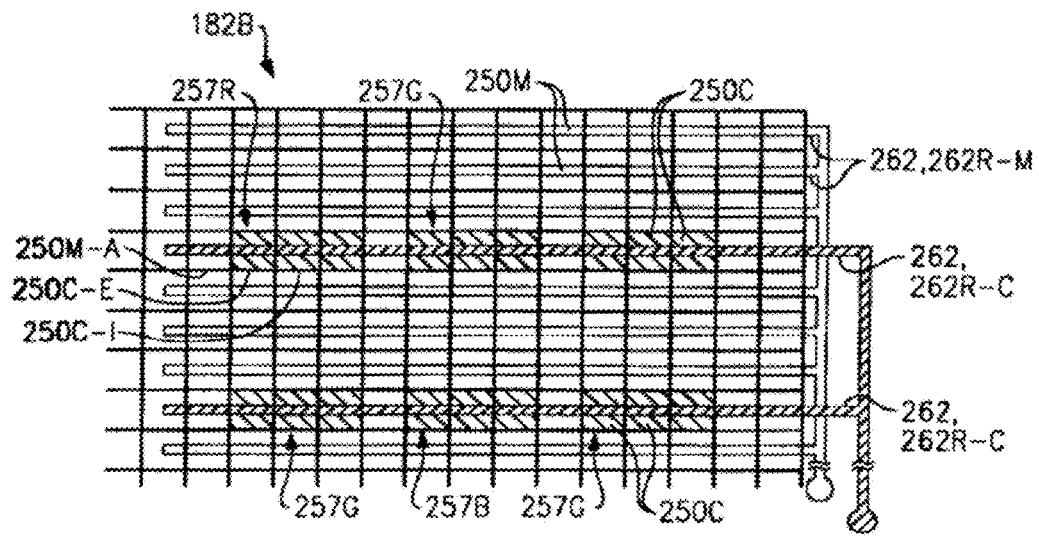
FIGS. 7c and 7d are schematic top views illustrating alternative configurations for a reset control system including separate sets of reset control lines for resetting a first subset of rows of pixels independent of resetting second subset of rows of pixels of an image sensor array according to the invention.
Figure 7D:
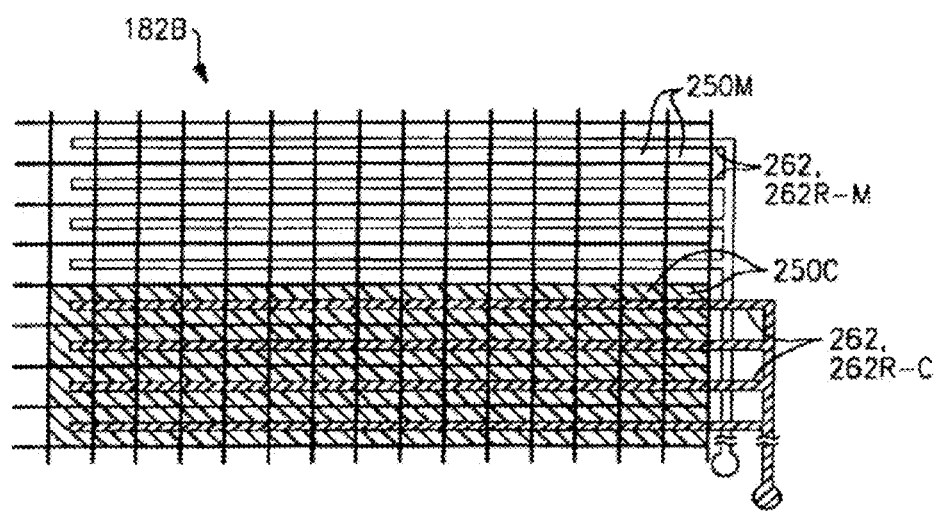

Referring to FIGS. 7c and 7d, image sensor array 182B may be configured to include separate and independent reset control lines for separately and independently resetting monochrome pixels 250M and color sensitive pixels 250C without increasing the overall thickness of image sensor array 182B. While disposing reset control lines on top of one another as described in connection with FIGS. 4b and 7b provides significant advantages; the image sensor array is made thicker with such arrangement which adds to manufacturing costs. Referring to FIG. 7c, a version of image sensor array 182B is illustrated having a first set of reset control lines 262, 262R-M for resetting monochrome pixels 250M and a second set of reset control lines 262, 262R-C for resetting color sensitive pixels 250C of image sensor array 182B. The reset control line configuration of FIG. 7c may be utilized with the color sensitive pixel distribution shown in FIG. 5f to provide an image sensor array 182B having separate and independently controllable reset control lines for separately resetting monochrome pixels 250M and color sensitive pixels 250C and which exhibits a thickness equal to a thickness of a commonly available off-the-shelf image sensor array. In the version of image sensor array 182B shown in FIG. 7c, the reset control lines of monochrome pixel rows are electrically connected together and the reset control lines of rows of pixels including color sensitive pixels are electrically connected together. The commonly connected reset control lines of the monochrome pixel rows are designated with the reference numeral 262, 262R-M, while the commonly reset control lines of the rows including color sensitive pixels are designated with the reference numeral 262, 262R-C. In the version of FIG. 5f and FIG. 7c, every fourth row of pixels of image sensor array 182B includes clusters of color sensitive pixels 257R, 257G, 257B. As shown in FIG. 7c, with reset control lines 262, 262R-C of rows including color sensitive pixels 250C electrically connected together, all rows of image sensor array 182B including color sensitive pixels 250C may be driven into reset by application of a reset control signal on common reset control line 262, 262R-C. Likewise, all rows of pixels including only monochrome pixels 250M (the monochrome row of pixels) can be driven into reset by applying a reset control signal on common monochrome pixel reset control line 262, 262R-M. With further reference to the version of image sensor array 182B shown in FIG. 7c, monochrome pixels 250M of image sensor array 182B may be driven into reset when pixels 250C are exposed for image data read out of color image data.

It is noted that with the configuration of FIG. 7c, adjacent monochrome pixels 250M-A adjacent to an end pixel, e.g., pixel 250C-E of a color sensitive pixel cluster, e.g., cluster 257R are not driven into reset during exposure periods of color sensitive pixels 250C. However, according to the invention in one example, image data corresponding only to a center pixel 250C-I of each color sensitive horizontally arranged cluster (and not the end pixels 250C-E) may be selectively addressed during read out of color image data. The presence of each lateral color filter element at the end pixels 250C-E, which are not addressed for image data read out, reduces the effect of cross talk attributable to photons entering image sensor array 182B at an angle through end pixels 250C, 250C-E.

Another configuration for providing separately and independently resetting monochrome pixels 250M and color sensitive pixels 250C of image sensor array 182B is shown and described with reference to FIG. 7d. In the version of FIG. 7d, image sensor array 182B includes a plurality of rows of pixels including all monochrome pixels 250M followed by a plurality of rows of pixels that include color sensitive pixels 250C only. The monochrome rows of pixels 250M form a first subset of pixels and the color sensitive pixels 250C form a second subset of pixels. The reset control lines for resetting the first subset of pixels can be made separate and independent of the reset control lines for controlling the second subset of pixels by electrically connecting the reset control lines of the first subset of pixels together and then separately electrically connecting together the reset control lines of the second subset of pixels. The common control lines of the first subset of monochrome pixels 250M in the version of FIG. 7d are designated with reference numeral 262, 262R-M while the common control lines of the second subset of color sensitive pixels 250C in the version of FIG. 7d are designated with the reference numeral 262, 262R-C. It will be seen that the configuration of FIG. 7d facilitating separate and independent control of monochrome pixels 250M and color sensitive pixels 250C can be utilized with the line art symbol optimized versions of image sensor array 182B shown and described in FIGS. 5g-5i having "zones" of monochrome or alternatively color sensitive pixels 250C that extend entire rows of image sensor array 182B.

Referring to FIG. 7d, color sensitive pixels 250C may be driven to reset during exposure periods for monochrome pixels 250M by application of a common reset control signal on reset control line 262, 262R-M during exposure of color sensitive pixels 250C for read out of color image data. Similarly color sensitive pixels 250C may be driven into reset by application of a reset control signal on common reset control line 262, 262R-C during exposure periods of monochrome pixels 250M for read out of image data from monochrome pixels 250M.

Features respecting specific embodiments of an image sensor array according to the invention have been described in connection with the views of FIGS. 2a-4c (image sensor array 182A), and the views of FIGS. 5a-7d (image sensor array 182B). General features of an image sensor array which may be incorporated into optical reader 100 (that is, features which can be incorporated in the image sensor array, whether of the embodiment labeled 182A, the embodiment labeled 182B, or another embodiment such as CMY image sensor array 182C, RGB image sensor array 182D, monochrome linear image sensor array 182E, monochrome area image sensor array 182F, monochrome and polarizer image sensor array 182G, or monochrome color and polarizer image sensor array 182H) are now described.

Optical reader 100 can be programmed or otherwise be configured to selectively address a first plurality of pixels in an image sensor array 182A, 182B, 182C, 182D, 182E, 182F, 182G, 182H independently of selectively addressing a second plurality of pixels of the image sensor array so that image data can be read out of the first plurality of pixels independently of the second plurality of pixels. In one operating mode optical reader 100 selectively addresses the first subset of pixels and reads out image data from first subset of pixels independently of the second color sensitive subset of pixels. In another operating mode optical reader 100 selectively addresses the second subset of pixels and reads out image data from the second subset of pixels independently of the first subset of pixels 250M. Where optical reader 100 selectively addresses and selectively reads out only a subset of pixels of an image sensor array, the resulting frame of image data read out of the image sensor array may be referred to as a "windowed frame" of image data. When a windowed frame of image data is read out, the frame rate of the image sensor array is normally increased relative to a normal frame rate of the image sensor array.

Image sensor array 182A, 182B, 182C, 182D, 182E, 182F, 182G, 182H can be configured to have a rolling shutter operating mode and a global shutter operating mode. When a rolling shutter operating mode is entered, rows of pixels of image sensor array are exposed sequentially. The term "rolling" shutter is used because when in a rolling shutter operating mode an exposure period for a row of pixels generally begins prior to a time an exposure period for a previous row has ended.

When operated in a global electronic shutter operating mode, pixels from several rows of an image sensor array are exposed simultaneously. That is, when operated in a global electronic shutter operating mode, transistor components (for example, transfer gates 304 and reset gates 308 of the array as shown in the embodiments of FIGS. 3a and 6a) forming an electronic shutter an image sensor array are controlled in a coordinated manner so that a plurality of rows of pixels are exposed simultaneously and have common exposure periods. In a global electronic shutter operating mode, electronic shutter components of the array are controlled so that the common exposure period for each of the plurality of rows of pixels begins at a common exposure start time (via control of reset gates 308) and ends at a common exposure stop time (via control of transfer gates 304). As explained herein, each pixel of the array may store a charge in an optically shielded storage region during the common exposure period. For facilitating a global electronic shutter operating mode, an exposure control timing pulse 354, 354', 354", 354''' can be applied to an image sensor array 182A, 182B, 182C, 182D, 182E, 182F, 182G, 182H, as is described in further detail in connection with the timing diagrams of FIGS. 15a-15e. An exposure control timing pulse 354, 354', 354", 354''' controls the timing for exposure of each row of pixels of image sensor array 182A, 182B, 182C, 182D, 182E, 182F, 182G, 182H being exposed. The exposure period for each row of pixels the image sensor array being subject to image data read out begins at the leading edge of exposure control timing pulse 354, 354', 354", 354''' and ends at the falling edge of exposure control timing pulse 354, 354', 354", 354'". For construction of an image sensor array having a global electronic shutter operating mode each pixel of the array is equipped with additional circuit elements as is described herein.

Image sensor array 182A, 182B, 182C, 182D, 182E, 182F, 182G, 182H of optical reader 100 may be constructed to be operated in a rolling shutter mode of operation only; that is, in one specific embodiment an image sensor array of optical reader 100 can only be controlled to expose pixels of the image sensor array on a rolling shutter basis and cannot be controlled so that pixels of image sensor array are exposed on a global electronic shutter basis. In another embodiment, an image sensor array incorporated in optical reader 100 is constructed to be operated in a global electronic shutter operational mode only and is incapable of operation in a rolling shutter mode.

Image sensor array 182A, 182B, 182C, 182D, 182E, 182F, 182G, 182H can be constructed to be operated in either of a global electronic shutter operation mode or a rolling shutter operational mode. Where an image sensor array incorporated in optical reader 100 is constructed to be operational in either of a rolling shutter operational mode or a global shutter operational mode, the switching between rolling shutter and global shutter operational modes may be made in response to a receipt of operator instructions to change the shutter mode. The switching between rolling shutter and global shutter operational modes may also be automatic and dynamic in response to the sensing of a predetermined criteria being satisfied. An image sensor array equipped optical reader 100 having both rolling shutter and global shutter operational modes is described in U.S. patent application Ser. No. 11/077,975, filed Mar. 11, 2005 entitled, Bar Code Reading Device With Global Electronic Shutter Control, which is incorporated herein by reference. An image sensor array constructed to be operated in either of a rolling shutter or global shutter operational mode is described in U.S. Pat. No. 6,552,323 entitled, "Image Sensor With A Shared Output Signal Line" which is incorporated by reference.

Image sensor array 182A, 182B, 182C, 182D, 182E, 182F, 182G, 182H can be constructed so that certain pixels of the image sensor array are capable of being exposed on either a rolling shutter basis or a global shutter basis and certain other pixels of the image sensor array are capable of being exposed only on a rolling shutter basis and are not capable of being exposed on a global electronic shutter basis.

Figure 18A:
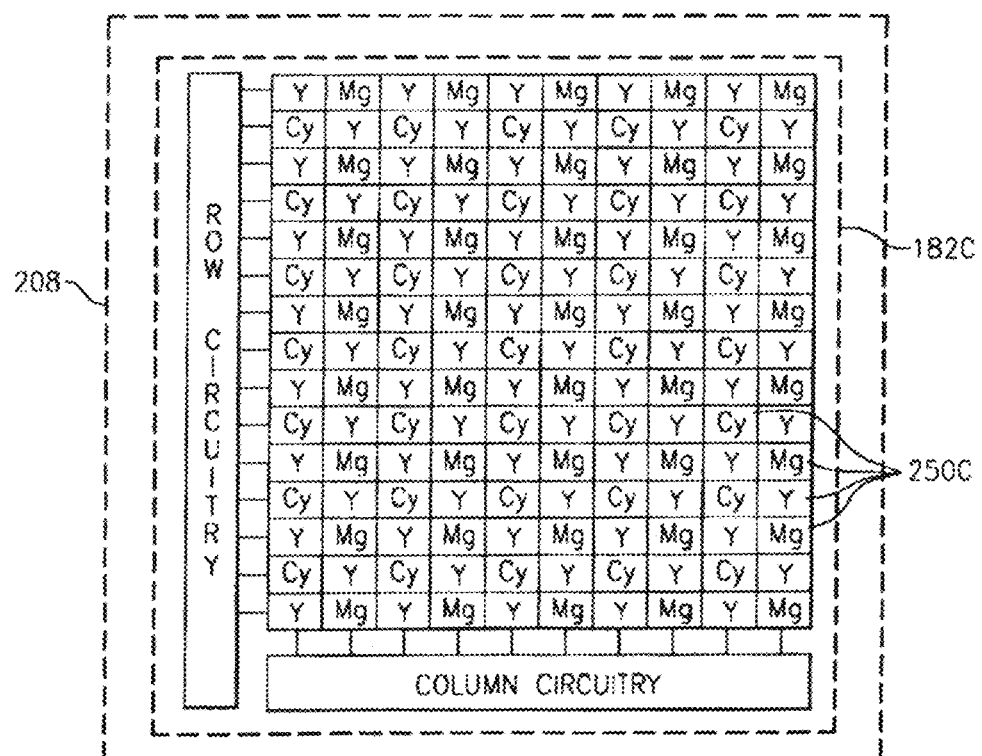
FIG. 18a is a schematic view of a cyan-magenta-yellow (CMY) image sensor array in accordance with the invention which may be incorporated into an optical reader according to the invention and which may be controlled to generate both a decode frame of image data and a visual display color frame of image data.
Figure 19A:
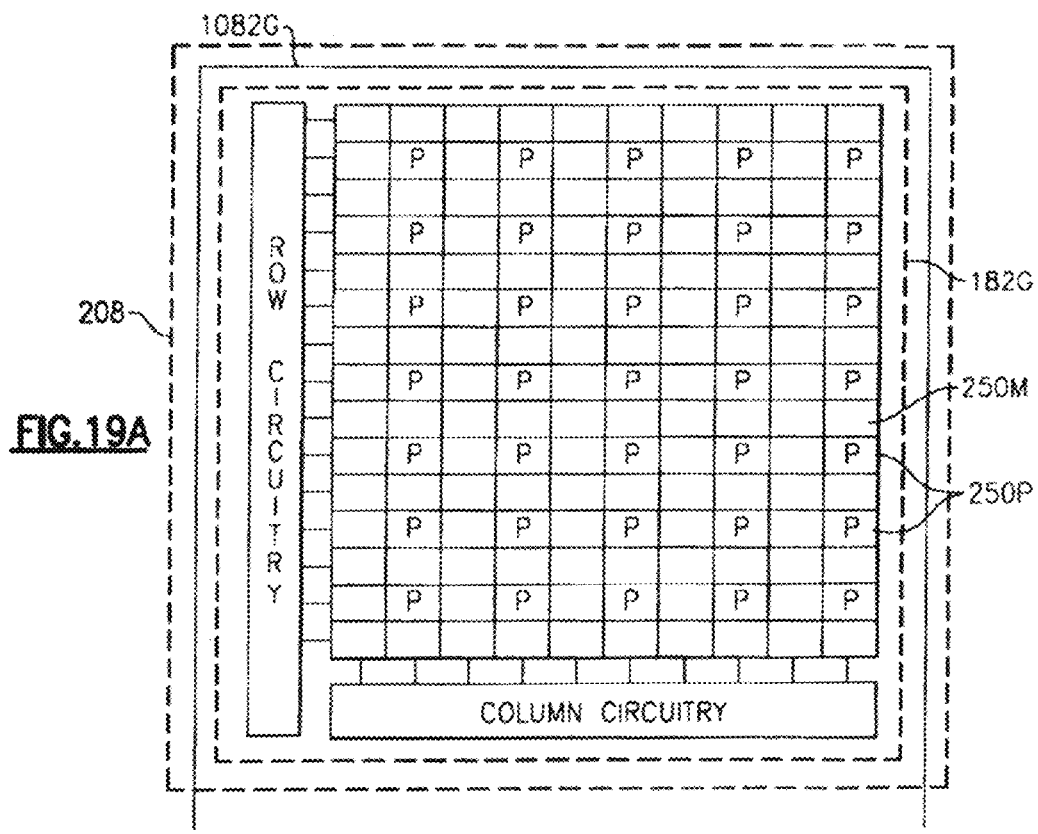
FIG. 19a is a schematic view of a hybrid monochrome and polarizer image sensor array in accordance with the invention which may be incorporated in an optical reader according to the invention.
Figure 19C:
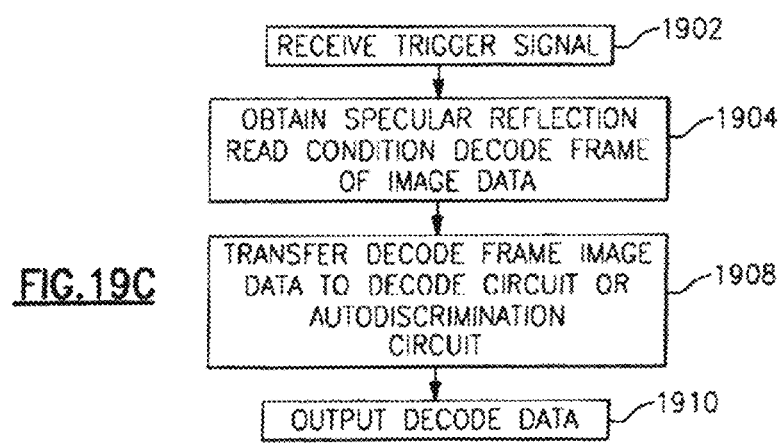
FIG. 19c is a flow diagram illustrating an exemplary operational mode of an optical reader according to the invention which incorporates a hybrid monochrome and polarizer image sensor array according to the invention.
Figure 19B:
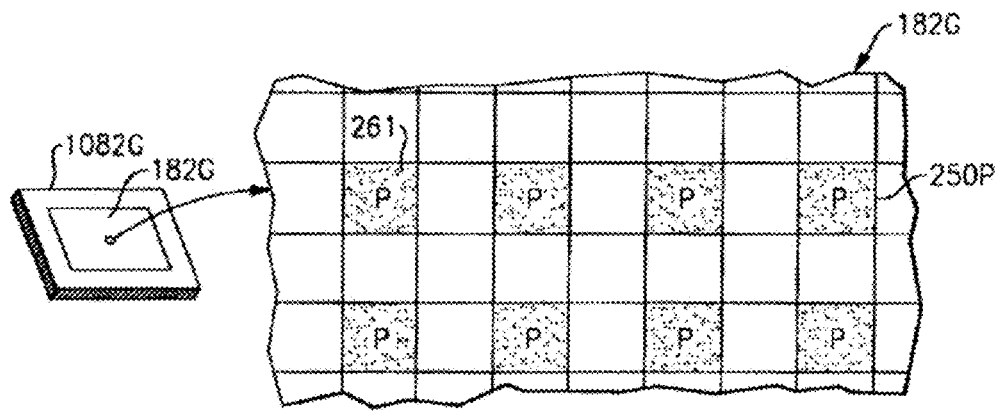
FIG. 19b is a top perspective view of a hybrid monochrome and polarizer image sensor array according to the invention with an exploded view section illustrating a pattern of light polarizing pixels that may be distributed throughout the image sensor array.
Figure 20A:
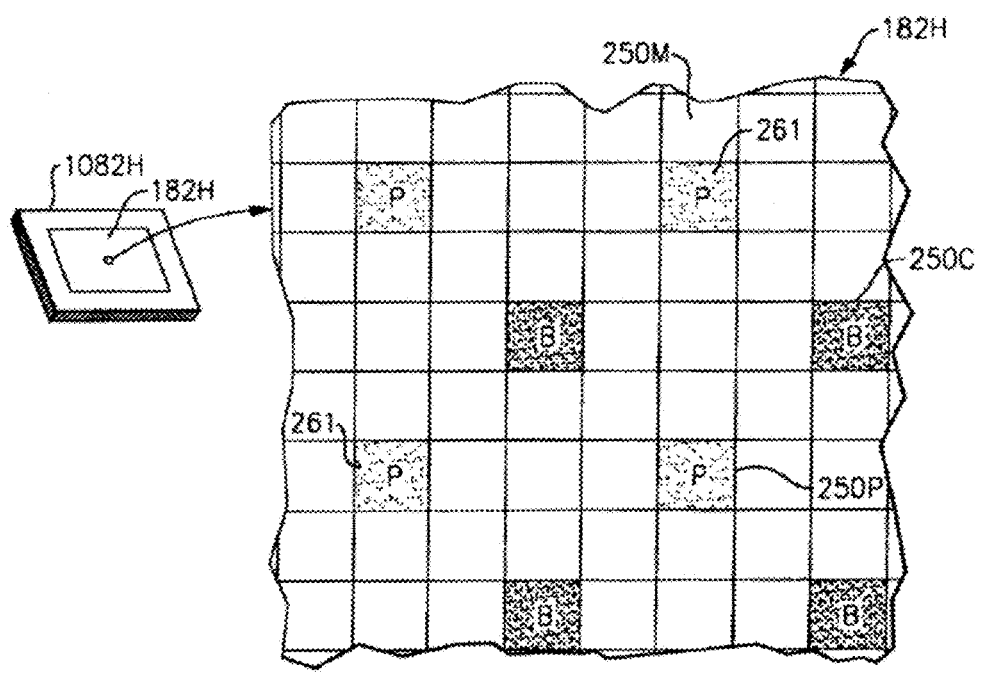
FIGS. 20a and 20b are top perspective views of a monochrome polarizer and color sensitive image sensor array according to the invention with an exploded view section illustrating a pattern of light polarizing pixels and color sensitive pixels that may be distributed throughout the array.
Figure 20B:
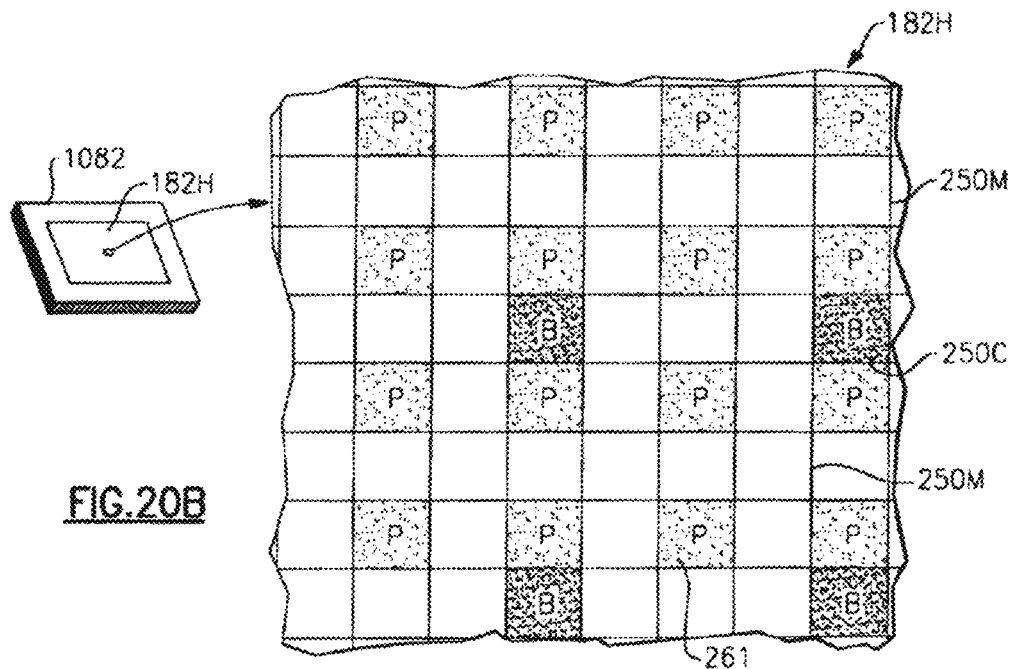

It has been described with reference specifically to image sensor array 182A, and image sensor array 182B that it may be advantageous to incorporate into an image sensor array of optical reader 100 separately controllable reset control lines 262, 262R-M and 262, 262R-C for resetting monochrome pixels separately and independently of color sensitive pixels to thereby reduce pixel cross talk. It will be understood that it may be advantageous to incorporate separately and independently controllable reset control lines into an image sensor array 182A, 182B, 182C, 182D, 182E, 182F, 182G, 182H according to the invention whenever image data is selectively read out of a first subset of image data and it is desired to reduce cross talk from pixels of the image sensor array external to the first subset of pixels. For example, in optical reader 100 incorporating a cyan-magenta-yellow (CMY) image sensor array 182C as shown in FIG. 18c, it may be advantageous to incorporate separate reset control lines for resetting magenta and cyan pixels separately from yellow pixels so that when yellow pixels are exposed for read out of decode frame yellow pixel image data for transmission to decode circuit 1792, the remainder of the pixels of the array, i.e., the cyan and magenta pixels can be set to reset to eliminate electron diffusion cross talk and to reduce photon penetration cross talk. When hand held optical reader 100 incorporates a hybrid monochrome and polarizer image sensor array 182G as shown in FIG. 19b or the monochrome color and polarizer image sensor array 182H as shown in FIGS. 20a and 20b, it may be beneficial to incorporate into image sensor array 182 separately controllable reset control lines for controlling the reset of pixels external to the polarizing pixels so that when the polarizing pixels are exposed for read out of image data from the polarizing pixels, the remaining pixels of the image sensor array are set to reset to reduce cross talk from the pixels external to the polarizing pixels.

While an image sensor array 182A, 182B, 182C, 182D, 182E, 182F, 182G, 182H is conveniently provided by a CMOS image sensor array fabricated utilizing complementary metal-oxide-silicone integrated circuit fabrication technologies, an image sensor array 182A, 182B, 182C, 182D, 182E, 182F, 182G, 182H may also be a charge coupled device (CCD) image sensor array, or a CID image sensor array or an image sensor array of another fabrication technology. In various embodiments of the invention described herein, it is advantageous to read out less than a full frame of image data, i.e., a read out of a "windowed frame" of image data which may also be referred to as an image region of interest (ROI). An example of a CCD image sensor array integrated circuit chip having windowing capability is the KODAK KAI-0340 image sensor array IC chip available from Eastman Kodak Corporation of Rochester, N.Y. The KAI-0340 image sensor array IC chip has various operational modes that are selectable utilizing various input switch setups. For example, setting a SW1 switch to the HIGH position causes charge in outer vertical resisters of the image sensor array to be dumped before it reaches the horizontal register, facilitating the selective read out of image data from center columns of the array only. Setting the SW2 switch of the KAI-0340 image sensor array chip changes diode transfer clock timing such that only charge from the center rows is transferred to vertical registers, facilitating the selective read out of image data from center rows of the image sensor array only. Accordingly, where image sensor array 182B is configured according to the version shown in FIG. 5h having center rows of monochrome pixels defining a monochrome pixel zone 2500M and where the image sensor array is a CCD KAI-0340 image sensor array, image data from the center rows can be read out by selecting a preconfigured operating mode of the image sensor array chip. Additional "windowed frame" patterns can be selectively read out of a CCD image sensor array by varying the speed of a pixel clock timing control timing pulse that controls the speed with which a pixel is clocked. Invalid or null data can be clocked out of a CCD pixel by speeding up a pixel clock signal. Varying a pixel clock control signal between valid data yielding rates and invalid data yielding rates during the reading out of image data from a CCD image sensor array yields a windowed frame of image data comprising valid image data clocked out at normal speed and invalid image data clocked out at high speed. Image data can also be selectively read out of a CCD image sensor array by selectively gating to output circuitry of the CCD image sensor array image data corresponding to select pixels of the image sensor array. It will be seen that for any application described herein wherein a windowed frame of image data is read by selective addressing of pixels from a CMOS image array, a CCD image sensor array supporting windowing capability may be substituted therefore to provide selective read out functionality.

Additional aspects of the invention are described with reference to the physical form views of FIGS. 8a-8c and the physical form views 9a, 9b and 9c. In the physical views of FIGS. 8a-8c, an imaging module onto which an image sensor chip may be incorporated is described. With reference to FIGS. 9a, 9b and 9c, hand held housings for supporting and encapsulating an imaging module including an image sensor chip are described.

An optical reader 100 of the invention, as shown in the embodiment of FIGS. 8a-8c, may include an imaging module such as imaging module 1802A. Imaging module 1802A as shown in FIGS. 8a-8c incorporates certain features of an IT4000 imaging module herein and additional features. IT4000 imaging modules are available from Hand Held Products, Inc. of Skaneateles Falls, N.Y. Imaging module 1802A includes first circuit board 1804 carrying light sources 160a, 160b, while second circuit board 1806 carries light sources 160c, 160d, 160e, 160f, 160g, 160h, 160i, 160j, 160k, 160l, 160m, 160n, 160o, 160p, 160q, 160r, 160s, and 160t (hereinafter 160c through 160t). First circuit board 1804 also carries image sensor array 182, which is integrated onto image sensor IC chip 1082. Image sensor IC chip 1082 and image sensor array 182 in FIG. 8a are generically labeled with the reference numerals "1082" and "182" respectively in FIGS. 8a-8d to indicate that any one of the specifically described image sensor IC chips 1082A, 1082B, 1082C, 1082D, 1082E, 1082F, 1082G, 1082H described herein or any one of the specifically described image sensor arrays 182A, 182B, 182C, 182D, 182E, 182F, 182G, 182H described herein may be incorporated into imaging module 1802A. The various image sensor IC chips and image sensor arrays can also be incorporated in another imaging module described herein such as imaging module 1802B, 1802C, 1802D, and 1802E. Imaging module 1802C shown in FIG. 8e is a laser aiming IT4300 imaging module of the type available from Hand Held Products, Inc. The laser aiming IT4300 imaging module includes a plurality of illumination LEDs e.g., LED 160, and an aiming pattern generator comprising a laser diode assembly 1872 in combination with a diffractive element 1873, wherein the diffractive element of the imaging module diffracts laser light from the laser diode assembly to project a two-dimensional aiming pattern onto a substrate, s. Imaging module 1802A also includes support assembly 1810 including lens holder 1812, which holds lens barrel 1814 that carries imaging lens 212 that focuses images onto an active surface of image sensor array 182. Lens 212 may be e.g., a single lens (a lens singlet), a lens doublet or a lens triplet. Light sources 160a, 160b are aiming illumination light sources whereas light sources 160c through 160t are illumination light sources. Referring to FIG. 8d, illumination light sources 160c through 160t project a two-dimensional illumination pattern 1830 over a substrate, s, that carries a decodable indicia such as a bar code symbol 1835 whereas aiming illumination light sources 160a, 160b project an aiming pattern 1838. In the embodiments shown and described in connection with FIGS. 8a-8c, light from aiming illumination light sources 160a, 160b is shaped by slit apertures 1840 in combination with lenses 1842 which image slits 1840 onto substrate, s, to form aiming pattern 1838 which in the embodiment of FIGS. 8a-8c is a line pattern 1838. Illumination pattern 1830 substantially corresponds to a full frame field of view of image reader 100 designated by box 1850. The present field of view of optical reader 100 is herein referred to as the "target" of optical reader 100. Aiming pattern 1838 is in the form of a line that extends horizontally across a center of field of view of image reader 100. Illumination pattern 1830 may be projected when all of illumination light sources 160c through 160t are operated simultaneously. Illumination pattern 1830 may also be projected when a subset of light sources 160c through 160t are simultaneously energized. Illumination pattern 1830 may also be projected when only one of light sources 160c through 160t is energized such as LED 160s or LED 160t. LEDs 160s and 160t of imaging module 1802 have a wider projection angle than LEDs 160c through 160t. In an optical reader 100 incorporating imaging module 1802, 1802A illumination assembly 104 includes LEDs 160a, 160b, LEDs 160c through 160t and slit apertures 1840 in combination with lenses 1842.

A reader imaging module may be incorporated into one of a hand held housing as shown in FIGS. 9a, 9b and 9c. In the embodiment of FIG. 9a, hand held housing 101 is a gun style housing. In the embodiment of FIG. 9b, hand held housing 101 supporting imaging module 1802 is in the form factor of a portable data terminal (PDT). In the embodiment of FIG. 9c, hand held housing 101 supporting imaging module is in the form factor of a mobile telephone, often referred to as a "cell phone." When optical reader 100 is a cell phone, optical reader 100 is configured to send voice data over GSM/GPRS transceiver 571 to GSM/GPRS network 198 (FIG. 10) and to receive over GSM/GPRS transceiver 571 voice data from GSM/GPRS network 198. Further, where optical reader 100 is a cell phone, optical reader 100 may be configured so that an operator inputs telephone numbers via keyboard 508. The specific imaging module 1802A described in connection with FIGS. 8a-8c may be incorporated in the optical reader shown in FIG. 9a or the optical reader 100 shown in FIG. 9b or the optical reader 100 shown in FIG. 9c. However, in the embodiment shown in FIG. 9a, housing 101 supports and encapsulates imaging module 1802B an imaging module of construction similar to imaging module 1802A, except that only two light sources 160 are incorporated into the imaging module. Housing 101 of the reader of FIG. 9b supports imaging module 1802 which is generically labeled element 1802 to indicate that any one of the specific imager modules described herein, e.g., 1802, 1802A, 1802B, 1802D, 1802E may be incorporated into an optical reader according to the invention.

Referring to further aspects of optical reader 100, optical reader 100 may incorporate a graphical user interface (GUI) 3170 enabling selection between various operating modes. With GUI 3170 an operator moves pointer 3172 to a selected icon and clicks on the icon to configure optical reader 100 in accordance with an operating mode associated with the selected icon. Reader 100 may include pointer mover 512 (otherwise termed a navigation matrix) to facilitate movement of the pointer 3172. Buttons 512B of pointer mover 512 facilitate selection of an icon of a GUI interface that is supported by incorporating a multitasking operating system (OS) into reader 100 such as WINDOWS CE. GUI 3172 may be developed using various open standard languages as HTML/Java or XML/Java.

In the embodiment of FIG. 9b, GUI 3170 includes a plurality of virtual selection buttons 3152, 3154, 3156, 3158, 3162, 3164. Selection of rolling shutter icon 3152 configures reader 100 so that during a next exposure period image sensor array 182 is operated in a rolling shutter mode. Selection of global shutter icon 3154 configures optical reader 100 so that during a next exposure period image sensor array 182 is operated in a global electronic shutter mode.

Figure 10:
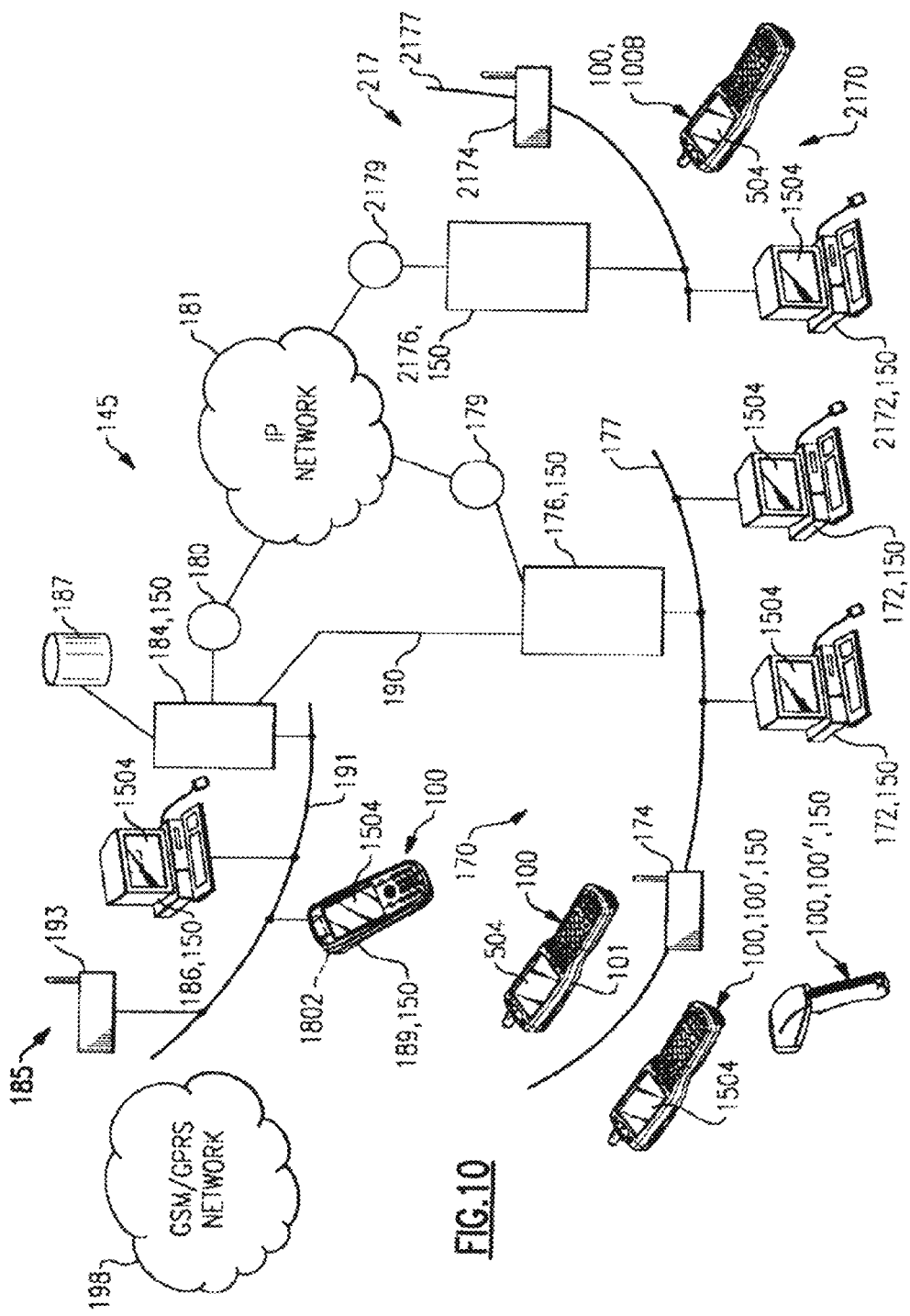
FIG. 10 is a schematic view of a system incorporating a plurality of optical readers according to the invention.

Selection of decode icon 3162 drives optical reader 100 into an indicia decode mode so that a next time a trigger signal is received, optical reader 100 captures a frame of image data and attempts to decode a bar code symbol or other decodable indicia (e.g., an OCR character) represented therein and outputs a decoded out message to display 504, or a spaced apart device 150, as is described with reference to FIG. 10. Selection of image capture (which may otherwise be referred to a picture taking) icon 3164 configures optical reader 100 so that next time a trigger signal is received, optical reader 100 captures image data and outputs the image data to one or more of a display 504, a specified memory address, or to a spaced apart device 150 without attempting to decode decodable indicia therein. Optical reader 100 may also be constructed so that optical reader 100 can be configured in accordance with a selected operating mode by sending to reader 100 a serial command from a spaced apart device, or by the reading of a specially configured programming bar code symbol.

Optical reader 100 is configured so that optical reader 100 receives a trigger signal when manual trigger 216 is manually depressed by an operator. Optical reader 100 may also be configured so that a trigger signal is received by the sensing of an object in the proximity of reader 100 or by the sending of a serial trigger command to reader 100 from a spaced apart device, 150, as shown in FIG. 10.

A flow diagram illustrating operation of optical reader 100 in one embodiment is described with reference to FIGS. 14*a*, 14*b*, and 14*c*. At step 1100 an operator selects between an indicia decode mode and a picture taking mode. At step 1100 an operator may select icon 3162 (FIG. 9*b*) to drive optical reader 100 into an indicia decode mode, or alternatively icon 3164 to drive optical reader 100 into a digital picture taking mode of operation. These modes may also be selected by sending to reader 100 a serial command from a spaced apart device 150 or by the reading of a programming bar code symbol. If an indicia decode mode of operation is selected, optical reader 100 executes an indicia decode process 1102. If a picture taking mode is selected, optical reader 100 executes picture taking process 1400.

An example of an indicia decode process 1200 is described with reference to FIG. 14*b*. At step 1202 a trigger signal is received by one of the methods described (depressing trigger 216, object sensing, serial trigger command) to commence a decode process. At step 1203, control circuit 552 of optical reader 100 captures a plurality of "parameter determination" or test frames of image data. The frames of image data captured at step 1203 are not subject to indicia decode processing, but rather, are processed for parameter determination (e.g., exposure, gain, illumination). Alternatively, parameter determining step 1203 may be avoided. For example, control circuit 552 may apply parameters determined from a previous image capture operation rather than determining parameters at step 1203. At step 1204 control circuit 552 obtains a decode frame of image data details of which are explained herein.

For the capturing of frames of image data (i.e., "test" frames and/or frames for use in decoding, picture taking or other processing or storage) control circuit 552 (FIG. 1*a*) may send an illumination control signal to illumination assembly 104 and various image capture initiation control signals to control/timing circuit 1092 of image sensor chip 1082 (labeled generically to refer to any of the image sensor chips described herein).

Image capture initiation control signals are described in greater detail with reference to FIGS. 15*a*-15*e*. For the capturing of image data, control circuit 552 may send to illumination assembly 104 an illumination control timing pulse 350 to energize at least one light source 160 such that illumination pattern 1830 is projected (as shown in FIG. 8*d*). Control circuit 552 may also send to image sensor IC chip 1082 an exposure control timing pulse 354 and a read out control timing pulse 368, and a reset control timing pulse 370 (that is, control circuit 552 sends appropriate signals to image sensor IC chip 1082 to initiate exposure control timing pulse 354, read out control timing pulse 368 and reset control timing pulse 370).

Figure 15A:
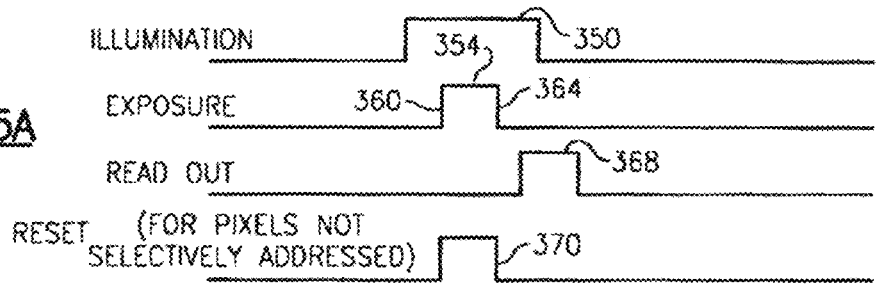
FIGS. 15a-15e are various image capture initiation control signal timing diagrams illustrating the invention.
Figure 15B:
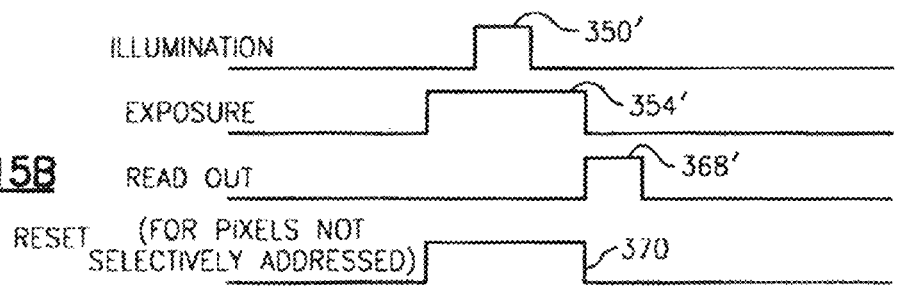
Figure 15C:
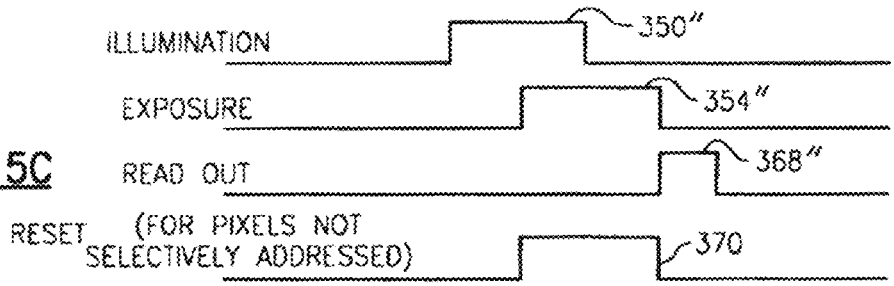
Figure 15D:
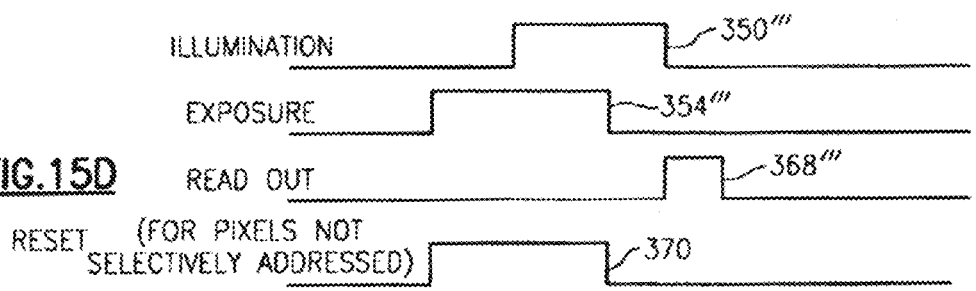
Figure 15E:

In one embodiment as shown in FIG. 15*a*, the exposure control timing pulse 354 begins after and finishes before the illumination control timing pulse 350. The read out control timing pulse 368 begins at the conclusion of the illumination control timing pulse 350. In another embodiment as shown in FIG. 15*b*, the illumination control timing pulse 350' begins after and finishes before the exposure control timing pulse 354'. In this embodiment, the read out control timing pulse 368' begins at the conclusion of the exposure control timing pulse 354'. In further embodiments the exposure control timing pulse and the illumination control timing pulse overlap each other while occurring sequentially. In one such embodiment as shown in FIG. 15*c*, this sequential operation can include the illumination control timing pulse 350" starting, the exposure control timing pulse 354" starting, the illumination control timing signal pulse 350" ending, and then the exposure control timing pulse 354" ending. In this embodiment, the read out control timing pulse 368" begins at the conclusion of the exposure control timing pulse 354". In a further such embodiment as shown in FIG. 15*d*, the sequential operation can include the exposure control timing pulse 354' starting, the illumination control timing pulse 350''' starting, the exposure control timing pulse 354''' ending, and then the illumination control timing signal pulse 350''' ending. In this embodiment, the read out control timing pulse 368' begins at the conclusion of the illumination control timing signal pulse 350'''. Each illumination control timing pulse 350, 350', 350", 350''' described herein may comprise a plurality of short duration individual pulses, sometimes referred to as a "strobed" pulse, as is indicated by FIG. 15*e*.

When exposure control timing pulse 354 is received by an image sensor IC chip and optical reader 100 is configured in a global electronic shutter operating mode, pixels from several rows of image sensor array 182A, 182B, 182C, 182D, 182E, 182F, 182G, 182H are simultaneously exposed to light for the duration of the pulse. That is, when optical reader 100 is configured in an global electronic shutter operating mode, each of several rows of image sensor array 182A, 182B, 182C, 182D, 182E, 182F, 182G, 182H that are subject to image data read out have common exposure periods such that the exposure period for each row of pixels the image sensor array subject to image data read out begins at a common exposure start time and ends at a common exposure stop time. The exposure period for each row of pixels image sensor array 182A, 182B, 182C, 182D, 182E, 182F, 182G, 182H subject to image data read out begins at the leading edge of exposure control timing pulse 354, 354', 354", 354''' and ends at the falling edge of exposure control timing pulse 354, 354', 354", 354'''.

When read out control timing pulse 368 is received by image sensor IC chip 1082B, image data is read out from the image sensor array. Image signals corresponding to pixels of the image sensor array are converted into digital form by analog-to-digital converter 1086 and transferred into memory 560 by FPGA 580.

Optical reader 100 may be configured so that at step 1204 when reading out image data, optical reader 100 reads a "windowed frame" of image data. As indicated herein, a windowed frame of image data may be read out by selectively addressing pixels of a desired region of interest or window. A windowed frame of image data read out during frame capture at step 1204 may comprise pixel values corresponding to all or substantially all monochrome pixels 250M of an image sensor array. With further reference to the timing diagrams of FIGS. 15a, 15b, 15c and 15d, a reset control timing pulse 370 for resetting pixels that are not selectively addressed may be coordinated with the exposure control timing pulse 354 for controlling exposure of pixels that are selectively addressed for reading out a windowed frame of image data. Thus, for reading out a monochrome frame of image data from a hybrid monochrome and color image sensor array, e.g., image sensor array 182A or image sensor array 182B, reset control timing pulse 3709 is applied to reset color pixels of the image sensor array 182 while exposure control timing pulse 354 is applied to enable exposure of monochrome pixels of the image sensor array. To facilitate resetting of color pixels of an image sensor array independent of resetting of monochrome pixels, an image sensor array may be configured to include a reset control line grid specifically adapted to enable resetting of color pixels. Applying reset control pulse 370 to drive color pixels into reset while monochrome pixels are being exposed to light can be expected to eliminate electron diffusion cross talk and to reduce cross talk resulting from light rays angularly entering the color pixels during exposure.

When frames are obtained at step 1204, they are obtained in a form suitable to facilitate indicia decoding such as bar code symbol decoding or OCR decoding. With the windowed frame of image data read out at step 1204 from a hybrid monochrome and color image sensor array 182A, 182B including only image data corresponding to monochrome pixels and no image data corresponding to color sensitive pixels 250C, control circuit 552 at step 1204 may store gray scale values into RAM 560, each pixel value representing an intensity of light at a particular monochrome pixel of image sensor array 182A, 182B. The frame of image data obtained at step 1204 may include e.g., 8 bit gray scale pixel values, 10 bit gray scale pixel values or 12 bit gray scale pixel values. Since numerous legacy bar code decoding and OCR decoding schemes are designed to operate on monochrome gray scale image data or binarized image data derived from gray scale image data, the selective addressing of monochrome pixels 250M in the capturing of a monochrome image frame yields a frame that is well suited for being subjected to indicia decoding processing. Of course, in certain applications, control circuit 552 at step 1204 may obtain a decode frame of image data including color image data. For example, where decode circuit 1702 is configured to decode color encoded bar code symbols, it is advantageous for control circuit 552 to obtain a decode frame of image data including color image data at step 1204.

In the execution of step 1204, control circuit 552 may carry out a plurality of alternative processes in obtaining a decode frame of image data. Referring to the flow diagram of FIG. 14d, optical reader 100 at step 1204 may simply capture a single windowed frame of image data which has been described herein above. As indicated by process step 1205 of FIG. 14d, control circuit 552 may carry out process step 1204 by selectively addressing monochrome pixels 250M of a hybrid monochrome and color image sensor array such as image sensor array 182A or image sensor array 182B and reading out image data from monochrome pixels 250M only; i.e., a windowed frame of image data comprising image data from monochrome pixels 250M only.

Figure 14A:
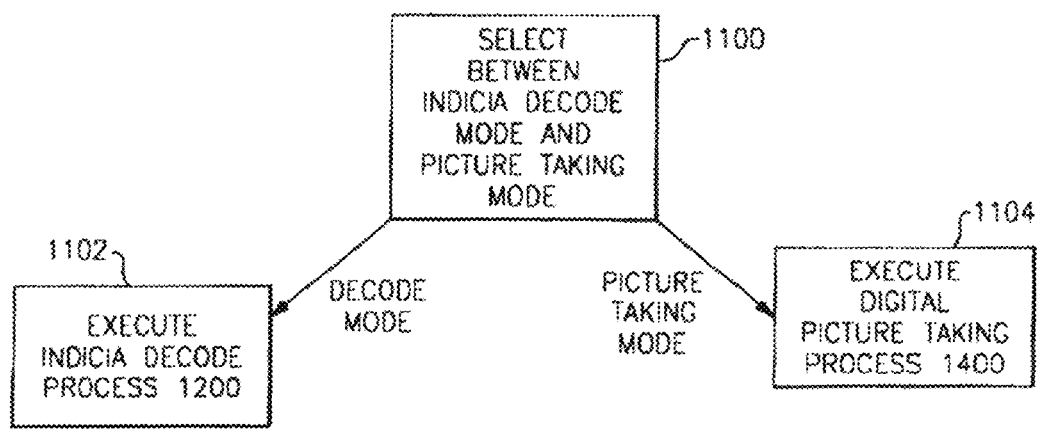
FIGS. 14a-14c are various flow diagrams illustrating the invention.
Figures 14B, 14C:
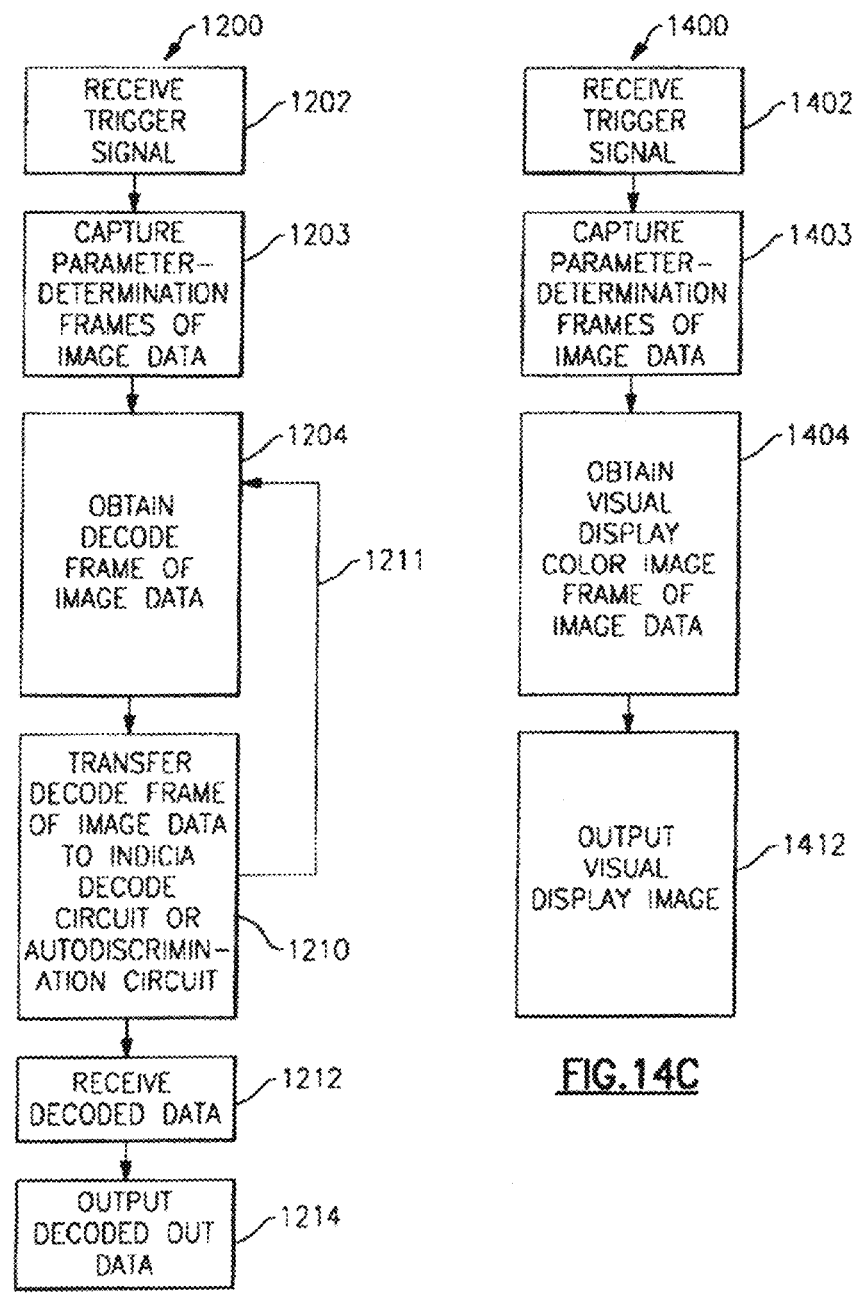
Figure 14D:
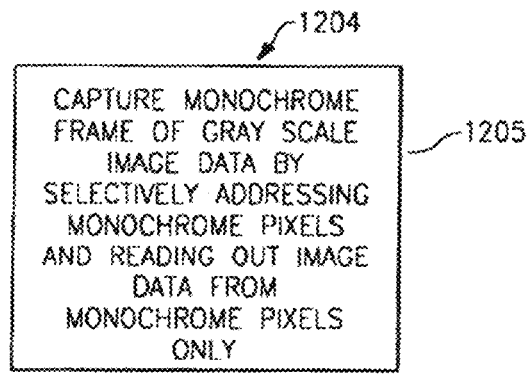
FIGS. 14d-14f are additional flow diagrams illustrating examples of operation of an optical reader according to the invention in an indicia decode mode of operation.
Figures 14E, 14F:
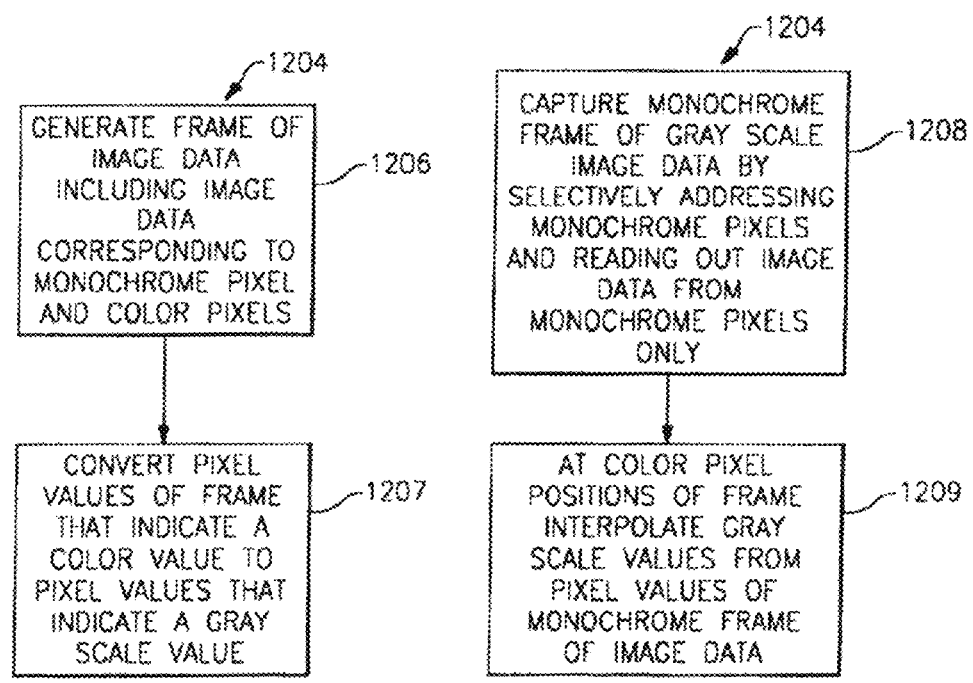

Referring to the flow diagram of FIG. 14e, the obtaining a decode frame step 1204 may be carried out in the alternative by the execution of steps 1206 and 1207. At step 1206 optical reader 100 may generate a frame of image data that includes image data corresponding to monochrome pixels 250M and color sensitive pixels 250C and at step 1207 image sensor array 182A, 182B may convert pixel values of the frame generated at step 1206 into gray scale values. The frame generated at step 1206 may be generated by exposing color and monochrome pixels of image sensor array 182A, 182B during a single exposure period, and reading out image data from both color and monochrome pixels 250M, 250C of image sensor array 182A, 182B during a single pixel read out period. Alternatively, at step 1206 control circuit 552 of optical reader 100 may combine image data from two different frames such as two successive frames, wherein a first of the captured frame is a windowed frame of image data including image data from color sensitive pixels 250C only and a second of the frames is a frame of image data including image data read out from monochrome pixels 250M only.

Figures 16A, 16B, 16C:
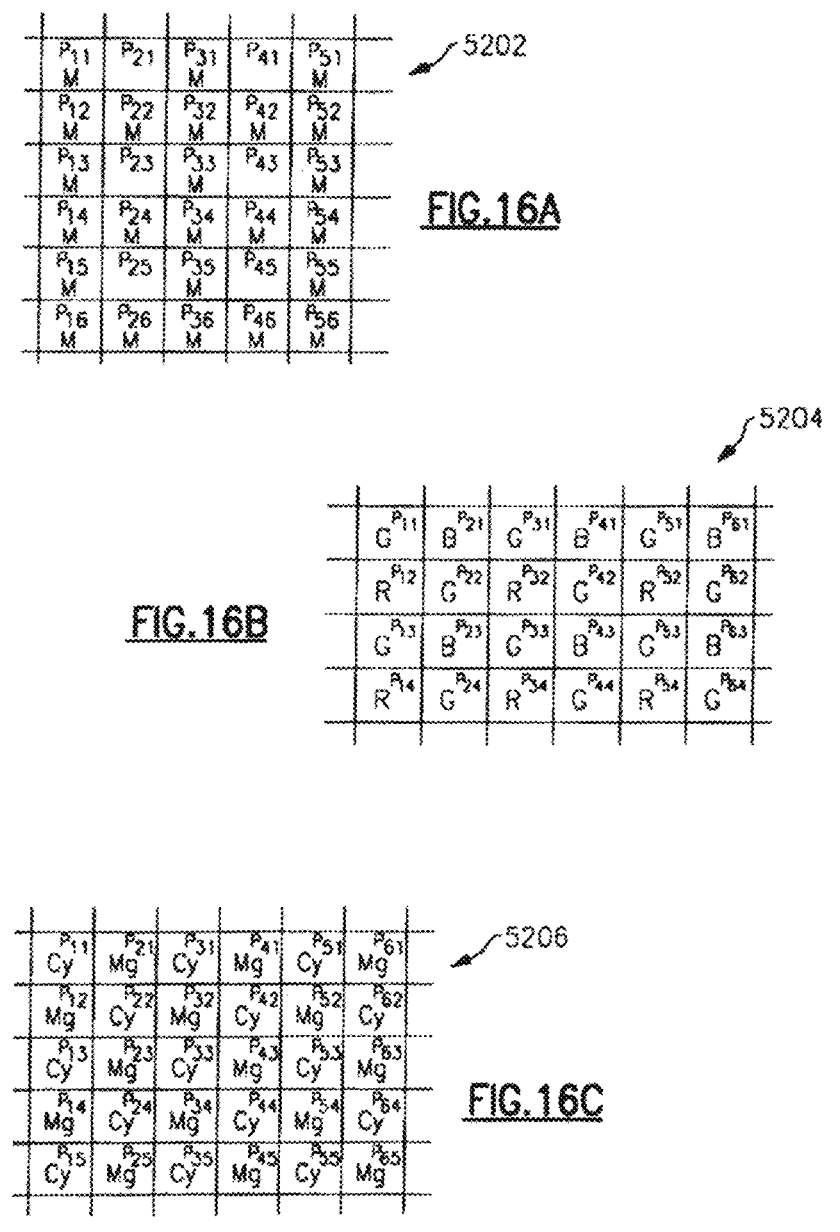

Referring to the flow diagram of FIG. 14f, optical reader 100 may also obtain a decode frame at step 1204 by carrying out steps 1208 and step 1209. At step 1208 optical reader 100 may capture a windowed frame of image data including image data corresponding to monochrome pixels 250M only and at step 1209 control circuit 552 may interpolate pixel values corresponding to color pixel positions of image sensor array 182A, 182B utilizing the monochrome pixel values from the windowed monochrome frame captured at step 1208. For example, control circuit 552 may capture a gray scale pixel value frame 5202 as illustrated in FIG. 16a that includes a gray scale pixel value for each monochrome pixel position of the image sensor array 182A, 182B. Optical reader 100 may interpolate a monochrome pixel value for any "missing pixel" color pixel position of the frame 5202. Referring to frame 5202, frame 5202 is a gray scale frame of image data captured by selecting reading out image data from an image sensor array 182B constructed in accordance with FIGS. 4a-7b (Period=2). Pixel positions $P_{11}$, $P_{31}$, $P_{51}$, $P_{12}$, $P_{22}$, $P_{32}$, $P_{42}$, $P_{52}$, $P_{13}$, $P_{33}$, $P_{63}$ . . . are pixel positions corresponding to monochrome pixels 250M of image sensor array 182 for which individual frame image data has been read out. Pixel positions $P_{21}$, $P_{41}$, $P_{23}$, $P_{43}$, . . . are missing pixel positions corresponding to color sensitive pixels, 250C of image sensor array 182B. Referring to the frame of image data represented at FIG. 16a an optical reader 100 may calculate a gray scale pixel value for color pixel positions, e.g., position $P_{23}$, by averaging the gray scale values for each pixel position that is adjacent to pixel position $P_{23}$ and each pixel position that is corner adjacent to color pixel position $P_{23}$. For example, referring to the frame represented in FIG. 16a, a gray scale value for color pixel position $P_{23}$ can be interpolated by averaging pixel values of pixel positions $P_{12}$, $P_{22}$, $P_{32}$, $P_{13}$, $P_{33}$, $P_{14}$, $P_{24}$, $P_{34}$. A pixel value for "missing pixel" position $P_{23}$ can also be interpolated utilizing more than 8 neighboring pixel positions. Also, corner adjacent pixels may be weighted less than side, top or bottom adjacent pixels during averaging. In one simple averaging method, only four surrounding pixels are averaged; namely, the top and bottom adjacent pixels and the two side adjacent pixels adjacent to the pixel position for which a gray scale value is being interpolated. In a still further interpolation method, only two pixels are used for averaging; namely either the two side adjacent pixels adjacent to the pixel position being interpolated or the top and bottom adjacent pixels. A two-dimensional image representation of a linear bar code symbol can be expected to have several consecutive pixel positions along a column with similar gray scale values, if the representation of the symbol is oriented with 0° or 180° angle of rotation (i.e., the symbol is right side up or upside down). If the symbol representation has a 90° or 280° angle of rotation, several consecutive pixel positions along rows of pixel positions can be expected to have similar valued gray scale values. Accordingly, it can be seen that interpolating pixel values of adjacent pixel position values running in the direction of bars in a symbol representation yields truer edge information than utilizing all surrounding pixel positions for interpolation.

In one method of the invention, the correlation between a pair of horizontally oriented scan lines is calculated along with a correlation between a pair of vertically oriented scan lines. The two correlation measurements are then compared. If row scan lines are more closely correlated, column adjacent pixels are selected for interpolation. If column scan lines are more closely correlated, row adjacent pixels are selected for interpolation. An exemplary set of code for calculating a first derivative correlation for a pair of scan lines (horizontal or vertical) is presented by Table 1.

TABLE 1

Exemplary Code For Performing First
Derivative Correlation Calculation

```
%OneDcorelate: correlates two 1D 1st derivative signals to report the
%correlation
%input a,b: ID array
%output c: 1st derivative correlation
function c=OneDcorrelate(a,b)
% "diff" is the first derivative calculation.
%for an input array a=[a_i]_{i=1}^n then diff(a) =[a_i - a_{i+1}]_{i=1}^{n-1}
da=diff(double(a));
db=diff(double(b));
n=length(da);
c=0;
for i=1:n
   c=c+da(i)*db(i);
end
   [End Table 1]
```

A set of code for interpolating missing color pixel position values by one of three methods (simple averaging, first derivative correlation, and simple correlations) wherein "M-set" refers to the monochrome set of pixels is presented in Table 2.

TABLE 2

Exemplary Code For Interpolating Missing Pixels
Corresponding To Color Pixel Positions

```
%MsetInterpolation: interpolates missing M-set pixels
%input I_Mset: M-set image
%input method: 1:first derivative correlation; 2: simple correlation; 3
%simple averaging
%input p: sample period
%output Im: interpolated monochrome image
function Im=MsetInterpolation(I_Mset,method,p)
Isz=size(I_Mset);
%M-set topology
%    ^
% MMMMMMMM
% MxMxMxMxM
% MMMMMMMM
% MxMxMxMxM
%(MMMMMMMM)
```

TABLE 2-continued

Exemplary Code For Interpolating Missing Pixels
Corresponding To Color Pixel Positions

```
%  v
Im=double(I_Mset);
m=Isz(1);
n=Isz(2);
%correlated averaging
for i=p:p:m
  for j=p:p:n
    if i+1 <=m & j+1 <=n
      if method == 2
        %simple correlation
        if abs(Im(i-1,j)-Im(i+1,j)) < abs(Im(i,j-1)-Im(i,j+1))
          Im(i,j)=(Im(i-1,j)+Im(i+1,j))/2;
        else
          Im(i,j)=(Im(i,j-1)+Im(i,j+1))/2;
        end
      else if method == 1
        %first derivative correlation
        if OneDcorrelate(Im(i-1,j-1:j+1),Im(i+1,j-1:j+1)) >
          OneDcorrelate(Im(i-1:i+1,j-1),Im(i-1:i+1,j+1))
          Im(i,j)=(Im(i-1,j)+Im(i+1,j))/2;
        else
          Im(i,j)=(Im(i,j-1)+Im(i,j+1))/2;
        end
      else %method==3
        % simple averaging
        Im(i,j)=(Im(i-1,j)+Im(i+1,j)+Im(i,j-1)+Im(i,j+1))/4;
      end
    else if i+1 <=m & j+1 > n
      Im(i,j)=(Im(i-1,j)+Im(i+1,j))/2;
    else if i+1 > m & j+1 <=n
      Im(i,j)=(Im(i,j-1)+Im(i,j+1))/2;
    else if i+1 > m & j+1 > n
      Im(i,j)=(Im(i-1,j)+Im(i,j-1))/2;
    end
  end
end
Im=uint8(Im);
    [End Table 2]
```

At step 1210, optical reader 100 transfers the frame of image data obtained at step 1204, to an indicia decode circuit 1702 which may be a bar code symbol decoding circuit or autodiscrimination circuit 1704 including an indicia decode circuit 1702. In one embodiment, decode circuit 1702 decodes 1D and 2D bar code symbols and OCR characters. Autodiscrimination circuit 1704 may decode 1D and 2D bar code symbols and OCR characters (decodable indicia) and automatically discriminate between decodable indicia and handwritten characters. In the event that autodiscrimination circuit 1704 recognizes the presence of handwritten character information, autodiscrimination circuit 1704 automatically outputs to display 504 and/or a spaced apart device 150 image data representing the handwritten character image data. Further details of indicia decode circuit 1702 and autodiscrimination circuit 1704 are described in copending U.S. patent application Ser. No. 11/077,975, filed Mar. 11, 2005, incorporated by reference and U.S. application Ser. No. 10/958,779, filed Oct. 5, 2004, also incorporated herein by reference.

In general, indicia decoding accuracy is expected to increase with an increase in the percentage of monochrome pixels of image sensor array 182A, 182B. With image sensor array 182B having a period of P=2, every other row of pixels of image sensor array 182B are all monochrome pixels. Thus, horizontal scan lines can be launched through horizontal rows of pixel values of a frame of image data obtained utilizing a P=2 image sensor array 182B during attempts to decode a linear bar code symbol without substantial reduction in performance relative to a frame obtained utilizing an all monochrome pixel image sensor array. For decoding linear bar code symbols, control circuit 552 may read image data along scan lines, such as scan lines defined by a horizontal row of pixel positions to determine the relative widths of bars and spaces of a symbol and then decode the symbol through table lookup to determine a set of decoded character data corresponding to the bar space information.

At step 1212 control circuit 552 receives a decoded output message from decode circuit 1702 or autodiscrimination circuit 1704. The message received by control circuit 552 at step 1212 may be e.g., a decoded bar code message or a set of decoded OCR characters. At step 1214 optical reader 100 outputs a decoded out message. At step 1214 control circuit 552 may send decoded out bar code data and/or decoded OCR data to display 504 or to a spaced apart device 150 or to a data storage memory location of reader 100, or system 145 as described in FIG. 10.

Examples of spaced apart devices 150 which may be in communication with optical reader 100 are shown and described in connection with FIG. 10. Optical reader 100 may be part of a system 145 and may be included in a local area network (LAN) 170 which comprises, in addition to reader 100, such spaced apart devices as other portable readers 100', 100", network access point 174, personal computers 172 and central server 176 that are spaced apart from hand held housing 101 of reader 100, all of which are connected together via backbone 177. Server 176 in turn is in communication with a variety of additional spaced apart devices 150 that are spaced apart from hand held housing 101 of reader 100 and which through server 176 are in communication with optical reader 100. Server 176 may be connected via gateways 179, 180 and network 181 to a first distant remote local area network 185 located miles to thousands of miles away from local area network 170 and a second distant local area network 2170 also located miles to thousands of miles away from local area network. Network 170 may be located at a supplier's warehouse. Network 2170 may be located at a delivery destination; and network 185 may be located at a data processing/data archiving facility. Network 185 can be configured to assemble, store and maintain in server 184 various web pages accessible with use of optical reader 100, that summarize data that has been collected by various optical readers 100, 100', 100", 100R. Server 176 may alternatively or redundantly be connected to remote network 185 via private communication line 190. IP network 181 may be the Internet or a virtual private network (VPN). Remote LAN 185 may include a personal computer 186 and a remote server 184 connected via backbone 191. Remote LAN 185 may also include a wireless communication access point 193. Remote LAN 185 may also include a personal data assistant (PDA) 189. Remote LAN 2170 may include a server 2176, connected to IP network 181 via gateway 2179, backbone 2177, access point 2174, PC 2172, and optical reader 100, 100R. System 145 may be configured so that a display equipped device, e.g., device 100', 172, 186, 189 automatically displays data, such as decoded out bar code message data of a visual display color image frame of image data, received from optical reader 100 on its associated display 1504 when receiving that data.

All of the steps of process 1200 are carried out automatically in response to the receipt of a trigger signal. The steps of process 1200 continue automatically until a stop condition is satisfied. A stop condition may be e.g., the receipt of a trigger stop signal as may be generated by release of trigger 216 or the successful decoding of a predetermined number of bar code symbols. As indicated by return line 1211 of FIG. 14b, control circuit 552 may repeatedly attempt to obtain image data and attempt to decode decodable indicia therein until a stop condition is satisfied.

Interpolating monochrome pixel values for "missing pixels" pixel positions is particularly advantageous where a hybrid monochrome and color image sensor array according to the invention includes a high number of color sensitive pixels distributed at spaced apart pixel positions throughout image sensor array. In other instances as alluded to previously in connection with the flow diagram of FIG. 14b, control circuit 552 may obtain a decode frame of image data at step 1204 that is suitable for transferring to decode circuit 1702 by simply reading from an image sensor array image data from monochrome pixels 250M without interpolation of any pixel values at "missing pixel" pixel positions where an image sensor array of reader 100 is constructed in accordance with image sensor array 182A, and monochrome pixels 250M form a complete checkerboard pattern, (there are no "missing" monochrome pixels positions in the M×N matrix of monochrome pixels within image sensor array 182A). Accordingly, where optical reader 100 includes image sensor 182A, the decode frame of image data at step 1204 is advantageously obtained by reading out from image sensor array 182A image data from monochrome pixels 250M without interpolation of any further monochrome pixel values.

Figure 11:
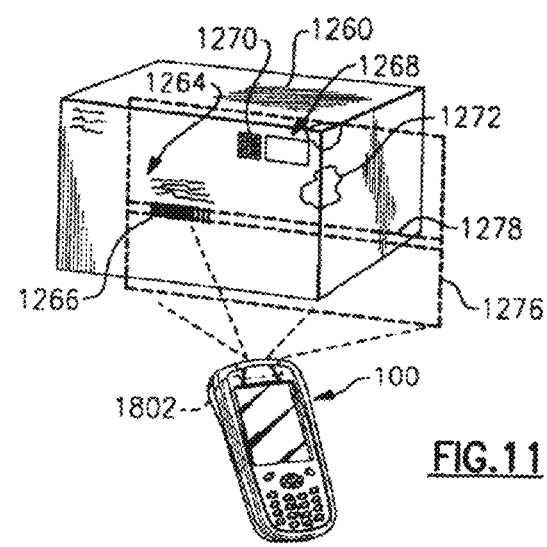
FIG. 11 is an application schematic view illustrating an optical reader according to the invention being operated to capture image data representing a parcel that carries a plurality of bar code symbols.

It may also be useful to obtain a decode frame of image data at step 1204 without interpolation of monochrome pixel values where optical reader 100 includes a linear bar code symbol optimized image sensor array 182B of one of the versions described in connection with FIGS. 5g-5j. In the versions of image sensor array 182B shown and described in connection with FIGS. 5g-5j, image sensor array 182B includes at least one "zone" of monochrome pixels 2500M and at least one "zone" of color sensitive pixels 2500C. Monochrome zone of pixels 2500M of a linear symbol decoding optimized version of image sensor array 182B generally comprises an elongated line of monochrome of pixels 250M having a minor dimension of one to a limited number of rows of pixels (which may be diagonal rows). Where optical reader 100 includes a linear symbol optimized version of image sensor array 182B a reduced area decode frame of image data at step 1204 without any "missing pixel" pixel positions can be obtained by selectively addressing pixels of monochrome zone 2500M and selectively reading out of image data from the pixels of monochrome zone 2500M without reading any image data from the pixels of color sensitive zone of pixels 2500C. More specifically, where optical reader 100 comprises a linear symbol optimized version of image sensor array 182B, control circuit 552 at step 1204 may obtain a reduced area monochrome frame of image data at step 1204 (FIG. 14b) and then transfer the reduced area monochrome frame of image data to decode circuit 1702 at step 1210. A reduced area frame of image data is further explained with reference to FIG. 11 illustrating an application where an optical reader 100 is utilized to collect decoded bar code data and image data from a parcel 1260 carrying various bar code symbols, e.g., linear bar code symbol 1266 and two-dimensional bar code symbol 1270. A full area frame of image data that may be obtained by optical reader 100 represents the scene area indicated by rectangular border 1276 of FIG. 11. Where image data from all pixels of image sensor array 182B are read out, a full area frame of image data is obtained. When optical reader 100 obtains a reduced area frame of image data, a reduced area frame of image data representing the reduced scene area as indicated by dashed-in border 1278 may be obtained. In the example of FIG. 11, optical reader 100 may incorporate one of the linear symbol optimized image sensor arrays 182B as shown in FIGS. 5g and 5h. A reduced area frame of image data representing the reduced scene area 1278 may be obtained by reading out image data from monochrome zone of thin center line monochrome zone 2500M of image sensor array 182B according to one of the versions of FIGS. 5g and 5h. It is seen with reference to FIG. 11 that when optical reader 100 obtains a reduced area frame of image data at step 1204 representing the reduced scene area 1278, the reduced area frame of image data, though reduced, can be of sufficient size to include a representation of linear bar code symbol 1266 carried by parcel 1260. Imaging module 1802 such as module 1802A (FIG. 8a) of reader 100 can be constructed so that aiming pattern 1838 (FIG. 8d) is projected onto scene area 1278 at expected reading angles, while aiming light sources 160a, 160b, and remaining light sources 160c-160t are energized simultaneously during the time that pixels of zone 2500M are exposed for read out of image data from zone 2500M. Simultaneously projecting aiming pattern 1838 and illumination pattern 1830 onto scene area 1278 improves the signal strength of image data corresponding to pixels of zone 2500M. After receiving the thin line reduced area frame of image data at step 1210, decode circuit 1702 may process the thin line reduced area decode frame of image data to decode linear bar code symbol 1266 by calculating the bar space widths of the bars and spaces of linear bar code symbol 1266 and then determining the characters of the symbol through table lookup. In a further aspect, optical reader 100 may be configured so that aiming pattern 1838 (FIG. 8d) is projected horizontally at a center of a field of view 1276 of optical reader 100 to coincide with area 1278 represented by the reduced area image obtained at step 1204 to aid an operator in obtaining an image that includes a representation of linear bar code symbol 1266. The frame rate of optical reader 100 when obtaining the reduced area decode frame of image data at step 1204 may be significantly reduced relative to the frame rate of optical reader 100 when obtaining a full frame of image data. Accordingly, a method of the invention where optical reader 100 at step 1204 obtains a reduced area frame of image data which is transferred to decode circuit 1702 is optimized for fast ("snappy") decoding. As has been described herein, color sensitive pixels 250C may be set to reset while monochrome pixels 250M are exposed for selective read out of image data from monochrome pixels 250M.

Figure 17A:
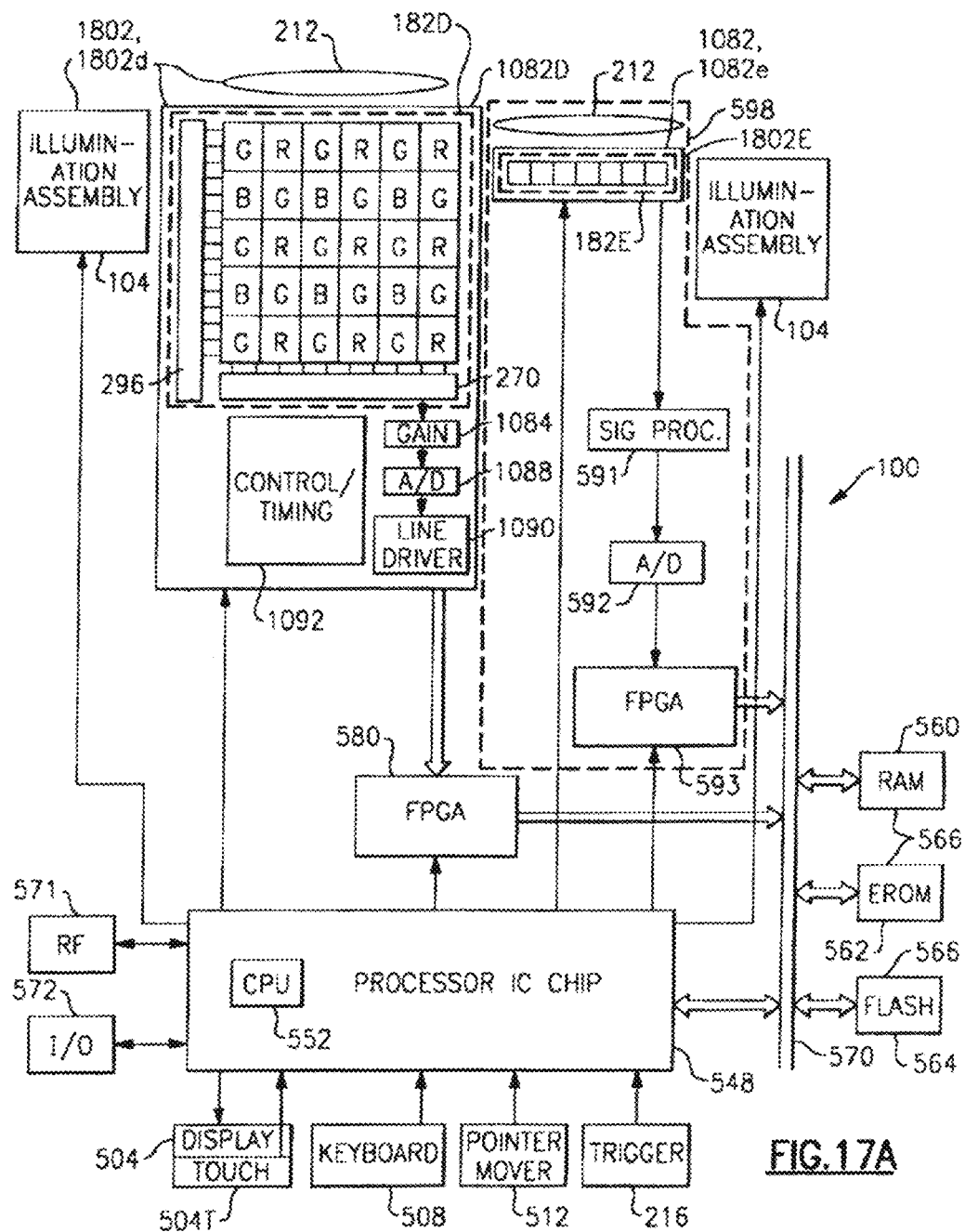
FIG. 17a is an electrical block diagram of an optical reader according to the invention having a plurality of imaging modules.
Figure 17B:
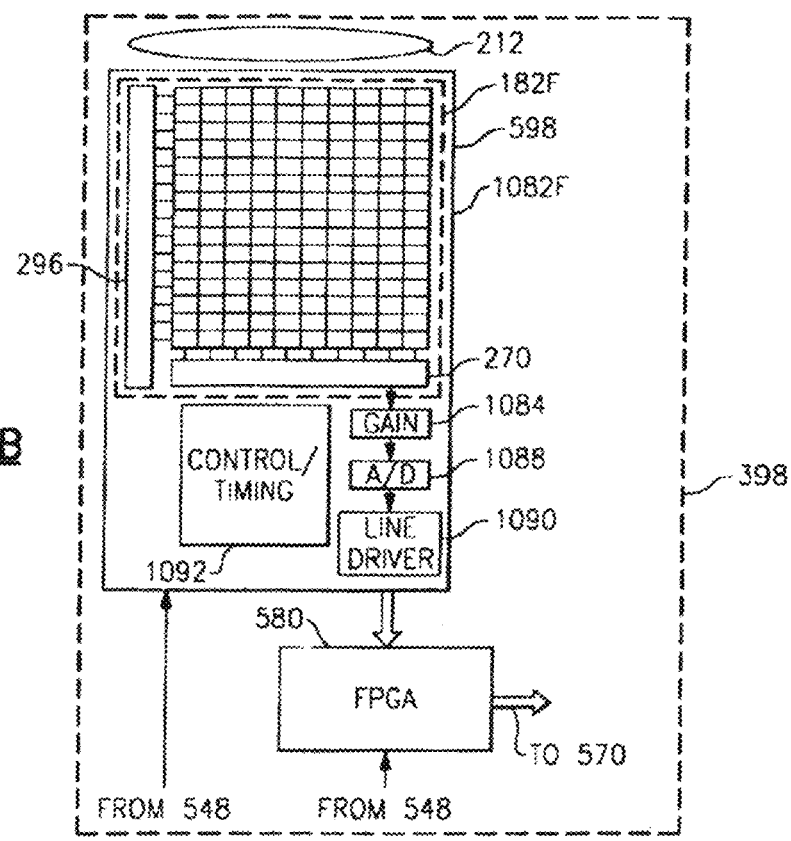

With further reference to the application view of FIG. 11, it is seen that the reduced area frame of image data representing scene area 1278 may not include a complete representation of linear bar code symbol 1266 and it is further seen that parcel 1260 may include or carry additional bar code symbols such as two-dimensional bar code symbol 1270 that is part of postal area 1268 of parcel 1260. According to the invention in another aspect, optical reader 100 can be configured so that where indicia decode circuit 1702 cannot successfully decode a bar code symbol via processing of a reduced area frame of image data or where control circuit 552 is programmed to search and decode multiple bar code symbols, control circuit 552 executes return line (FIG. 14b) to re-execute the obtaining of a decode frame of image data at step 1204. However, when control circuit 552 executes step 1204 the second time, control circuit 552 captures a frame of image data that represents a scene area that is larger than the scene area represented by the frame obtained during the first execution of step 1204. The decode frame of image data obtained by a second execution of step 1204 may be a full area image data frame representing the full field of view of optical reader 100 indicated by dashed-in border 1276 of FIG. 11. Where color zones 2500C of image sensor array 182B are distributed in a Bayer pattern, control circuit 552 during the second execution of obtain step 1204 may selectively read out image data from the green pixels of color sensitive zones of image sensor array of 2500C and interpolate green pixels values at non-green pixel positions utilizing the green pixel values so that the decode frame of image data obtained at step 1204 includes all green pixel values. Further, the missing pixel positions corresponding to monochrome zone 2500M can be filled in utilizing the image data obtained during the previous execution of step 1204 as scaled based on a relationship between the color scale values of pixels corresponding to zone 2500M and the color scale values of pixels surrounding zone 2500M. At step 1210, larger area green image data is transferred to indicia decode circuit 1702. Indicia decode circuit 1702 may attempt to decode linear bar code symbol 1266 and all other bar code symbols such as two-dimensional bar code symbol 1270 that may be represented in the image obtained during the second execution of step 1204. With reference to the application view of FIG. 11, optical reader 100 incorporating a linear symbol decode optimized to image sensor array 182B may attempt to decode linear symbol 1266 utilizing small area image representing area 1278 and then subsequently attempt to decode a two-dimensional bar code symbol, e.g., symbol 1270, utilizing a larger area frame of image data representing scene area 1276. It will be seen that the method described where control circuit 552 obtains a reduced area frame of image data, attempts to decode, then subsequently obtains a larger frame of image data and attempts to decode utilizing the larger image may be practiced utilizing an "all monochrome" image sensor array 182F as shown and described in connection with FIG. 17b. Where optical reader 100 incorporates an all monochrome image sensor array 182F as shown in FIG. 17b, it is particularly useful to set monochrome pixels 250M to reset that are not being selected for read out of a reduced area decode frame of image data at step 1204 during exposure periods for selected monochrome pixels 250M that are being selectively addressed for image data read out.

Monochrome pixels 250M transmit more light than color sensitive pixels 250C. Therefore, resetting monochrome sensitive pixels 250M that are not selectively addressed and which are adjacent to a region of interest during an exposure period can be expected to have a greater benefit in terms of improving the overall signal to noise ratio of reader 100 than resetting color sensitive pixels 250C that are adjacent to a region of interest during an exposure period.

Figure 12A:
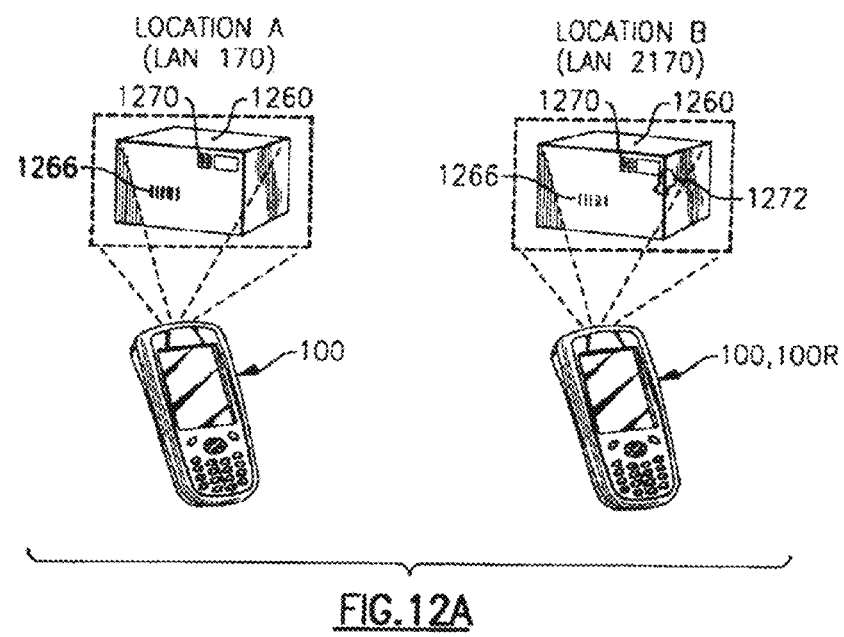
FIG. 12a is an application schematic view illustrating a first optical reader according to the invention and a second remotely located optical reader according to the invention being operated to take first and second digital pictures of a parcel at first and second locations that are a distance apart for purposes of determining whether the parcel was damaged during delivery from the first location to the second location.

With still further reference to the application view of FIG. 11, it may be advantageous to utilize optical reader 100 to obtain a visual display color frame of image data representing parcel 1260. For example, parcel 1260 may include a damaged area 1272. Obtaining a visual display color frame of image data corresponding to parcel 1260 creates a record documenting parcel damage. Referring to the application view of FIG. 12a, different optical readers 100 and 100R at different locations A and B located miles apart along a delivery route may be utilized to document physical transformations of parcel 1260 when parcel 1260 is carried along a delivery route. Optical reader 100 at location A including LAN 170 (FIG. 10) may be operated to obtain a visual display color frame of image data of parcel 1260 when parcel 1260 is located at location A. Further, the color frame may automatically be transferred to remote server 184 (FIG. 10) having a database 187 of color frames of image data that are indexed by a parcel identifier decoded in a parcel bar code symbol 1266 which identifier is also transmitted to remote server 184 automatically when optical reader 100 reads bar code symbol 1266. At location B remote optical reader 100, 100R (FIG. 10) may be utilized to again decode bar code symbol 1266 and capture visual display color frame of image data representing parcel 1266 and automatically transfer the parcel identifier corresponding to bar code 1266 and the color frame of image data to remote server 184. With reference to the application view of FIG. 12*a* the color frame of image data transmitted to remote server 184 from location B will include a representation of damaged area 1272 that is not included in the color frame of image data transmitted to remote server 184 from location A. Accordingly, a person (for example, at PC 172 viewing web pages of server 184) reviewing the parcel identifier indexed color frame data of database 187 can determine that the damage to parcel 1260 occurred during the time that the parcel was delivered from location A to location B. Referring to FIG. 12*b*, optical reader 100 can also be utilized to take color pictures of a delivery vehicle 1282 that carried parcel 1260 from location A to location B. In the example of FIG. 12*b*, a picture being taken by optical reader 100 has the field of view indicated by rectangle 1286. The field of view encompasses parcel 1260, and delivery vehicle 1282, including a license plate 1284. Trigger 216 can be actuated a first time to decode bar code symbols 1266, 1267 and then an additional time or times to have a picture of parcel 1260 and/or vehicle 1272 including a picture of license plate 1284. The decoded bar code data and multiple color frames of image data may be associated with one another into a single transaction data set, and then via a packet based transmission scheme, the transaction data set may be sent to remote server 184, which may organize the data into viewable web pages viewable at PC 172. Optical reader 100, which may be incorporated in hand held housing 101, can be configured so that all of the data of the transaction data set is sent to remote server 184 in response to a single command input to optical reader 100 via a user interface of reader 100 (e.g., 3170). Further aspects of optical reader 100 operating in a picture taking mode of operation are described with reference to the flow diagrams of FIGS. 14*c*, 14*g* and 14*h*.

Referring again to the flow diagram of FIG. 14*a*, a digital picture taking process 1400 is executed when optical reader 100 is configured to operate in a picture taking mode of operation. At step 1100, a picture taking mode of operation may be selected, e.g., by clicking on "image capture" icon 3164 (FIG. 9*b*) and at step 1104 picture taking process 1400 is executed.

Referring to the steps of picture taking process 1400, optical reader 100 at step 1402 receives a trigger signal as may be generated e.g., by depression of a manual trigger an object in the proximity of reader 100 being sensed or receipt of a serial command. At step 1403 control circuit 552 captures a plurality of "test" or parameter determination frames of image data. The frames of image data captured at step 1403 are not output for visual display; but rather are processed in order to determine operational parameters (exposure setting, gain illumination). Alternatively, step 1404 can be avoided and control circuit 552 can instead load operational parameters that were derived during a past image capture operation. At step 1404 control circuit 552 obtains a "visual display" image frame of image data. A visual display color frame of image data is one that is generated for visual display on a display and may include three color scale values for each pixel position of the plurality of pixel positions of the frame. A visual display frame after being obtained is sent to a display for visual display of an image or to a memory location for future display. In the embodiment of FIG. 14*c*, the image data obtained at step 1404 is not transferred to decode circuit 1702.

An image captured as part of obtaining at step 1404 may be one that is captured in accordance with the timing diagrams of FIGS. 15*a*-15*e*. In an alternative embodiment, the control signals input into image sensor IC chip 1082 for the capture of a frame of image data may not include illumination control timing pulse e.g., pulse 350. In many applications an object subject to image capture by optical reader 100 during a picture taking mode will be a long range image (an object will be subject to image capture is one that is one to several feet from image reader). Light from light sources 160 may have little affect on an image captured that corresponds to a long range object; thus, optical reader 100, in one embodiment may not send an illumination control timing pulse at step 1404.

However, depending on the application, it may be desirable to increase the illumination intensity of optical reader 100 during capture of color image data relative to the intensity during capture of monochrome image data to compensate for the signal reduction affect of color filter elements 260R, 260G, 260B, 260M, 260C. In a further aspect, optical reader 100 can have a plurality of operator selectable configuration settings. Optical reader 100 can be configured so that activation of button 3150 toggles through a sequence of options one of which may be selected by actuation of a key of keyboard 508. As shown by Table 3, where e=exposure, g=gain, and i=illumination intensity, a selection of a configuration setting can result in a differentiation between the imaging parameters of reader 100 during read out of monochrome image data at step 1204 and the imaging parameters of reader 100 during read out of color image data at step 1404. Configuration setting 1 is a base line setting wherein there is no differentiation between monochrome read out and color image data read out imaging parameters. Configuration setting 2 has been described above. With configuration setting 2, there is no illumination during read out of color image data at step 1404. Configuration setting 3 has also been described above. With configuration setting 3, illumination intensity is increased for read out of color image data. With configuration setting 4, illumination intensity for read out of monochrome image data can be increased. For example, as described herein, illumination pattern 1830 and aiming pattern 1838 can be projected simultaneously during read out of monochrome image data corresponding to a monochrome zone 2500M of pixels. With configuration setting 5, exposure time is boosted for read out of color image data and with configuration setting 6, gain is boosted for read out of color image data. Configuration setting 3 is highly useful where optical reader 100 includes a long distance flash illumination light source 160, 160X or where optical reader 100 is used for picture taking at close range.

TABLE 3

| Configuration | Imaging Parameters When Reading Out Monochrome Image Data At Decode Frame Obtain Step 1204 | Imaging Parameters When Reading Out Color Image Data At Visual Display Obtain Step 1404 |
| --- | --- | --- |
| 1 | $e = e_0$<br>$g = g_0$<br>$i = i_0$ | $e = e_0$<br>$g = g_0$<br>$i = i_0$ |

TABLE 3-continued

| Configuration | Imaging Parameters When Reading Out Monochrome Image Data At Decode Frame Obtain Step 1204 | Imaging Parameters When Reading Out Color Image Data At Visual Display Obtain Step 1404 |
|---|---|---|
| 2 | $e = e_0$<br>$g = g_0$<br>$i = i_0$ | $e = e_0$<br>$g = g_0$<br>$i = 0$ (Illumination Off) |
| 3 | $e = e_0$<br>$g = g_0$<br>$i = i_0$ | $e = e_0$<br>$g = g_0$<br>$i = i_1, i_1 > i_0$ |
| 4 | $e = e_0$<br>$g = g_0$<br>$i = i_2, i_2 > i_0$ | $e = e_0$<br>$g = g_0$<br>$i = i_0$ |
| 5 | $e = e_0$<br>$g = g_0$<br>$i = i_0$ | $e = e_1, e_1 > e_0$<br>$g = g_0$<br>$i = i_0$ |
| 6 | $e = e_0$<br>$g = g_0$<br>$i = i_0$ | $e = e_0$<br>$g = g_1, g_1 > g_0$<br>$i = i_0$ |

In executing the obtaining visual display color frame of image data step 1404, optical reader 100 may carry out a variety of alternative processes. With reference to the flow diagram of FIG. 14g, a process is described wherein optical reader 100 may obtain a visual display color frame of image data utilizing image data read out from color sensitive pixels 250C only. With reference to the flow diagram of FIG. 14h, a process is described wherein control circuit 552 obtains a visual display color frame of image data utilizing image data derived by reading out of image data from both monochrome pixels and color sensitive pixels of image sensor array 182.

Referring to the flow diagram of FIG. 14g, control circuit 552 at step 1405 captures a windowed frame of image data by selectively addressing color pixels 250C and by selectively reading out image data from color pixels 250C of image sensor array 182A, 182B. As explained previously herein, image sensor array 182A, 182B may include a separate reset control grid for resetting monochrome pixels 250M independent of color sensitive pixels 250C. At step 1405 while color sensitive pixels are exposed for read out of image data, monochrome pixels 250M may be reset with use of a reset control timing pulse 370, 370', 370'', 370''' (FIGS. 15a-15d). Coordinating a reset control timing pulse 370, 370', 370'', 370''' for resetting monochrome pixels with an exposure control timing pulse 354, 354', 354'', 354''' for controlling exposure of color sensitive pixels 250, 250C reduces cross talk resulting from light rays entering monochrome pixels 250M, i.e., by eliminating electron diffusion cross talk and by reducing cross talk attributable to light rays angularly penetrating through monochrome 250M.

At step 1406, optical reader 100 automatically transfers the color filter array image data frame captured at step 1405 to a demosaicing circuit 1706 (FIG. 1e). Taking as an input a color filter array image data frame, demosaicing circuit 1706 outputs a visual display color frame of image data. Where display 504 is a color display configured to receive red, green and blue (RGB) signals for each pixel of display 504, demosaicing circuit 1706 at step 1406 may generate RGB color scale values for each pixel of display 504 so that a frame output by demosaicing circuit 1706 is compatible with display 504. The color scale values may comprise e.g., 8 bits, 10 bits, or 12 bits of data. At step 1407, optical reader 100 receives a visual display color frame of image data from demosaicing circuit 1706.

A particular example of optical reader 100 executing step 1404 is described with reference to FIG. 16b. At step 1406 where optical reader 100 includes a hybrid monochrome color image sensor array 182A, 182B including a Bayer pattern color filter array as shown in FIG. 2c and FIG. 5a, optical reader 100 may read out an RGB Bayer pattern frame of image data as shown in FIG. 16b. Where a reader image sensor array is provided by image sensor array 182B including a 1280×1024, array of pixels, with a 320×256 subset array (P=4) of color sensitive pixels 250, 250C (P=4) dispersed in array 182B optical reader 100 at step 1405 captures a 320×256 Bayer pattern of pixels. Demosaicing circuit 170 processes the Bayer pattern frame 1502 as shown in FIG. 16b to output a visual display color frame of image data including a 320×256 color image, wherein each pixel of the frame includes a red color scale value, a green color scale value, and a blue color scale value. In such an embodiment, demosaicing circuit 1706, for each pixel of the Bayer pattern color filter array image data frame 5204, interpolates red, green, and blue values. Referring to frame 5204 shown in FIG. 16b, optical reader 100 determines a red value for red pixel position $P_{32}$ simply by reading the color scale value of pixel position $P_{32}$. Optical reader 100 determines a green value for red pixel $P_{32}$ by averaging the values of green pixel positions $P_{31}$, $P_{22}$, $P_{42}$ and $P_{33}$. Optical reader 100 may interpolate a blue value for red pixel position $P_{32}$ by averaging the values of blue pixel positions $P_{14}$ $P_{41}$, $P_{23}$, $P_{43}$. It will be seen that red, green, and blue values can be determined for each pixel position interpolating the pixel values as necessary. With increased processing speeds, it is possible to utilize dozens or more surrounding pixel values for interpolation of a red, green, or blue pixel for each pixel position.

In another aspect of the invention, the accuracy with which color scale values for each pixel position may be interpolated can be enhanced by utilizing monochrome pixel values in the color scale value interpolation process. Referring to red pixel position $P_{32}$ of frame 5204, it has been described that color scale values at green pixel positions $P_{31}$, $P_{22}$, $P_{42}$, $P_{33}$ may be averaged for interpolating a green color scale value at pixel position $P_{32}$. In another method, monochrome pixel values at positions $P_{33}$, $P_{22}$, $P_{42}$, $P_{33}$ may be utilized for enhancing the interpolation of a green pixel value at position $P_{32}$. The monochrome pixel values at positions $P_{33}$, $P_{22}$, $P_{42}$, $P_{33}$ may be interpolated from monochrome pixel values by one of the monochrome pixel interpolation methods described herein. Then, the color scale value at each pixel position, $P_{32}$, $P_{22}$, $P_{42}$, $P_{33}$ may be offset by a value, Delta, equal to the difference between the interpolated monochrome pixel values at the position being interpolated and the monochrome pixel value at the position contributing to the interpolation calculation. Thus, a green color scale value at position $P_{32}$ may be calculated according to Eq. A.

$$G(P_{32}) = \frac{[G(P_{31}) + Delta_{31}] + [G(P_{22}) + Delta_{22}] + [G(P_{42}) + Delta_{42}] + [G(P_{33}) + Delta_{33}]}{4} \quad \text{(Eq. A)}$$

Where $Delta_{31} = M(P_{32}) - M(P_{31})$, $Delta_{22} = M(P_{32}) - M(P_{22})$, $Delta_{42} = M(P_{32}) - M(P_{42})$, $Delta_{33} = M(P_{32} - M(P_{33})$.

Similarly, a blue color scale value at position $P_{42}$ may be interpolated according to the formula of Equation B.

$$B(P_{42}) = \frac{[B(P_{41}) + Delta_{41}] + [B(P_{43}) + Delta_{43}]}{2} \quad \text{(Eq. B)}$$

Where $Delta_{41} = M(P_{42}) - M(P_{41})$ and $$Delta_{43} = M(P_{42}) - M(P_{43})$$

An exemplary algorithm for interpolating a color scale value at a color pixel position utilizing monochrome pixel values is presented in Table 4 where "C-set" refers to color pixel values and "M-set" refers to monochrome pixel values.

TABLE 4

Algorithm For Interpolating Color Scale
Values Utilizing Monochrome Image Data

1) For each color pixel C for interpolation, select the missing color neighborhood C-set pixel values Ci and select the corresponding neighborhood M-set pixel values Mi.
   Select corresponding M-set pixel value M to color pixel C.
2) let C=0
3) for i=1 to n where n is the number of neighborhood pixel Ci
4) C=C+Ci+M−Mi
5) end
6) C=C/n Regarding step 1, it is noted that there will normally be two neighborhood color or "C-set" pixels where blue or red values are interpolated at a green pixel position, and in other cases four neighborhood color pixels.

Another particular example of optical reader 100 executing steps 1405 and 1406 is explained with reference to FIG. 16c. Where a reader image sensor array is provided by image sensor array 182B including 1280×1024 array of pixels, and a period P=4 of color sensitive pixels formed with a Cyan-Magenta (Cy-Mg, or "CM") color filter array as shown in FIG. 5b, optical reader 100 at step 1405 reads out a color filter array frame 5206 as shown in FIG. 16c. Color filter array image data frame 5206 includes a 320×256 pattern of Cy-Mg pixel values. Demosaicing circuit 1706 may process image data frame 5206 into a visual display frame such as a visual display color frame of image data where each pixel position of frame 5206 is represented by a combination of red, green and blue values. In processing the Cy-Mg visual display color frame 5206 into a frame of image data including red, green, and blue values for each pixel position, optical reader 100 may first calculate white, cyan and magenta values for each pixel position of frame 5206. Where an original pixel position such as pixel position $P_{53}$ (FIG. 16c) is a cyan pixel, the cyan value is determined by directly reading the pixel value of the cyan pixel. A magenta value for cyan pixel at position $P_{53}$ is calculated by interpolation utilizing the magenta values of surrounding pixel positions of magenta pixels such as positions $P_{52}$, $P_{43}$, $P_{63}$, $P_{54}$ (FIG. 16c). A white value for cyan pixel at position $P_{35}$ is calculated by interpolation using pixel values from monochrome pixel positions that surround cyan pixel $P_{53}$. Referring to FIG. 5b, a supplemental frame including monochrome pixel values may be captured, e.g., successively before or after frame 5206 is captured for purposes of interpolating a white value for each color pixel of the color filter array windowed frame 5206. Alternatively, the color filter array frame 5206 captured at step 1405 may include monochrome pixel image data for purposes of interpolating a white value for each color pixel value. When white, cyan and magenta values are calculated for each pixel of frame 5206, the white, cyan, and magenta values are readily converted into red, green, and blue values. Alternatively, display 504 can be configured to be responsive to white, cyan and magenta signals for each pixel of display 504. A set of transform equations for transforming a set of white, cyan and magenta values for a given pixel of a frame into a set of red, green and blue values for that pixel is given as follows.

$$R = W - Cy \quad \text{(Eq. 1)}$$

$$G = Mg + Cy - W \quad \text{(Eq. 2)}$$

$$B = W - Mg \quad \text{(Eq. 3)}$$

In the process described relative to the flow diagram of FIG. 14g, an original color filter array frame is processed into a visual display color frame of image data of reduced spatial resolution (a reduced spatial resolution 320×256 visual display color frame of image data may be produced using a hybrid monochrome and color image sensor array having a 1280×1024 pixel resolution). With reference to FIG. 14h, a process for producing a high spatial resolution visual display color image is described. In the process described relative to the flow diagram of FIG. 14h, optical reader 100 utilizes image data from both monochrome pixels 250M and color pixels 250C from a hybrid monochrome and color image sensor array such as image sensor array 182A or image sensor array 182B in the generation of a visual display color image having spatial resolution equal to or on the order of the overall pixel resolution of the image sensor array.

At step 1408 control circuit 552 captures a color filter array image data frame by selectively addressing color pixels 250C of an image sensor array and selectively reading out image data from color sensitive pixels 250M. The frame of image data captured at step 1408 is a windowed frame of image data. For reduction of cross talk resulting from light entering monochrome pixels 250M, the monochrome pixels of image sensor array 182A, 182B may be reset using reset control timing pulse 370, 370', 370", 370'" at the time that exposure control timing pulse 354, 354', 354", 354'" is applied to expose color pixels for capture of a color filter pattern image frame at step 1408.

At step 1409 control circuit 552 captures a monochrome frame of image data by selectively addressing monochrome pixels 250M of array 182A, 182B and selectively reading out image data from monochrome 280M pixels. The frame of image data captured at step 1409 is a windowed frame of image data. For reduction of cross-talk resulting from light entering color pixels 250C the color pixels of image sensor array 182 may be reset using reset control timing pulse 370, 370', 370", 370'" at the time that exposure control timing pulse 354, 354', 354", 354'" is applied to expose monochrome pixels for capture of a monochrome, typically gray scale or binarized image frame at step 1409.

At step 1410 control circuit 552 transfers both the color filter array frame captured at step 1408 and the monochrome image frame captured at step 1409 to fusion circuit 1708. Fusion circuit 1708 takes as inputs the color filter array image data frame and the monochrome image data frame and processes them into a high resolution visual display color frame of image data.

Referring to FIG. 14i, an example of the process 1440 which may be executed by fusion circuit 1708 (FIG. 1e) to process a combination of monochrome image data and color image data into a visual display color frame of image data is described. As explained with reference to FIG. 1e, fusion circuit 1708 may be physically embodied by the combination of a control circuit provided by a CPU 552 operating in combination with memory 566 that stores an executable program. The specific process described with reference to FIG. 14*i* is executed utilizing an optical reader 100 including substantially uniform dimensional pixel image sensor array 182B. At step 1442 of process 1440 control circuit 552 generates color filter array image data and monochrome gray scale image data. Where optical reader 100 includes image sensor array 182B, control circuit 552 may execute step 1442 by reading out from image sensor array 182B a single frame of image data comprising both monochrome image data and color image data. Control circuit 552 may also execute step 1442 by successively capturing a first monochrome frame comprising monochrome image data and then a second color frame comprising color image data. Control circuit 552 at step 1442 may drive monochrome pixels 250M into reset during an exposure period for read out of color image data from color sensitive pixels 250C. When generating a frame of monochrome image data at step 1442, control circuit may interpolate monochrome pixel values for "missing pixel" positions occupied by color sensitive pixels 250C.

At step 1446 control circuit 552 generates an RGB image having resolution equal to the color sensitive subset of pixels of image sensor array 182B. In an RGB image, each pixel of the image is represented by a red color value, a green color value and a blue color value. The RGB image generated at step 1446 may have the same characteristics as the visual display image received by optical reader 100 at step 1407 of the alternative process described in connection with FIG. 14*g*. Where a color filter array image captured at step 1442 is a Bayer pattern image, the RGB image generated at step 1446 is derived by executing a demosaicing routine as described herein. Where the color filter array image captured at step 1442 is a CMY image or a CM image (cyan and magenta only) image as described in connection with FIGS. 2*b* and 2*d*, the RGB image generated at step 1446 is derived by way of a transformation process as described herein in connection with equations 1, 2 and 3. With further reference to process 1440 which may be executed by fusion circuit 1708 control circuit 552 at step 1450 expands the pixel count of the RGB image generated at step 1446 so that the pixel count of the color image is equal to the pixel count of the monochrome image captured at step 1442 (at step 1442 monochrome pixels from the captured monochrome image may be interpolated as described with FIG. 16*a*). When control circuit 552 executes step 1450, the monochrome gray scale image generated at step 1442 and the color image at that stage of the processing have equal numbers of pixels such that each pixel position e.g., pixel of the monochrome image has a corresponding pixel position in the color image. With reference to image sensor array 182B having a period of P=2, there are four times as many monochrome pixels as there are color sensitive pixels. Accordingly, with image sensor array 182B having a period of P=2, control circuit 552 at step 1450 expands each pixel into a 2×2 pixel block. Where image sensor array 182B has a period P=3, control circuit 552 at step 1450 expands each pixel into a 3×3 pixel block. Where image sensor array 182B includes the period of P=4, control circuit 552 at step 1450 expands each pixel into a 4×4 pixel pixel block. At step 1454 control circuit 552 calculates an intensity value $I_c$ for each pixel position of the expanded color image. Control circuit 552 at step 1454 calculates an intensity value for each pixel position of the expanded color image according to the formula.

$$I_c = 0.299R + 0.587G + 0.144B \quad \text{(Eq. 4)}$$

Control circuit 552 at step 1460 then calculates an intensity value delta, D, for each pixel position, (Px, Py) utilizing a monochrome image intensity value $I_m$ and an expanded image color intensity value, $I_c$, at each pixel position. Control circuit 552 at step 1460 may calculate an intensity value delta for each pixel position of the monochrome and expanded color image according to the formula $$D(P_x,P_y) = I_m(P_x,P_y) - I_c(P_x,P_y) \quad \text{(Eq. 5)}$$

At step 1464, control circuit 552 updates the RGB data set color scale values of the expanded RGB color image using the set of formulas $$R'(P_x,P_y) = R(P_x,P_y) + D(P_x,P_y) \quad \text{(Eq. 6)}$$

$$G'(P_x,P_y) = G(P_x,P_y) + D(P_x,P_y) \quad \text{(Eq. 7)}$$

$$B'(P_x,P_y) = B(P_x,P_y) + D(P_x,P_y) \quad \text{(Eq. 8)}$$

At step 1468 control circuit 552 truncates RGB data set color scale values that are greater than 255 (where an 8 bit gray scale is used). After control circuit 552 truncates RGB values greater than 255, control circuit 552 at step 1770 outputs a visual display color frame of image data having a spatial resolution equal to or approximately equal to the overall pixel resolution of image sensor array 182B. The visual display color frame of image data output at step 1770 may have a number of RGB data sets equal to the overall pixel count (e.g., monochrome pixels plus color sensitive pixels) of image sensor array 182B.

At step 1411 optical reader 100 receives from fusion circuit 1708 a high resolution visual display color frame of image data. The visual display color frame of image data received at step 1411 may include a pixel resolution equal to or on the order of the pixel resolution of image sensor array 182B. Optical reader 100 may be regarded as having received a visual display color frame of image data when fusion circuit 1708 outputs a visual display color frame of image data at step 1470.

When executing process 1440, control circuit 552 fuses monochrome and color image data to produce a high resolution visual display color frame of image data. When executing the alternative process described with reference to the flow diagram of FIG. 14*j*, control circuit 552 fuses monochrome and color image data in such a manner that color reproduction is optimized.

In general, increasing the percentage of monochrome pixels 250M in image sensor array 182A, 182B increases indicia decoding accuracy, while increasing the percentage distribution of color sensitive pixels 250C in image sensor array increases color reproduction accuracy. Because of the light transmissivity of monochrome pixels, an image obtained utilizing an image sensor array having a higher percentage of monochrome pixels 250M has a higher signal to noise ratio than an image obtained utilizing an image sensor array having a smaller percentage of monochrome pixels 250M. Accordingly, an image obtained utilizing an image sensor array having a higher percentage of monochrome pixels often produces an image with greater detail and improved overall visual quality.

Figure 21:
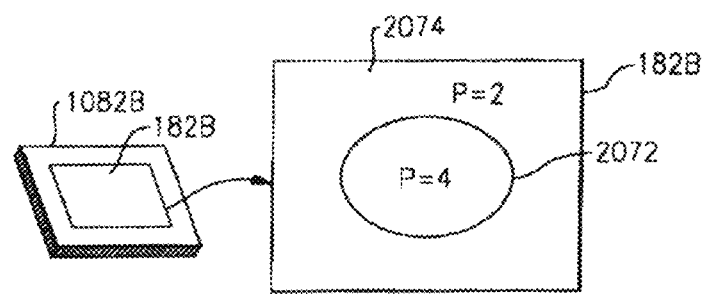
FIG. 21 is a schematic view of an image sensor integrated circuit chip incorporating an image sensor array having color sensitive pixels disposed therein with two different periods of distribution.

Optical reader 100 in another aspect may incorporate the structure shown in FIG. 2*l*. In FIG. 21, center pixels 2072 of reader image sensor array 182B have a higher percentage of monochrome pixels 250M, i.e., a period of P=4, as shown in FIG. 5*e*, while outer pixels 2074 have a lower percentage of monochrome pixels 250M, i.e., a period of P=2, as shown and described in FIG. 5*c*. The image sensor array 182B is constructed such that center pixels 2072 are optimized for providing image data yielding increased decoding accuracy while outer pixels 2074 are optimized for providing image data yielding increased color reproduction accuracy.

Referring to further steps of process 1400, control circuit 552 at step 1412 outputs the visual display color frame of image data obtained at step 1404. At step 1412 control circuit 552 may output a visual display color frame of image data to display 504 for visual observation by an operator or to a designated color frame storage memory location of reader 100 such as a designated frame memory storage location of Flash memory 564 or to another frame memory location of system 145. Where control circuit 552 is incorporated in hand held housing 101, control circuit 552 at step 1410 may also send a visual display color frame of image data to spaced apart device 150, as shown in FIG. 10. For sending a frame of image data to a spaced apart device 150, optical reader 100, the spaced apart device 150, and a communication link there between may be configured to transmit data packets in accordance with a protocol of the TCP/IP suite of protocols. Further, optical reader 100 may format the visual display color frame of image data obtained at step 1412 in a suitable image file format (e.g., .BMP, .TIFF, .PDF, .JPG, .GIF) and optical reader 100 may automatically send the visual display color frame of image data at step 1412 utilizing the file transfer protocol (FTP). Optical reader 100 at output step 1212 may format the visual display color frame of image data in a suitable image file format (e.g., .BMP, .TIFF, .PDF, .JPG, .GIF) when storing the visual display color frame of image data in memory 566 (which can be incorporated in hand held housing 101) or when sending the visual display color frame of image data to a spaced apart device 150 for storage. Optical reader 100 may also transmit a visual display color frame of image data utilizing a suitable markup language such as .XML. Referring to FIG. 10, system 145 may be configured so that when a display equipped spaced apart device 150 receives a visual display color frame of image data from optical reader 100, the spaced apart device 150 automatically displays that received visual display color frame of image data on a display 1504 associated with that device.

Optical reader 100 can be configured so that all the steps of process 1400 are carried out automatically in response to receipt of a trigger signal until a stop condition is satisfied. A stop condition may be the receipt of a trigger stop signal such as may be generated by the release of trigger 216.

In the embodiments of FIGS. 14a-14c, two actuations of a reader control button are made to carry out an indicia decode process and two actuations of a reader control button are made to carry out a picture taking process (one actuation of button 3162 or button 3164 to configure the reader 100 and then another actuation of trigger 216 to capture an image). It will be understood that optical reader 100 can be configured to carry out indicia decoding or picture taking with a single actuation of a reader control button. For example, optical reader 100 can be configured so that actuation of virtual button 3162 both configures reader 100 to decode and simultaneously generates a trigger signal to immediately commence image capture and decoding. Optical reader 100 can also be configured so that actuation of virtual icon button 3164 both configures a reader 100 for picture taking and simultaneously generates a trigger signal to immediately commence image capture.

While process 1200 and process 1400 may be carried out in the alternative, process 1200 and process 1400 may also be executed contemporaneously. For example, while control circuit 552 obtains a decode frame at step 1204, control circuit 552 may obtain a visual display color frame of image data at step 1404. Control circuit 552 may obtain a color frame of image data as a decode frame at step 1204 and then outputs that frame at step 1212 as visual display color frame of image data. Control circuit 552 at step 1412 may output a visual display color frame of image data and contemporaneously transfer that frame of image data to decode circuit 1702. In general, reader 100 may be configured so that whenever control circuit 552 obtains a decode frame at step 1204, control circuit 552 may store that frame for later processing, which processing may include processing for generating a visual display color frame of image data and which processing may be responsive to an operator input command to perform such processing. Optical reader 100 may also be configured so that when control circuit 552 obtains a visual display color frame of image data at step 1404, control circuit may store that frame for further processing, which processing may include transferring that frame to decode circuit 1702 or autodiscrimination circuit 1704, and which processing may be responsive to an operator input command to perform such processing.

Another embodiment of the invention is described with reference to FIGS. 17a-17g. In the embodiment of FIGS. 17a-17g optical reader 100 includes a pair of imaging modules 1802D and 1802E. Imaging module 1802D is a color imaging module having color image sensor array 182D. Color image sensor array 182D includes a Bayer pattern color filter with one of red, green or blue wavelength selective filter disposed on each pixel. Imaging module 1802E as shown in FIG. 17e is a monochrome imaging module having a one-dimensional solid state image sensor array 182E. One-dimensional monochrome image sensor array 182E in the embodiment of FIGS. 17a, 17e, 17f, and 17g includes an Mx1 (one row) array of monochrome (without color filter) pixels. One-dimensional image sensor array 182E may also include and MxN array of pixels, where M>>N, e.g., an M×2 (2 rows) of pixels.

The reader 100 shown in the electrical block diagram of FIG. 17a has many of the same components as shown in optical reader 100 of FIG. 1a. Namely, optical reader 100 of FIG. 17a includes a control circuit 552 provided in the example by a CPU, which operates under the control of program data stored in EPROM 562. Control circuit 552 is in communication with a memory unit 566 that includes in addition to EPROM 562, RAM 560, and Flash memory 564. Control circuit 552 further receives input control data from various user input devices such as manual trigger 216, pointer controller 512, keyboard 508 and touch screen 504T. Control circuit 552 may also output data such as decoded output data and visual display image data to color display 504. For capturing image data, control circuit 552 may control either image sensor array 182E or image sensor array 182D. For capturing one-dimensional image data corresponding to a one-dimensional slice image of a target, control circuit 552 sends various image capture initiating control signals to one-dimensional image sensor array 182E. In response to the image capture initiation control signals, image sensor array 182E sends analog image signals to signal processing circuit 591 which among various processing functions amplifies the signals and feeds the signals to analog-to-digital converter 592. Analog-to-digital converter 592 converts the signals into digital form and routes the digital image data to FPGA 593 which under the control of control circuit 552, manages the transfer of the digital information into RAM 560, where the monochrome image data can be accessed for decoding processing by control circuit 552. For capturing two-dimensional frames of color image data, control circuit 552 sends appropriate image capture initiation control signals (e.g., exposure, read out) to image sensor chip 1082. FPGA 580 receives digital image data from image sensor IC chip 1082, 1082D and under the control of control circuit 552 manages the transfer of color image data into RAM 560. Illumination assembly 104 for each module 1802D, 1802E may be controlled during image acquisition as explained with reference to the timing diagrams of FIGS. 15a-15e.

Optical reader 100 as shown in FIGS. 17a-17g may be operated in accordance with the flow diagram of FIGS. 17a-17g. Namely, by a suitable selection method such as by depressing icon 3162 or icon 3164 (FIG. 9b) one of a decode mode of operation and a color image capture mode of operation can be selected. However, in the dual imaging module embodiment of FIGS. 17a-17g, the imaging module which is utilized for capturing image data depends on which mode (indicia decoding, or picture taking) is selected. If the indicia decode mode is selected at step 1100 (FIG. 14a) and a trigger signal is received, optical reader 100 proceeds to step 1102 to execute indicia decode process 1200 (FIG. 14a). At step 1204 of indicia decode process 1200, control circuit 552 obtains a decode frame of image data. If the picture taking mode of operation is selected at step 1100 (FIG. 14a) and a trigger signal is received, control circuit 552 proceeds to step 1404 (FIG. 14c) to obtain a visual display color frame of image data. Where reader 100 includes two imaging modules, one color such as module 1802, 1802D having color image sensor array 182, 182D and one monochrome such as module 1802, 1802E having monochrome image sensor 182, 182E, the particular image sensor array 182 to which control circuit 552 sends control signals for initiating image capture depends on whether optical reader 100 is operating in a decode mode of operation or a picture taking mode of operation. With reference to the reader 100 of FIGS. 17a-17g, and the flow diagrams of FIGS. 14a, 14b and 14c, reader 100 at step 1204 sends image capture initiation control signals to monochrome one-dimensional image sensor array 182, 182E to initiate image capture without sending any image capture initiation control signals to color image sensor array 182, 182D if the reader 100 is operating in a decode mode operation. Reader 100 at step 1404 sends image capture initiation control signals to color image sensor array 182, 182D without sending any image capture initiation control signals to monochrome image sensor array 182, 182E if reader 100 is operating in a picture taking mode operation. Accordingly, where optical reader 100 is in an indicia decode mode and receives a trigger signal, a monochrome frame of image data is sent to RAM 560 for further processing by decode circuit 1702 (FIG. 10). Where optical reader 100 is in a picture taking mode and receives a control signal, a color image is sent to RAM 560. The color image if a Bayer pattern image is subject to a demosaicing process as described herein for generating a visual display color frame of image data, which visual display color frame of image data may be output by control circuit 552 e.g., to display 504 and/or a designated memory address of system 145 (e.g., memory 566 or another memory such as a memory of a spaced apart device 150), and/or to a display 1504 of a spaced apart device 150 of system 145 (FIG. 5).

When an image is captured by the two imaging module readers of FIGS. 17a-17g, the type of image capture (monochrome or color) depends on a selected operating mode. When an indicia decode mode is selected, a monochrome gray scale image well suited for decode processing is captured. When a picture taking mode is selected, a color image is captured which is well suited for visual display.

Figure 17C:
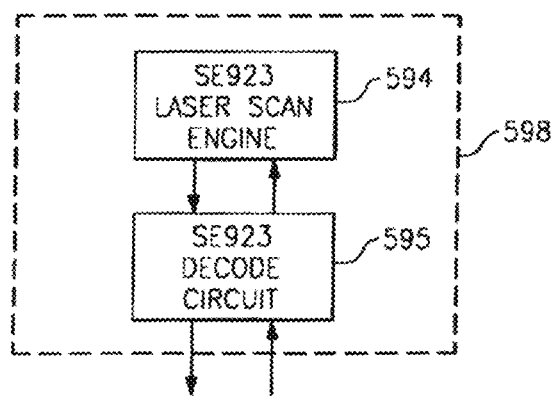

Further aspects of a dual imaging module reader are described with reference to FIGS. 17b-17g. FIGS. 17b and 17c illustrate that the hardware block 598 of reader 100 shown in FIGS. 17a, 17f, and 17g may be replaced with alternative hardware blocks. As indicated by FIG. 17b, hardware block 398 which in FIG. 17a includes a CCD one-dimensional solid state image sensor array 182E and off-board signal processing circuit 591, analog-to-digital converter 592 and FPGA 593 may be replaced by a hardware block including an CMOS image sensor IC chip 1082F including a monochrome image sensor array 182F. Image sensor IC chip 1082, 1082F is of construction similar to image sensor IC chip 1082, 1082A and IC chip 1082, 1082D except that image sensor array 182F of chip 1082F includes monochrome pixels 250, 250M only and is devoid of color sensitive pixels 250, 250C. FIG. 17c illustrates that imaging assembly hardware block 598 can be replaced with a laser scanning bar code engine 594 and an associated decode circuit 595. Laser scanning bar code engine 594 and associated decode circuit 595 may be available in a package known as an SE 923 decoded out scan engine available from Symbol Technologies. In the embodiment of FIG. 17c, steps 1210, 1212, 1214 of decode process 1200 are carried out by decode circuit 595.

Exemplary imaging modules supporting various types of image sensor IC chips are shown in FIGS. 17d and 17e. FIG. 17d shows an exemplary imaging module for supporting image sensor IC chip 182D. Imaging module 1082D includes the elements shown and described with reference to FIGS. 8a-8d except that imaging module 1082D includes image sensor IC chip 182D and further except that certain light sources are optionally deleted. Imaging module 1082E includes the elements shown and described with reference to FIGS. 8a-8e except that imaging module 1082E includes one-dimensional monochrome image sensor chip 182E and further except that certain light sources of illumination block 104 are optionally deleted. With module 1802E, aiming pattern 1838 (FIG. 8d) may serve as an aiming and illumination pattern. Further, it will be noted that illumination assembly 104 of an imaging module herein may include a flash illumination light source, 160, 160X (FIG. 9a). It may be particularly useful to incorporate a flash illumination into illumination assembly 104, where an imaging module 1082 is used primarily for capture of visual display color image.

Referring to FIGS. 17f and 17g construction views of dual imaging module readers incorporated in various optical reader housings are shown and described. In FIG. 17f a gun style optical reader 100 is shown having color two-dimensional imaging module 1802D and one-dimensional monochrome imaging module 1082E supported therein. In FIG. 17g a portable data terminal (PDT) optical reader 100 is shown having color two-dimensional imaging module 1802D and one-dimensional monochrome imaging module 1802E supported therein. The dual modules can also be installed in other types of housings such as cell phone housings (FIG. 9c) and personal data assistant housings (PDAs). In the examples of FIGS. 17f and 17g, imaging modules 1802 are supported by struts 597 formed on an interior wall 1802 of housing 101. Via ribbon connectors 598, the modules 1802 in each example are in communication with a main printed circuit board 599 which includes various electrical components including processor IC chip 548.

In one application, the optical reader 100 of FIGS. 17a-17g is operated in the following manner. An operator actuates color image sensor array 182D to take a color picture of parcel 1260 (FIGS. 11 and 12) carrying a bar code symbol

1266, 1270. Such actuation may be carried out, e.g., by depressing decode button 3164 and then trigger 216 or button 3164 only. An operator then actuates monochrome image sensor array 182E (or alternatively image sensor array 182F, or laser scan engine 594) to decode bar code symbol 1266, 1270. Such actuation may be carried out e.g., by depressing button 3162 and then trigger 216 or by depressing button 3162 only. Further, control circuit 552, which may be incorporated in hand held housing 101, may transmit a visual display color frame of image data representing parcel 1260 and decoded out messages corresponding to one or more of symbols 1266, 1270 to remote server 184 (FIG. 10). System 145 can be configured so that such transmission is automatic in response to trigger signals being received, or optical reader 100 can be configured so that associated color picture data and decoded out bar code message data are transmitted in response to receipt of a user-initiated command input into a user-interface of optical reader 100 to transmit associated picture and decoded bar code message data.

With further reference to the reader electrical block diagram shown in FIG. 1*a*, various useful optical reader embodiments may be yielded by reconfiguration of hardware block 208 including an image sensor array. With reference to FIG. 18*a*, an optical reader 100 having the hardware components shown in FIG. 1*a* may be modified to include an image sensor array 182C as shown and described in connection with FIG. 18*a*. In the embodiment of FIG. 18*a*, optical reader 100 includes cyan-magenta-yellow (CMY) color filter array 182C. Each pixel 250 of image sensor array 182C includes a color filter element; namely one of a cyan color filter element, a magenta color filter element or a yellow color filter element. Yellow color filter elements have excellent light transmittance (approaching the transmittance of a monochrome pixel). Further, it is seen that in accordance with the CMY color filter pattern shown in FIG. 18*a* that approximately 50% of all pixels of image sensor array 182C are yellow pixels (pixels having a yellow light wavelength sensitive filter element). In the specific example of FIG. 18*a*, image sensor array 182C having cyan, magenta and yellow pixels is devoid of green pixels. However, image sensor arrays are available which have green pixels in addition to cyan, magenta and yellow pixels. Image sensor array 182C may be incorporated into an optical reader 100 that operates in accordance with the picture taking mode/indicia decode mode flow diagram described in connection with FIG. 14*a*. That is, when driven into a indicia decode mode of operation as described in connection with FIG. 14*b*, optical reader 100 including CMY color image sensor array 182C obtains a decode frame of image data whereas when optical reader 100 including image sensor array 182C is driven into a picture taking mode of operation, optical reader 100 obtains a visual display color image frame of image data as described in connection with FIG. 14*c* herein.

According to the invention, an optical reader including a CMY image sensor array 182C as shown in FIG. 18*a* may obtain image data in a manner that depends on which operational mode (indicia code or picture taking) is selected. Where optical reader 100 including CMY image sensor array 182C obtains a decode frame of image data at step 1204, control circuit 552 of optical reader 100 can selectively address yellow color pixels of CMY image sensor array 182C and selectively read out image data only from yellow colored pixels of image sensor array 182C. With further reference to a reader including image sensor array 182C, control circuit 552 at step 1204 may interpolate missing pixel values corresponding to the pixel positions of magenta and cyan pixels of image sensor array 182C. After interpolating the missing pixel positions, control circuit 552 at step 1210 may transfer the interpolated decode frame to one of indicia decode circuit 1702 or autodiscrimination circuit 1704.

In a further aspect of the optical reader described in connection with FIG. 18*a* including a CMY color image sensor array 182C, image sensor array 182C may include separate and independent reset control lines for facilitating the reset of magenta (labeled "Mg") and cyan (labeled "Cy") pixels independent from the resetting of yellow pixels (labeled "Y"). Accordingly, when image data at step 1204 is read out selectively from yellow pixels, the magenta and cyan pixels of image sensor array 182C may be driven into reset to eliminate electron diffusion cross talk and to reduce cross talk attributable to photons entering image sensor array 182C through magenta and cyan color pixels 250C.

When obtaining a visual display color frame of image data as described at step 1404 of the flow diagram FIG. 14*c* an optical reader including image sensor array 182C may simply read out image data from all of the pixels of the array 182C and execute a simple demosaicing algorithm to convert a single color value for each pixel of image sensor array 182C into a visual display color image wherein each pixel of image sensor array 182C is represented by a data set including three color scale values, e.g., a cyan color scale value, a magenta color scale value and a yellow color scale value.

Control circuit 552 at step 1404 where the reader includes a CMY image sensor array 182C may transform the CMY visual display image into an RGB visual display image utilizing a CMY to RGB transformation process as described herein.

The performance of optical reader 100 may be hindered where optical reader 100 is operated to read bar code symbols or other indicia disposed on a substrate having a shiny surface (e.g., metal, glass, laminated, plastic, etc.). Light rays emanating from light sources 160 of reader 100 that are projected on a highly reflective shiny surface of a substrate, s, may be substantially entirely reflected directly on to image sensor array 182. "Specular" reflection is said to occur where a substantial percentage of light rays are reflected and directed onto image sensor array 182. Light rays are said to be reflected at a "specular angle" when light rays are reflected from a surface at about the angle of incidence. Specular reflection tends to saturate image sensor array 182 to cause decoding failures. The optical reader 100 described in connection with FIGS. 19*a-c* is configured so that read errors resulting from specular reflection are reduced. As shown and described in connection with FIG. 19*a*, hardware block 208 shown in FIG. 1*a* as including a hybrid monochrome in color image sensor array 182A can be replaced with hardware block 208 as shown in FIG. 19*a* including a hybrid monochrome and polarizer filter image sensor array 182G.

Image sensor array 182G includes a first subset of monochrome pixels 250M and a second subset of light polarizing pixels 250P. Light polarizing pixels 250P of image sensor array 182G include light polarizing filter elements 261 (alternatively termed "light polarizing filters," or simply "light polarizers") typically formed at each polarizing pixel 250P in the position of filter 260 as shown in the color pixel views of FIGS. 3*c* and 6*c*. Light polarizing filter elements 261 of image sensor array 182G, 182H can be deposited onto the major body of light polarizing pixels 250P by way of a depositing process. Light polarizing filter elements 261 of image sensor array 182G can be constructed to attenuate polarized light rays generated from an appropriately polarized light source and reflected at a specular angle. Accordingly, polarized light rays incident on the image sensor array on the polarizing pixels 250P are attenuated significantly; thus, reducing the contribution of specularly reflected light rays to generated image signals from the polarizing pixels 250P.

According to the invention, optical reader 100 including image sensor array 182G may be configured to selectively address light polarizing pixels 250P and selectively read out image data from light polarizing pixels 250P to generate image data for subjecting to decoding which is likely to result in successful reading of bar codes or other indicia notwithstanding the image data being obtained during specular reflections read conditions.

Referring to FIG. 19b, a perspective view of light polarizing image sensor array 182G is shown with an exploded view showing a pattern which may be repeated throughout the array. In the version of FIG. 19b, light polarizing pixels 250P having light polarizing light filter elements 261 are uniformly distributed throughout image sensor array 182G with a period of P=2. It will be understood that light polarizing pixels 250P may also be distributed throughout image sensor array 182G in a uniform or substantially uniform distribution pattern other than the pattern shown in FIG. 19b. For example, light polarizing pixels 250P may be distributed throughout image sensor array 182G with a distribution pattern of P=3, (as described in connection with FIG. 5d showing a hybrid monochrome and color image sensor array) or a distribution pattern having the period of P=4, as illustrated with reference to hybrid monochrome and color image sensor array as shown in FIG. 5e.

Referring to the view of FIG. 9b, optical reader 100 may be operated in a mode in which optical reader 100 captures image data by selectively addressing polarizing pixels 250P and selectively reading out image data from light polarizing pixels 250P only. Optical reader 100 may be configured to have a reduced specular reflection read error decode mode. Optical reader 100 can be configured so that when button 3156 is actuated, optical reader 100 receives a trigger signal to obtain image data that is likely to result in successful reading notwithstanding specular reflection reading conditions.

Referring to the flow diagram of FIG. 19c, optical reader 100 at step 1902 may receive a trigger signal to commence operation in a reduced specular reflection read error decode mode. The trigger signal may be received pursuant to a manual control by an operator such as an actuation of control button 3156. Control circuit 552 may also be configured to receive the trigger signal at step 1902 when control circuit 552 automatically senses a predetermined condition such as a saturation condition. Control circuit 552 at step 1902 may determine that a saturation condition is present by analysis of image data at step 1204 (FIG. 14b) during normal decoding operations so that when a saturation condition is detected, optical reader 100 automatically commences operation in a reduced specular reflection read error decode mode. In a specific embodiment of the invention, control circuit 552 may determine that a saturation condition is present when an average white value of monochrome image data is below a predetermined level.

At step 1904 optical reader 100 obtains a specular reflection read condition decode frame of image data. Control circuit 552 obtains a specular reflection condition decode frame of image data at step 1902 by selectively addressing light polarizing pixels 250P of image sensor array 182G and selectively reading out image data from light polarizing pixels 250P only. In another aspect of image sensor array 182G that may be incorporated in optical reader 100, image sensor array 182G may include separate reset control lines for resetting monochrome pixels 250M separately and independently of light polarizing pixels 250P. Image sensor array 182G may have separate sets of reset control lines as described in connection with image sensor array 182G, particularly in connection with FIG. 7a.

Accordingly, when control circuit 552 selectively addresses light polarizing pixels 250P for read out of image data from light polarizing pixels 250P, control circuit 552 drives monochrome pixels 250M into reset. Resetting of monochrome pixels 250M is synchronized with the exposure period for exposing light polarizing pixels 250P as described herein. Driving monochrome pixels 250M into reset while light polarizing pixels 250P are exposed eliminates electron diffusion cross talk and reduces cross talk resulting from photon penetration to image sensor array 182G.

At step 1904, control circuit 552 may interpolate pixel values at pixel positions corresponding to missing pixel positions. At step 1906 control circuit 552 transfers the specular reflection condition decode frame of image data obtained at step 1904 to indicia decode circuits 1702 or autodiscrimination circuit 1704 as are described in connection with FIG. 1e.

At step 1908 control circuit 552 receives decoded output data output by decode circuit 1702 or signature autodiscrimination circuit 1704. At step 1910 control circuit 552 outputs decoded out data, e.g., by transferring decoded out data to an on reader display 504 or to a spaced apart display 1504 or else stores decoded data in appropriate memory address location of system 145 (FIG. 10).

A process has been described with reference to the flow diagram of FIG. 19c wherein control circuit 552 selectively reads out monochrome pixel image data from monochrome pixels 250M and selectively reads out image data from light polarizing pixels 250P. An optical reader including hybrid monochrome and light polarizing image sensor array 182G may also be operated without selectively reading out image data from image sensor array 182G. An optical reader incorporating hybrid monochrome and light polarizing image sensor array 182G can be operated to decode decodable indicia and to take pictures in accordance with the process described with reference to the flow diagrams of FIGS. 14a, 14b, and 14c. In obtaining a decode frame of image data (step 1204, FIG. 14b), control circuit 552 may read out image data from all pixels of hybrid monochrome and light polarizing image sensor array 182G including image data from all monochrome pixels 250M and all light polarizing pixels 250P in a single frame capture step. The full frame monochrome and light polarizer pixel image data can also be captured with two frame capture steps. At step 1210, control circuit 552 may transfer to decode circuit 1702 or autodiscrimination circuit 1704 the full frame of monochrome and polarized pixel image data obtained at step 1204. If decode circuit 1702 or autodiscrimination circuit 1704 fails to decode or fails to detect the presence of handwritten characters, control circuit 552 may, after step 1210, transfer a subset of full frame of image data originally transferred at step 1210. Namely, after step 1210, if decoding or autodiscrimination fails, control circuit 552 may transfer to decode circuit 1702, or autodiscrimination circuit 1704 a reduced resolution image extracted from a full frame image by selectively extracting monochrome image data from the full frame of image data. The reduced resolution frame of image data includes only image data corresponding to light polarizing pixels 250P of image sensor array 182G. The failure of decode circuit 1702 to decode or autodiscrimination circuit to recognize may be regarded as a determination by control circuit 552 that a saturation condition is present.

The elements of a hybrid monochrome and color image sensor array (such as image sensor array 182A or 182B) as described herein can be combined with the elements of a hybrid monochrome and light polarizing image sensor array 182G into a single image sensor array. FIGS. 20a and 20b show an image sensor array 182H including a first subset of monochrome pixels 250M, a second subset of color sensitive pixels 250C and a third subset of light polarizing pixels 250P. Image sensor array 182H may include three separate sets of reset control lines to enable separate and independent of resetting of monochrome pixels 250M, of color sensitive pixels 250C and of light polarizing pixels 250P. Image sensor array 182H may be incorporated in hand held optical reader 100 and may be substituted for hardware block 208 as shown in FIG. 1a. Optical reader 100 incorporating image sensor array 182H may have operating modes in which optical reader separately addresses monochrome pixels 250M for read out of image data from monochrome pixels 250M only. Optical reader 100 including image sensor array 182H may also have an operating mode in which optical reader 100 selectively addresses color sensitive pixels 250C and selectively reads out image data from color sensitive 250C. Optical reader 100 may also have an operating mode in which optical reader 100 selectively addresses light polarizing pixels 250P and selectively reads out image data from light polarizing pixels 250P. Optical reader 100 may obtain a full frame of image data including monochrome, color and light polarizing pixels image data (obtained with one, two, or three frame capture steps) and then utilize the image data on an as needed basis. For example, if a decode attempt utilizing the full frame image data fails, optical reader 100 may selectively extract light polarizing pixel image data from the full frame image data and transfer the extracted image data to decode circuit 1702.

In general, optical reader 100 including image sensor array 182H selectively reads out image data from monochrome pixels 250M in obtaining a decode frame of image data for transferring to a decode circuit 1702 under normal read conditions. Optical reader 100 selectively reads out image data from color sensitive pixels 250C when obtaining image data for use when obtaining a visual display color frame of image data. Optical reader 100 selectively reads out image data from light polarizing pixels 250P, or selectively extracts image data corresponding to pixels 250P from a frame of image data when optical reader 100 senses that a specular reflection is present or when an operator pursuant to operator control drives optical reader 100 into a reduced specular reflection read error decode mode of operation. An optical reader 100 including image sensor array 182H may operate in accordance with the picture taking and decode mode flow diagram as described in connection with FIG. 14a and may execute the reduced specular reflection read error decode mode decoding process described in connection with FIG. 19c.

Figure 8F:
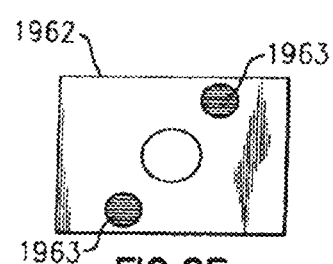

For enhancing the performance of an optical reader according to the invention, having an image sensor array such as image sensor array 182G, 182H including light polarizing filters, optical reader 100 may incorporate emit optics light polarizers (which may alternatively be termed "light polarizing filter elements" or "light polarizing filters"). For example, a reader imaging module, e.g., module 1802A can include an optical plate 1962 as shown in FIG. 8f which may be disposed forwardly of circuit board 1806 as shown in FIG. 8a. Optical plate 1962 can incorporate light polarizers 1963 which polarize light from light sources 160S, 160T, that can be selectively energized when capturing images utilizing polarizing image sensor array 182G, 182H. Light polarizers 1963 can be cross-polarized relative to the polarizing filter elements 261 of image sensor array 182G, 182H. Optical plate 1962 can include other such elements as optical diffusers (not shown) for diffusing light rays emitted by light sources 160C-160T.

Further aspects of indicia decode circuit module 1702 and autodiscrimination circuit module 1704 are described with reference to FIGS. 22a-22i. Indicia decode circuit 1702 (which may be a bar code symbol dataform decode circuit) when receiving image data transferred by control circuit 552 may search the image data for markers, such as a quiet zone, indicative of the presence of a dataform, such as a one or two-dimensional bar code. If a potential decodable indicia (dataform) is located, the decode circuit 1702 applies one or more indicia decoding algorithms to the image data. If the decode attempt is successful, the optical reader outputs decoded dataform data. All of the circuits (modules) described with reference to FIG. 22a can be incorporated in housing 101. Further, all of the circuits of FIG. 22a can be embodied by the combination of control circuit 552 and memory 566.

Figure 22A:
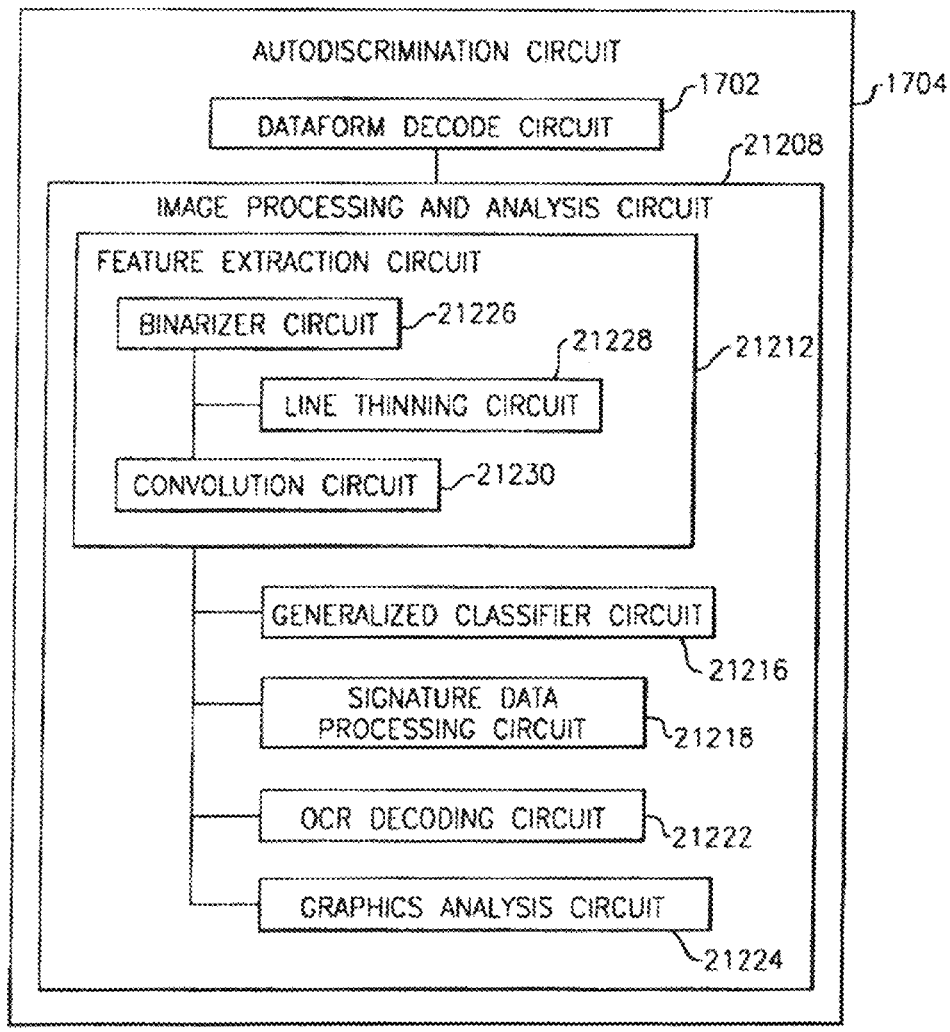
FIG. 22a is a schematic block diagram of an autodiscrimination circuit which may be utilized with the invention.

Optical reader 100 may also include an autodiscriminating circuit 1704. Referring to FIG. 22a, autodiscriminating circuit 1704 may incorporate a decode circuit 1702 and an image processing and analysis circuit 21208, that are in communication with one another.

As shown in this embodiment, the image processing and analysis circuit 21208 comprises a feature extraction circuit 21212, a generalized classifier circuit 21216, a signature data processing circuit 21218, an OCR decode circuit 21222, and a graphics analysis circuit 21224 that are in communication with each other. In addition, as shown in FIG. 22a, the feature extraction circuit 21212 comprises a binarizer circuit 21226, a line thinning circuit 21228, and a convolution circuit 21230 that are in communication with each other.

FIG. 22b shows a process 21300 for employing one embodiment of the invention utilizing the autodiscrimination circuit shown in FIG. 22a. The process 21300 comprises an image reader recording an actuation event (step 21302), such as a receipt of a trigger signal, and in response at step 21304, collecting (obtaining) image data from a target with the optical reader 100. The collecting of image data step may be in accordance with step 1204 (FIG. 14b). After collection, the image data is transferred (step 21308) to the decode circuit 1702. The dataform decode circuit searches (step 21310) the image data for markers, such as a quiet zone, indicative of the presence of a dataform, such as a one or two-dimensional bar code. If a potential dataform is located, the decode circuit 1702 applies (step 21314) one or more dataform decoding algorithms to the ensuing image data. If the decode attempt is successful, the optical reader 100 outputs (step 21318) decoded dataform data and signals (step 21322) a successful read with an alert, such as a beep tone.

In one embodiment if the decode attempt is not successful, the image data is transferred (step 21326) to the image processing and analysis circuit 21208. In another embodiment, the image data is processed in parallel with the attempt to decode the dataform data. In one such embodiment, the process that completes first (i.e., dataform decode attempt or the image processing) outputs its data (e.g., a decoded bar code or a captured signature) and the other parallel process is terminated. In a further embodiment, the image data is processed in response to the decoding of the dataform. In one such embodiment, a bar code encodes item information such as shipping label number and information indicating that a signature should be captured.

Within the image processing and analysis circuit 21208, the image data is processed by the feature extraction circuit 21212. In general, the feature extraction circuit generates numeric outputs that are indicative of the texture of the image data. As indicated above, the texture of the image data refers to the characteristics of the type of data contained in the image data. Common types of texture include one or two-dimensional bar code texture, signature texture, graphics texture, typed text texture, handwritten text texture, drawing or image texture, photograph texture, and the like. Within any category of texture, sub-categories of texture are sometimes capable of being identified.

As part of the processing of the image data by the feature extraction circuit 21212, the image data is processed (step 21328) by the binarizer circuit 21226. The binarizer circuit 21226 binarizes the grey level image into a binary image according to the local thresholding and target image size normalization. With the image data binarized, the image data is processed (step 21332) by the line thinning circuit 21228 to reduce multi-pixel thick line segments into single pixel thick lines. With binarized line thinned image data, the image data is processed (step 21336) by the convolution circuit 21230.

Figure 22C:
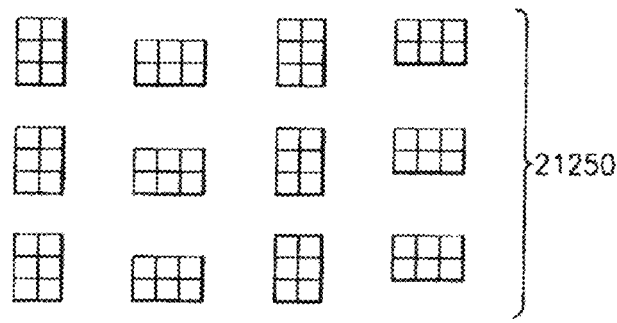
FIG. 22c shows one embodiment of a plurality of curvelent detector maps which may be utilized with the invention.

In general, the convolution circuit 21230 convolves the processed image data with one or more detector maps designed according to the invention to identify various textural features in the image data. In one embodiment, the convolution circuit 21230 generates a pair of numbers, the mean and variance (or standard deviation), for each convolved detector map. FIG. 22c shows a set of 12 2×3 binary curvelet detector maps 21250 used to detect curved elements present in image data. As each of the curvelet detector maps 21250 is convolved with the image data, the mean value and the variance generated provide an indication of the presence or density of elements in the binarized line thinned image data having similar shapes to the curvelet detector maps 21250. As each pixel map generates a pair of numbers, the 12 curvelet detector maps 21250 generate a total of 24 numbers. According to one embodiment, these 24 numbers are representative of the curved or signature texture of the processed image data.

Further processing of the image data includes the outputs from the feature extraction circuit 21212 being fed (step 21340) into the generalized classified circuit 21216. The generalized classifier circuit 21216 uses the numbers generated by the feature extraction circuit as inputs to a neural network, a mean square error classifier or the like. These tools are used to classify the image data into general categories. In embodiments employing neural networks, different neural network configurations are contemplated in accordance with the invention to achieve different operational optimizations and characteristics. In one embodiment employing a neural network, the generalized classifier circuit 21212 includes a 24+12+6+1=43 nodes Feedforward, Back Propagation Multilayer neural network. The input layer has 24 nodes for the 12 pairs of mean and variance outputs generated by a convolution circuit 21230 employing the 12 curvelet detector maps 21250. In the neural network of this embodiment, there are two hidden layers of 12 nodes and 6 nodes respectively. There is also one output node to report the positive or negative existence of a signature.

Figure 22D:
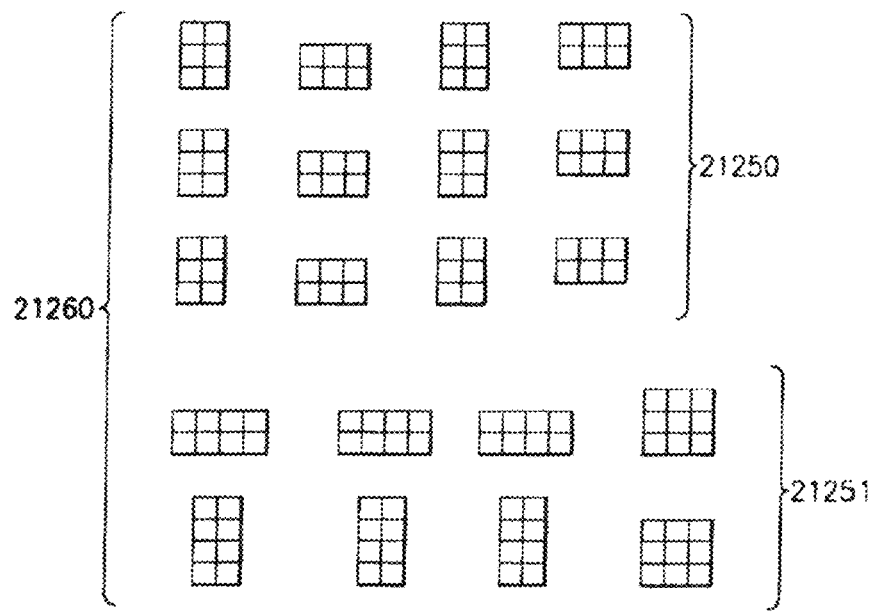
FIG. 22d shows another embodiment of a plurality of curvelent detector maps which may be utilized with the invention.

In another embodiment employing a neural network, the 20 curvelet detector maps 21260 shown in FIG. 22d are used by the convolution circuit 21230. As shown, the 20 curvelet detector maps 21260 include the original 12 curvelet detector maps 21250 of FIG. 22c. The additional 8 pixel maps 21260 are used to provide orientation information regarding the signature. In one embodiment employing the 20 curvelet detector maps 21260, the generalized classifier circuit 21212 is a 40+40+20+9=109 nodes Feedforward, Back Propagation Multilayer neural network. The input layer has 40 nodes for the 20 pairs of mean and variance outputs generated by a convolution circuit 21230 employing the 20 curvelet detector maps 21260. In the neural network of this embodiment, there are two hidden layers of 40 nodes and 20 nodes respectively, one output node to report the positive or negative existence of a signature, and 8 output nodes to report the degree of orientation of the signature. The eight output nodes provide $2^8=256$ possible orientation states. Therefore, the orientation angle is given in degrees between 0 and 360 in increments of 1.4 degrees.

In some embodiments, the generalized classifier circuit 21216 is capable of classifying data into an expanded collection of categories. For example, in some embodiments the generalized classifier circuit 21216 specifies whether the image data contains various data types such as a signature; a dataform; handwritten text; typed text; machine readable text; OCR data; graphics; pictures; images; forms such as shipping manifest, bill of lading, ID cards, and the like; fingerprints, biometrics such as fingerprints, facial images, retinal scans and the like, and/or other types of identifiers. In further additional embodiments, the generalized classifier circuit 21216 specifies whether the image data includes various combinations of these data types. In some embodiments, the general classifier circuit 21216 specifies whether the image data contains a specified type of data or not. In one such embodiment the image processing and analysis circuit 21208 is contained within an identification circuit that outputs an affirmative or negative response depending on the presence or absence of the specified data type, such as a signature or a biometric in the image data.

Figure 22E:
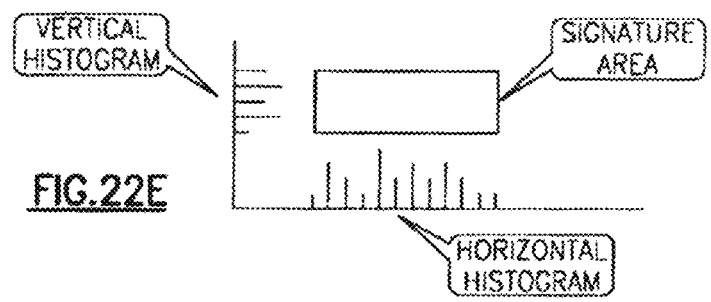
FIG. 22e is a diagrammatic representation of a histogram analysis which may be performed in one embodiment of the invention.

In one embodiment once the presence of a signature has been confirmed and its general orientation determined, image data is transferred (step 21344) to the signature data processing circuit 21218. In one embodiment, the signature data processing circuit 21218 is used to detect the boundaries of the signature in the image data. In one embodiment, the signature boundary is detected using a histogram analysis. As shown in FIG. 22e, a histogram analysis consists of a series of one-dimensional slices along horizontal and vertical directions defined relative to the orientation of the signature. In one embodiment, the value for each one-dimensional slice corresponds to the number of black (i.e., zero valued) pixels along that pixel slice. In some embodiments if no bar codes have been decoded, then some specified region of the full frame of image data, such as a central region is captured for signature analysis. Once completed, the histogram analysis provides a two-dimensional plot of the density of data element pixels in the image data. The boundary of the signature is determined with respect to a minimum density that must be achieved for a certain number of sequential slices. In one embodiment, the histogram analysis searches inwardly along both horizontal and vertical directions until the pixel density rises above a predefined cutoff threshold. So that the signature data is not inadvertently cropped, it is common to use low cutoff threshold values.

In one embodiment, once the boundaries of the signature have been determined, the signature data processing circuit 21218 crops the image data and extracts the signature image data. In one such embodiment, the cropping is performed by an image modification circuit that generates modified image data in which a portion of the image data not including the signature has been deleted. In other embodiments, various compression techniques are employed to reduce the memory requirements for the signature image data. One such technique includes the encoding of the signature image data by run length encoding. According to this technique, the length of each run of similar binarized values (i.e., the length of each run of 1 or 0) for each scan line is recorded as a means of reconstructing a bit map. Another encoding technique treats the signature image data as a data structure where the elements of the data structure consist of vectors. According this encoding technique, the signature is broken down into a collection of vectors. The position of each vector in combination with the length and orientation of each vector is used to reconstruct the original signature. In one such embodiment, the encoding process generates a new vector whenever the curvature for a continuous pixel run exceeds a specified value. A further compression technique employs B-Spline curve fitting. This technique has the capacity to robustly accommodate curvature and scaling issues.

In various embodiments, the signature image data or a compressed or encoded version of the signature image data is stored locally on a dedicated memory device. In one such embodiment, the local memory device can be a detachable memory device such as a CompactFlash memory card or the like described in more detail below. In another embodiment, the signature image data is stored in a volatile or non-volatile portion of general purpose memory and downloaded at a future time. In a further embodiment, the signature image data can be transmitted via wired or wireless means either at the time of capture or at a later point, such as when a data collection session has been completed.

In another embodiment, the signature data processing circuit 21218 does not perform a histogram analysis but simply stores in memory the entire image or a compressed version once the presence of a signature has been determined. In a further embodiment to save processing time, the initial image analysis is performed on a lower resolution image. Once the presence of a signature is determined in this embodiment, a higher resolution image is taken. In one embodiment, a signature extraction histogram analysis is performed on this image. Next, the image is stored in memory in either compressed or original format. In some embodiments, the image data is combined with other data to form a record for a particular item such as a package or shipping envelope. As mentioned above, some of the additional data that can be collected by the optical reader 100 and stored with or separate from the signature data includes but is not limited to dataform data, handwritten text data, typed text data, graphics data, image or picture data, and the like.

As part of its operations, the image processing and analysis circuit 21208 can be designed to perform specialized tasks for different data types. For example, if the generalized classifier circuit 21216 determines that the image data contains typed or machine readable text, the image data can be collected, possibly histogram analyzed, and stored or alternatively, the image data can be transferred to the OCR decoding circuit 21222. Similarly, if the generalized classifier circuit 21216 determines that the image data includes a graphic element, the image data can be transferred to the graphics analysis circuit 21224 for processing. In one embodiment, the graphics analysis circuit 21224 is configured to recognize and decode predefined graphics. In one such embodiment, the graphics analysis can include determining which, if any, boxes have been selected in the billing and shipping instructions on a shipping label. In a further embodiment, the graphics analysis can include locating and decoding the typed or handwritten text contained in the zip code box on a shipping label. In an alternative embodiment, the optical reader 100 can be configured to automatically attempt decode operations in addition to the dataform decode, such as OCR decoding or graphics decoding, prior to the activation of the feature extraction circuit 21212.

Figure 22F:
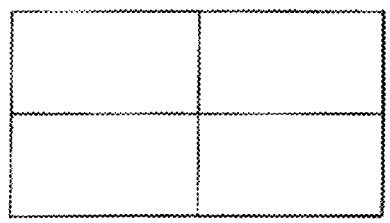
FIGS. 22f-22i are diagrammatic representations of an image data segmentation process according to embodiments of the invention.
Figure 22G:
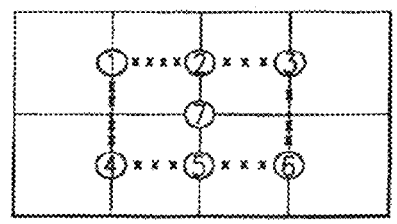
Figure 22H:
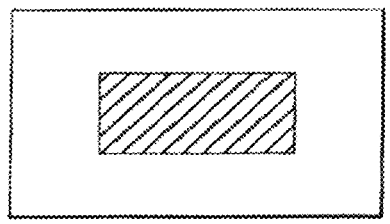
Figure 22I:
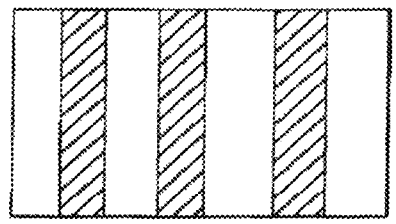

In another embodiment, the image processing and analysis circuit 21208 segments the image data into regions and performs a feature extraction and general classification analysis on each region. In one embodiment as shown in FIG. 22*f*, the standard rectangular image data window is divided into four equal sized sub-rectangles. In another embodiment shown in FIG. 22*g*, the segmentation consists of overlapping regions so that the total area of the segmented regions is larger than that of the complete field of the image data. In FIG. 22*g* there are seven shown overlapping regions where each identifying numeral is shown in the center of its region. In a further embodiment shown in FIGS. 22*h* and 22*i*, the segmentation consists of sample regions (shown as cross-hatched) within the complete field of the image data. In another embodiment, the sampled regions can be based on a preloaded user template that, for example, identifies regions of interest such as a signature region and/or a bar code region, in for example, a shipping label.

In one embodiment, the segmentation process is used to identify the location of a signature in image data the might include additional elements such as dataforms including bar code dataforms, text, graphics, images and the like. In one such embodiment the generalized classifier circuit 21216 classifies the contents of each region of the segmented image data. The region containing the signature is then extracted by the signature data processing circuit 21218. In one embodiment if multiple regions are indicated as containing signature data, the signature data processing circuit 21218 analyzes the arrangement of these regions to identify the region most likely to contain the image data. In a further embodiment when multiple regions are indicated as containing signature data, the image processing and analysis circuit 21208 establishes a feedback loop where additional segmented regions are generated and analyzed until a single segmented region containing signature data is located.

Additional image processing operations which may be carried out by optical reader 100 are described in U.S. patent application Ser. No. 10/958,779, filed Oct. 5, 2004 entitled, "System And Method To Automatically Discriminate Between A Signature And A Barcode" and incorporated herein by reference in its entirety.

Figure 13E:
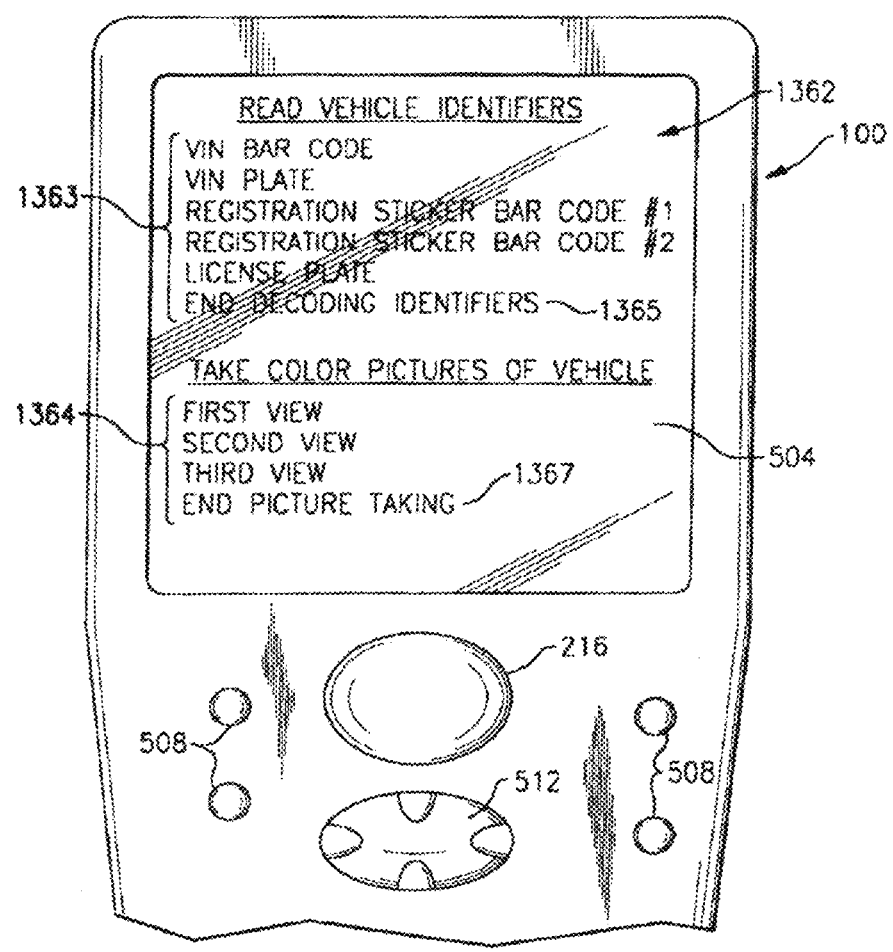
FIG. 13e is a view of an optical reader programmed to display a GUI form assisting an application wherein an optical reader, according to the invention, is utilized to decode bar code symbols and to take color pictures of a vehicle.

Various applications which may be carried out by any of the optical readers 100 that have been described herein have been described with reference to FIGS. 10, 11, 12*a* and 12*b*. Another application which can be carried out with any optical reader 100 described herein is described with reference to FIGS. 13*a*-13*e*. In FIG. 13*a* a motor vehicle 1282 is shown which may be a delivery vehicle or a passenger vehicle. Vehicle 1282 has a license plate 1314, a vehicle identification number (VIN) sticker 1306, typically located on the driver's side door jam. The VIN sticker 1306 carries a printed VIN number 1308 and a bar code symbol 1310. A VIN number is an alphanumeric unique vehicle identification number assigned at the time of manufacture of the vehicle. Vehicle 1282 may further include a VIN plate 1314 (FIG. 13*c*) carrying the characters of the VIN number etched on a metal plate and located under the vehicle windshield 1351, and a vehicle registration sticker 1320. Vehicle 1282 has a plurality of machine readable vehicle identifiers. Specifically, the characters of license plate 1284 can be OCR decoded by optical reader. Further, VIN sticker 1308 has a VIN bar code 1310 and registration sticker 1320 which may include a plurality of bar code symbols 1322, 1324 encoding the vehicle registration number and possibly redundantly encoding the VIN number of vehicle 1282. The characters etched on VIN plate 1314 can also be subject to OCR decoding by optical reader 100. Further, the VIN characters of VIN sticker 1306 can be subject to OCR decoding by optical reader 100. It may be advantageous to utilize an optical reader including light polarizing pixels 250P having light polarizing filter elements 261 when reading VIN plate 1314 given that specular reflection read conditions are more prevalent when decoding indicia encoded by etching on metal surface.

In an application for utilizing optical reader 100 relative to vehicle 1282, several identifiers of vehicle 1282 may be decoded and several color pictures of vehicle 1282 may be taken. The decoded message data together with the color picture data may then be uploaded to a remote server 184 (FIG. 10) which archives and creates accessible web pages containing reports summarizing the identifier and picture information. In one application LAN 170 (FIG. 10) is a LAN at an automobile insurance claim center, LAN 185 is a distant data archiving center operated by the automobile insurance provider and LAN 2170 is a LAN apart from LAN 170 and LAN 185 and may be located, e.g., at a claim center of the insurance provider other than the claim center in which LAN 170 is located.

Optical reader 100 may be configured so that when an operator actuates a designated user interface control button such as button 3158 (FIG. 9b) an auto insurance application form 1362 is displayed on display 504 which aids an operator of optical reader 100 in entering data into reader 100. Form 1362 first prompts an operator to read several machine readable identifiers of vehicle 1282. Form 1362 prompts an operator to read VIN bar code symbol 1310, then characters of VIN plate 1314, then the first registration sticker bar code symbol 1310, then the second registration sticker bar code symbol 1324, then the character of the license plate 1284. The text corresponding to each identifier may be highlighted when data corresponding to the identifier is read. When data corresponding to identifier decode section 1363 of form 1362 is being entered, optical reader 100 is in a decode mode of operation such that actuation of trigger 216 causes optical reader 100 to obtain a decode frame at step 1204 and transfer the decode frame to decode circuit 1702. The decode frame may contain monochrome image data read from a hybrid monochrome image sensor array 182, 182A. Where optical reader 100 has separate picture taking and decoding imaging assemblies as described in connection with FIGS. 17a-17g, the decode frame at step 1204 is obtained by actuation of the imaging assembly within block 598 (FIG. 17a). When entry of decoded vehicle identifier information is complete, an operator toggles to line 1365 and clicks an appropriate key of keyboard 508 to indicate that identifier decoding is complete. Form 1362 then prompts an operator to take pictures of vehicle 1282 for purposes of making a record of the damage to vehicle 1282. The inventor discovered that the incorporation of color filter elements into an image sensor array 182 of optical reader 100 facilitates the obtaining of visual display frames of image data that accurately record damage to a vehicle. With visual display color frames of image data corresponding to vehicle 1282 being stored and/or displayed for visual display, damage to vehicle 1282 can readily be assessed by visual inspection of the visual display frames when displayed on a display 504, 1504. When damage records are recorded with color image data, the amount of paint scratched from a vehicle, for example, can readily be assessed by visual inspection. Section 1364 of display form 1362 prompts an operator to take several color pictures of vehicle. When picture entry section 1364 of form 1362 is being executed, optical reader 100 is in a picture taking mode such that actuation of trigger 216 causes a visual display frame of image data to be obtained at step 1404 (FIG. 14c). The visual display frame of image data may be output to e.g., a storage device and/or a display device. When data corresponding to form section 1364 is being entered, an operator may use optical reader 100 to take several color pictures of damaged area 1370 of vehicle 1282. While executing obtain step 1404, control circuit 552 may selectively read out color image data from color sensitive pixels 250C as described herein and possibly utilize monochrome image data for enhancement of the information content of the color image data. Where optical reader 100 includes a pair of imaging assemblies as described in connection with FIGS. 17a-17g, control circuit 552 at step 1404 may actuate color image sensor array 182D for execution of obtain step 1404. When an operator inputs a confirmation that all necessary pictures of vehicle 1282 have been taken by toggling to line 1367 and clicking an appropriate key of keyboard 508, control circuit 552, which may be incorporated in hand held housing 101, may format obtained visual display color frames of image data in one or more suitably image file formats, (e.g., .BMP, .TIFF, .PDF, .JPG, .GIF) assemble all the collected decoded vehicle identifier data and all of the visual display color frames of image data corresponding to vehicle 1282 into a transaction data set, and send the transaction data set to distant remote server 184. Control circuit 552 may date/time stamp the transaction data set on sending. The File Transfer Protocol (FTP) may be utilized to send the transaction data set or another suitable file transferring protocol configured to carry associated decoded vehicle identifier data (such as decoded VIN bar code data and decode vehicle registration bar code data) and color image data. Server 184 may store the received transaction data set into a database as indicated by database 187 including similar information from other vehicles at other claim centers. Server 184 may be configured to create viewable web pages summarizing the transaction set data (e.g., the date/time stamped combined VIN, registration number, license plate number and record-of damage visual display color frames of image data). These web pages may be viewed using any PC in communication with IP network, e.g., PC 172 and PC 2172.

While the present invention has necessarily been described with reference to a number of specific embodiments, it will be understood that the time, spirit, and scope of the present invention should be determined only with reference to the following claims.

I claim:

1. An optical reader comprising:
   a first image sensor array, the first image sensor array being a pixel array having a plurality of first pixels;
   a first imaging lens associated with the first image sensor array; and
   a memory storing instructions that, when executed by a processor, configure the apparatus to:
   capture one or more color frames of image data;
   capture one or more decode frames of image data;

decode one or more decodable indicia in the one or more decode frames of image data;
associate the one or more color frames of image data with the one or more decode frames of image data;
receive one or more second color frames of image data captured by a second optical reader; and
compare at least one of the one or more color frames of data and at least one of the one or more second color frames of image data to detect differences in a parcel between the two or more stored first color frames of image data.

2. The optical reader of claim 1, further comprising:
a second image sensor array, the second image sensor array being a pixel array having a plurality of second pixels; and
a second imaging lens associated with the second image sensor array,
wherein the second image sensor array is configured to capture the one or more color frames of image data, and
wherein the first image sensor array is configured to capture the one or more decode frames of image data.

3. The optical reader of claim 1, wherein the first image sensor array is a two-dimensional CMOS image sensor array comprising the plurality of first pixels disposed in a plurality of rows, the plurality of first pixels being operable in a global shutter mode of operation, and wherein the one or more decodable indicia comprise one or more two-dimensional bar codes.

4. The optical reader of claim 1, wherein associating the one or more color frames of image data with the one or more decode frames of image data comprises:
identifying a parcel identifier decoded from the one or more decodable indicia; and
storing the parcel identifier in association with the one or more color frames of image data.

5. The optical reader of claim 4, wherein storing the parcel identifier in association with the one or more color frames of image data comprises transmitting the parcel identifier and the one or more color frames of image data to a remote server comprising a database of other color frames of image data associated with a plurality of other parcel identifiers.

6. The optical reader of claim 1, wherein the one or more decode frames of image data define a reduced area relative to the one or more color frames of image data.

7. The optical reader of claim 6, further comprising an aiming illumination light source, wherein the aiming illumination light source is configured to project an aiming pattern that aligns with a location corresponding to the reduced area of the one or more decode frames of image data.

8. An optical reader comprising:
a color display comprising a touch screen, wherein the color display defines a plane of the display, wherein the color display further comprises a graphical user interface with virtual selectable buttons;
a radio frequency communication interface, wherein the radio frequency communication interface is operable to communicate via at least one of Bluetooth, 802.11, and GSM/GPRS;
a first image sensor array, the first image sensor array being a pixel array having a plurality of first pixels;
a first imaging lens associated with the first image sensor array;
a processor that implements a multitasking operation system; and
a memory storing instructions that, when executed by a processor, configure the apparatus to:
capture one or more color frames of image data;
capture one or more decode frames of image data;
decode one or more decodable indicia in the one or more decode frames of image data;
associate the one or more color frames of image data with the one or more decode frames of image data;
receive one or more second color frames of image data captured by a second optical reader; and
compare at least one of the one or more color frames of data and at least one of the one or more second color frames of image data to detect differences in a parcel between the two or more stored first color frames of image data.

9. The optical reader of claim 8, further comprising:
a second image sensor array, the second image sensor array being a pixel array having a plurality of second pixels; and
a second imaging lens associated with the second image sensor array,
wherein the second image sensor array is configured to capture the one or more color frames of image data, and
wherein the first image sensor array is configured to capture the one or more decode frames of image data.

10. The optical reader of claim 8, wherein the first image sensor array is a two-dimensional CMOS image sensor array comprising the plurality of first pixels disposed in a plurality of rows, the plurality of first pixels being operable in a global shutter mode of operation, and wherein the one or more decodable indicia comprise one or more two-dimensional bar codes.

11. The optical reader of claim 8, wherein associating the one or more color frames of image data with the one or more decode frames of image data comprises:
identifying a parcel identifier decoded from the one or more decodable indicia; and
storing the parcel identifier in association with the one or more color frames of image data.

12. The optical reader of claim 11, wherein storing the parcel identifier in association with the one or more color frames of image data comprises transmitting the parcel identifier and the one or more color frames of image data to a remote server comprising a database of other color frames of image data associated with a plurality of other parcel identifiers.

13. The optical reader of claim 8, wherein the one or more decode frames of image data define a reduced area relative to the one or more color frames of image data.

14. The optical reader of claim 13, further comprising an aiming illumination light source, wherein the aiming illumination light source is configured to project an aiming pattern that aligns with a location corresponding to the reduced area of the one or more decode frames of image data.

15. A system comprising:
a plurality of optical readers, wherein each optical reader comprises:
a first image sensor array, the first image sensor array being a pixel array having a plurality of first pixels;
a first imaging lens associated with the first image sensor array; and
a memory storing instructions that, when executed by a processor, configure the apparatus to:
capture one or more color frames of image data;
capture one or more decode frames of image data;
decode one or more decodable indicia in the one or more decode frames of image data; and associate the one or more color frames of image data with the one or more decode frames of image data; and at least one remote server connected with the plurality of optical readers via at least one of one or more wired networks and/or one or more wireless networks, wherein the at least one remote server comprises non-transitory computer readable memory storing a plurality of stored color frames of image data received from the plurality of optical readers, wherein the plurality of stored color frames of image data are stored in association with a plurality of parcel identifiers, wherein the system is further configured to compare two or more stored first color frames of image data of the plurality of stored color frames of image data to detect differences in a parcel between the two or more stored first color frames of image data.

16. The system of claim 15, wherein the plurality of stored color frames of image data are stored in a database that is indexed by the plurality of parcel identifiers.

17. The system of claim 15, wherein associating the one or more color frames of image data with the one or more decode frames of image data comprises:

identifying a parcel identifier decoded from the one or more decodable indicia; and transmitting the parcel identifier to the at least one remote server in association with the one or more color frames of image data.

18. The system of claim 15, further comprising identifying at least one of a location and optical reader from the plurality of optical readers associated with each of the two or more stored first color frames of image data, and determining which of the at least one location and optical reader is associated with damage to the parcel.

19. The system of claim 15, further configured to display a web page comprising one or more of the plurality of stored color frames of image data to a user.

* * * * *